US008907980B2

(12) United States Patent
Nielsen et al.

(10) Patent No.: US 8,907,980 B2
(45) Date of Patent: Dec. 9, 2014

(54) METHODS, APPARATUS AND SYSTEMS FOR GENERATING SEARCHABLE ELECTRONIC RECORDS OF UNDERGROUND FACILITY LOCATE AND/OR MARKING OPERATIONS

(75) Inventors: Steven Nielsen, North Palm Beach, FL (US); Curtis Chambers, Palm Beach Gardens, FL (US); Jeffrey Farr, Jupiter, FL (US); Greg Block, Juno Beach, FL (US)

(73) Assignee: Certus View Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 12/831,330

(22) Filed: Jul. 7, 2010

(65) Prior Publication Data

US 2011/0007076 A1 Jan. 13, 2011

Related U.S. Application Data

(60) Provisional application No. 61/223,636, filed on Jul. 7, 2009.

(30) Foreign Application Priority Data

Jul. 6, 2010 (CA) ...................................... 2707246

(51) Int. Cl.
*G09G 5/00* (2006.01)
*G06F 17/30* (2006.01)
*G06Q 50/06* (2012.01)
(52) U.S. Cl.
CPC .......... *G06Q 50/06* (2013.01); *G06F 17/30241* (2013.01); *G09G 5/00* (2013.01)
USPC ...................................................... 345/629
(58) Field of Classification Search
USPC ........................................................ 345/629
See application file for complete search history.

(56) References Cited

U.S. PATENT DOCUMENTS 3,986,777 A 10/1976 Roll
4,623,282 A 11/1986 Allen
(Continued)

FOREIGN PATENT DOCUMENTS

CA 2386200 4/2001
CA 2418157 7/2004
(Continued)

OTHER PUBLICATIONS

U.S. Appl. No. 12/029,732, filed Feb. 12, 2008, Nielsen et al.
(Continued)

*Primary Examiner* — Kee M Tung
*Assistant Examiner* — Peter Hoang

(57) ABSTRACT

Manual, semi-automated or automated image-based electronic manifests of locate operations. Image layers may be selectively enabled or disabled for display to facilitate viewing of base images and/or categories of information overlaid on the base image(s) relating to the locate operation. Accuracy indicators and/or calibration factors may be employed to ensure geographic integrity and appropriate registration of displayed information. Revision layers may be employed so that "raw" data, modified data, and/or annotated images may be maintained and locked to prevent unauthorized modifications. Limited access files may be employed to prevent unauthorized edits or use. Base images may be sketched manually with a drawing tool, and/or edge-detection and other image processing algorithms may be employed to improve feature recognition and/or remove undesirable features. Safeguards are employed to ensure that manifests are created at or near the work site, and information in the manifests may be analyzed to assess labor/material costs.

57 Claims, 51 Drawing Sheets

(56) References Cited

U.S. PATENT DOCUMENTS

| | | |
|---|---|---|
| 4,688,921 A | 8/1987 | Wakabayashi |
| 5,414,462 A | 5/1995 | Veatch |
| 5,448,263 A | 9/1995 | Martin |
| 5,576,973 A | 11/1996 | Haddy |
| 5,644,237 A | 7/1997 | Eslambolchi et al. |
| 5,689,415 A | 11/1997 | Calotychos et al. |
| 5,699,244 A | 12/1997 | Clark, Jr. et al. |
| 5,815,411 A | 9/1998 | Ellenby et al. |
| 5,920,194 A | 7/1999 | Lewis et al. |
| 5,987,380 A | 11/1999 | Backman et al. |
| 5,991,694 A | 11/1999 | Gudat et al. |
| 6,101,087 A | 8/2000 | Sutton et al. |
| 6,127,827 A | 10/2000 | Lewis |
| 6,141,000 A | 10/2000 | Martin |
| 6,201,883 B1 | 3/2001 | Mizui |
| 6,299,934 B1 | 10/2001 | Manning |
| 6,337,681 B1 | 1/2002 | Martin |
| 6,351,707 B1 | 2/2002 | Ichikawa |
| 6,371,692 B1 | 4/2002 | Fatigati |
| 6,421,725 B1 | 7/2002 | Vermilyea et al. |
| 6,426,872 B1 | 7/2002 | Sutton et al. |
| 6,430,499 B1 | 8/2002 | Nakano |
| 6,437,708 B1 | 8/2002 | Brouwer |
| 6,477,475 B1 | 11/2002 | Takaoka et al. |
| 6,493,650 B1 | 12/2002 | Rodgers et al. |
| 6,567,116 B1 | 5/2003 | Aman et al. |
| 6,597,992 B2 | 7/2003 | Rooney et al. |
| 6,650,293 B1 | 11/2003 | Eslambolchi et al. |
| 6,650,834 B2 | 11/2003 | Ume |
| 6,701,647 B2 | 3/2004 | Stump |
| 6,710,741 B2 | 3/2004 | Tucker |
| 6,723,375 B2 | 4/2004 | Zeck et al. |
| 6,747,636 B2 | 6/2004 | Martin |
| 6,751,552 B1 | 6/2004 | Minelli |
| 6,751,553 B2 | 6/2004 | Young et al. |
| 6,772,142 B1 | 8/2004 | Kelling et al. |
| 6,778,128 B2 | 8/2004 | Tucker et al. |
| 6,798,379 B2 | 9/2004 | Tucker et al. |
| 6,803,906 B1 | 10/2004 | Morrison et al. |
| 6,850,161 B1 | 2/2005 | Elliott et al. |
| 6,853,905 B2 | 2/2005 | Barton |
| 6,873,998 B1 | 3/2005 | Dorum |
| 6,895,356 B2 | 5/2005 | Brimhall et al. |
| 6,898,525 B1 | 5/2005 | Minelli |
| 6,904,361 B1 | 6/2005 | Tallman et al. |
| 6,941,890 B1 | 9/2005 | Cristo et al. |
| 6,950,535 B2 | 9/2005 | Sibayama |
| 6,956,524 B2 | 10/2005 | Tucker et al. |
| 6,957,250 B1 | 10/2005 | Nakano |
| 6,958,690 B1 | 10/2005 | Asher et al. |
| 6,972,698 B2 | 12/2005 | Deguchi |
| 6,975,942 B2 | 12/2005 | Young et al. |
| 6,999,021 B2 | 2/2006 | Taylor, Jr. et al. |
| 7,003,138 B2 | 2/2006 | Wilson |
| 7,009,399 B2 | 3/2006 | Olsson et al. |
| 7,027,653 B2 | 4/2006 | Hino |
| 7,120,564 B2 | 10/2006 | Pacey |
| 7,142,196 B1 | 11/2006 | Connor et al. |
| 7,185,021 B2 | 2/2007 | Kishigami |
| 7,216,034 B2 | 5/2007 | Vitikainen et al. |
| 7,222,986 B2 | 5/2007 | Mah |
| 7,236,162 B2 | 6/2007 | Morrison et al. |
| 7,262,797 B2 | 8/2007 | Weldum |
| 7,274,756 B2 | 9/2007 | Kuijk |
| 7,372,247 B1 | 5/2008 | Giusti et al. |
| 7,400,976 B2 | 7/2008 | Young et al. |
| 7,417,641 B1 | 8/2008 | Barber |
| 7,437,830 B2 | 10/2008 | Kulavic |
| 7,469,247 B2 | 12/2008 | Cossins et al. |
| 7,482,973 B2 | 1/2009 | Tucker et al. |
| 7,584,123 B1 | 9/2009 | Karonis et al. |
| 7,613,331 B2 | 11/2009 | Maeda |
| 7,626,496 B1 | 12/2009 | Asher et al. |
| 7,636,901 B2 | 12/2009 | Munson |
| 7,640,105 B2 | 12/2009 | Nielsen et al. |
| 7,664,530 B2 | 2/2010 | Skelton |
| 7,773,095 B1 | 8/2010 | Badrak et al. |
| 7,777,648 B2 | 8/2010 | Smith et al. |
| 7,834,806 B2 | 11/2010 | Tucker et al. |
| 7,886,616 B1 | 2/2011 | Hayman |
| 7,889,124 B2 | 2/2011 | Islam et al. |
| 7,889,888 B2 | 2/2011 | Deardorr |
| 7,917,292 B1 | 3/2011 | Du |
| 7,978,129 B2 | 7/2011 | Sawyer et al. |
| 8,045,995 B2 | 10/2011 | King |
| 8,054,343 B2 | 11/2011 | Cheatle et al. |
| 8,081,112 B2 | 12/2011 | Tucker et al. |
| 8,144,058 B2 | 3/2012 | Sawyer, Jr. et al. |
| 8,150,826 B2 | 4/2012 | Arrouye et al. |
| 8,204,642 B2 | 6/2012 | Tanaka et al. |
| 8,300,925 B2 | 10/2012 | Kunieda |
| 8,311,765 B2 | 11/2012 | Nielsen et al. |
| 8,473,148 B2 | 6/2013 | Nielsen et al. |
| 8,484,300 B2 | 7/2013 | Nielsen et al. |
| 8,532,341 B2 | 9/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 2001/0036295 A1 | 11/2001 | Hendrickson |
| 2001/0049470 A1 | 12/2001 | Mault et al. |
| 2002/0013704 A1 | 1/2002 | Finney |
| 2002/0044690 A1 | 4/2002 | Burgess |
| 2002/0052755 A1 | 5/2002 | Whatley et al. |
| 2002/0059296 A1 | 5/2002 | Hayashi et al. |
| 2002/0122119 A1 | 9/2002 | Takakura |
| 2002/0124177 A1 | 9/2002 | Harper |
| 2002/0145617 A1 | 10/2002 | Kennard |
| 2002/0184235 A1 | 12/2002 | Young |
| 2003/0012411 A1 | 1/2003 | Sjostrom |
| 2003/0095708 A1 | 5/2003 | Pittel |
| 2003/0110184 A1 | 6/2003 | Gibson et al. |
| 2003/0164053 A1 | 9/2003 | Ignagni |
| 2003/0222815 A1 | 12/2003 | Tucker |
| 2004/0006425 A1 | 1/2004 | Wood et al. |
| 2004/0008883 A1 | 1/2004 | Shi et al. |
| 2004/0073578 A1 | 4/2004 | Nam |
| 2004/0146185 A1 | 7/2004 | Blair |
| 2004/0148191 A1 | 7/2004 | Hoke |
| 2004/0150556 A1 | 8/2004 | Tucker et al. |
| 2004/0151388 A1 | 8/2004 | Maeda |
| 2004/0168358 A1 | 9/2004 | Stump |
| 2004/0199410 A1 | 10/2004 | Feyen et al. |
| 2004/0203909 A1 | 10/2004 | Koster |
| 2004/0210370 A1 | 10/2004 | Gudat et al. |
| 2004/0210386 A1 | 10/2004 | Wood |
| 2004/0220731 A1 | 11/2004 | Tucker |
| 2004/0252303 A1 | 12/2004 | Giorgianni et al. |
| 2005/0033513 A1 | 2/2005 | Gasbarro |
| 2005/0034074 A1 | 2/2005 | Munson |
| 2005/0046584 A1 | 3/2005 | Breed |
| 2005/0057745 A1 | 3/2005 | Bontje |
| 2005/0104775 A1 | 5/2005 | Tucker et al. |
| 2005/0122518 A1 | 6/2005 | Overbeck et al. |
| 2005/0125389 A1 | 6/2005 | Hazzard et al. |
| 2005/0183028 A1 | 8/2005 | Clough et al. |
| 2005/0192752 A1 | 9/2005 | Rooney |
| 2005/0203768 A1 | 9/2005 | Florance |
| 2005/0219268 A1 | 10/2005 | Kyle |
| 2005/0254704 A1 | 11/2005 | Komiya et al. |
| 2006/0020417 A1 | 1/2006 | Koch et al. |
| 2006/0058945 A1 | 3/2006 | Watanabe |
| 2006/0077095 A1 | 4/2006 | Tucker et al. |
| 2006/0085396 A1 | 4/2006 | Evans et al. |
| 2006/0091888 A1 | 5/2006 | Holman et al. |
| 2006/0161349 A1 | 7/2006 | Cross et al. |
| 2006/0229809 A1 | 10/2006 | Chen |
| 2006/0235741 A1 | 10/2006 | Deaton et al. |
| 2006/0239560 A1 | 10/2006 | Sternby |
| 2006/0282191 A1 | 12/2006 | Gotfried |
| 2006/0282280 A1 | 12/2006 | Stotz et al. |
| 2007/0011271 A1 | 1/2007 | Baker et al. |
| 2007/0027591 A1 | 2/2007 | Goldenberg |
| 2007/0031029 A1 | 2/2007 | Sasaki |
| 2007/0076920 A1 | 4/2007 | Ofek |

(56) References Cited

U.S. PATENT DOCUMENTS

| | | |
|---|---|---|
| 2007/0100768 A1 | 5/2007 | Boccon-Gibod et al. |
| 2007/0110316 A1 | 5/2007 | Ohashi |
| 2007/0118278 A1 | 5/2007 | Finn et al. |
| 2007/0143676 A1 | 6/2007 | Chen |
| 2007/0182721 A1 | 8/2007 | Watanabe et al. |
| 2007/0187574 A1 | 8/2007 | Lia |
| 2007/0219722 A1 | 9/2007 | Sawyer, Jr. |
| 2007/0258642 A1 | 11/2007 | Thota |
| 2007/0286021 A1 | 12/2007 | Hoenmans et al. |
| 2008/0021863 A1 | 1/2008 | Evans |
| 2008/0025614 A1 | 1/2008 | Hintz et al. |
| 2008/0059889 A1 | 3/2008 | Parker et al. |
| 2008/0075368 A1 | 3/2008 | Kuzmin |
| 2008/0109751 A1 | 5/2008 | Fitzmaurice et al. |
| 2008/0180322 A1 | 7/2008 | Islam |
| 2008/0192235 A1 | 8/2008 | Komiya et al. |
| 2008/0208415 A1 | 8/2008 | Vik |
| 2008/0245299 A1 | 10/2008 | Nielsen et al. |
| 2008/0284902 A1 | 11/2008 | Konno et al. |
| 2008/0285805 A1 | 11/2008 | Luinge et al. |
| 2008/0292295 A1 | 11/2008 | Konno et al. |
| 2009/0004410 A1 | 1/2009 | Thomson et al. |
| 2009/0012418 A1 | 1/2009 | Gerlach et al. |
| 2009/0013806 A1 | 1/2009 | Miller |
| 2009/0013928 A1 | 1/2009 | Nielsen et al. |
| 2009/0067695 A1 | 3/2009 | Komiya et al. |
| 2009/0070071 A1 | 3/2009 | Wood |
| 2009/0092297 A1 | 4/2009 | Kitoh et al. |
| 2009/0100185 A1 | 4/2009 | Shehan et al. |
| 2009/0121937 A1 | 5/2009 | Kaegebein |
| 2009/0185712 A1 | 7/2009 | Wong et al. |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0237263 A1 | 9/2009 | Sawyer, Jr. et al. |
| 2009/0237297 A1 | 9/2009 | Davis et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0257620 A1 | 10/2009 | Hicks |
| 2009/0306881 A1 | 12/2009 | Dolgov et al. |
| 2009/0322868 A1 | 12/2009 | Ikeda |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0033684 A1 | 2/2010 | Thiebaud |
| 2010/0045517 A1 | 2/2010 | Tucker et al. |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0091200 A1 | 4/2010 | Vigouroux |
| 2010/0094553 A1 | 4/2010 | Nielsen et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |

(56) References Cited

U.S. PATENT DOCUMENTS

| | | |
|---|---|---|
| 2011/0241936 A1 | 10/2011 | Sawyer, Jr. et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0257785 A1 | 10/2012 | Narayan et al. |
| 2012/0259550 A1 | 10/2012 | Du |
| 2012/0274476 A1 | 11/2012 | Nielsen et al. |
| 2012/0290190 A1 | 11/2012 | Kim et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0147637 A1 | 6/2013 | Nielsen et al. |
| 2013/0162431 A1 | 6/2013 | Nielsen et al. |
| 2013/0174072 A9 | 7/2013 | Nielsen et al. |
| 2013/0182009 A1 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2013/0325542 A1 | 12/2013 | Tucker et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |

FOREIGN PATENT DOCUMENTS

| | | |
|---|---|---|
| CA | 2423148 | 9/2004 |
| CA | 2574595 | 2/2006 |
| CA | 2811172 | 2/2006 |
| CA | 2528795 | 6/2007 |
| CA | 2632267 | 6/2007 |
| CA | 2643844 | 9/2007 |
| CA | 2713282 | 3/2013 |
| EP | 1769270 | 4/2007 |
| WO | WO-02/067083 | 8/2002 |
| WO | WO2005052627 | 6/2005 |
| WO | WO2006014724 | 2/2006 |
| WO | WO2007067898 | 6/2007 |
| WO | WO2007106871 | 9/2007 |
| WO | WO2008005837 | 1/2008 |

OTHER PUBLICATIONS

U.S. Appl. No. 12/208,846, filed Sep. 11, 2008, Nielsen et al.
U.S. Appl. No. 12/363,009, filed Jan. 30, 2009, Nielsen et al.
U.S. Appl. No. 12/363,046, filed Jan. 30, 2009, Nielsen et al.
U.S. Appl. No. 12/366,050, filed Feb. 5, 2009, Nielsen et al.
U.S. Appl. No. 12/607,843, filed Oct. 28, 2009, Nielsen et al.
U.S. Appl. No. 12/369,232, filed Feb. 11, 2009, Nielsen et al.
U.S. Appl. No. 12/369,565, filed Feb. 11, 2009, Nielsen et al.
U.S. Appl. No. 13/190,138, filed Jul. 25, 2011, Nielsen et al.
U.S. Appl. No. 13/190,185, filed Jul. 25, 2011, Nielsen et al.
U.S. Appl. No. 13/191,048, filed Jul. 26, 2011, Nielsen et al.
U.S. Appl. No. 13/191,058, filed Jul. 26, 2011, Nielsen et al.
U.S. Appl. No. 13/194,121, filed Jul. 29, 2011, Nielsen et al.
U.S. Appl. No. 13/194,163, filed Jul. 29, 2011, Nielsen et al.
U.S. Appl. No. 13/193,337, filed Jul. 28, 2011, Nielsen et al.
U.S. Appl. No. 13/185,194, filed Jul. 18, 2011, Nielsen et al.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
InMaps Develops Critical Database Link to Keep UGI Automation on Track, Holdemess, NH, Sep. 2006, http://www.inmaps.com/InMaps-develops-critical-database-link-to-keep-ugi-automation-on-track, 1 page.
International Search Report, Application No. PCT/US10/041160, Oct. 6, 2010.
Notice of Allowance dated Oct. 6, 2011 from CA Application No. 2,715,312.
Office Action dated Jun. 23, 2011 from U.S. Appl. No. 12/208,846.
Office Action dated Jul. 13, 2011 from U.S. Appl. No. 12/029,732.
Office Action dated Oct. 4, 2011 from Canadian Application No. 2,707,246.
Office Action dated Oct. 6, 2011 from U.S. Appl. No. 12/366,050.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
UGI Utilities Selects KEMA for FLAME Project Implementation, Burlington, Massachusetts, Electric Energy Publications, Inc., Feb. 10, 2004, http://www.eet-d.com/?page=show_news&id=17641, 2 pages.
UGI Utilities, Inc., FLAME Project White Paper, (original publication date unknown), received Aug. 3, 2011, 12 pages.
Office Action dated Nov. 23, 2011 from U.S. Appl. No. 12/208,846.
Office Action dated Nov. 23, 2011 from U.S. Appl. No. 12/363,009.
Office Action dated Nov. 26, 2010 from Australian Application No. 2009213151.
Office Action dated Nov. 29, 2011 from Australian Application No. 2009213151.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
GPS Technology Enhancing Underground Utility Locating, Underground Construction Magazine, Apr. 2010, 3 pages.
International Search Report and Written Opinion, Application Serial No. PCT/US2009/000859, Apr. 14, 2009.
Letter from Norfield Data Products to Wolf Greenfield & Sacks, P.C., May 5, 2010, 2 pages.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Virginia Pilot Project, Incorporating GPS Technology to Enhance One-Call Damage Prevention, Phase I—Electronic White Lining Project Report, Nov. 2007, 50 pages.
Binder 1: "Virginia Utility Protection Service, Inc. Response to US Patent Application Publication . . . ," pp. DY0001-DY0755, Nov. 3, 2010.
Binder 2: "Patent US 2009 0237408," pp. DY0756-DY1271, Nov. 3, 2010.
Binder 3: "Patent US 2009 0238414," pp. DY1272-DY2210, Nov. 3, 2010.

(56) References Cited

OTHER PUBLICATIONS

Binder 4: "Patent US 2009 0238415," pp. DY2211-DY3308, Nov. 3, 2010.
Binder 5: "Patent US 2009 0238416," pp. DY3309-DY3889, Nov. 3, 2010.
Binder 6: "Patent US 2009 0238417," pp. DY3890-DY4133, Nov. 3, 2010.
Binder 7: "Patent US 2009 0241045," pp. DY4134-DY4276, Nov. 3, 2010.
Binder 8: "Patent US 2009 0241046," pp. DY4277-DY4499, Nov. 3, 2010.
R. Pevarski, Letter from the Virginia Utility Protection Service, Inc., dated Apr. 7, 2010.
H.L. Smith, Letter dated Oct. 27, 2010.
H.L Smith, Letter dated Jan. 14, 2011, with two attachments each dated Jan. 5, 2011.
Notice of Allowance dated Jul. 11, 2012 from U.S. Appl. No. 12/366,050.
Office Action dated Jun. 8, 2012 from U.S. Appl. No. 13/194,163.
Office Action dated Jun. 28, 2012 from U.S. Appl. No. 12/369,565.
Office Action dated Jul. 17, 2012 from U.S. Appl. No. 12/369,232.
Ross, C., "2d Tile Map Editor," Oct. 19, 2005, http://www.blitzbasic.com/Community/posts.php?topic=52152, pp. 1-3.
w3schools; "JavaScript Pop Up Boxes," Aug. 11, 2005; http://www.w3schools.com/js/js_popup.asp, pp. 1-2.
Office Action dated May 24, 2012 from U.S. Appl. No. 13/194,121.
Office Action dated May 24, 2012 from U.S. Appl. No. 13/190,138.
Notice of Allowance dated Apr. 30, 2012 from U.S. Appl. No. 12/208,846.
Notice of Allowance dated Dec. 13, 2011 from U.S. Appl. No. 12/369,565.
Office Action dated Jan. 20, 2012 from U.S. Appl. No. 13/190,138.
Office Action dated Feb. 16, 2012 from U.S. Appl. No. 12/369,232.
Office Action dated Feb. 29, 2012 from U.S. Appl. No. 12/833,117.
Office Action dated Mar. 2, 2012 from U.S. Appl. No. 12/831,330.
Office Action dated Mar. 8, 2012 from U.S. Appl. No. 13/190,185.
Office Action dated Mar. 19, 2012 from U.S. Appl. No. 12/208,846.
Office Action dated Apr. 17, 2012 from U.S. Appl. No. 12/607,843.
Office Action dated Apr. 23, 2012 from U.S. Appl. No. 12/366,050.
Office Action dated Apr. 25, 2012 from U.S. Appl. No. 12/363,046.
Office Action dated May 1, 2012 from U.S. Appl. No. 12/363,009.
Office Action dated May 7, 2012 from U.S. Appl. No. 13/193,337.
Heath, M. et al., "Comparison of Edge Detectors: A Methodology and Initial Study," 1996, IEEE Computer Society Press; http://citeseerx.ist.psu.edu/viewdoc/summary?doi=10.1.45.5214.
Office Action dated Apr. 5, 2012 from U.S. Appl. No. 13/191,048.
Office Action dated Apr. 6, 2012 from U.S. Appl. No. 13/191,058.
Office Action dated Apr. 11, 2012 from U.S. Appl. No. 12/029,732.
U.S. Appl. No. 13/741,080, filed Jan. 14, 2013, Nielsen et al.
Office Action dated Jan. 2, 2013 from U.S. Appl. No. 12/363,009.
Office Action dated Jan. 15, 2013 from U.S. Appl. No. 12/029,732.
Office Action dated Dec. 28, 2012 from U.S. Appl. No. 13/193,337.
Office Action dated Dec. 30, 2013 from Canadian Application No. 2,707,246.
Notice of Allowance dated Jan. 31, 2013 from U.S. Appl. No. 12/363,046.
Office Action dated Feb. 12, 2013 from U.S. Appl. No. 12/833,117.
U.S. Appl. No. 13/758,336, filed Feb. 4, 2013, Nielsen et al.
U.S. Appl. No. 13/796,487, filed Mar. 12, 2013, Nielsen et al.
Complaint for Patent Infringement dated May 28, 2013, *CertusView Technologies LLC v. S&N Locating Services, LLC et al.*, Case No. 1:13CV646, USDC Eastern District of Virginia.
Complaint for Patent Infringement dated Apr. 10, 2013, *CertusView Technologies LLC v. United States Infrastructure Corporation et al.*, Case No. 2:13CV182, USDC Eastern District of Virginia.
Office Action dated May 20, 2013 from U.S. Appl. No. 13/741,080.
Office Action dated May 28, 2013 from U.S. Appl. No. 13/193,337.
Office Action dated Apr. 22, 2013 from U.S. Appl. No. 13/734,415.
Office Action dated May 7, 2013 from U.S. Appl. No. 13/191,058.
Office Action dated Apr. 23, 2013 from U.S. Appl. No. 13/191,048.

Office Action dated Feb. 4, 2013 from Australian Application No. 2010270589.
Office Action dated Feb. 4, 2013 from Canadian Application No. 2,707,246.
Notice of Allowance dated Jun. 6, 2013 from U.S. Appl. No. 13/796,487.
ArcFM UT, "A GIS for Utilities Based on Standards," White Paper, AED SICAD, Sep. 2008, 1-28.
ArcFM, White Paper, 2006, 1-28.
ArcGIS 9, Geocoding in ArcGIS, Manual, 2004, 1-192.
U.S. Appl. No. 13/625,436, filed Sep. 24, 2012, Nielsen et al.
ArcPad, Mobile GIS Software for Field Mapping Applications, brochure, 2006, http://www.esri.com/library/brochures/pdfs/arcpadbro.pdf.
ArcPad: Mobile GIS, ESRI White Paper, Sep. 2004, 1-17, http://www.esri.com/library/whitepapers/pdfs/arcpad.pdf.
DigiTerra Explorer, brochure, v. 6, 2009, 1-2.
DigiTerra Explorer, User Manual, v. 5, 2007, 1-64.
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
Notice of Allowance dated Oct. 1, 2012 from U.S. Appl. No. 12/607,843.
Notice of Allowance dated Nov. 16, 2012 from U.S. Appl. No. 12/208,846.
Office Action dated Oct. 9, 2012 from U.S. Appl. No. 13/190,138.
Office Action dated Oct. 10, 2012 from U.S. Appl. No. 13/191,048.
Office Action dated Oct. 10, 2012 from U.S. Appl. No. 13/191,058.
Office Action dated Nov. 21, 2012 from U.S. Appl. No. 13/194,121.
Office Action dated Nov. 27, 2012 from U.S. Appl. No. 13/194,163.
Ruggiero, K., "Using ArcGIS for Clearing Cable Locates," ESRI 2006.
Trimble Comprehensive Utilities, brochure, 2010, 1-6.
Vanaartsen, S.J., GIS Automates Utility One Call Process, Proceeding ESRI, 1-15, http://proceedings.esri.com/library/useconf/proc06/papers/papers/pap_1148.pdf, ESRI, 2006.
Corrected Notice of Allowabilty dated Feb. 27, 2014 from U.S. Appl. No. 13/191,058.
Notice of Allowance dated Feb. 18, 2014 from U.S. Appl. No. 13/193,337.
Preliminary Proposed Claim Constructions and Identification of Structure(s), Act(s), or Material(s) Corresponding to Claims Governed by 35 U.S.C. § 112(6), *CertusView Technologies, LLC v. S&N Locating Services, LLC et al.*, Case No. 2:13-cv-346, USDC Eastern District of Virginia, Feb. 14, 2014.
Preliminary Proposed Constructions dated Feb. 14, 2014, *CertusView Technologies, LLC v. S&N Locating Services, LLC et al.*, Case No. 2:13-cv-346, USDC Eastern District of Virginia.
Notice of Allowance dated Feb. 10, 2014 from U.S. Appl. No. 13/758,336.
Notice of Allowance dated Feb. 14, 2014 from U.S. Appl. No. 13/741,080.
Office Action dated Feb. 5, 2014 from U.S. Appl. No. 13/185,194.
Patent Examination Report No. 1 dated Jan. 21, 2014 from Australian Application No. 2012241082.
Office Action dated Oct. 31, 2013 from U.S. Appl. No. 13/953,998.
Notice of Allowance dated Dec. 6, 2013 from U.S. Appl. No. 13/191,048.
Notice of Allowance dated Dec. 20, 2013 from U.S. Appl. No. 13/191,058.
Office Action dated Nov. 4, 2013 from U.S. Appl. No. 13/193,337.
Office Action dated Nov. 6, 2013 from U.S. Appl. No. 13/741,080.
Office Action dated Nov. 4, 2013 from U.S. Appl. No. 13/758,336.
U.S. Appl. No. 13/953,998, filed Jul. 30, 2013, Nielsen et al.
U.S. Appl. No. 13/950,655, filed Jul. 25, 2013, Nielsen et al.
Notice of Allowance dated Sep. 11, 2013 from U.S. Appl. No. 13/191,048.
Notice of Allowance dated Sep. 13, 2013 from U.S. Appl. No. 13/625,436.
Office Action dated Sep. 4, 2013 from U.S. Appl. No. 12/363,009.
Office Action dated Jul. 1, 2013 from U.S. Appl. No. 12/029,732.

(56) References Cited

OTHER PUBLICATIONS

Supplemental Notice of Allowability dated Jul. 2, 2013 from U.S. Appl. No. 13/796,487.
Notice of Allowability dated Jul. 26, 2013 from U.S. Appl. No. 13/796,487.
Notice of Allowance dated Jul. 19, 2013 from U.S. Appl. No. 13/734,415.
Office Action dated Aug. 1, 2013 from U.S. Appl. No. 13/190,138.
Notice of Allowance dated Jul. 26, 2013 from U.S. Appl. No. 12/029,732.
Office Action dated Jul. 3, 2013 from Canadian Application No. 2,707,246.
Office Action dated Jul. 3, 2013 from U.S. Appl. No. 13/758,336.
"Online Service, Software Enable Faster Data Collection," Mapping underground in real-time, Mar. 2007, pp. 18-19.
Bernold, L.E. et al., "A Multi-Sensory Approach to 3-D Mapping of Underground Utilities," article by Bernold, Venkatesan, and Suvarna, pp. 1-6, 2002.
Borsan, T. et al., "Setting Up a Database to Record Preventive and Salvage Archeological Excavations," article by Borsan, Ludsan, Dimen, Ienciu, and Oprea, Dec. 1, 1918, pp. 237-242.
Chhabra, K. "Integrated GIS Work Environment with ESRI Products," A paper for the ESRI Users Conference 2004, 7 pages.
Chmura, A. "Project to Create GPS Excavation Monitoring System," Development of Encroachment Notification, Jul./Aug. 2008, 1 page.
Clark et al., "Using ArcPad," ArcPad 6, 398 pages, 2000.
Cut Field-Mapping Time in Half Using Mobile GIS, Edgecomb County, 4 pages, 2005.
Edgecomb County, North Carolina, Maps and Inventories Water/Wastewater Infrastructure with GIS and GPS, Field Mapping Time Cut in Half, 4 pages, 2005.
Eide, S.E. et al., "3D Utility Mapping Using Electronically Scanned Antenna Array," 9th International Conference on Ground Penetrating Radar, Apr. 29-May 2, 2002, 5 pages.
Farag, A., R&D for Damage Prevention, Damage Prevention Conference paper, Apr. 2008, 24 pages.
Ground Penetrating Radar Systems webpage, Feb. 28, 2008, 3 pages.
Kolera, B.T. et al., "Intelligent Utility Locating Tool for Excavators," *Journal of Construction Engineering and Management*, Sep. 2006, pp. 919-927.
Loeber, P.C., "An Investigation of Geobase Mission Data Set Design, Implementation, and Usage Within Air Force Civil Engineer Electrical and Utilities Work Centers," Msgt, USAF, Mar. 2005, 139 pages.
Meehan, B., "Empowering Electric and Gas Utilities with GIS," 264 pages, 2007.
Miss Utility webpage, Dec. 30, 2007, 2 pages.
New Breakthroughs in GIS/GPS Technology Focus on Underground Utility Damage Prevention, Press Release, Jan. 27, 2003, 2 pages.
Olst, R. van, "Using I.T. to improve the efficiency and accuracy of Network Data Collection," IEEE AFRICON 2004, pp. 927-932.
Pickering, D. et al., "Utility Mapping and Record Keeping for Infrastructure," Urban Management Programme, 1946, 84 pages.
Plaintiff CertusView Technologies, LLC's Claim Construction Reply Brief dated Mar. 21, 2014, *CertusView Technologies, LLC* v. *S&N Locating Services, LLC et al.*, Case No. 2:13-cv-346, USDC Eastern District of Virginia.
Quiroga, C. et al., "A Data Platform for Managing Utilities Along Highway Corridors," Project No. 0-2110, Report 2110-1, Texas Transportation Institute, Feb. 2002, 88 pages.
S&N Location Services, LLC and S&N Communication, Inc.'s Opening Claim Construction Brief dated Mar. 18, 2014, *CertusView Technologies, LLC* v. *S&N Locating Services, LLC et al.*, Case No. 2:13-cv-346, USDC Eastern District of Virginia.
S&N Location Services, LLC and S&N Communication, Inc.'s Reply Claim Construction Brief dated Mar. 21, 2014, *CertusView Technologies, LLC* v. *S&N Locating Services, LLC et al.*, Case No. 2:13- cv-346, USDC Eastern District of Virginia.
Schempf, H. et al., "GRISLEE: Gasmain Repair & Inspection System for Live Entry Environments," article by Schempf, Mutschler, Goltsberg, and Crowley, 12 pages, 2004.
Sentinel USA Announces New Alliance with Guardian Angel Protection, Press Release: Jan. 26, 2003, 2 pages.
Toyama, K. et al., "Geographic Location Tags on Digital Images," article by Toyama, Logan, Roseway, and Anandan, pp. 156-166, 2003.
Ultimate Utility Management System to be Unveiled at Planet Underground, The Planet Underground, 2 pages, 2004.
Underground, pages from magazine, Jan./Feb. 2003 issue, 4 pages.
Utility Notification Center webpage, Mar. 4, 2008, 2 pages.
Utility Sciences Corporation to Attend Trade Show, SpatialNews. com Press Release, 2 pages, 2004.
Vandeberg, G., "Introduction to ArcPad: Mobile GIS," ND GIS Users Conference, Oct. 26, 2006, 30 pages.
Virginia Damage Prevention Conference Agenda, Apr. 20-22, 2010, 6 pages.
Virginia Damage Prevention Conference Agenda, Apr. 21-23, 2009, 5 pages.
Virginia Damage Prevention Conference Agenda, Apr. 8-10, 2008, 5 pages.
Invalidity Claim Chart for claims 1, 2, 17, 19, 20, 21, 22, 40 and of U.S. Patent No. 8,290,204 in view of American Society of Civil Engineers Standard Guideline for the Collection and Depiction of Existing Subsurface Utility Data ("ASCE") (Exhibit 11-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of American Society of Civil Engineers Standard Guideline for the Collection and Depiction of Existing Subsurface Utility Data ("ASCE") (Exhibit 11-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of American Society of Civil Engineers Standard Guideline for the Collection and Depiction of Existing Subsurface Utility Data ("ASCE") (Exhibit 11-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of American Society of Civil Engineers Standard Guideline for the Collection and Depiction of Existing Subsurface Utility Data ("ASCE") (Exhibit 11-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of American Society of Civil Engineers Standard Guideline for the Collection and Depiction of Existing Subsurface Utility Data ("ASCE") (Exhibit 11-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Department of Transportation Federal Highway Administration, Publication No. FHWA-IF-02-049 (Exhibit 12-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Department of Transportation Federal Highway Administration, Publication No. FHWA-IF-02-049 (Exhibit 12-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of U.S. Department of Transportation Federal Highway Administration, Publication No. FHWA-IF-02-049 (Exhibit 12-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Department of Transportation Federal Highway Administration, Publication No. FHWA-IF-02-049 (Exhibit 12-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Patent No. 8,407,001 in view of U.S. Department of Transportation Federal Highway Administration, Publication No. FHWA-IF-02-049 (Exhibit 12-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of "Finding Buried Utilities Before They Find You," article by Daniel P. Duffy (Exhibit 13-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Patent No. 8,340,359 in view of "Finding Buried Utilities Before They Find You," article by Daniel P. Duffy (Exhibit 13-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Finding Buried Utilities Before They Find You," article by Daniel P. Duffy (Exhibit 13-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Finding Buried Utilities Before They Find You," article by Daniel P. Duffy (Exhibit 13-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Patent No. 8,407,001 in view of "Finding Buried Utilities Before They Find You," article by Daniel P. Duffy (Exhibit 13-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of Triangulation, http://searchnetworking.techtarget.com/definition/triangulation (Exhibit 14-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Patent No. 8,340,359 in view of Triangulation, http://searchnetworking.techtarget.com/definition/triangulation (Exhibit 14-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Triangulation, ttp://searchnetworking.techtarget.com/definition/triangulation (Exhibit 14-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Triangulation, http://searchnetworking.techtarget.com/definition/triangulation (Exhibit 14-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Patent No. 8,407,001 in view of Triangulation, http://searchnetworking.techtarget.com/definition/triangulation (Exhibit 14-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of "New Approaches for Preventing Damage to Gas and Oil Pipelines," presentation by Joe Zhou at Canberra Joint Technical Meeting (Exhibit 15-A); S&N Invalidity Contentions; Case 2:13-cv- 00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Patent No. 8,340,359 in view of "New Approaches for Preventing Damage to Gas and Oil Pipelines," presentation by Joe Zhou at Canberra Joint Technical Meeting (Exhibit 15-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of New Approaches for Preventing Damage to Gas and Oil Pipelines, presentation by Joe Zhou at Canberra Joint Technical Meeting (Exhibit 15-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 4, 5, 6, 7 9, 10, 12, 14, 16, 17, 18, 19, 20, 22, 23, 25 and 28 of U.S. Patent No. 8,532,341 in view of "New Approaches for Preventing Damage to Gas and Oil Pipelines," presentation by Joe Zhou at Canberra Joint Technical Meeting (Exhibit 15-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Patent No. 8,407,001 in view of "New Approaches for Preventing Damage to Gas and Oil Pipelines," presentation by Joe Zhou at Canberra Joint Technical Meeting (Exhibit 15-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of "New Approaches for Preventing Damage to Gas and Oil Pipelines," article by Joe Zhou for Canberra Joint Technical Meeting (Exhibit 16-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Patent No. 8,340,359 in view of "New Approaches for Preventing Damage to Gas and Oil Pipelines," article by Joe Zhou for Canberra Joint Technical Meeting (Exhibit 16-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of "New Approaches for Preventing Damage to Gas and Oil Pipelines," article by Joe Zhou for Canberra Joint Technical Meeting (Exhibit 16-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "New Approaches for Preventing Damage to Gas and Oil Pipelines," article by Joe Zhou for Canberra Joint Technical Meeting (Exhibit 16-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Patent No. 8,407,001 in view of "New Approaches for Preventing Damage to Gas and Oil Pipelines," article by Joe Zhou for Canberra Joint Technical Meeting (Exhibit 16-E); S&N Invalidity

(56) References Cited

OTHER PUBLICATIONS

Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Phase I—Electronic White Lining Project Report (Nov. 2007) (Exhibit 17-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Phase I—Electronic White Lining Project Report (Nov. 2007) (Exhibit 17-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Phase I—Electronic White Lining Project Report (Nov. 2007) (Exhibit 17-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Phase I—Electronic White Lining Project Report (Nov. 2007) (Exhibit 17-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Phase I—Electronic White Lining Project Report (Nov. 2007) (Exhibit 17-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Technologies to Accurately and Cost-Effectively Detect and Identify Unauthorized Acitivity Near Pipelines (Exhibit 18-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Technologies to Accurately and Cost-Effectively Detect and Identify Unauthorized Activity Near Pipelines (Exhibit 18-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Technologies to Accurately and Cost-Effectively Detect and Identify Unauthorized Activity Near Pipelines (Exhibit 18-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Technologies to Accurately and Cost-Effectively Detect and Identify Unauthorized Activity Near Pipelines (Exhibit 18-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Technologies to Accurately and Cost-Effectively Detect and Identify Unauthorized Activity Near Pipelines (Exhibit 18-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Virginia Pilot Program—Phases I and II (Exhibit 1-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Virginia Pilot Program—Phases I and II (Exhibit 1-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Virginia Pilot Program—Phases I and II (Exhibit 1-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Virginia Pilot Program—Phases I and II (Exhibit 1-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 29 and 30 of U.S. Patent No. 8,407,001 in view of Virginia Pilot Program—Phases I and II (Exhibit 1-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Project to Create GPS Excavation Monitoring System," Underground Focus (Exhibit 24-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Project to Create GPS Excavation Monitoring System," Underground Focus (Exhibit 24-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Project to Create GPS Excavation Monitoring System," Underground Focus (Exhibit 24-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Project to Create GPS Excavation Monitoring System," Underground Focus (Exhibit 24-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "Project to Create GPS Excavation Monitoring System," Underground Focus (Exhibit 24-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Edgecombe County, Cut Field-Mapping Time in Half Using Mobile GIS (Exhibit 25-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Edgecombe County, Cut Field-Mapping Time in Half Using Mobile GIS (Exhibit 25-B); S&N Invalidity Contentions; Case 2:13-cv-00346-MSD-LRLVAED *CertusView Technologies, LLC* v. *S&N Locating Services*; Apr. 29, 2014 (Eastern District of Virginia)
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Edgecombe County, Cut Field-Mapping Time in Half Using Mobile GIS (Exhibit 25-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Edgecombe County, Cut Field-Mapping Time in Half Using Mobile GIS (Exhibit 25-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Edgecombe County, Cut Field-Mapping Time in Half Using Mobile GIS (Exhibit 25-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Introduction to ArcPad Mobile GIS," Gregory Vandeberg, Ph.D., presentation at ND GIS Users Conference (Exhibit 26-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Introduction to ArcPad Mobile GIS," Gregory Vandeberg, Ph.D., presentation at ND GIS Users Conference (Exhibit 26-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Introduction to ArcPad Mobile GIS," Gregory Vandeberg, Ph.D., presentation at ND GIS Users Conference (Exhibit 26-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "Introduction to ArcPad Mobile GIS," Gregory Vandeberg, Ph.D., presentation at ND GIS Users Conference (Exhibit 26-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Introduction to ArcPad Mobile GIS," Gregory Vandeberg, Ph.D., presentation at ND GIS Users Conference (Exhibit 26-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Using ArcPad," ArcPad 6, Clarke, Greenwald, and Spalding (Exhibit 27-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Using ArcPad," ArcPad 6, Clarke, Greenwald, and Spalding (Exhibit 27-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Using ArcPad," ArcPad 6, Clarke, Greenwald, and Spalding (Exhibit 27-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Using ArcPad," ArcPad 6, Clarke, Greenwald, and Spalding (Exhibit 27-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "Using ArcPad," ArcPad 6, Clarke, Greenwald, and Spalding (Exhibit 27-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Integrated GIS Work Environment With ESRI Products, Paper for ESRI Users Conference 2004 (Exhibit 28-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Integrated GIS Work Environment With ESRI Products, Paper for ESRI Users Conference 2004 (Exhibit 28-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Integrated GIS Work Environment With ESRI Products, Paper for ESRI Users Conference 2004 (Exhibit 28-C); S&N Invalidity Contentions; Case 2:13-cv- 00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Integrated GIS Work Environment With ESRI Products, Paper for ESRI Users Conference 2004 (Exhibit 28-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Integrated GIS Work Environment With ESRI Products, Paper for ESRI Users Conference 2004 (Exhibit 28-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of US 2012/0259550 (Exhibit 29-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 2012/0259550 (Exhibit 29-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 2012/0259550 (Exhibit 29-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 2012/0259550 (Exhibit 29-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 2012/0259550 (Exhibit 29-E); S&N Invalidity Contentions; Case 2:13-cv00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Tucker References (Exhibit 2-A); S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 2, 5, 10, 12, 18, 21 and 23 of U.S. Patent No. 8,340,359 in view of Tucker References (Exhibit 2-B);

(56) References Cited

OTHER PUBLICATIONS

S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Tucker References (Exhibit 2-C); S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Tucker References (Exhibit 2-D); S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 3, 13, 14, 16, 18, 22, 27, 28, 29 and 30 of U.S. Patent No. 8,407,001 in view of Tucker References (Exhibit 2-E); S&N Invalidity Contentions; Case 2:13-cv00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of US 8150826 (Exhibit 30-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 8150826 (Exhibit 30-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 8150826 (Exhibit 30-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 8150826 (Exhibit 30-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 8150826 (Exhibit 30-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of US 2004/0168358 (Exhibit 31-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 2004/0168358 (Exhibit 31-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 2004/0168358 (Exhibit 31-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 2004/0168358 (Exhibit 31-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 2004/0168358 (Exhibit 31-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of US 6,597,992 (Exhibit 32-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 6,597,992 (Exhibit 32-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 6,597,992 (Exhibit 32-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 6,597,992 (Exhibit 32-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 6,597,992 (Exhibit 32-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of US 2007/0118278 (Exhibit 33-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 2007/0118278 (Exhibit 33-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 2007/0118278 (Exhibit 33-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 2007/0118278 (Exhibit 33-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 2007/0118278 (Exhibit 33-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Patent No. 5,991,694 (Gudat) (Exhibit 34-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Patent No. 5,991,694 (Gudat) (Exhibit 34-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Patent No. 5,991,694 (Gudat) (Exhibit 34-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Patent No. 5,991,694 (Gudat) (Exhibit 34-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 13, 14, 16, 18, 22, 27, 28, 29, and 30 of U.S. Patent No. 8,407,001 in view of U.S. Patent No. 5,991,694 (Gudat) (Exhibit 34-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of a Data Platform for Managing Utilities Along Highway Corridors (Exhibit 35-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of a Data Platform for Managing Utilities Along Highway Corridors (Exhibit 35-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of a Data Platform for Managing Utilities Along Highway Corridors (Exhibit 35-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of a Data Platform for Managing Utilities Along Highway Corridors (Exhibit 35-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of a Data Platform for Managing Utilities Along Highway Corridors (Exhibit 35-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of an Investigation of Geobase Mission Data Set Design, Implementation, & Usage Within Air Force Civil Engineer Electrical and Utilities Work Centers (Exhibit 36-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of an Investigation of Geobase Mission Data Set Design, Implementation, & Usage Within Air Force Civil Engineer Electrical and Utilities Work Centers (Exhibit 36-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of an Investigation of Geobase Mission Data Set Design, Implementation, & Usage Within Air Force Civil Engineer Electrical and Utilities Work Centers (Exhibit 36-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of an Investigation of Geobase Mission Data Set Design, Implementation, & Usage Within Air Force Civil Engineer Electrical and Utilities Work Centers (Exhibit 36-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of an Investigation of Geobase Mission Data Set Design, Implementation, & Usage Within Air Force Civil Engineer Electrical and Utilities Work Centers (Exhibit 36-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Using I.T. to Improve the Efficiency and Accuracy of Network Data Collection," IEEE AFRICON, Rex van Olst and Barry Dwolatzky (Exhibit 37-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Using I.T. to Improve the Efficiency and Accuracy of Network Data Collection," IEEE AFRICON, Rex van Olst and Barry Dwolatzky (Exhibit 37-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Using I.T. to Improve the Efficiency and Accuracy of Network Data Collection," IEEE AFRICON, Rex van Olst and Barry Dwolatzky (Exhibit 37-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Using I.T. to Improve the Efficiency and Accuracy of Network Data Collection," IEEE AFRICON, Rex van Olst and Barry Dwolatzky (Exhibit 37-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "Using I.T. to Improve the Efficiency and Accuracy of Network Data Collection," IEEE AFRICON, Rex van Olst and Barry Dwolatzky (Exhibit 37-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Intelligent Utility Locating Tool for Excavators, Kolera and Bernold (Exhibit 38-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Intelligent Utility Locating Tool for Excavators, Kolera and Bernold (Exhibit 38-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Intelligent Utility Locating Tool for Excavators, Kolera and Bernold (Exhibit 38-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Intelligent Utility Locating Tool for Excavators, Kolera and Bernold (Exhibit 38-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Intelligent Utility Locating Tool for Excavators, Kolera and Bernold (Exhibit 38-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "GRISLEE: Gasmain Repair & Inspection System for Live Entry Environments," article by Schempf, Mutschler, Goltsberg, and Crowley (Exhibit 39-A); S&N Invalidity

(56) References Cited

OTHER PUBLICATIONS

Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "GRISLEE: Gasmain Repair & Inspection System for Live Entry Environments," article by Schempf, Mutschler, Goltsberg, and Crowley (Exhibit 39-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "GRISLEE: Gasmain Repair & Inspection System for Live Entry Environments," article by Schempf, Mutschler, Goltsberg, and Crowley (Exhibit 39-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "GRISLEE: Gasmain Repair & Inspection System for Live Entry Environments," article by Schempf, Mutschler, Goltsberg, and Crowley (Exhibit 39-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "GRISLEE: Gasmain Repair & Inspection System for Live Entry Environments," article by Schempf, Mutschler, Goltsberg, and Crowley (Exhibit 39-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Guardian ProStar/ProStar Data Collection Software (PointMan and/or Predator Products) (Oct. 15, 2006) (Exhibit 3-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Guardian ProStar/ProStar Data Collection Software (PointMan and/or Predator Products) (Oct. 15, 2006); (Exhibit 3-B); S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Guardian ProStar/ProStar Data Collection Software (PointMan and/or Predator Products) (Oct. 15, 2006) (Exhibit 3-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Guardian ProStar/ProStar Data Collection Software (PointMan and/or Predator Products) (Oct. 15, 2006) (Exhibit 3-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Guardian ProStar/ProStar Data Collection Software (PointMan and/or Predator Products) (Oct. 15, 2006) (Exhibit 3-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Empowering Electric and Gas Utilities with GIS (Exhibit 40-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Patent No. 8,340,359 in view of Empowering Electric and Gas Utilities with GIS (Exhibit 40-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Empowering Electric and Gas Utilities with GIS (Exhibit 40-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Empowering Electric and Gas Utilities with GIS (Exhibit 40-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Empowering Electric and Gas Utilities with GIS (Exhibit 40-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Pub. No. 2005/0183028A1 (Aug. 18, 2005) (Exhibit 41-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Pub. No. 2005/0183028A1 (Aug. 18, 2005) (Exhibit 41-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Pub. No. 2005/0183028A1 (Aug. 18, 2005) (Exhibit 41-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Pub. No. 2005/0183028A1 (Aug. 18, 2005) (Exhibit 41-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of U.S. Pub. No. 2005/0183028A1 (Aug. 18, 2005) (Exhibit 41-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Pat. No. 6,701,647 (Mar. 9, 2004) (Exhibit 42-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Pat. No. 6,701,647 (Mar. 9, 2004) (Exhibit 42-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Pat. No. 6,701,647 (Mar. 9, 2004) (Exhibit 42-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Pat. No. 6,701,647 (Mar. 9, 2004) (Exhibit 42-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 13, 14, 16, 18, 22, 27, 28, 29, and 30 of U.S. Patent No. 8,407,001 in view of U.S. Pat. No. 6,701,647 (Mar. 9, 2004) (Exhibit 42-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Patent No. 7,372,276 (Exhibit 43-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Patent No. 7,372,276 (Exhibit 43-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Patent No. 7,372,276 (Exhibit 43-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Patent No. 7,372,276 (Exhibit 43-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of U.S. Patent No. 7,372,276 (Exhibit 43-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Patent No. 6,957,250 (hereinafter referred to as "Nakano") (Exhibit 44-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Patent No. 6,957,250 (hereinafter referred to as "Nakano") (Exhibit 44-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Patent No. 6,957,250 (hereinafter referred to as "Nakano") (Exhibit 44-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Patent No. 6,957,250 (hereinafter referred to as "Nakano") (Exhibit 44-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of U.S. Patent No. 6,957,250 (hereinafter referred to as "Nakano") (Exhibit 44-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of U.S. Patent Publication No. 2002/0059296 (Exhibit 45-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of U.S. Patent Publication No. 2002/0059296 (Exhibit 45-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of U.S. Patent Publication No. 2002/0059296 (Exhibit 45-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of U.S. Patent Publication No. 2002/0059296 (Exhibit 45-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of U.S. Patent Publication No. 2002/0059296 (Exhibit 45-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view US 2007/0258642 (Exhibit 46-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 2007/0258642 (Exhibit 46-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 2007/0258642 (Exhibit 46-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 2007/0258642 (Exhibit 46-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 2007/0258642 (Exhibit 46-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of US 2002/0044690 (Exhibit 47-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of US 2002/0044690 (Exhibit 47-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of US 2002/0044690 (Exhibit 47-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of US 2002/0044690 (Exhibit 47-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of US 2002/0044690 (Exhibit 47-E); S&N Invalidity Contentions; Case 2:13-cv-00346-

(56) References Cited

OTHER PUBLICATIONS

MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "A Multi-Sensory Approach to 3-D Mapping of Underground Utilities" by Leonard E. Bernold and Lashminarayan Venkatesan (hereinafter referred to as the "Bernold" reference) (Exhibit 49-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "A Multi-Sensory Approach to 3-D Mapping of Underground Utilities" by Leonard E. Bernold and Lashminarayan Venkatesan (hereinafter referred to as the "Bernold" reference) (Exhibit 49-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "A Multi-Sensory Approach to 3-D Mapping of Underground Utilities" by Leonard E. Bernold and Lashminarayan Venkatesan (hereinafter referred to as the "Bernold" reference) (Exhibit 49-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "A Multi-Sensory Approach to 3-D Mapping of Underground Utilities" by Leonard E. Bernold and Lashminarayan Venkatesan (hereinafter referred to as the "Bernold" reference) (Exhibit 49-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "A Multi-Sensory Approach to 3-D Mapping of Underground Utilities" by Leonard E. Bernold and Lashminarayan Venkatesan (hereinafter referred to as the "Bernold" reference) (Exhibit 49-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Guardian ProStar/ProStar Web Services (Oct. 15, 2006) (Exhibit 4-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Guardian ProStar/ProStar Web Services (Oct. 15, 2006) (Exhibit 4-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Guardian ProStar/ProStar Web Services (Oct. 15, 2006) (Exhibit 4-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Guardian ProStar/ProStar Web Services (Oct. 15, 2006) (Exhibit 4-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Guardian ProStar/ProStar Web Services (Oct. 15, 2006) (Exhibit 4-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Geographic Location Tags on Digital Images (Exhibit 50-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Geographic Location Tags on Digital Images (Exhibit 50-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Geographic Location Tags on Digital Images (Exhibit 50-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Geographic Location Tags on Digital Images (Exhibit 50-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Geographic Location Tags on Digital Images (Exhibit 50-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "3D Utility Mapping Electronically Scanned Antenna Array" by Egil Side and Jens F. Hjelmstad (the "Eide" Reference) (Exhibit 51-A); S&N Invalidity Contentions;

(56) References Cited

OTHER PUBLICATIONS

Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "3D Utility Mapping Electronically Scanned Antenna Array" by Egil Side and Jens F. Hjelmstad (the "Eide" Reference) (Exhibit 51-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "3D Utility Mapping Electronically Scanned Antenna Array" by Egil Side and Jens F. Hjelmstad (the "Eide" Reference) (Exhibit 51-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "3D Utility Mapping Electronically Scanned Antenna Array" by Egil Side and Jens F. Hjelmstad (the "Eide" Reference) (Exhibit 51-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "3D Utility Mapping Electronically Scanned Antenna Array" by Egil Side and Jens F. Hjelmstad (the "Eide" Reference) (Exhibit 51-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Common Ground—Study of One-Call Systems and Damage Prevention Best Practices ("Common Ground") (Exhibit 52-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Common Ground—Study of One-Call Systems and Damage Prevention Best Practices ("Common Ground") (Exhibit 52-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of Common Ground—Study of One-Call Systems and Damage Prevention Best Practices ("Common Ground") (Exhibit 52-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Common Ground—Study of One-Call Systems and Damage Prevention Best Practices ("Common Ground") (Exhibit 52-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of Common Ground—Study of One-Call Systems and Damage Prevention Best Practices ("Common Ground") (Exhibit 52-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Merging Two GIS Platforms for Utility Data into One: FRAMME to ESRI Conversion and all of the other pieces and parts" (2005) (Exhibit 53-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Merging Two GIS Platforms for Utility Data into One: FRAMME to ESRI Conversion and all of the other pieces and parts" (2005) (Exhibit 53-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of "Merging Two GIS Platforms for Utility Data into One: FRAMME to ESRI Conversion and all of the other pieces and parts" (2005) (Exhibit 53-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Merging Two GIS Platforms for Utility Data into One: FRAMME to ESRI Conversion and all of the other pieces and parts" (2005) (Exhibit 53-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of "Merging Two GIS Platforms for Utility Data into One: FRAMME to ESRI Conversion and all of the other pieces and parts" (2005) (Exhibit 53-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of GIS for Public Works Presentation (Aug. 2006) (Exhibit 54-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of GIS for Public Works Presentation (Aug. 2006) (Exhibit 54-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of GIS for Public Works Presentation (Aug. 2006) (Exhibit 54-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of GIS for Public Works Presentation (Aug. 2006) (Exhibit 54-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of GIS for Public Works Presentation (Aug. 2006) (Exhibit 54-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of OnPoint Software (2005) (Exhibit 55-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of OnPoint Software (2005) (Exhibit 55-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of OnPoint Software (2005) (Exhibit 55-C); S&N Invalidity Conten-

(56) References Cited

OTHER PUBLICATIONS tions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of OnPoint Software (2005) (Exhibit 55-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of OnPoint Software (2005) (Exhibit 55-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of ArcIMS Software (2000) (Exhibit 56-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of ArcIMS Software (2000) (Exhibit 56-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of ArcIMS Software (2000) (Exhibit 56-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of ArcIMS Software (2000) (Exhibit 56-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of ArcIMS Software (2000) (Exhibit 56-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of GO! Sync™ Software (2005) (Exhibit 57-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of GO! Sync™ Software (2005) (Exhibit 57-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of GO! Sync™ Software (2005) (Exhibit 57-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of GO! Sync™ Software (2005) (Exhibit 57-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of GO! Sync™ Software (2005) (Exhibit 57-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Patent No. 8,290,204 in view of ArcPad 6 Software (2000) (Exhibit 58-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of ArcPad 6 Software (2000) (Exhibit 58-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of ArcPad 6 Software (2000) (Exhibit 58-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of ArcPad 6 Software (2000) (Exhibit 58-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of ArcPad 6 Software (2000) (Exhibit 58-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of ArcGIS Software (2000) (Exhibit 59-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of ArcGIS Software (2000) (Exhibit 59-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Patent No. 8,265,344 in view of ArcGIS Software (2000) (Exhibit 59-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of ArcGIS Software (2000) (Exhibit 59-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Patent No. 8,407,001 in view of ArcGIS Software (2000) (Exhibit 59-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Guardian ProStar/ProStar Web Portal (Oct. 15, 2006) (Exhibit 5-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Guardian ProStar/ProStar Web Portal (Oct. 15, 2006) (Exhibit 5-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6 7, 10, 11, 12, 13, 14, 15, 17, 18, 19, 20, 23, 24, 25 and 26 of U.S. Patent No. 8,265,344 in view of Guardian ProStar/ProStar Web Portal (Oct. 15, 2006) (Exhibit 5-C); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Guardian ProStar/ProStar Web Portal (Oct. 15, 2006) (Exhibit 5-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Guardian ProStar/ProStar Web Portal (Oct. 15, 2006) (Exhibit 5-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 of Guardian ProStar/ProStar Data Services (Oct. 15, 2006) (Exhibit 6-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Guardian ProStar/ProStar Data Services (Oct. 15, 2006) (Exhibit 6-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Guardian ProStar/ProStar Data Services (Oct. 15, 2006) (Exhibit 6-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Guardian ProStar/ProStar Data Services (Oct. 15, 2006) (Exhibit 6-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Guardian ProStar/ProStar Data Services (Oct. 15, 2006) (Exhibit 6-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of Guardian ProStar/ProStar Mapping Components (Oct. 15, 2006) (Exhibit 7-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of Guardian ProStar/ProStar Mapping Components (Oct. 15, 2006) (Exhibit 7-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of Guardian ProStar/ProStar Mapping Components (Oct. 15, 2006) (Exhibit 7-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of Guardian ProStar/ProStar Mapping Components (Oct. 15, 2006) (Exhibit 7-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of Guardian ProStar/ProStar Mapping Components (Oct. 15, 2006) (Exhibit 7-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Patent No. 8,290,204 in view of "Online Service, Software Enable Faster Data Collection" article in Underground Focus (Mar. 2007) (Exhibit 8-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 5, 10, 12, 18, 20, 21 and 23 of U.S. Patent No. 8,340,359 in view of "Online Service, Software Enable Faster Data Collection" article in Underground Focus (Mar. 2007) (Exhibit 8-B); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Patent No. 8,265,344 in view of "Online Service, Software Enable Faster Data Collection" article in Underground Focus (Mar. 2007) (Exhibit 8-C); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Patent No. 8,532,341 in view of "Online Service, Software Enable Faster Data Collection" article in Underground Focus (Mar. 2007) (Exhibit 8-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29 and 30 of U.S. Patent No. 8,407,001 in view of "Online Service, Software Enable Faster Data Collection" article in Underground Focus (Mar. 2007) (Exhibit 8-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Prior Art Table; S&N Invalidity Contentions; Case 2:13-cv-00346-MSD-LRLVAED *CertusView Technologies, LLC* v. *S&N Locating Services*; Apr. 29, 2014 (Eastern District of Virginia).
Opinion and Order Following Markman Hearing, May 16, 2014; Case 2:13-cv-00346-MSD-LRLVAED *CertusView Technologies, LLC* v. *S&N Locating Services*; (Eastern District of Virginia).
Corrected Notice of Allowability dated May 22, 2014 from U.S. Appl. No. 13/191,048.
Corrected Notice of Allowability dated May 22, 2014 from U.S. Appl. No. 13/191,058.
Office Action dated Jul. 30, 2014 from U.S. Appl. No. 13/194,121.
Notice of Allowance dated Jul. 3, 2014 from U.S. Appl. No. 13/758,336.
Office Action dated Jul. 18, 2014 from U.S. Appl. No. 13/185,194.
Notice of Allowance dated Aug. 4, 2014 from U.S. Appl. No. 13/741,080.
Notice of Allowance dated Jul. 18, 2014 from U.S. Appl. No. 13/193,337.
Expert CV and Testimony of Ivan Zatkovich (10 pages); Case 2:13-cv-00346-MSD-LRLAED *CertusView Technologies, LLC* v. *S&N Locating Services*; Apr. 29, 2014 (Eastern District of Virginia).
Invalidity Claim Chart—Application of WO 2007/106871 ("Tucker '871") to Claims 1, 2, 17, 19, 20, 21, 22, 40 and 42 of U.S. Patent No. 8,290,204 (Exhibit 2-A); Case 2:13-cv-00346-MSD-LRLVAED *CertusView Technologies, LLC* v. *S&N Locating Services*; Apr. 29, 2014 (Eastern District of Virginia).
Invalidity Claim Chart—Application of WO 2007/106871 ("Tucker '871") to Claims 1, 2, 5, 10, 12, 18, 20, 21 and 23 of U.S. Patent No. 8,340,359 (Exhibit 2-B); Case 2:13-cv-00346-MSD-LRLVAED *CertusView Technologies, LLC* v. *S&N Locating Services*; Apr. 29, 2014 (Eastern District of Virginia).
Invalidity Claim Chart—Application of WO 2007/106871 ("Tucker '871") to Claims 1-2, 4-7, 10-15, 1720, and 23-26 of U.S. Patent No. 8,265,344 (Exhibit 2-C); Case 2:13-cv-00346-MSD-LRLVAED *CertusView Technologies, LLC* v. *S&N Locating Services*; Apr. 29, 2014 (Eastern District of Virginia).
Invalidity Claim Chart—Application of WO 2007/106871 ("Tucker '871") to Claims 1, 3-7, 9-10, 12, 14, 16-20, 22-23, 25 and 28 of U.S.

(56) References Cited

OTHER PUBLICATIONS

Patent No. 8,532,341 (Exhibit 2-D); Case 2:13-cv-00346-MSD-LRLVAED *CertusView Technologies, LLC v. S&N Locating Services*; Apr. 29, 2014 (Eastern District of Virginia).
Invalidity Claim Chart—Application of WO 2007/106871 ("Tucker '871") to Claims 1, 3, 13, 14, 16, 18, 22, 27, 28, 29, and 30 of U.S. Patent No. 8,407,001 (Exhibit 2-E); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II to Claims 1, 2, 17, 19, 20, 21, 22, 40 and 42 of U.S. Patent No. 8,290,204 (Exhibit 4-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II to Claims 1, 2, 5, 10, 12, 18, 20, 21 and 23 of U.S. Patent No. 8,340,359 (Exhibit 4-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II to Claims 1-2, 4-7, 10- 15, 17-20, and 23-26 of U.S. Patent No. 8,265,344 (Exhibit 4-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II to Claims 1, 3-7, 9-10, 12, 14, 16-20, 22-23, 25, and 28 of U.S. Patent No. 8,532,341 (Exhibit 4-D); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II to Claims 1, 3, 13, 14, 16, 18, 22, 27, 28, 29, and 30 of U.S. Patent No. 8,407,001 (Exhibit 4-E); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 17, 19, 20, 21, 22, 40 and 42 of U.S. Patent No. 8,290,204 (Exhibit 5-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 5, 10, 12, 18, 20, 21 and 23 of U.S. Patent No. 8,340,359 (Exhibit 5-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 4, 5, 6, 7, 10, 11, 12, 13, 14, 15, 17, 18, 19, 20, 23, 24, 25 and 26 of U.S. Patent No. 8,265,344 (Exhibit 5-C); Case 2:13-cv-00346-MSD-LRLVAED *CertusView Technologies, LLC vs. S&N Locating Services*; Apr. 29, 2014 (Eastern District of Virginia).
Invalidity Claim Chart—Application of TelDig Systems to Claims 1, 3, 4, 5, 6, 7, 9, 10, 12, 14, 16, 17, 18, 19, 20, 22, 23, 25 and 28 of U.S. Patent No. 8,532,341 (Exhibit 5-D); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 3, 13, 14, 16, 18, 22, 27, 28, 29, and 30 of U.S. Patent No. 8,407,001 (Exhibit 5-E); Case 2:13-cv-00346-MSD-LRLVAED *CertusView Technologies, LLC v. S&N Locating Services*; Apr. 29, 2014 (Eastern District of Virginia).
Tel-Dig One Call Brochure (1 page) (Exhibit 6); Case 2:13-cv-00346-MSD-LRLVAED *CertusView Technologies, LLC v. S&N Locating Services*; Apr. 29, 2014 (Eastern District of Virginia).
Tel-Dig Junior—The most advanced system on earth—and below Brochure (5 pages) (Exhibit 7); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and Avoiding Utility Regulations to Claims 1-2, 17, 19-22, 40 and 42 of U.S.P.N. 8,290,204 (Exhibit 8-A); Case 2:13-cv00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and Avoiding Utility Regulations to Claims 1-2, 5, 10, 12, 18, 20-21 and 23 of U.S.P.N. 8,340,359 (Exhibit 8-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and Avoiding Utility Regulations to Claims 1-2, 4-7, 10-15, 17-20, and 23-26 of U.S.P.N. 8,265,344 (Exhibit 8-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and Avoiding Utility Regulations to Claims 1, 3-7, 9-10, 12, 14, 16-20, 22-23, 25 and 28 of U.S.P.N. 8,532,341 (Exhibit 8-D); Case 2:13-cv-00346-MSD-LRLVAED *CertusView Technoologies, LLC v. S&N Locating Services*; Apr. 29, 2014 (Eastern District of Virginia).
Invalidity Claim Chart—Application of Virginia Pilot Program—Phases I and II and Avoiding Utility Regulations to Claims 1, 3, 13-14, 16, 18, 22, and 27-30 of U.S. Patent No. 8,407,001 (Exhibit 8-E); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1, 2, 17, 19, 20, 21, 22, 40 and 42 of U.S. Patent No. 8,290,204 (Exhibit 9-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1, 2, 5, 10, 12, 18, 20, 21 and 23 of U.S. Patent No. 8,340,359 (Exhibit 9-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1-2, 4-7, 10-15, 17-20, and 23-26 of U.S.P.N. 8,265,344 (Exhibit 9-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1, 3-7, 9-10, 12, 14, 16-20, 22-23, 25 and 28 of U.S. Patent No. 8,532,341 (Exhibit 9-D); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and WO 2008/005837 (Tucker '837) to Claims 1, 2, 17, 19, 20-22, 40 and 42 of U.S.P. N. 8,290,204 (Exhibit 10-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and WO 2008/005837 (Tucker '837) to Claims 1-2, 5, 10, 12, 18, 20-21 and 23 of U.S.P. N. 8,340,359 (Exhibit 10-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and WO 2008/005837 (Tucker '837) to Claims 1-2, 4-7, 10-15, 17-20, and 23-26 of U.S.P. N. 8,265,344 (Exhibit 10-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of Virginia Pilot Program—Phases I and II and WO 2008/005837 (Tucker '837) to Claims 1, 3-7, 9-10, 12, 14, 16-20, 22-23, 25 and 28 of U.S.P.N. 8,532,341 (Exhibit 10-D); Case 2:13-cv-00346-MSD-LRLVAED *CertusView Technologies, LLC v. S&N Locating Services*; Apr. 29, 2014 (Eastern District of Virginia).
Expert Report of Ivan Zatkovich Regarding the Invalidity of U.S. Patent Nos. 8,265,344, 8,290,204, 8,340,359, 8,407,001, and 8,532,341, dated Sep. 3, 2014; Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

GIS Best Practices, GIS for Public Works, Aug. 2006, 26 pages.
2001-2004 News, Jul. 5, 2004 City of Madison Implements TelDig Utility & TelDig Mobile, 12 pages.
Mobile Computing Makes its Move on Utility Field Automotion, Mar. 1, 1996, 6 pages.
Progress Energy Chooses MapFrame's FieldSmart Software for Mobile Mapping & Field Automation, IntelligentUtility, Jul. 17, 2003, 3 pages.
Maps joining tickets on ARKUPS' computers in trucks, ARKUPS, January, Febuary, March, 2003, 2 pages.
Avoiding Utility Relocations, U.S. Department of Transportation Federal Highway Administration, Publication No. FHWA-IF-02-049, Jul. 2002, 128 pages.
Underground Utility Damage Prevention, Virginia's Pilot Program, Jan. 2006, 15 pages.
Underground Facility Damage Prevention, Virginia's Pilot Program for One-call Location Technology Business Case, Jun. 2006, 37 pages.
Project Plan, VA Pilot Project, Draft, Aug. 24, 2009, 15 pages.
Virginia Pilot Project, Incorporating GPS Technology to Enhance One-Call Damage Prevention, Phase I—Electronic White Lining Project Report, Nov. 2007, 41 pages.
One Call Technology Pilot Project, Trimble Meeting, Aug. 25, 2006, 5 pages.
Virginia Utility Projection Service, Inc. (VUPS), Project Proposal to: U.S. Department of Transportation Pipeline & Hazardous Materials Safety Administration, Phase II of the Virginia Pilot Program Electronic Manifests, Jul. 31, 2007, 16 pages.
Georgia Underground Marking Standards, PSC Rule 515-9-4.14, published online May 2 2008, http://www.gaupc.com/userfilesffile/Marking_Standards_Presentation_05_02_08.pdf.
Notice of Allowance dated Sep. 23, 2014 from U.S. Appl. No. 14/063,417.
Office Action dated Sep. 19, 2014 from U.S. Appl. No. 13/194,163.
Notice of Allowance dated Aug. 18, 2014 from U.S. Appl. No. 13/190,138.
Notice of Allowance dated Sep. 2, 2014 from U.S. Appl. No. 13/191,058.
Office Action dated Aug. 26, 2014 from Canadian Application No. 2,707,246.
Notice of Allowance dated Sep. 12, 2014 from U.S. Appl. No. 13/191,048.
Office Action dated Oct. 10, 2014 from U.S. Appl. No. 13/190,185.
Examination Report dated Oct. 9, 2014 from Australian Application No. 2013204039.

| | |
|---|---|
| Timestamp (2005-10-20 09:43) — 710 | Facility Type Identifier (Power) — 720 |
| Facility Mark Location (N38° 51.40748, W077°20.27798;...; N38° 51 1.40784, W077°20.27865) — 730 | |
| Environmental Landmark Identifier (Curb) — 740 | |
| Environmental Landmark Location (N38° 51.40756, W077°20.27805;...; N38° 51 1.40733, W077°20.27858) — 750 | |
| Other Information (1.2 Meters Between Curb and Power Line) — 760 | |
| Facility Owner/Operator (ABC Corp) — 765 | Marking Method (Red Paint) — 770 |
| Property Address (555 Main Street, 22220) — 780 | Ticket Number (1234567) — 790 |
| Location Stamp (N38° 51.40752, W077°20.27840) — 715 | Certification (Joe Locator) — 725 |

700 → Entry/Message

FIG. 7

METHODS, APPARATUS AND SYSTEMS FOR GENERATING SEARCHABLE ELECTRONIC RECORDS OF UNDERGROUND FACILITY LOCATE AND/OR MARKING OPERATIONS

CROSS-REFERENCE TO RELATED APPLICATIONS

This application claims a priority benefit, under 35 U.S.C. §119(a), to Canadian application serial no. 2707246, entitled "Methods, Apparatus and Systems for Generating Searchable Electronic Records of Underground Facility Locate and/or Marking Operations," filed on Jul. 6, 2010.

This application claims a priority benefit, under 35 U.S.C. §119(e), of U.S. Provisional Patent Application No. 61/223,636, entitled "Searchable Electronic Records of Underground Facility Locate Marking Operations," filed on Jul. 7, 2009.

Each of the above-identified applications is incorporated by reference herein in its entirety.

BACKGROUND

Excavators are required to notify underground facility owners/operators in advance of their excavation activities and to describe and communicate the geographic area of those activities to underground facility owners/operators. The geographic area so described is commonly referred to as "the dig area." In turn, facility owners/operators are required to determine if they own or operate any underground facilities at an identified dig area. The presence of underground facilities at a dig area is generally detected using a device commonly referred to as a "locate wand." Locate wands use a number of electronic methods to detect the presence of underground facilities. The location of those underground facilities, if any, which exist within a dig area, is marked using paint or some other physical marking system, such as flags. Paint is generally applied as a sequence of dashes or dots on the surface (grass, dirt, asphalt, concrete, etc.) directly above the underground facility and is color-coded to indicate to the excavator the type (e.g., gas, water, sewer, power, telephone, cable television, etc.) of the underground facility present. Flags, which also may identify the underground facility via color-coding, can be placed in the ground directly above the underground facility being marked. Paint and/or flags can be dispensed using various devices. The process of detecting a presence or an absence of one or more underground facilities and indicating same via the application of paint, flags, or some other marking object is often referred to as a "locate operation," or more simply a "locate." The marks resulting from a locate are commonly called underground facility "locate marks."

Underground facility owners/operators may perform locates with in-house employees or choose to hire independent contract locating firms to perform locates on their behalf. Generally, the person performing the locate operation is called a locate technician. The set of instructions necessary for a locate technician to perform a locate operation may be called a "ticket." A ticket might specify, for example, the address or description of the dig area to be marked, the day and/or time that the dig area is to be marked, and/or whether the user is to mark the dig area for telecommunications (e.g., telephone and/or cable television), power, gas, water, sewer, or some other underground facility.

It is generally recommended, or in some jurisdictions required, to document the type and number of underground facilities located, i.e. telephone, power, gas, water, sewer, etc., and the approximate geographic location of the locate marks.

In practice, however, documenting of locate operations is implemented irregularly and inconsistently, and is a manual paper-based process.

As part of locate documentation, it is recommended (or in some instances required) to document the distance, or "offset" of the locate marks from environmental landmarks that exist at the dig area. An environmental landmark may include any physical object that is likely to remain in a fixed location for an extended period of time. Examples of an environmental landmark may include a tree, a curb, a driveway, a utility pole, a fire hydrant, a storm drain, a pedestal, a water meter box, a manhole lid, a building structure (e.g., a residential or office building), or a light post. For example, a telephone cable located two and a half meters behind the curb of a residential street would be documented as being offset two and a half meters behind the curb. These offsets serve as evidence supporting the location of the locate marks after those locate marks may have been disturbed by the excavation process.

Documentation of some or all of the information regarding a locate operation is often called a "manifest." A manifest may typically contain a variety of information related to a locate operation including a manual sketch (hand-drawing) of the dig area that identifies the approximate location of the locate marks and environmental landmarks present at the dig area; the time and date the locate operation was performed; identification of the entity and the locate technician performing the locate operation; the entity requesting the locate operation; the geographic address of the dig area; the type of markings used for the locate operation (e.g., colored paint, flags, or other markers); notes from the locate technician; and/or a technician signature.

If performing locate operations with in-house employees, each individual underground facility owner/operator generally documents on the manifest only the existence of its facilities and the approximate location of its locate marks. If an independent contract locating firm is hired to perform locates for more than one underground facility owner/operator, the contract locating firm may document on the manifest some or all of the underground facilities at the dig area that it located and the approximate location of all the locate marks.

SUMMARY

As noted above, conventional locate documentation may employ a manual sketching process which results in the creation of a paper manifest. Applicants have recognized and appreciated that such paper manifests produced by hand are often not to scale, incomplete, prone to human error, and costly in drafting time spent by the locate technician (who is typically not a professional draftsperson). Paper manifests are stored as they are (e.g., in filing cabinets or storage boxes) or in some jurisdictions the paper manifests are digitally scanned/photographed. Because the manifests are stored as paper or scanned images/photographs, they are not in a format that readily provides for indexing, cataloguing or archiving, and easy searching, nor are they in a format that facilitates data analysis or interrogation in any mechanized or automated way.

In view of the foregoing, various embodiments of the present invention are directed to methods, apparatus and systems for creating a searchable electronic record, or "electronic manifest," relating to a geographic area including a dig area to be excavated or otherwise disturbed. In some implementations, the geographic location of one or more physical locate marks, applied to the dig area during a locate operation to indicate a presence (or absence) of one or more underground facilities, is somehow identified with respect to its immediate surroundings in the geographic area to form part of the electronic record. Additionally or alternatively, one or more geographic locations of where underground facilities are detected (e.g., prior to marking) may be identified in some manner with respect to the immediate surrounding to form part of the electronic record.

To create such an electronic record, in one exemplary implementation one or more input images relating to the geographic area including the dig area may be utilized. For example, source data representing one or more input images of a geographic area including the dig area is received and/or processed so that the input image(s) may be displayed on a display device. The geographic location of the physical locate mark(s), and/or detected locations of one or more underground facilities, are then indicated in some manner on the displayed input image(s) so as to generate one or more marked-up images constituting at least a portion of the electronic record. For example, geographic locations of the physical locate mark(s) and/or detected facilities may be indicated in the marked-up image(s) using digital representation(s) of the physical locate mark(s) ("locate mark indicators") and/or detected facilities ("detection indicators") that are added to the marked-up image(s). In other implementations, the input image need not necessarily be displayed to add one or more locate mark and/or detection indicators; for example, geographic information relating to one or more physical locate marks applied to the dig area and/or detected facilities may be received and locate mark indicator(s) and/or detection indicator(s) may be added to the input image based on the geographic information, without requiring display of the input image.

In some implementations of the inventive concepts disclosed herein, the searchable electronic record may include a variety of non-image information to facilitate identification of the dig are and its immediate surroundings, including the geographic location(s) of the physical locate mark(s) and/or detected facilities. Examples of such non-image information include, but are not limited to, a text description of the geographic location of the dig area, an address or lot number of a property within which the dig area is located, geo-encoded information such as geographic coordinates relating to the dig area and/or various aspects of the geographic area surrounding the dig area, as well as other non-image information relating generally to the locate operation (e.g., a timestamp for the locate operation, geographic coordinates for locate mark indicators and/or detection indicators, one or more identifiers for a locate technician and/or a locate company performing the locate operation, information regarding one or more environmental landmarks, etc.). The marked-up image(s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

Electronic manifests as described herein according to various embodiments may be created in significant part by a user/technician using electronic drawing tools to facilitate sketching or drawing, in an electronic display field, of various features relating to a locate operation. Electronic manifests created in this manner (via significant interaction by a user/technician) are referred to herein as "manual" electronic manifests. In some embodiments described in detail further below, electronic manifests alternatively may be created via a semi-automated or automated process, in which a user/technician may provide relatively little or no information, and at least some (if not all) data relating to a locate operation is automatically uploaded (e.g., from locate instrumentation providing geographic information relating to detected and/or marked underground facilities, and/or by analyzing locate request tickets and extracting relevant ticket information therefrom). For example, in some implementations of a "semi-automated" or "automated" electronic manifest, geographic coordinates corresponding to detected and/or marked facilities may be automatically uploaded from locate instrumentation (such as locate receivers and marking apparatus) and overlaid on a digital image to provide at least some of the information constituting an electronic record of a locate operation. Additional information relating to the generation of semi-automated or automated electronic manifests may be found in U.S. publication number US2010-0117654-A1, published on May 13, 2010, and entitled "Methods and Apparatus for Displaying an Electronic Rendering of a Locate and/or Marking Operation Using Display Layers," which is hereby incorporated herein by reference in its entirety.

In exemplary aspects, multiple image layers may be employed, wherein one or more base images for an electronic manifest may be selectively enabled or disabled for display to facilitate comparative viewing of different base images (e.g., aerial or other photographic image, digital maps, facilities maps, grids, manual electronic sketches, etc.). Additionally, multiple image layers may be used for different categories of information overlaid on the base image(s) relating to the locate operation (e.g., locate and marking information for different facility types, landmark information for different landmarks, etc.), again to facilitate comparative viewing. Accuracy indicators and/or calibration factors may be used to ensure geographic integrity and appropriate registration of displayed information in respective layers. Revision layers may be employed so that "raw" data, modified data, and/or annotated images may be maintained and locked to prevent unauthorized modifications. Limited access files also may be employed for electronic manifests to prevent unauthorized edits to or use of manifests. Additional safeguards may be used to ensure that manifests are created at or near the work site, and information in the manifests may be analyzed to assess labor/material costs.

In another aspect, various techniques may be employed to facilitate creation of electronic manifests if one or more appropriate digital base images are not available or of poor quality. For example, in one embodiment, a base image may be sketched manually by a user/technician (e.g., on a displayed grid) with an electronic drawing tool. Edge-detection and other image processing algorithms (e.g., smoothing, filtering, sharpening, thresholding, opacity/transparency, etc.) may be employed in connection with various types of base images to improve feature recognition and/or remove undesirable features. For example, in a manner similar to that noted above in connection with image layers, multiple graphics layers (e.g., bitmap and/or vector graphics layers) may be composited over a given base image, wherein one or more graphics filters are employed for the respective graphics layers to improve one or more aspects of image quality and enable comparative viewing of original and processed image information.

In sum, one embodiment of the invention is directed to a method for managing and displaying information relating to a locate operation and/or a marking operation to detect and/or mark a presence or an absence of at least one underground facility, the method comprising: A) electronically storing first information relating to a first electronic rendering of the locate and/or marking operation; B) accepting from at least one user interface at least one user input relating to a modification of the first electronic rendering; C) electronically storing second information relating to a second electronic rendering of the locate and/or marking operation, wherein the second electronic rendering is based at least in part on the at least one user input relating to the modification of the first electronic rendering; and D) providing for independent enabling or disabling for display, via the at least one user interface, of (i) at least one first layer constituting at least part of the first electronic rendering, and/or (ii) at least one second layer constituting at least part of the second electronic rendering.

Another embodiment is directed to an apparatus for managing and displaying information relating to a locate operation and/or a marking operation to detect and/or mark a presence or an absence of at least one underground facility, the apparatus comprising: a memory to store processor-executable instructions; at least one user interface; and a processor coupled to the memory and the at least one user interface, wherein upon execution of the processor-executable instructions, the processor: A) controls the memory to electronically store first information relating to a first electronic rendering of the locate and/or marking operation; B) accepts from the at least one user interface at least one user input relating to a modification of the first electronic rendering; C) controls the memory to electronically store second information relating to a second electronic rendering of the locate and/or marking operation, wherein the second electronic rendering is based at least in part based on the at least one user input; and D) provides for independent enabling or disabling for display, via the at least one user interface, of (i) at least one first layer constituting at least part of the first electronic rendering, and/or (ii) at least one second layer constituting at least part of the second electronic rendering.

Another embodiment is directed to at least one non-transitory computer-readable storage medium encoded with at least one program including processor-executable instructions that, when executed by a processor, perform a method for managing and displaying information relating to a locate operation and/or a marking operation to detect and/or mark a presence or an absence of at least one underground facility, the method comprising: A) electronically storing first information relating to a first electronic rendering of the locate and/or marking operation; B) accepting at least one user input relating to a modification of the first electronic rendering; C) electronically storing second information relating to a second electronic rendering of the locate and/or marking operation, wherein the second electronic rendering is based at least in part on the at least one user input relating to the modification of the first electronic rendering; and D) providing for independent enabling or disabling for display of (i) at least one first layer comprising the first electronic rendering, and/or (ii) at least one second layer comprising the second electronic rendering.

Another embodiment is directed to a method for providing on a display device an electronic rendering of a locate operation and/or a marking operation to detect and/or mark a presence or an absence of at least one underground facility, the method comprising: A) electronically categorizing information relating to the locate operation and/or the marking operation into a plurality of display layers of the electronic rendering, the plurality of display layers including: at least one first display layer comprising original information relating to the locate operation and/or the marking operation; and at least one second display layer comprising modified information relating to the locate operation and/or the marking operation, wherein the modified information is based at least in part on one or more revisions to the original information; B) providing for independent enabling or disabling for display, via at least one user interface, of the at least one first display layer and the at least one second display layer; and C) displaying in a display field of the display device only enabled display layers of the plurality of display layers so as to provide the electronic rendering of the locate operation and/or the marking operation.

Another embodiment is directed to an apparatus for providing on a display device an electronic rendering of a locate operation and/or a marking operation to detect and/or mark a presence or an absence of at least one underground facility, the apparatus comprising: a memory to store processor-executable instructions; at least one user interface; a display device; and a processor coupled to the memory, the at least one user interface, and the display device, wherein upon execution of the processor-executable instructions, the processor: A) electronically categorizes information relating to the locate operation and/or the marking operation into a plurality of display layers of the electronic rendering, the plurality of display layers including: at least one first display layer comprising original information relating to the locate operation and/or the marking operation; and at least one second display layer comprising modified information relating to the locate operation and/or the marking operation, wherein the modified information is based at least in part on one or more revisions to the original information; B) provides for independent enabling or disabling for display, via at least one user interface, of the at least one first display layer and the at least one second display layer; and C) controls the display device so as to display only enabled display layers of the plurality of display layers so as to provide the electronic rendering of the locate operation and/or the marking operation.

Another embodiment is directed to at least one non-transitory computer-readable storage medium encoded with at least one program including processor-executable instructions that, when executed by a processor, perform a method for providing on a display device an electronic rendering of a locate operation and/or a marking operation to detect and/or mark a presence or an absence of at least one underground facility, the method comprising: A) electronically categorizing information relating to the locate operation and/or the marking operation into a plurality of display layers of the electronic rendering, the plurality of display layers including: at least one first display layer comprising original information relating to the locate operation and/or the marking operation; and at least one second display layer comprising modified information relating to the locate operation and/or the marking operation, wherein the modified information is based at least in part on one or more revisions to the original information; B) providing for independent enabling or disabling for display of the at least one first display layer and the at least one second display layer; and C) displaying in a display field only enabled display layers of the plurality of display layers so as to provide the electronic rendering of the locate operation and/or the marking operation.

Another embodiment is directed to an apparatus for managing information relating to a locate operation and/or a marking operation to detect and/or mark a presence or an absence of at least one underground facility, the apparatus comprising: a communication interface; a memory to store processor-executable instructions; and a processor coupled to the communication interface and the memory, wherein upon execution of the processor-executable instructions by the processor, the processor: controls the communication interface so as to electronically receive first information relating to the locate operation and/or the marking operation; based on the first information, generates at least one electronic manifest relating to the locate operation and/or the marking operation, the at least one electronic manifest including image information documenting performance of the locate operation and/or the marking operation; generates at least one limited access file comprising second information relating to the at least one electronic manifest; and controls the communication interface to transmit, and/or controls the memory to store, the at least one limited access file.

Another embodiment is directed to a method for managing information relating to a locate operation and/or a marking operation to detect and/or mark a presence or an absence of at least one underground facility, the method comprising: A) electronically receiving first information relating to the locate operation and/or the marking operation; B) based on the first information, electronically generating at least one electronic manifest relating to the locate operation and/or the marking operation, the at least one electronic manifest including image information documenting performance of the locate operation and/or the marking operation; C) electronically generating at least one limited access file comprising second information relating to the at least one electronic manifest; and D) electronically transmitting and/or electronically storing the at least one limited access file.

Another embodiment is directed to at least one non-transitory computer-readable storage medium encoded with at least one program including processor-executable instructions that, when executed by a processor, perform a method for managing information relating to a locate operation and/or a marking operation to detect and/or mark a presence or an absence of at least one underground facility, the method comprising: A) electronically receiving first information relating to the locate operation and/or the marking operation; B) based on the first information, electronically generating at least one electronic manifest relating to the locate operation and/or the marking operation, the at least one electronic manifest including image information documenting performance of the locate operation and/or the marking operation; C) electronically generating at least one limited access file comprising second information relating to the at least one electronic manifest; and D) electronically transmitting and/or electronically storing the at least one limited access file.

Another embodiment is directed to a method for generating an accuracy-referenced electronic record of a locate and/or marking operation performed by a locate technician, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) digitally representing, on a display device, the location of the at least one underground facility and/or the at least one physical locate mark so as to generate a representation of the locate and/or marking operation; B) digitally representing, on the display device, the accuracy of the represented location using at least one accuracy indicator overlaid on the representation of the locate and/or marking operation so as to generate an accuracy-annotated representation of the locate and/or marking operation; and C) electronically transmitting and/or electronically storing information relating to the accuracy-annotated representation of the locate and/or marking operation so as to generate an accuracy-referenced electronic record of the locate and/or marking operation.

In the method above, the at least one accuracy indicator may comprise, for example, a user-estimated error radius and/or an indication of a user-estimated range of potential error, although the embodiment is not limited in these respects.

Another embodiment is directed to a method for generating an accuracy-referenced electronic record of a locate and/or marking operation performed by a locate technician, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) electronically receiving first information regarding a location of the at least one underground facility and/or the at least one physical locate mark; B) based at least in part on the first information received in A), digitally representing, on a display device, the location of the at least one underground facility and/or the at least one physical locate mark so as to generate a representation of the locate and/or marking operation; C) electronically receiving second information regarding an accuracy of the represented location; D) based at least in part on the second information received in C), digitally representing, on the display device, the accuracy of the represented location using at least one accuracy indicator overlaid on the representation of the locate and/or marking operation so as to generate an accuracy-annotated representation of the locate and/or marking operation; and E) electronically transmitting and/or electronically storing third information relating to the accuracy-annotated representation of the locate and/or marking operation so as to generate an accuracy-referenced electronic record of the locate and/or marking operation.

In the method above, A) may comprise receiving the first information from a GPS-enabled locating and/or marking device. Similarly, C) may comprise receiving the second information from a GPS-enabled locating and/or marking device. The at least one accuracy indicator may comprise, for example, a user-estimated error radius and/or an indication of a user-estimated range of potential error. However, it should be appreciated that the embodiment is not limited in these respects.

Another embodiment is directed to a method for generating a corrected electronic record of a locate and/or marking operation performed by a locate technician, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) electronically receiving first information regarding a location of the at least one underground facility and/or the at least one physical locate mark; B) based at least in part on the first information received in A), digitally representing, on a display device, the location of the least one underground facility and/or the at least one physical locate mark so as to generate a representation of the locate and/or marking operation; C) receiving second information regarding a corrected location of the at least one underground facility and/or the at least one physical locate mark; D) based at least in part on the second information received in C), digitally representing, on the display device, the corrected location so as to generate a corrected representation of the locate and/or marking operation; and E) electronically transmitting and/or electronically storing third information relating to the corrected representation of the locate and/or marking operation so as to generate a corrected electronic record of the locate and/or marking operation.

In the method above, A) may comprise receiving the first information from a GPS-enabled locating and/or marking device. Similarly, C) may comprise receiving the second information from a GPS-enabled locating and/or marking device. B) may comprise digitally representing the location of the least one underground facility and/or the at least one physical locate mark on an underlying input image. In the latter case, the second information may comprise information identifying a reference location in the underlying input image. However, it should be appreciated that the embodiment is not limited in these respects.

Another embodiment is directed to a method for generating a calibration factor based on user input received in connection with a location of at least one underground facility and/or at least one physical locate mark of a locate and/or marking operation performed by a locate technician, the locate and/or marking operation comprising locating and/or identifying, using the at least one physical locate mark, a presence or an absence of the at least one underground facility within a dig area, wherein at least a portion of the dig area may be excavated or disturbed during excavation activities, the method comprising: A) electronically receiving first information regarding a location of the at least one underground facility and/or the at least one physical locate mark; B) based at least in part on the first information received in A), digitally representing, on a display device, the location of the least one underground facility and/or the at least one physical locate mark so as to generate a representation of the locate and/or marking operation; C) receiving second information regarding a corrected location of the at least one underground facility and/or the at least one physical locate mark; D) based at least in part on the second information received in C), determining a calibration factor for the location of the at least one underground facility and/or the at least one physical locate mark; and E) electronically transmitting and/or electronically storing the calibration factor so as to facilitate correction of other location data.

In the method above, the other location data may relate to another locate and/or marking operation and/or another location of the at least one underground facility and/or the at least one physical locate mark, although the embodiment is not limited in these respects.

Another embodiment is directed to a method for assessing an aspect relating to a locate and/or marking operation performed by a locate technician based on an electronic representation of the locate and/or marking operation, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) digitally representing, on a display device, at least one underground facility and/or the at least one physical locate mark so as to generate a representation of the locate and/or marking operation; B) determining a length associated with the representation of the locate and/or marking operation; and C) based at least in part on the length determined in B), automatically assessing an aspect relating to a locate and/or marking operation.

In the method above, the aspect may comprise (1) a cost associated with a locate and/or marking operation or (2) a productivity and/or competence of a locate technician who performs a locate and/or marking operation, although the embodiment is not limited in this respect.

Another embodiment is directed to a method for assessing a cost associated with a locate and/or marking operation performed by a locate technician based on an electronic representation of the locate and/or marking operation, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) digitally representing, on a display device, at least one underground facility and/or the at least one physical locate mark so as to generate a representation of the locate and/or marking operation; B) determining a length associated with the representation of the locate and/or marking operation; and C) based at least in part on the length determined in B), automatically assessing a cost associated with the locate and/or marking operation.

The method above may further comprise: D) automatically generating a bill based at least in part on the cost determined in C), although the embodiment is not limited in this respect.

Another embodiment is directed to a method for assessing a productivity and/or competence of a locate technician who performs a locate and/or marking operation, the locate and/or marking operation comprising locating and/or identifying, using at least one physical locate mark, a presence or an absence of at least one underground facility within a dig area, wherein at least a portion of the dig area may be excavated or disturbed during excavation activities, the method comprising: A) digitally representing, on a display device, at least one underground facility and/or the at least one physical locate mark so as to generate a representation of the locate and/or marking operation; B) determining a length associated with the representation of the locate and/or marking operation; C) determining duration of time associated with the locate and/or marking operation; and D) based at least in part on the length determined in B) and the duration of time determined in C), automatically assessing a productivity and/or competence of the locate technician.

Another embodiment is directed to an apparatus for managing information relating to a locate operation and/or a marking operation to detect and/or mark a presence or an absence of at least one underground facility, the apparatus comprising: a communication interface; a memory to store processor-executable instructions; and a processor coupled to the communication interface and the memory, wherein upon execution of the processor-executable instructions by the processor, the processor: A) controls the communication interface so as to electronically receive first information relating to the locate operation and/or the marking operation, the first information including image information; B) processes the image information to improve at least one aspect of an image represented by the image information and thereby provide improved image information; and C) generates at least one electronic manifest relating to the locate operation and/or the marking operation, the at least one electronic manifest including the improved image information and documenting performance of the locate operation and/or the marking operation. In one aspect of this embodiment, the processor-executable instructions include at least one image processing algorithm selected from the group consisting of an edge-detection algorithm, a smoothing algorithm, a filtering algorithm, a sharpening algorithm, a thresholding algorithm, and an opacity/transparency algorithm, and wherein in B), the processor processes the image information by executing the at least one image processing algorithm.

Another embodiment is directed to a method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities. The method comprises: A) displaying, on a display device, a bare grid; B) adding to the displayed bare grid, via a user input device associated with the display device, at least one digital representation of the at least one physical locate mark so as to generate a marked-up grid including the at least one digital representation of the at least one physical locate mark; and C) electronically transmitting and/or electronically storing information relating to the marked-up grid so as to generate the searchable electronic record of the locate operation.

Another embodiment is directed to a computer-readable medium encoded with instructions that, when executed on at least one processing unit, perform a method of generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) rendering, on a display device, a bare grid; B) receiving user input relating to a geographic location of the at least one physical locate mark; C) adding to the displayed bare grid at least one digital representation of the at least one physical locate mark so as to generate a marked-up grid including the at least one digital representation of the at least one physical locate mark; and D) electronically transmitting and/or electronically storing information relating to the marked-up grid so as to generate the searchable electronic record of the locate operation.

Another embodiment is directed to an apparatus for facilitating generation of a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the apparatus comprising: a communication interface; a display device; a user input device; a memory to store processor-executable instructions; and a processing unit coupled to the communication interface, the display device, the user input device, and the memory, wherein upon execution of the processor-executable instructions by the processing unit, the processing unit: controls the display device to display a bare grid; acquires, via the user interface, user input relating to a geographic location of the at least one physical locate mark; controls the display device to display a marked-up grid including at least one digital representation of the at least one physical locate mark based at least in part on the user input; and controls the communication interface and/or the memory to electronically transmit and/or electronically store information relating to the marked-up grid so as to generate the searchable electronic record of the locate operation.

Another embodiment is directed to a method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) electronically receiving a digital image of a geographic area comprising the dig area, at least a portion of the received digital image being displayed on a display device; B) adding to the displayed digital image, via a user input device associated with the display device, (i) at least one digital representation of at least one physical indication of a dig area observed by the locate technician during the locate operation and (ii) at least one digital representation of the at least one physical locate mark so as to generate a marked-up digital image; and C) electronically transmitting and/or electronically storing information relating to the marked-up digital image so as to generate the searchable electronic record of the locate operation.

Another embodiment is directed to a computer-readable medium encoded with instructions that, when executed on at least one processing unit, perform a method of generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) rendering, on a display device, a digital image of a geographic area comprising the dig area; B) receiving first user input relating to a geographic location of at least one physical indication of the dig area observed by the locate technician during the locate operation; C) receiving second user input relating to a geographic location of the at least one physical locate mark; D) adding to the displayed digital image, via a user input device associated with the display device, at least one digital representation of the at least one physical indication of the dig area and at least one digital representation of the at least one physical locate mark so as to generate a marked-up digital image; and E) electronically transmitting and/or electronically storing information relating to the marked-up digital image so as to generate the searchable electronic record of the locate operation.

Another embodiment is directed to an apparatus for facilitating generation of a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the apparatus comprising: a communication interface; a display device; a user input device; a memory to store processor-executable instructions; and a processing unit coupled to the communication interface, the display device, the user input device, and the memory, wherein upon execution of the processor-executable instructions by the processing unit, the processing unit: controls the display device to display a digital image of a geographic area comprising the dig area; receives, via the user input device, first user input relating to a geographic location of at least one physical indication of the dig area observed by the locate technician during the locate operation; receives, via the user input device, second user input relating to a geographic location of the at least one physical locate mark; generates a marked-up digital image including at least one digital representation of the at least one physical indication of the dig area and at least one digital representation of the at least one physical locate mark; and controls the communication interface and/or the memory to electronically transmit and/or electronically store information relating to the marked-up digital image so as to generate the searchable electronic record of the locate operation.

Another embodiment is directed to a method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) electronically receiving a digital image of a geographic area comprising the dig area, at least a portion of the received digital image being displayed on a display device; B) adding to the displayed digital image (i) at least one digital representation of the at least one physical locate mark and (ii) an indication of a distance between a physical landmark and the at least one physical locate mark so as to generate a marked-up digital image; and C) electronically transmitting and/or electronically storing information relating to the marked-up digital image so as to generate the searchable electronic record of the locate operation.

Another embodiment is directed to a method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) displaying, on a display device, a digital image of a geographic area comprising the dig area; B) electronically receiving first information relating to at least one location of the at least one physical locate mark; C) electronically receiving second information relating to at least one physical indication of the dig area observed by the locate technician during the locate operation; D) based at least in part on the first and second information, digitally representing, on the displayed digital image, (i) at least one digital representation of the at least one physical indication of the dig area and (ii) at least one digital representation of the at least one physical locate mark so as to generate a marked-up digital image; and E) electronically transmitting and/or electronically storing information relating to the marked-up digital image so as to generate the searchable electronic record of the locate operation.

Another embodiment is directed to a method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) displaying, on a display device, a digital image of a geographic area comprising the dig area; B) electronically receiving first information relating to at least one location of the at least one physical locate mark; C) electronically receiving second information relating to at least one location of the locate technician during the locate operation; D) based at least in part on the first and second information, digitally representing, on the displayed digital image, (i) at least one digital representation of the at least one physical locate mark and (ii) at least one digital representation of the at least one location of the locate technician during the locate operation; and E) electronically transmitting and/or electronically storing information relating to the marked-up digital image so as to generate the searchable electronic record of the locate operation.

Another embodiment is directed to a method for controlling a user interface displaying a information relating to a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising: A) displaying, on a display device, a digital image of a geographic area comprising the dig area; B) based on first user input received via at least one user input device associated with the display device, adding to the displayed digital image, at least one digital representation of the at least one physical locate mark so as to generate a marked-up digital image; C) based on second user input received via the at least one user input device, deactivating the at least one digital representation of the at least one physical locate mark so as to hide the at least one digital representation on the marked-up digital image; and D) based on third user input received via the at least one user input device, activating the at least one digital representation of the at least one physical locate mark so as to redisplay the at least one digital representation on the marked-up digital image.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 7 is a diagram of an exemplary data set that may be stored in the memory of FIG. 3 and/or FIG. 4, according to one embodiment of the present invention;

DETAILED DESCRIPTION

Following below are more detailed descriptions of various concepts related to, and embodiments of, inventive systems, methods and apparatus for generating searchable electronic records of underground facility locate and/or marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
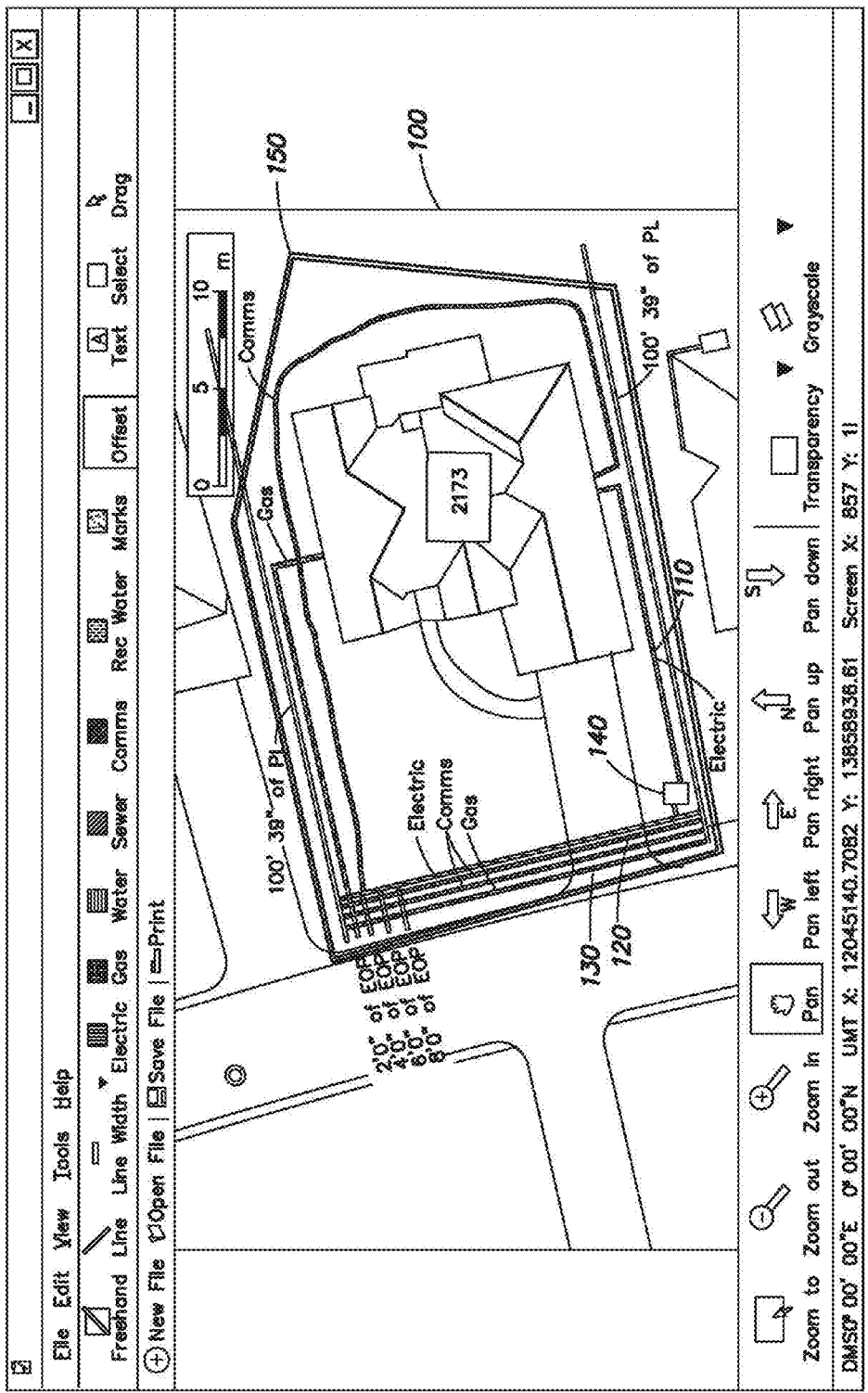
FIG. 1 is a diagram of an exemplary searchable electronic record of a locate operation, according to one embodiment of the present invention.

FIG. 1 is a diagram illustrating an exemplary searchable electronic record, or "electronic manifest," of a locate operation, according to one embodiment of the present invention. When locating underground facilities at a geographic location, such as at a dig area 100 (which, in the example of FIG. 1 is associated with a residence or a business), it may be beneficial to document locate marks in a permanent and reproducible manner. For example, a locate technician may locate and mark underground facilities using a locating device and/or a marking device. A locating device may generally be defined as a locating wand or another device used to detect the presence (or absence) of underground facilities, while a marking device may generally be defined as any tool (e.g., a paint wand) to apply a physical locate mark, such as paint or other material to a surface. The locate technician may use paint, flags, or some other object with a particular color or other characteristic to mark the location of an underground facility. Referring to the example shown in FIG. 1, the locate technician may use red paint to mark underground power lines 110, orange paint to mark telecommunications (e.g., telephone and/or cable television) lines 120, and yellow paint to mark gas lines 130.

The locate technician may also identify one or more environmental landmarks that are present at or near the dig area and/or determine the distance between the environmental landmark(s) and the located underground facility. For example, a transformer 140 may be indicated as an environmental landmark, as shown in FIG. 1. The geographic location of transformer 140 may be used to measure offsets to other locate marks in the dig area.

As described herein, documentation of some or all of this information regarding a locate operation is created as a searchable electronic record, also referred to herein as "an electronic manifest." An electronic manifest, as used herein, may generally refer to one or more computer-readable files that include some or all of the information in a manifest. The electronic manifest may be created using one or more input images of a dig area, such as dig area 100, that may be combined with other information (e.g., non-image information) that is added by the user (e.g., a locate technician) about the locate operation ("manual" electronic manifest). In other implementations, an electronic manifest may be created using one or more input images of a dig area combined with information about detection and/or marking of one or more underground facilities that is provided by other sources, e.g., instruments such as locating devices and/or marking devices that are used to perform the locate operation may provide data for creation of an electronic manifest. In some examples of these implementations, data from such instruments, and/or information derived from one or more locate request tickets, may be automatically uploaded to facilitate creation of an "automated" electronic manifest (in which a user/technician need not necessarily sketch or draw, via an electronic stylus or other electronic drawing tools, locate mark indicators and/or detection indicators). Other implementations may use one or more input images of a dig area combined with information that is added by the user/technician and information that is provided by other sources (e.g., locate request tickets, locate instruments) to facilitate creation of a "semi-automated" electronic manifest. As used herein, a "user" may refer to any person operating a device to create an electronic manifest, such as a locate technician, a site supervisor, or any other person or group of people.

Accordingly, various embodiments of the present invention are directed to methods, apparatus and systems for creating a searchable electronic record, or "electronic manifest," relating to a geographic area including a dig area to be excavated or otherwise disturbed. As part of the electronic record, the geographic location of one or more physical locate marks, applied to the dig area during a locate operation (e.g., via a marking device) to indicate a presence (or absence) of one or more located underground facilities, is somehow identified with respect to its immediate surroundings in the geographic area. In some implementations, in addition to or alternatively to one or more electronic indications of physical locate marks applied to the dig area, an electronic manifest may include one or more electronic indications of where one or more underground facilities were detected (e.g., by a locate device) during the locate operation.

To create such an electronic record, in one exemplary implementation one or more input images relating to the geographic area including the dig area may be utilized. For example, source data representing one or more input images of a geographic area including the dig area is received and/or processed so that the input image(s) may be displayed on a display device. The geographic location of the physical locate mark(s), and/or where one or more facilities were detected, is then indicated in some manner on the displayed input image(s) so as to generate one or more marked-up images constituting at least a portion of the electronic record. For example, geographic locations of the physical locate mark(s) may be indicated in the marked-up image(s) using digital representation(s) of the physical locate mark(s) ("locate mark indicators") that are added to the marked-up image(s). Likewise, geographic locations of where underground facilities were detected may be indicated in the marked-up image(s) as "detection indicators." In other implementations, the input image need not necessarily be displayed to add one or more locate mark indicators and/or detection indicators; for example, geographic information relating to one or more physical locate marks applied to the dig area and/or detected facilities may be received and locate mark indicator(s) and/or detection indicators may be added to the input image based on the geographic information, without requiring display of the input image.

In some implementations of the inventive concepts disclosed herein, the searchable electronic record may include a variety of non-image information to facilitate identification of the dig area and its immediate surroundings, including the geographic location(s) of the physical locate mark(s) and/or detected facilities. Examples of such non-image information include, but are not limited to, a text description of the geographic location of the dig area, an address or lot number of a property within which the dig area is located, geo-encoded information such as geographic coordinates relating to the dig area and/or various aspects of the geographic area surrounding the dig area, as well as other non-image information relating generally to the locate operation (e.g., a timestamp for the locate operation, geographic coordinates for locate mark indicators and/or detection indicators, one or more identifiers for a locate technician and/or a locate company performing the locate operation, information regarding one or more environmental landmarks, etc.). The marked-up image(s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

As may be observed from FIG. 1, an input image serving as a starting point for creating a searchable electronic record according to various embodiments of the present invention may be displayed (e.g., on a laptop computer), and the displayed input image provides a view of the geographic area including dig area 100 (which, in FIG. 1, is essentially an entire property surrounding a building). For purposes of the present disclosure, an input image is any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

Figure 10:
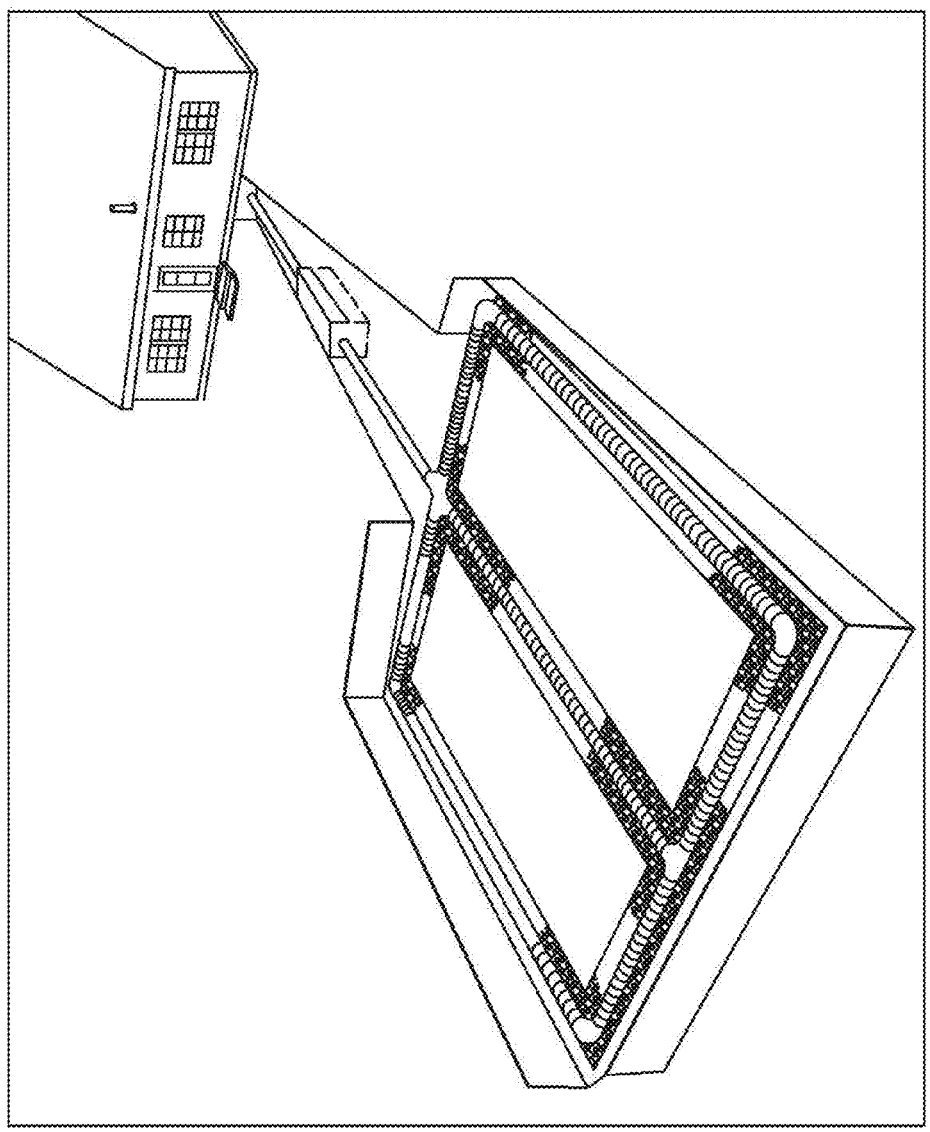
FIG. 10 shows a sketch, representing an exemplary input image.
Figure 11:
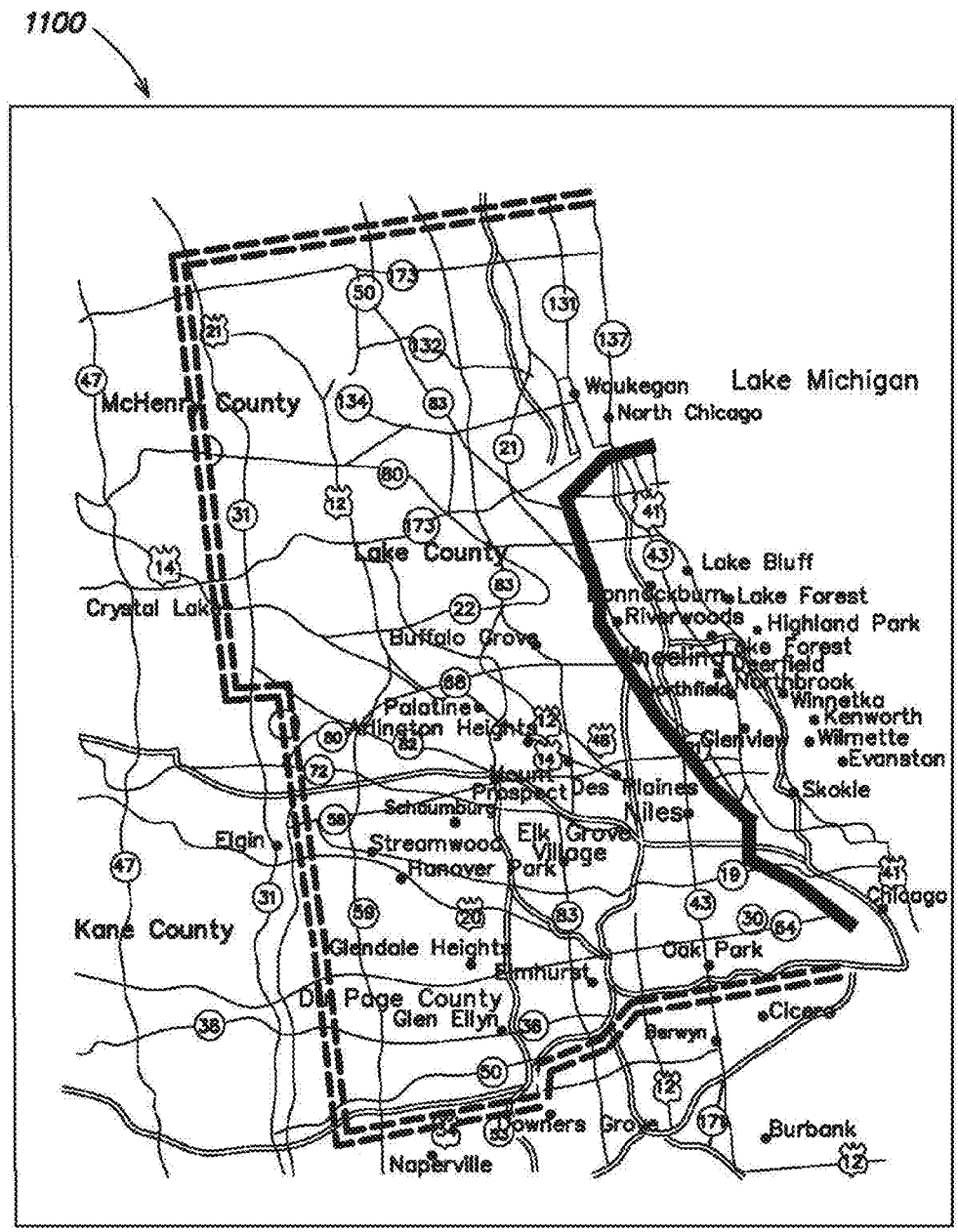
FIG. 11 shows a map, representing an exemplary input image.
Figure 12:
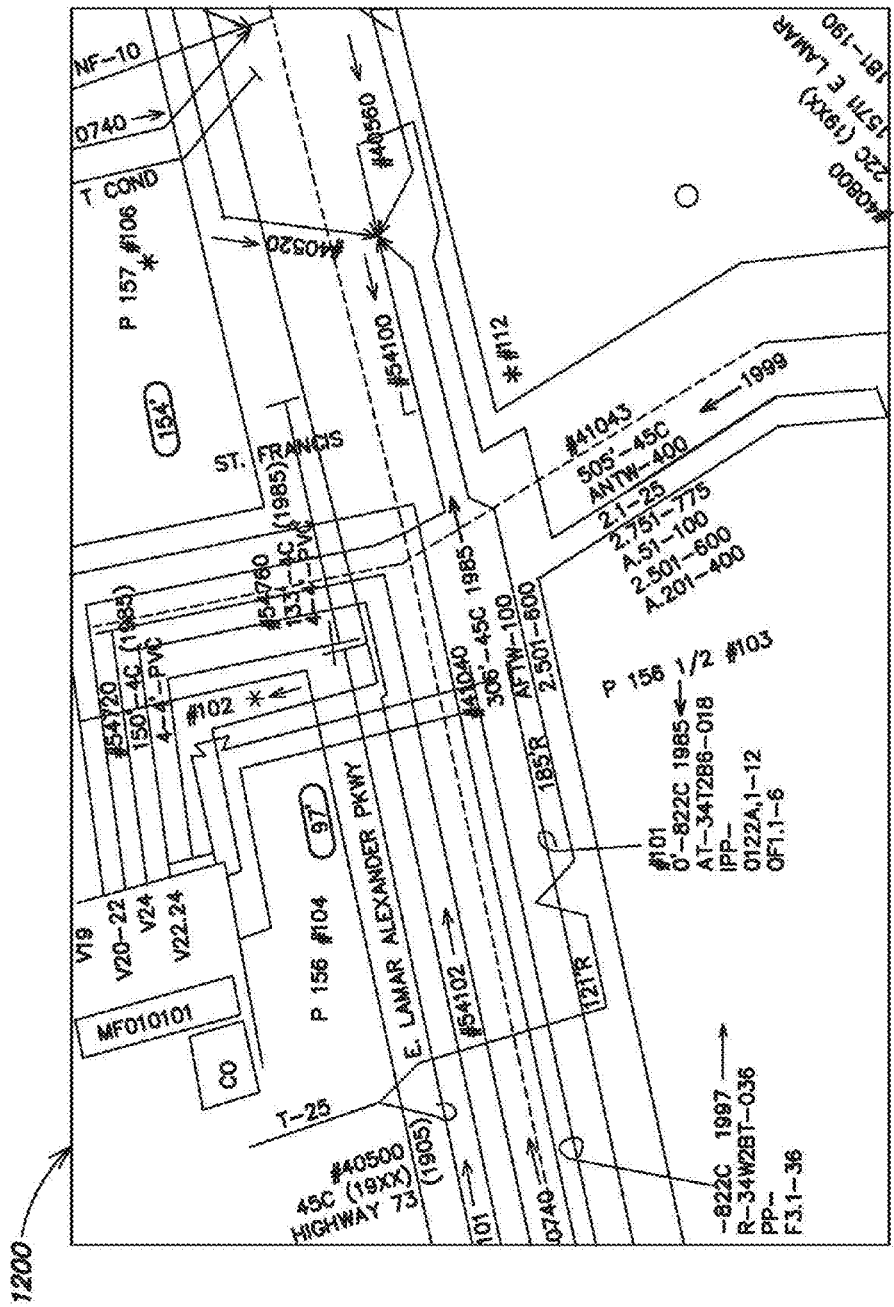
FIG. 12 shows a facilities map, representing an exemplary input image.
Figure 13:
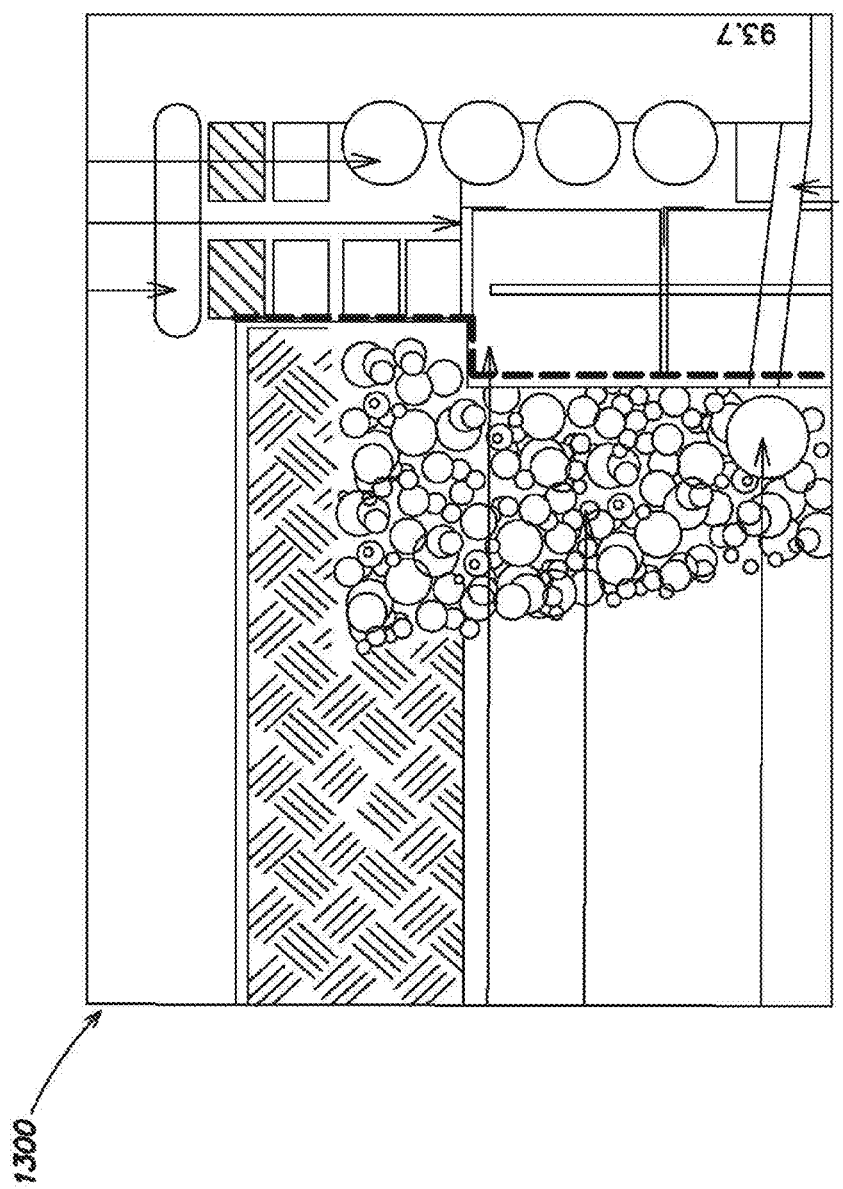
FIG. 13 shows a construction/engineering drawing, representing an exemplary input image.
Figure 14:
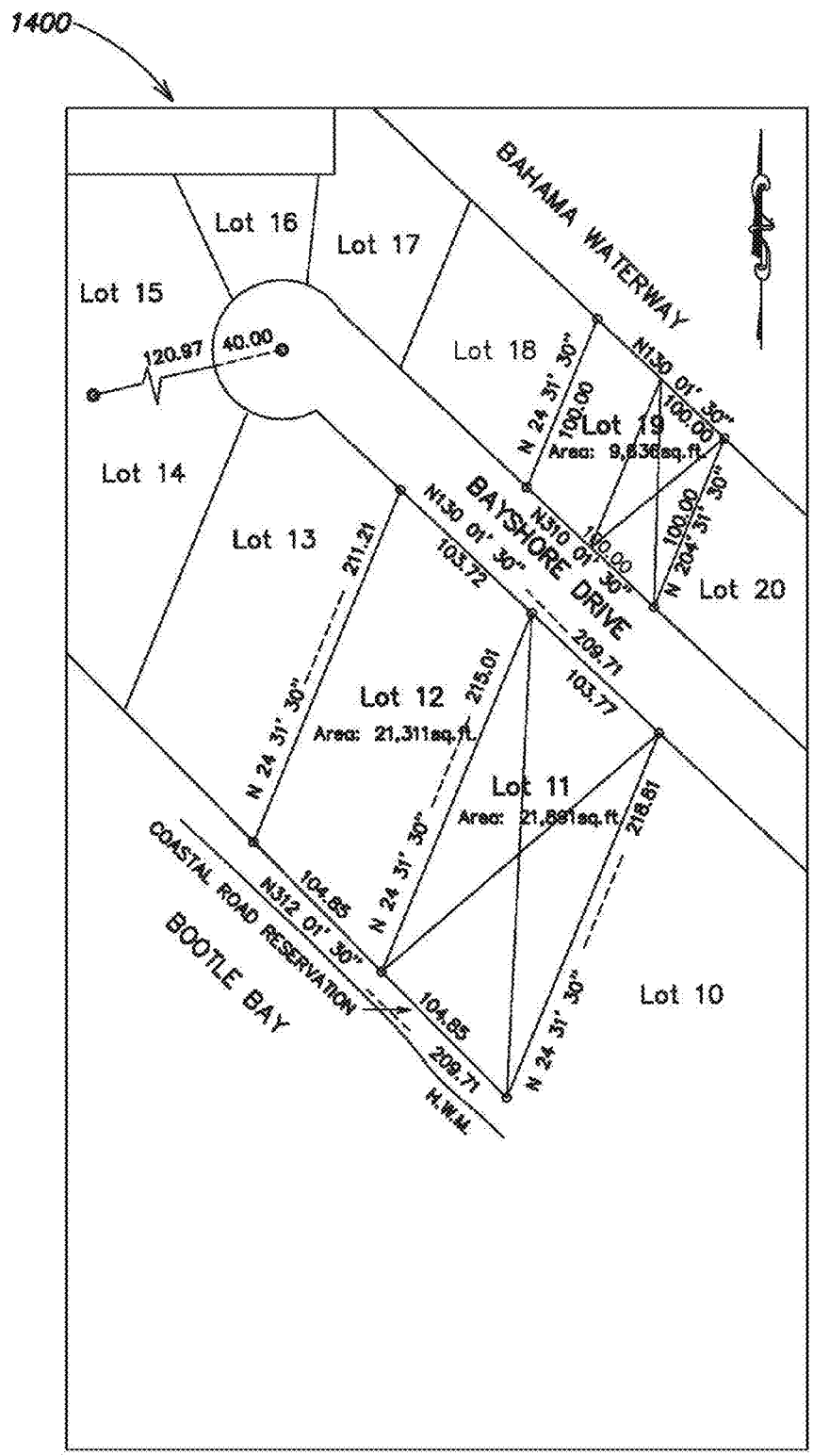
FIG. 14 shows a land survey map, representing an exemplary input image.
Figure 15:
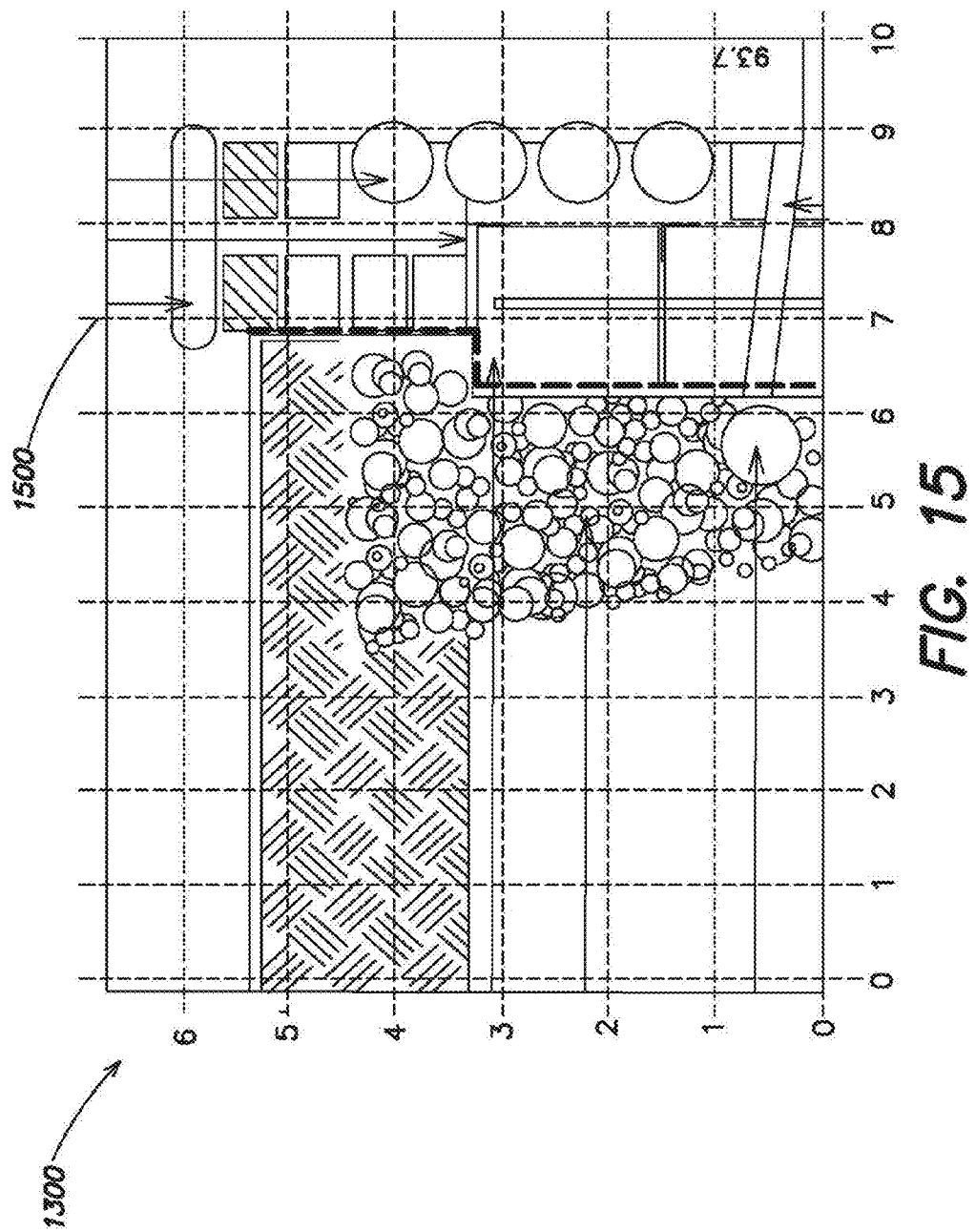
FIG. 15 shows a grid, overlaid on the construction/engineering drawing of FIG. 13, representing an exemplary input image.
Figure 16:
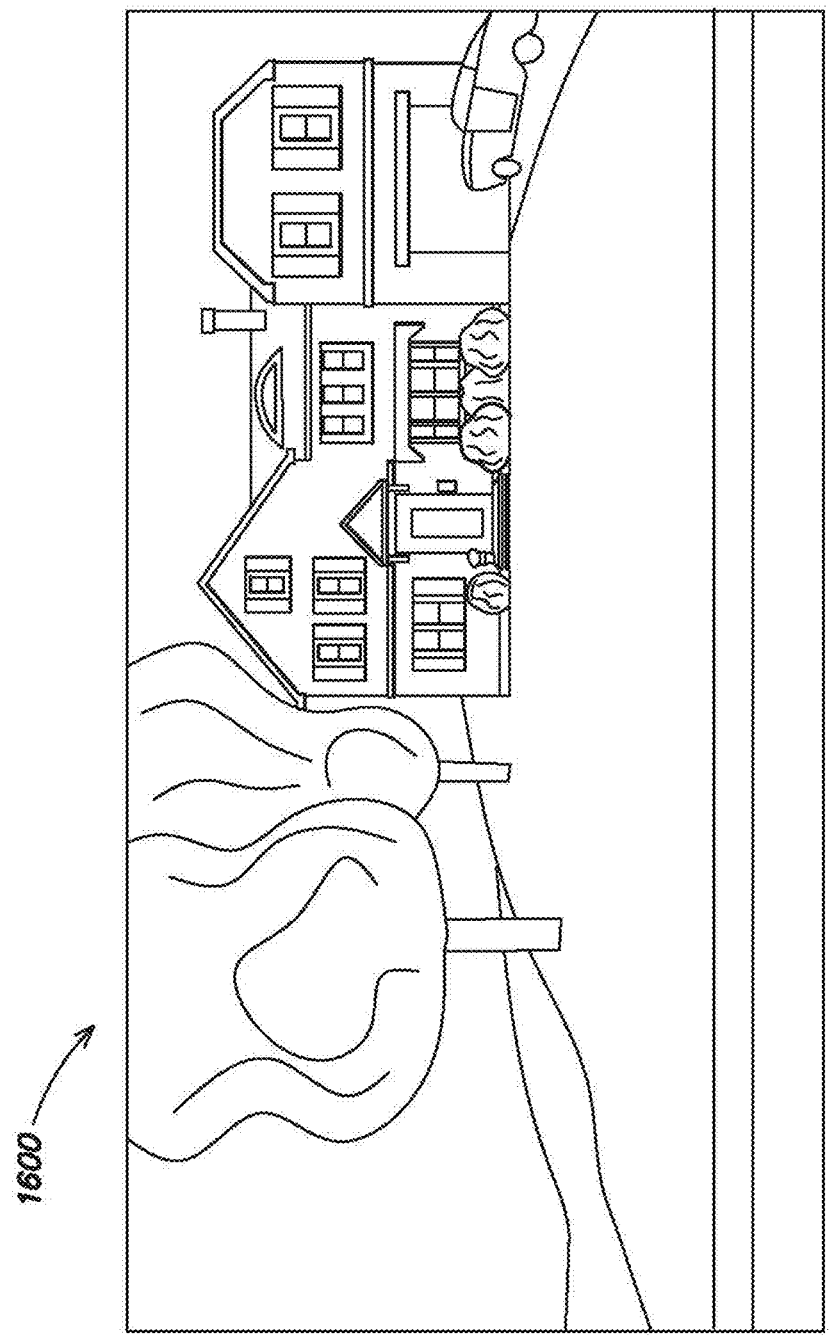
FIG. 16 shows a street level image, representing an exemplary input image.

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.). FIG. 10 shows an exemplary sketch 1000;

Various maps indicating surface features and/or extents of geographical areas, such as street/road maps (e.g., map 1100 of FIG. 11), topographical maps, military maps, parcel maps, tax maps, town and county planning maps, call-center and/or facility polygon maps, virtual maps, etc. (such maps may or may not include geo-encoded information);

Facilities maps illustrating installed underground facilities, such as gas, power, telephone, cable, fiber optics, water, sewer, drainage, etc. Facilities maps may also indicate street-level features (streets, buildings, public facilities, etc.) in relation to the depicted underground facilities. Examples of facilities maps include CAD drawings that may be created and viewed with a GIS to include geo-encoded information (e.g., metadata) that provides location information (e.g., infrastructure vectors) for represented items on the facility map. An exemplary facilities map 1200 is shown in FIG. 12;

Architectural, construction and/or engineering drawings and virtual renditions of a space/geographic area (including "as built" or post-construction drawings). An exemplary construction/engineering drawing 1300 is shown in FIG. 13;

Land surveys, i.e., plots produced at ground level using references to known points such as the center line of a street to plot the metes and bounds and related location data regarding a building, parcel, utility, roadway, or other object or installation. FIG. 14 shows an exemplary land survey map 1400;

A grid (a pattern of horizontal and vertical lines used as a reference) to provide representational geographic information (which may be used "as is" for an input image or as an overlay for an acquired "real world" scene, drawing, map, etc.). An exemplary grid 1500, overlaid on construction/engineering drawing 1300, is shown in FIG. 15. It should be appreciated that the grid 1500 may itself serve as the input image (i.e., a "bare" grid), or be used together with another underlying input image;

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML);

Photographic renderings/images, including street level (see e.g., street level image 1600 of FIG. 16), topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators, or "virtual white lines," that provide one or more indications of or graphically delimit a dig area, as described in U.S. publication no. 2009-0238417-A, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

With reference again to FIG. 1, it may be observed that the dig area 100 is indicated in the displayed input image by a dig area indicator 150. As noted above, in one embodiment the input image may have been received with one or more dig area indicators previously provided so that the dig area may be readily identified in the displayed input image. While FIG. 1 illustrates a dig area indicator 150 as an essentially continuous line delimiting a boundary of the dig area, it should be appreciated that one or more dig area indicators are not limited in this respect, and that such indicators may include lines having various colors and line-types (dashed, dotted, etc.), drawing shapes, shades, symbols, etc., and need not necessarily delimit an entire boundary of a dig area. Additionally, as also noted above, it should be appreciated that in some embodiments an input image need not include any dig area indicators to provide a foundation for generating a searchable electronic record of a locate operation.

In FIG. 1, digital representations of the physical locate marks applied to a dig area (e.g., corresponding to power lines 110, telecommunications lines 120 and gas lines 130 shown in FIG. 1), may be added to the displayed input image to graphically indicate the geographic locations of the physical locate marks in the dig area 100. In one embodiment, representations of the physical locate marks, also referred to as "locate mark indicators," may be added to the displayed input image through the use of a drawing application or marking tool application, which may superimpose over or otherwise display one or more locate mark indicators on the displayed input image. As used herein, "representations of physical locate marks" or "locate mark indicators" may include lines, drawing shapes, shades, symbols, coordinates, data sets, or other indicators to provide one or more indications of the geographic locations of the physical locate marks on a displayed input image. As discussed further below, a given locate mark indicator may have an associated attribute representing a type of underground facility corresponding to the physical locate mark(s) applied to the dig area. Examples of different attributes for a locate mark indicator include, but are not limited to, color, line-type, symbol-type, shape, shade, etc. (e.g., a first locate mark indicator for a gas line may include a green dashed-line, a second locate mark indicator for a fiber optic cable may include a red dotted-line, a third locate mark indicator for an electric line may include one or more gray diamond shapes arranged along a path traversed in the input image by the buried electric line, etc.).

While FIG. 1 and additional figures discussed in turn below initially illustrate an electronic manifest and generation of same in connection with representations of physical locate marks corresponding to the marking portion of a locate operation, as noted above it should be appreciated that an electronic manifest also or alternatively may include representations of one or more geographic locations ("detection indicators") at which one or more underground utilities were detected during a locate operation (e.g., prior to marking). Many of the concepts discussed herein in connection with locate mark indicators as part of an electronic manifest apply similarly for detection indicators employed to represent and document via an electronic manifest where underground facilities were detected. Similarly, while the embodiment depicted in FIG. 1 illustrates a graphic user interface including various elements relating to a drawing tool application to facilitate creation of a "manual" electronic manifest in which a user electronically sketches/draws on an underlying image, other embodiments contemplate elements that facilitate semi-automated or automated creation of an electronic manifest.

In some exemplary embodiments described herein, whether created manually, or in a semi-automated or automated manner, the marked-up images having one or more of locate mark indicators, detection indicators, and dig area indicators, as well as non-image information, may form part of the searchable electronic record, and information regarding the searchable electronic record (and in some instances the record itself) may be electronically transmitted and/or stored to facilitate verification of the locate operation. In one implementation, the non-image information may include a series of geographical coordinates representing the locate mark indicator(s) and/or detection indicators. These marked-up images and coordinates enable documentation of where the physical locate marks were made and/or where facilities were detected, even after the physical locate marks no longer exist. Such documentation may be important in the event of accidental damage to an underground facility or another event triggering a dispute concerning whether the underground facilities were appropriately detected and/or marked. Further, documentation provided by the searchable electronic records according to the present disclosure may be helpful for training locate technicians, assessing the quality of locate operations, and ensuring that locate operations have actually and/or accurately been performed without a need to visit the dig site thereafter. An electronic record comprising the marked-up image may be stored for later retrieval, and may be searchable. For example, data embedded within or otherwise associated with the marked-up image may be searchable (e.g., via a search engine) using key words.

Exemplary Network

Figure 2:
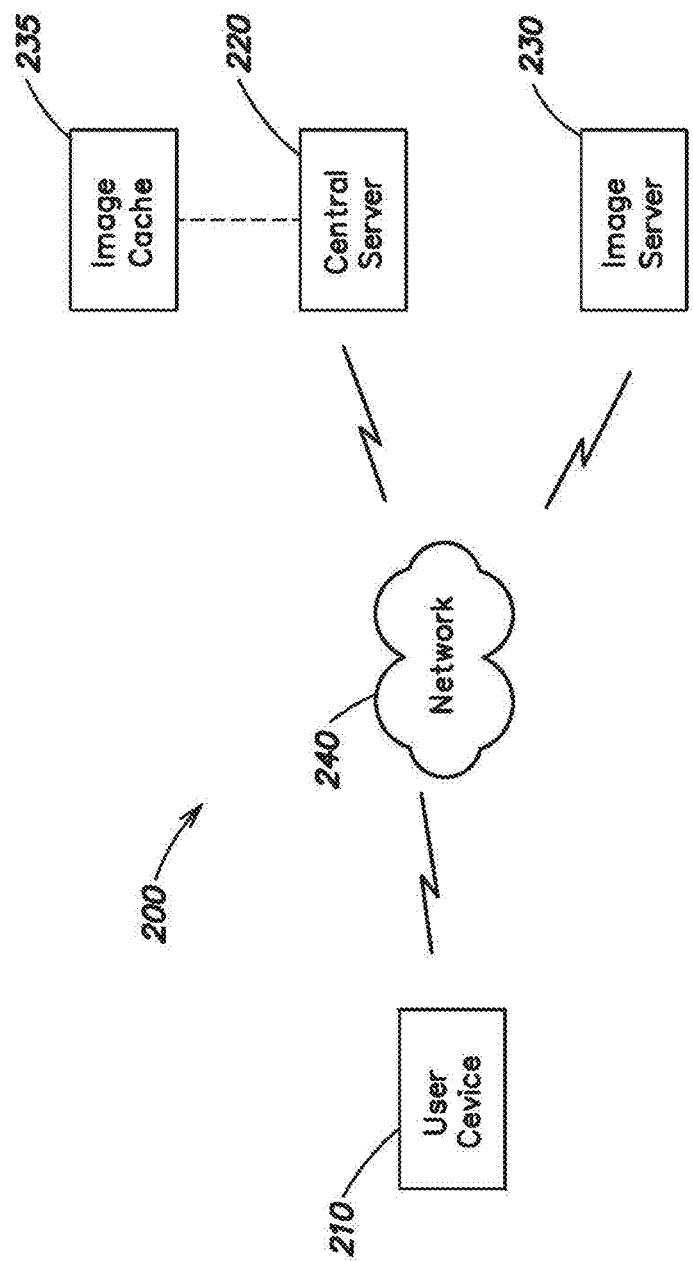
FIG. 2 is a diagram of an exemplary network in which the various inventive concepts described herein may be implemented, according to one embodiment of the present invention.

FIG. 2 is a diagram of an exemplary network 200 in which systems and methods described herein may be implemented. As shown in FIG. 2, the network 200 may include a user device 210 connected to a central server 220 and an image server 230 via a network 240. A single user device 210, central server 220, and image server 230 have been illustrated as connected to network 240 for simplicity. In practice, there may be more or fewer user devices and/or servers. For example, in one alternative implementation, the user device 210 may operate as a comprehensive device and, thus, the network 200 may include no central server, with user device 210 communicating directly through network 240 to image server 230. Also, in some instances, the user device 210 may perform one or more of the functions of the central server 220 and/or central server 220 may perform one or more of the functions of the user device 210. In still another implementation, multiple user devices 210 may be connected to the central server 220 through the network 240.

The user device 210 may encompass a computer device, such as a laptop computer, a small personal computer, a tablet device, a personal digital assistant (PDA), a mobile computing device (e.g., a smart phone), a touch-screen device, or generally any device including or connecting to a processor and a display. The user device 210 may be portable so as to be separately carried by the user performing a locate operation. Alternatively, the user device 210 may be integrated with or affixed to another moveable object, such as a vehicle.

The central server 220 may include a computer device that may store information received from or provided to the user device 210 and/or the image server 230. The central server 220 may include storage capacity and/or optionally include networked access to one or more separate hardware components, such as images cache 235, to store cached images and the like.

The image server 230 may include a computer device that may store and provide input images of geographic locations The image server 230 may be associated with the same, or a different, party that maintains the central server 220. For example, the image server 230 may be associated with a party that provides input images for a fee.

The network 240 may include a local area network (LAN), a wide area network (WAN), a telephone network, such as the Public Switched Telephone Network (PSTN) or a cellular network, an intranet, the Internet, a communications link, or a combination of networks. The user device 210, central server 220, and image server 230 may connect to the network 240 via wired and/or wireless connections. The user device 210 and central server 220 may communicate using any communication protocol.

Exemplary User Device Architecture

Figure 3:
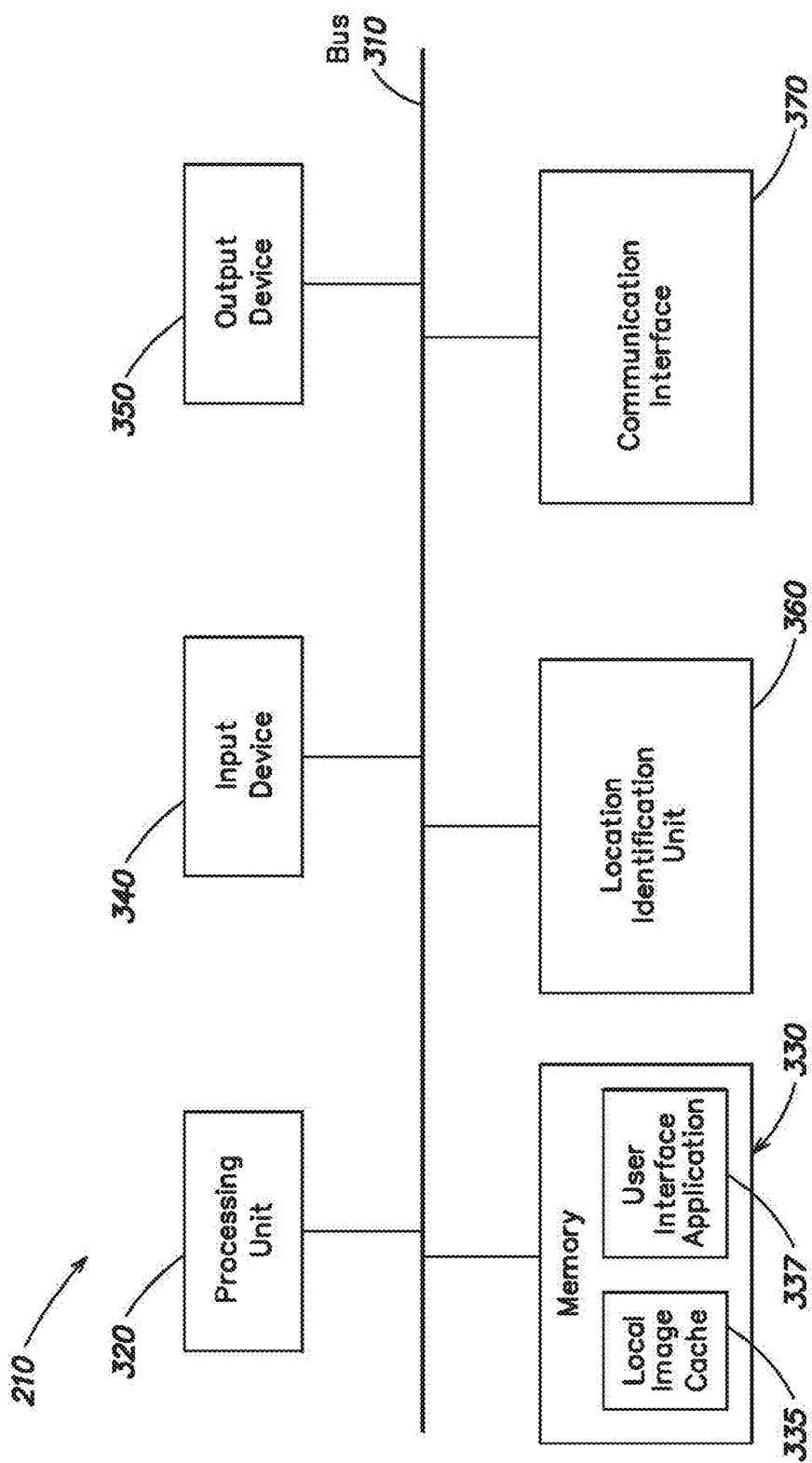
FIG. 3 is a diagram of exemplary components of the user device of FIG. 2.

FIG. 3 is a diagram of exemplary components of the user device 210. The user device 210 may include a bus 310, a processing unit 320, a memory 330, an input device 340, an output device 350 (e.g., a display device), a location identification unit 360, and a communication interface 370. In another implementation, the user device 210 may include more, fewer, or different components. For example, the location identification unit 360 may not be included, or the location identification unit 360 may be included as a device located external to the user device 210, such as a device worn or carried by a user of the user device 210.

The bus 310 may include a path that permits communication among the components of the user device 210. The processing unit 320 may include a processor, a microprocessor, or processing logic that may interpret and execute instructions. The memory 330 may include a random access memory (RAM), a read only memory (ROM), a memory card, a magnetic and/or optical recording medium and its corresponding drive, or another type of memory device. Generally, the memory 330 may be sufficient to store and manipulate input images, such as those stored in a local image cache 335. In one implementation, the local image cache 335 may include one or more input images of a dig area to be marked by a user. In another implementation, the local image cache 335 may include a series of input images that correspond to the geographical region to which a particular user is assigned. For example, local image cache 335 may include a collection of high-resolution images of a particular zip code or town. In still another implementation, the local image cache 335 may include an entire set of input images intended to be made available to multiple users.

The input device 340 may include one or more mechanisms that permit a user to input information to the user device 210, such as a keyboard, a keypad, a touchpad, a mouse, a stylus, a touch screen, a camera, or the like. Alternatively, or additionally, the input device 340 may include a microphone that can capture a user's intent by capturing the user's audible commands. Alternatively, or additionally, the input device 340 may interact with a device that monitors a condition of the user, such as eye movement, brain activity, or heart rate. The output device 350 may include a mechanism that outputs information to the user, such as a display, a speaker, or the like. The condition information may be used to assess the reliability of the user inputs that are used to generate the marked-up image or other aspects of the electronic record. For example, if the monitored heart rate of the user is sufficiently high as to indicate that the user is under stress, the reliability of the user inputs may be assessed as poor.

The location identification unit 360 may include a device that can determine its geographic location to a certain degree of accuracy, such as a global positioning system (GPS) or a global navigation satellite system (GNSS) receiver. In another implementation, the location identification unit 360 may include a device that determines location using another technique, such as tower (e.g., cellular tower) triangularization. The location identification unit 360 may receive location tracking signals (e.g., GPS signals) and determine its location based on these signals. In one implementation, location identification unit 360 may be capable of determining its location within approximately thirty centimeters or less.

The communication interface 370 may include any transceiver-like mechanism that enables user device 210 to communicate with other devices and/or systems. For example, the communication interface 370 may include mechanisms for communicating with another device or system via a network. For example, the communication interface 370 may enable communications between the user device 210 and the central server 220 and/or image server 230 over network 240.

As will be described in detail below, user device 210 may perform certain operations relating to the documentation of locate operations and/or the creation of an electronic manifest. User device 210 may perform these operations in response to the processing unit 320 executing software instructions (e.g., a user interface application 337) contained in a computer-readable medium, such as the memory 330. A computer-readable medium may be defined as a physical or logical memory device. In some exemplary implementations, elements of the user interface application 337 may be based, at least in part, on the Map Suite GIS Software (based on .NET components) available from ThinkGeo LLC of Frisco, Tex. (http://thinkgeo.com/).

The software instructions may be read into the memory 330 from another computer-readable medium, or from another device via the communication interface 370. The software instructions contained in the memory 330 may cause processing unit 320 to perform processes that will be described later. Alternatively, hardwired circuitry may be used in place of, or in combination with, software instructions to implement processes described herein. Thus, implementations described herein are not limited to any specific combination of hardware circuitry and software.

Exemplary Central Server Architecture

Figure 4:
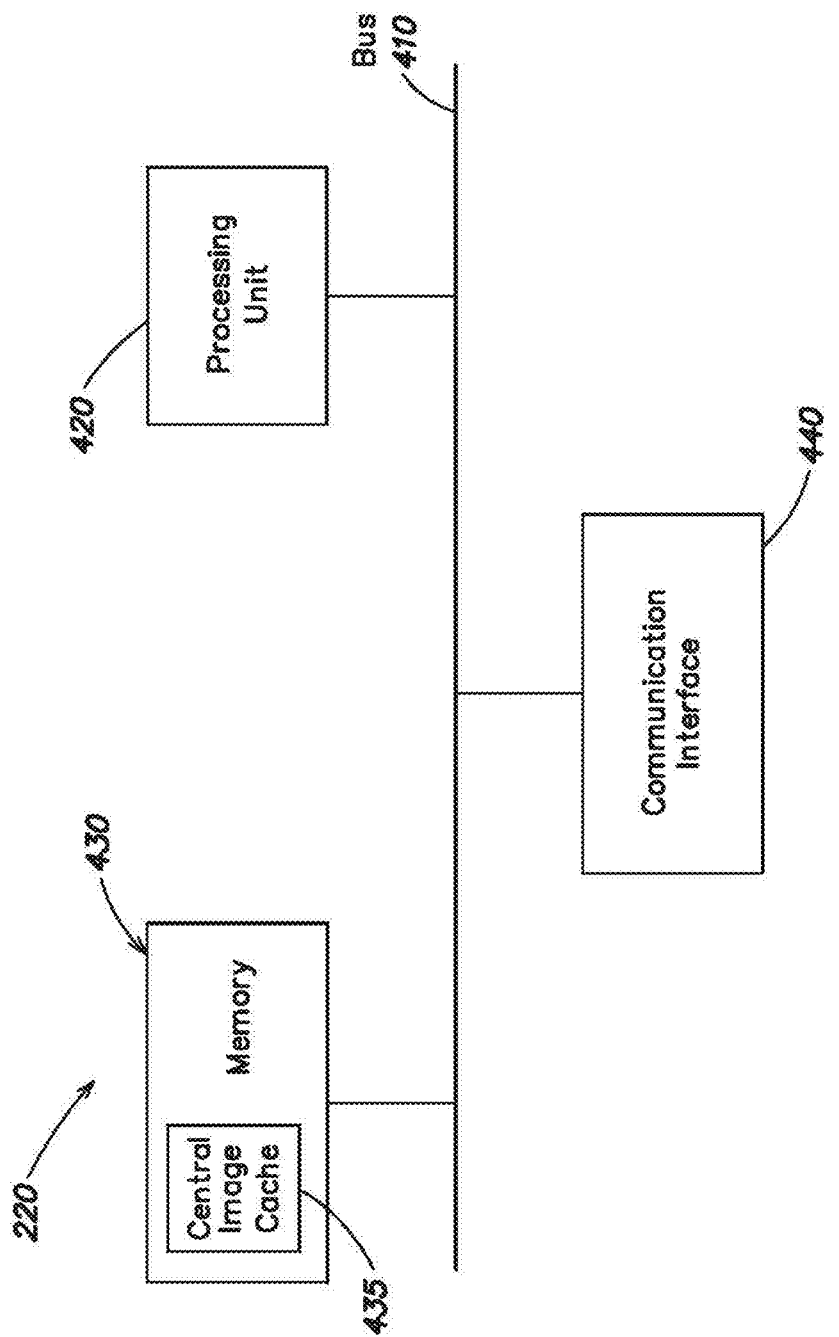
FIG. 4 is a diagram of exemplary components of the central server of FIG. 2.

FIG. 4 is a diagram of exemplary components of the central server 220. The central server 220 may include a bus 410, a processing unit 420, a memory 430, and a communication interface 440. In another implementation, the central server 220 may include more, fewer, or different components. For example, an input device and/or an output device (not shown) may be included, as necessary.

The bus 410 may include a path that permits communication among the components of the central server 220. The processing unit 420 may include a processor, a microprocessor, or processing logic that may interpret and execute instructions. The memory 430 may include a magnetic and/or optical recording medium and its corresponding drive, a RAM, a ROM, a memory card, or another type of memory device suitable for high capacity data storage. Generally, the memory 430 may be sufficient to store input images of particular geographic locations, such as those stored in a central image cache 435. In one implementation, the central image cache 435 may include a set of input images that correspond to the geographical regions to which a group of users are assigned. In still another implementation, the central image cache 435 may include the entire set of input images intended to be made available to any of a group of users. For example, central image cache 435 may include a collection of high-resolution input images of a particular county, state or other geographic region. In another implementation, as shown in FIG. 2, central image cache 435 may be replaced or supplemented with one or more networked storage components, such as image cache 235.

The communication interface 440 may include any transceiver-like mechanism that enables the central server 220 to communicate with other devices and/or systems. For example, the communication interface 440 may include mechanisms for communicating with another device or system via a network. For example, the communication interface 440 may enable communications between the central server 220 and the user device 210 and/or image server 230 over network 240.

As will be described in detail below, the central server 220 may perform certain operations to facilitate the documentation of locate operations and/or the creation of an electronic manifest. The central server 220 may perform these operations in response to the processing unit 420 executing software instructions contained in a computer-readable medium, such as the memory 430.

The software instructions may be read into the memory 430 from another computer-readable medium, or from another device via the communication interface 440. The software instructions contained in the memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Exemplary Routines

Figure 5:
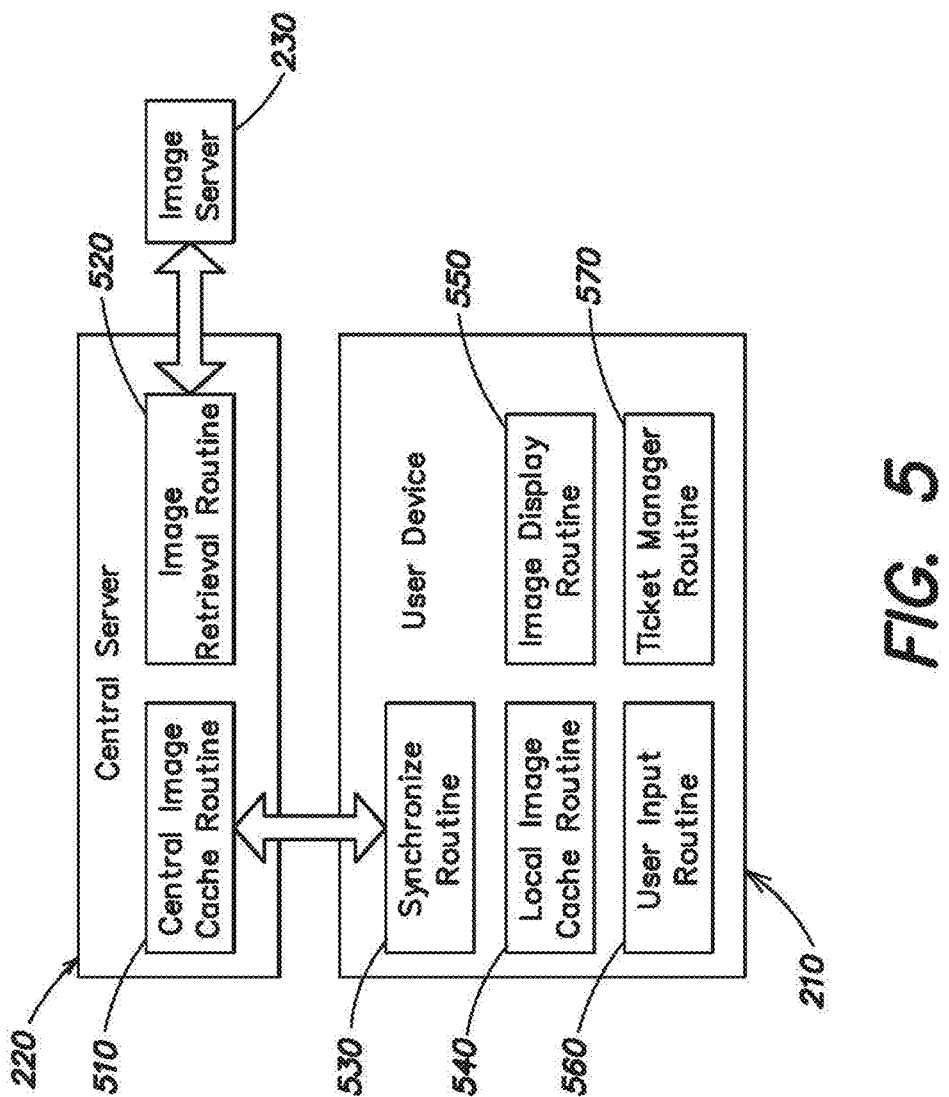
FIG. 5 is a diagram of exemplary software routines for components of FIG. 2.

FIG. 5 is a diagram of exemplary software routines for the components shown in FIG. 2. The central server 220 may include an image retrieval routine 510 and a central image cache routine 510. The user device 210 may execute (e.g., via the processing unit 320) a user interface application 337 (e.g., stored in memory 330) to facilitate creation of electronic manifests, and in various embodiments such a user interface application may include one or more of a synchronize routine 530, a local image cache routine 540, an image display routine 550, a user input routine 560, and a ticket manager routine 570. As discussed in more detail herein, the examples of routines associated with the central server 220 and the user device 210 may be interchangeable between each hardware component. Furthermore, some or all of routines 510, 520, 530, 540, 550, 560, and 570 need not be performed exclusively by any one hardware component. As noted above, in some exemplary implementations, elements of the user interface application 337 (e.g., image display routine 550, user input routine 560) may be based, at least in part, on the Map Suite GIS Software (based on .NET components) available from ThinkGeo LLC of Frisco, Tex. (http://thinkgeo.com/).

Still referring to FIG. 5, the image server 230 may store a library of input images. Generally, input images such as aerial images may be of sufficient resolution at an optimal elevation to be useful as a record of the locate operation. The input images from the image server 230 may include geocoding or other geographical identification metadata and may be provided in any computer-readable format, such as JPEG file interchange format (JPEG), tagged image file format (TIFF), portable document format (PDF), graphics interchange format (GIF), bitmap (BMP), portable network graphics (PNG), Windows® metafile (WMF), and/or the like. Also, input images from the image server 230 may include a combination of images or overlays, such as overlays of street names, regions, landmark descriptions, and/or other information about areas displayed in an image. The input images from the image server 230 may be supplied by a third-party provider if the coverage area of the third-party image provider overlaps with the desired area of the user.

The central image cache routine 510 and the image retrieval routine 520 of the central server 220 may include a variety of functionalities. In certain implementations, the central image cache routine 510 may receive information about specific tickets and parse tickets in order to discern location information. For example, a ticket may identify the dig area by an address of the property or by geographic coordinates. The ticket might specify, for example, the address or description of the dig area to be marked, the day and/or time that the dig area is to be marked, and/or whether the user is to mark the dig area for telecommunications (e.g., telephone and/or cable television), power, gas, water, sewer, or some other underground facility.

The central image cache routine 510 may also convert dig area location information to latitude/longitude coordinates or other coordinates. When location information from a ticket is sufficiently precise to allow for identification of corresponding imagery, the central image cache routine 510 may calculate the image extent (which may be generally defined as the bounding region of the dig area of interest), and update the ticket with the calculated extent. In one implementation, the central image cache routine 510 may determine image date, coordinates, and resolution of each image that may be stored in the central image cache 435 or in another location. In another implementation, when location information from a ticket is imprecise (or "fuzzy"), the central image cache routine 510 may mark the ticket to indicate that no corresponding image was able to be retrieved based on the ticket information.

In another implementation, central image cache 510 may identify an image to retrieve based on GPS coordinates of a GPS-enabled device associated with a user. For example, a user may arrive at an excavation site in a GPS-enabled vehicle and the GPS information from the vehicle may be used to identify coordinates corresponding to an image to be retrieved. GPS coordinates may also be obtained from other GPS-enabled devices being used by or in the vicinity of the user. As used herein a GPS-enabled device may include any device or combination of devices capable of interfacing with a global navigation satellite system, geo-spatial positioning system, or other location-identification system to determine a location. Examples of GPS-enabled devices may include a marking device (e.g., a paint wand) with an integrated GPS receiver; a locating device (e.g., a locating wand) with a GPS receiver; a wearable GPS-enabled device; a vehicle-mounted GPS system; certain PDAs, computers, and cellular telephones; and stand-alone GPS-enabled systems.

In still another implementation, central image cache 510 may identify one or more images to request based on a designated geographical area assigned to a user. For example, a user may be assigned to work in several dig areas associated with a particular section of a neighborhood. The user may input coordinates associated with the entire selected section of the neighborhood, and central image cache 510 may then retrieve images for those coordinates.

The image retrieval routine 520 catalogues and stores images from the image server 230 to the central server 220. For example, images may be stored in the central image cache 435 in the memory 430 of the central server 220. In one implementation, the image retrieval routine 520 may query the central image cache 435 or other cache for an image associated with a particular dig area relating to a ticket of interest, and determine, based on (for example) the age and resolution of the cached image, whether the image in the central image cache 435 needs to be updated from the image server 230.

In another implementation, the image retrieval routine 520 may interface with multiple image providers and image servers 230. The image retrieval routine 520 may determine which image provider is the best source for the image corresponding to a particular dig area relating to a ticket of interest based on algorithms that factor, for example, each image provider's geographical coverage, image resolution, cost, and availability. Regarding geographical coverage, it will be beneficial to confirm that the image provider's area of coverage includes the desired extent (in other words, the entire geographical region of interest to the user).

Regarding image resolution, available resolution may be measured in meters (or centimeters, feet, or inches) per pixel. For example, one provider may offer thirty centimeters per pixel, while another offers fifteen centimeters or less per pixel, for the same coverage area. If an image is requested at a standard altitude, then the image retrieval routine 520 may choose a pre-defined optimal scale (for example, thirty centimeters per pixel for a rural area, but fifteen centimeters per pixel for an urban area) and determine which provider provides images at the pre-defined optimal scale. Alternatively, if the image of interest is at a less granular scale (for example, a community or neighborhood image that allows the locator to pan around the image), then resolution may not be a significant factor.

Regarding cost, the image retrieval routine 520 may have access to pricing information for a variety of image providers. The image retrieval routine 520 may identify which provider has the lowest cost for the desired image. Cost analysis may be based on images desired for an individual ticket or the algorithm may account for a group of image requests, including volume incentives and/or penalties from each image provider Regarding availability of image providers, the image retrieval routine 520 may identify what providers are available and/or operational. Also, if an image provider has a regular latency profile (for example, if a provider has a particular server that is busiest 3-5 PM Pacific time), then the image retrieval routine 520 may manage requests to be provided to another image provider or to a particular server of that image provider to efficiently load share the image retrieval.

When an image provider is selected, the image retrieval routine 520 may download the image from the selected image provider's server, which may be an image server 230. The downloaded image may be stored locally, for example, in the central image cache 435.

It should be understood that some of the routines and/or functionalities described above with respect to the central image cache routine 510 and the image retrieval routine 520 may be performed by one or both of the routines 510 and 520 above, and the arrangement of functionalities are not limited to the implementations disclosed herein.

The synchronize routine 530 for user device 210 may ensure that images already stored and manipulated on the user device 210 correspond to images stored in the central server 220. When a user performing a locate operation identifies a ticket or dig area, the synchronize routine 530 may check if an image exists in the central server 220 that matches the extent requested, and if the matching image is up-to-date in, for example, the local image cache 335. The synchronize routine 530 may also synchronize images from the central server 220 cache and store copies locally in the user device 210.

If the ticket has a valid extent (i.e., a recognizable boundary), the local image cache routine 540 may associate the ticket information with an image matching the extent. The local image cache routine 540 may load the image from the local image cache 335. If the ticket does not have a valid extent, the local image cache routine 540 may accept address information that is entered by the user. Alternatively, the local image cache routine 540 may read the local address information from the ticket or from a GPS-enabled device in communication with the user device 210 so that address information may be pre-entered for the user to the extent possible. Address information may include, for example, a street address, street name, city, state and/or zip code. If either none or multiple stored addresses appear to be associated with particular address information, the local image cache routine 540 may display a list of best match addresses from which a user can select.

Once an image is loaded from the local cache 335, image display routine 550 may provide a variety of view options for the user. For example, the image display routine 550 may support zooming in and out of the image by changing the image scale. Also, the image display routine 550 may support panning horizontally and vertically in the image. Furthermore, the image display routine 550 may support "roaming" outside the boundaries of the initial extent. Roaming generally occurs when the user zooms or pans, such that images beyond the boundaries of the stored images may be required to be retrieved (using, for example, synchronize routine 530) from either the local image cache 335 or the central server 220. The additional images retrieved from either the local image cache 335 or the central server 220 may be displayed and stitched together to display a complete image.

The user input routine 560 allows the user to add information to the image to create an electronic manifest. The user input routine 560 may accept user input from, for example, input device 340, and may support the addition of lines, freehand forms (or scribbling), shapes such as circles and rectangles, shading, or other markings which denote the approximate location of underground facilities which are present within the dig area. A drawing shape may generally be any kind of drawing shape or mark. The user input routine 560 may further enable drawing of underground facility locate marks for telecommunications (e.g., telephone and cable television), gas, power, water, sewer, and the like, so that each type of drawn locate mark is distinguishable from the other(s). The user input routine 560 may limit the display of such facilities by the type of work which is to be performed according to the instructions included within the user's assigned ticket. Accordingly, a given locate mark indicator, serving as a digital representation of a physical locate mark applied to the dig area, may have an associated attribute representing a type of underground facility corresponding to the physical locate mark. Examples of different attributes for a locate mark indicator include, but are not limited to, color, line-type, symbol-type, shape, shade, etc. (e.g., a first locate mark indicator for a gas line may include a green dashed-line, a second locate mark indicator for a fiber optic cable may include a red dotted-line, a third locate mark indicator for an electric line may include one or more gray diamond shapes arranged along a path traversed in the input image by the buried electric line, etc.).

In addition to the marking of the underground facility locate marks on the input image, user input routine 560 may also include offsets from environmental landmarks that may be displayed on the image in, for example, English or metric units. Environmental landmarks may also be marked and/or highlighted on the input image. The user input routine 560 may also accept positioning information from external sources, such as a GPS-enabled device. The user input routine 560 may further include features to annotate the image with text and to revise user inputs by, for example deleting, dragging or pasting shapes. In one implementation, when the user zooms the image view in or out, user input (e.g., lines and/or shapes) that have been added to the original image may adhere to the changing image scale and remain in the original user-input locations.

The electronic manifest, which is a compilation of one or more input images and user inputs, may be saved as an image file. In another implementation, the user inputs may be saved in a mark-up format, including the geo-coordinates and underground facility type of each input.

In one implementation, the user device 210 may interface with a ticket management program for coordinating multiple tickets. The ticket manager routine 570 may facilitate such an interface. The ticket management program for coordinating multiple tickets may reside on the central server 220, for example, or on a separate server that is accessible to the user device 210. Generally, tickets may be stored on a central server and assigned to a user. When a user edits a ticket, the user may also have created an electronic manifest associated with the ticket. The ticket manager routine 570 may allow the user to synchronize the user's ticket cache with the company's central database and also synchronize the images and user input. The ticket manager routine 570 may copy images from the central server 220 to the user device 210 for new tickets, and will copy the user input from the user device 210 to the central server 220 for completed tickets. The ticket manager routine 570 may interface with the routines described above to correlate a user's assigned tickets with images for those tickets and download the images to the user device from the central server 220. The ticket manager routine 570 may retrieve the corresponding ticket number from the ticket management program when the user retrieves an image, or the ticket manager routine 570 may retrieve the image corresponding to an entered ticket number.

Figure 6:
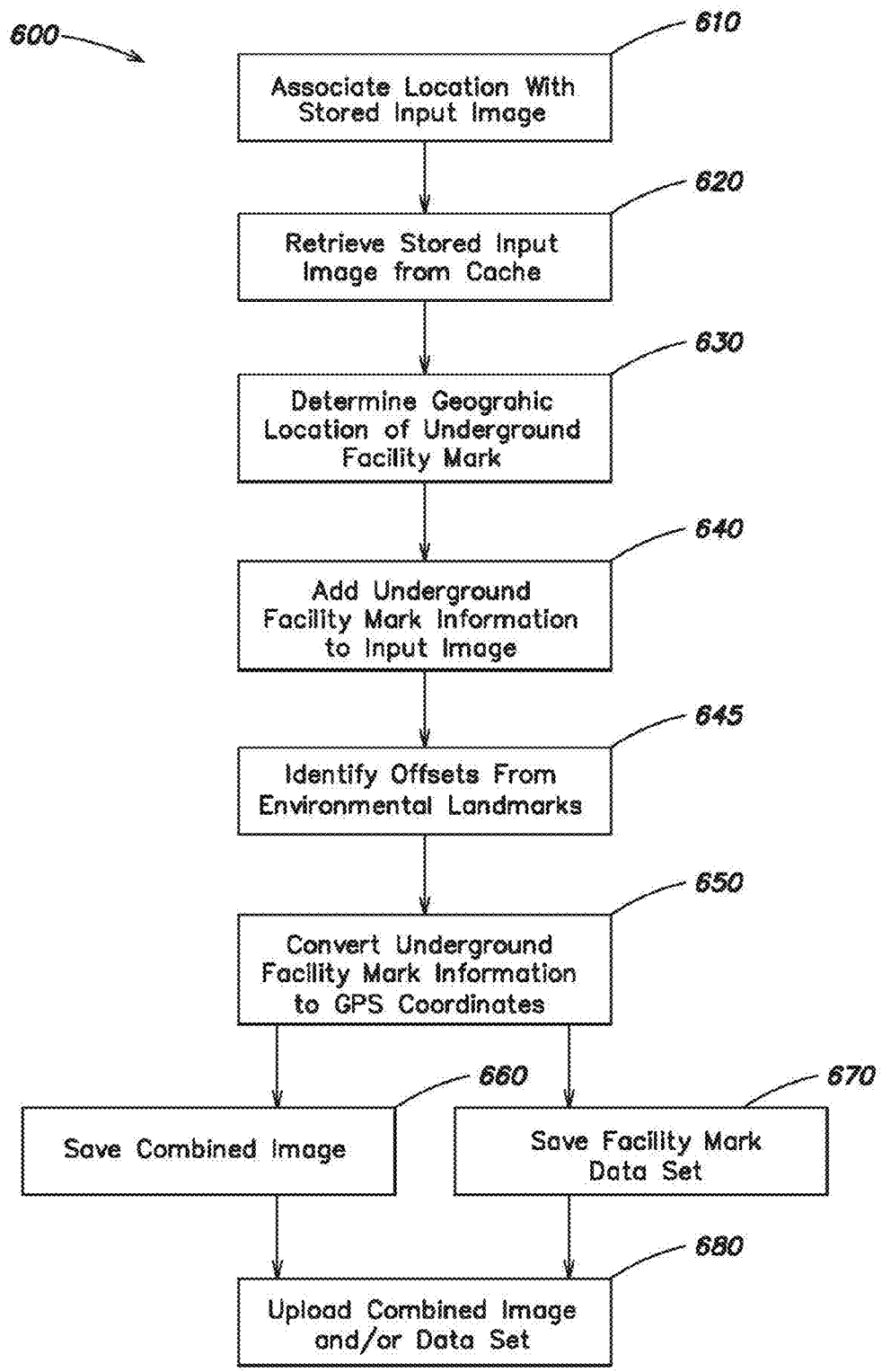
FIG. 6 is a flowchart of an exemplary process for creating an electronic manifest of underground facility locate marks, according to one embodiment of the present invention.

FIG. 6 provides a flowchart 600 of an exemplary process for creating an electronic manifest relating to a locate operation and the application of locate marks to a dig area to indicate a presence (or absence) of one or more underground facilities. In one implementation, at least some of the blocks of FIG. 6 may be performed using user device 210 (FIG. 2). In another implementation, one or more of the blocks of FIG. 6 may be manually performed or performed by another device, such as central server 220.

The process 600 may begin with a user being dispatched to a dig area to be located, in response to a locate request ticket being generated for a locate operation. For example, the user might be given a ticket that identifies what underground facilities the user needs to locate at the dig area. The ticket might specify, for example, the address or description of the dig area to be located, the day and/or time that the dig area is to be located, and/or whether the user is to locate the dig area for telecommunications, power, gas, water, sewer, or other underground facility. Based on information in the ticket, or other information about the dig area to be located, user device 210 in block 610 may associate the property address with a stored input image of the dig area. Such association may include associating the address with geographic location information, such as global positioning coordinates for the dig area extent (or boundary).

In one exemplary embodiment, the locate request ticket may be an electronic locate request ticket that comprises a previously marked-up image of a geographic area including the dig area, on which one or more dig area indicators, or "virtual white lines," were placed (e.g., by an excavator or a one-call center) to provide an indication of the dig area. In this manner, an electronic locate request ticket received by a locate company or locate technician may include both image data and non-image data; for example, a locate request ticket may include a marked-up image with one or more dig area indicators, as well as associated non-image information providing additional details of the locate operation to be performed, as noted above. Further details of locate request tickets including marked-up images with one or more dig area indicators are given in U.S. publication no. 2009-0238417-A, which is incorporated by reference herein.

In block 620, the stored input image associated with the dig area to be located is retrieved from a cache of images and loaded into the user device 210. As previously described and discussed herein with respect to FIG. 5, the cache of images may reside within the user device 210, the central server 220, a separate image server, or another storage device. As discussed above, the input image may be represented by a wide variety of source data that, when processed, facilitates display of the input image. In one exemplary implementation, the input image for the searchable electronic record may be a previously marked-up image with one or more dig area indicators or virtual white lines; in one aspect, such an input image may be received as part of the locate request ticket specifying the locate operation. In various implementations, it should be appreciated that the input image may or may not be displayed, as discussed further below.

In block 630, the user may perform a locate operation to locate the underground facilities present within the dig area and mark the located underground facilities using a locating device and/or marking device, or a combined locating/marking device. For example, the user may use the locating device to identify an underground facility at the dig area, and may use the marking device to mark the underground facility with the appropriate marker (e.g., color paint, flag, or some other object). In certain implementations, locate instruments (e.g., a locate receiver and a marking device) may be employed that are configured to acquire, store and transmit various information regarding the approximate geographic location of one or more detected facilities and/or applied underground facility locate marks; in particular, the approximate geographic location of detected facilities and/or underground facility locate marks may be determined, for example, by identifying the current geographic location of the GPS-enabled device as the user performs the locating or marking operation. In another implementation, a user may use a triangularization technique to determine the approximate geographic location of the underground facility locate marks. In yet another implementation, a user may determine latitude and longitude coordinates or some other measurement of a geographic location.

If in block 630 the technician employs instrumentation and/or techniques that provide geographic information (e.g., geographic coordinates) of detected and/or marked facilities, this information may be used in some embodiments to facilitate semi-automated or automated creation of an electronic manifest in which some or all of such geographic information is overlaid on the input image. It should be appreciated, however, that some embodiments do not necessarily require the provision of such geographic information.

In block 640, information about the approximate geographic location of detected facilities and/or applied underground facility locate marks may be added to the input image that was retrieved previously in block 620. To create "manual" electronic manifests, the geographic information about may be input by the user using an input device, such as input device 340 (FIG. 3) of user device 210, and added to the displayed input image as one or more locate mark indicators and/or detection indicators. In one exemplary implementation in which the input image is a previously marked-up image having one or more dig area indicators, this image may be further marked-up to add one or more locate mark indicators and/or detection indicators that are displayed together with the one or more dig area indicators. Additional aspects regarding information to be input by the user are discussed in more detail herein with respect to FIG. 8.

Still referring to block 640, as noted above geographic information regarding detected and/or marked facilities may also be received directly from a GPS-enabled device, such as the GPS-enabled locating device or marking device used in block 630, and overlaid on the input image. In one exemplary implementation, one or more locate mark indicators and/or detection indicators based on this information may be added to the input image automatically, and in some instances without any requirement to display the input image. Alternatively, the user may use of a combination of geographic information received from one or more GPS-enabled locate instruments, together with some degree of manual entry of information relating to the locate operation, to create a semi-automated electronic manifest.

To appropriately display geographic information obtained from one or more locate instruments together with an input image, the geo-spatial reference frame employed for geographic information and the input image should preferably be the same. Accordingly, in some embodiments, one or both of the geographic information obtained from one or more locate instruments, and geographic information in the source data for an input image may be converted, if necessary, to a common geo-spatial reference frame to facilitate accurate comparative viewing (overlaying) of locate mark indicators and/or detection indicators and the input image. Additional information relating to the processing of geographic information from locate instruments for use in connection with automated or semi-automated creation of electronic manifests may be found in U.S. publication number US2010-0117654-A1, published on May 13, 2010, and entitled "Methods and Apparatus for Displaying an Electronic Rendering of a Locate and/or Marking Operation Using Display Layers," which is hereby incorporated herein by reference in its entirety.

In automated or semi-automated embodiments in which geographic information regarding detected and/or marked facilities is obtained from one or more locate instruments, such information may be displayed in an electronic manifest in a static or dynamic manner. For example, in one aspect, the image portion of an electronic manifest may be static in that all available information is presented in a display field (e.g., overlaid on an input image) at one time after collection of the information (e.g., completion of the locate and/or marking operation and uploading of information from the locate instrument(s)); alternatively, the image portion of the electronic manifest may be dynamic in that information obtained from a locate instrument may be displayed in essentially real-time as it is collected, or may be displayed after collection in a time-sequenced animation that "recreates" the collection of information (e.g., recreates the locate and/or marking operation) on the time scale in which it was originally acquired.

In another aspect of automated or semi-automated embodiments, the processing unit 320 of the user device 210 (and/or the processing unit 420 of the server 220) may process the geographic information obtained from one or more locate instruments not only to ensure that such information is in a same geo-spatial reference frame as the input image, but further so as to filter, average, interpolate and/or otherwise "smooth" data (e.g., so as to provide "cleaner" visual renderings and/or connect successive locate mark indicators and/or detection indicators); alternatively, "raw data" provided by a given instrument may be utilized "as is" for the visual representation (including any geo-spatial reference frame conversion as may be necessary). In yet another aspect of automated or semi-automated embodiments, visual representations of multiple locate and/or marking operations for different underground facilities within the same work site/dig area may be generated in the same display field of a display device (e.g., output device 350) so as to provide an electronic manifest including a composite visual representation, in which different underground facilities may be uniquely identified in some manner (e.g., by different line types and/or different colors), and one or more environmental landmarks in and/or around the work site/dig area may be identified using a variety of displayed identifiers (e.g., icons, symbols, marks, shapes, etc.).

With respect to processing of geographic information obtained from one or more locate instruments so as to generate an automated or semi-automated electronic manifest, in one embodiment the processing unit 320 (and/or the processing unit 420), together with geo-spatial reference frame conversion as may be necessary, examines the uploaded geographic information to determine the geographic extents of the locate mark indicators, detection indicators, and/or environmental landmarks to be visually rendered on a display device. In particular, the processing unit may review the respective latitude and longitude coordinates of the available geo-location data to determine the maximum extents of the locate operation to be visually rendered. The maximum extents of the marking operation may be determined in any of a variety of manners according to different exemplary implementations. Alternatively, for essentially real-time display of geographic information as acquired by one or more locate instruments, a default extents area may be selected in advance based on any of a variety of criteria.

In another aspect, the extents area of the locate operation to be visually rendered is then mapped to an available display field of a display device, using any appropriate scaling factor as necessary, to ensure that all of the geo-location data acquired from one or more locate instruments fits within the display field. For example, in one exemplary implementation, a transformation may be derived using information relating to the available display field (e.g., a reference coordinate system using an appropriate scale for a given display field of a display device) to map data points within the extents area to the available display field. In another aspect of this example, a buffer area around the extents area may be added to provide one or more suitable margins for the displayed visual representation, and/or to accommodate different shapes of extents areas to the available display field of the display device, and an appropriate transformation may be derived based on this optional additional buffer area.

Once a transformation is derived to map the locate operation extents area to the available display field of a display device, one or more locate mark indicators, display indicators and/or landmark indicators (e.g., icons, symbols, marks, shapes, etc.) is/are rendered in the display field (e.g., overlaid on the input image) based on applying the transformation to the geo-location data uploaded from the locate instrument(s).

In block 645, as an optional step, information about offsets of the underground facility locate marks from environmental landmarks may be added to the input image. As with the input of the facility locations in block 640, the location of the environmental landmarks may be input by the user using an input device, such as input device 340 (FIG. 3) of user device 210, or automatically input from a GPS-enabled device. The offset information may be automatically calculated or input by the user. Offset information may also be obtained by identifying selected environmental landmarks on the retrieved image and automatically calculating the distance from the selected environmental landmarks to the underground facility locate marks overlaid on the image.

In block 650, as an optional step, information about the location of the underground facility locate marks (e.g., the locate mark indicators added to the input image) and/or detection indicators, if manually added to the manifest via the user device 210, may be converted to GPS coordinates. In block 660, the marked-up input image and other information (e.g., non-image information) about the location operation may be stored in memory as a searchable electronic record or "electronic manifest," which may be formatted as a single combined image (e.g., image data and non-image metadata) or as separate image data and non-image data that are linked. In exemplary implementations, the electronic manifest may be stored as, for example, a digital image or an interactive electronic map. Additionally or alternatively, in block 670, the geographical coordinates of the underground facility locate marks and/or detected facilities may be stored in memory, such as memory 330 (FIG. 3), as one or more separate data sets. The data set(s) may be compiled as, for example, a database of GPS coordinates. In block 680, the combined image and/or separate data set(s) may optionally be transmitted to a central location, such as central server 220 (FIG. 2).

Thus, the marked-up image(s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

In some locate operations, no underground facilities are determined to be present in a designated dig area. Such locate operations are sometimes referred to as "clears." In some implementations of the inventive concepts discussed herein, an input image may nonetheless be employed to provide an electronic record of a "clear;" more specifically, although no locate mark indicators may be added to an input image (i.e., the step 640 may not be necessary because there are no physical locate marks to digitally represent), other non-image information associated with the "clear" locate operation (e.g., a timestamp of when the locate operation was performed, an identifier for a technician or locate company performing the locate operation, a text address or other geographical identifier for the dig area, a location stamp, etc.) may be associated with the input image (e.g., as a separate data set linked to the input image, as metadata, a combined file of image and non-image data, etc.) to create a searchable electronic record that may be consulted to verify that the locate operation was indeed completed, even though no underground facilities were found.

FIG. 7 is a diagram of an exemplary data set that may be stored in memory 330 and/or transmitted to server 220. As shown in FIG. 7, a data set 700 may include a timestamp field 710, an underground facility identifier field 720, an underground facility location field 730, an environmental landmark identifier field 740, an environmental landmark location field 750, an other information field 760, a facility owner/operator field 765, a marking method field 770, a property address field 780, a ticket number field 790, a location stamp field 715, and a certification field 725. In another implementation, the data set 700 may include additional, fewer, or different fields.

Timestamp field 710 may include time data that identifies the day and/or time that a locate operation was performed. This may coincide with a time at which an environmental landmark location was identified in connection with the dig area. The time data in timestamp field 710 is shown in FIG. 7 as 9:43 a.m. on Oct. 20, 2005—although any type of date and/or time code may be used. The information in timestamp field 710 may be useful in establishing when a locate operation occurred.

The underground facility identifier field 720 may include an identifier that uniquely identifies the type of underground facility that was marked. The identifier in underground facility identifier field 720 is shown in FIG. 7 as "power"—although any type of identifier may be used. Underground facility location field 730 may include geographic location information corresponding to an underground facility locate mark. In one implementation, the geographic location information may include a set of geographic points along the marking path of the located underground facility. The geographic location information in underground facility location field 730 is shown in FIG. 7 as N38°51.40748, W077°20.27798; . . . ; N38°51.40784, W077°20.27865—although any type of geographic location information may be used. The information in underground facility location field 730 may be useful in graphically presenting the underground facility locate marks on a map, and/or to verify that the locate operation was actually and accurately performed. Additionally, or alternatively, underground facility location field 730 may include geographic location information for multiple underground facility locate marks.

Environmental landmark identifier field 740 may include an identifier that uniquely identifies the type of environmental landmark being marked. The identifier in environmental landmark identifier field 740 is shown in FIG. 7 as "curb"—although any type of identifier may be used.

Environmental landmark location field 750 may include geographic location information corresponding to the environmental landmark identified in environmental landmark identifier field 740. The geographic location information in environmental landmark location field 750 is shown in FIG. 7 as N38°51.40756, W077°20.27805; . . . ; N38°51.40773, W077°20.27858—although any type of geographic location information may be used.

Other information field 760 may store other data that may be useful, including user notes, such as offset or distance information that identifies a distance between one or more environmental landmarks and one or more underground facility locate marks. Other information field 760 is shown in FIG. 7 as including "1.2 meters between curb and power line"—although any other data may be used. Additionally and/or alternatively, other information field 760 may include audio/voice data, transcribed voice-recognition data, or the like to incorporate user notes.

The underground facility owner field 765 may include the name of the owner/operator of the underground facility that has been marked during the locate operation. For example, in FIG. 7, the underground facility owner field 765 is shown as "ABC Corp." Because multiple underground facilities may be marked during a single locate operation, it may be beneficial to associate each marked underground facility with a particular owner/operator. Alternatively, this field may include one or more identifiers for the locate company performing the locate operation, or an additional field may be added to the data set 700 for this purpose.

Marking method field 770 may indicate the type of marking used at the dig area to indicate the location of an underground facility. For example, in FIG. 7, marking method field 770 is shown indicating red paint. Property address field 780 may be the property address associated with the marking recorded in the data set 700. The property address field 780 may include, for example, the street address and zip code of the property. Other information in field 780 may include city, state, and/or county identifiers. The ticket number field 790 may include the ticket number associated with the locate operation, such as ticket "1234567" shown in FIG. 7.

Location stamp field 715 may include a location stamp indicating a location where the locate operation was performed (e.g., the dig area). The location stamp may optionally be generated at the same time as timestamp 710, and the information underlying these stamps may be from a same source or otherwise correlated, such that the location stamp reflects the location of the locate technician, user device, or associated locate and/or marking device when the timestamp 710 is generated. The location stamp may comprise, for example, location coordinates (as shown in FIG. 7), a city name or designation, a state name or designation, a county name or designation, and/or an address. Generally, the location stamp identifies the presence and location of a locate technician in connection with the locate operation.

According to one exemplary implementation, location stamp data is generated by the user device (e.g., by location identification unit 360) in response to an action associated with a locate operation (e.g., a marking being made on the electronic manifest, creation of a new electronic manifest, completion or certification of an electronic manifest). According to another exemplary implementation, location stamp data is generated by a GPS-enabled device associated with a locate technician dispatched to perform a locate operation (e.g., a GPS-enabled device in the vehicle and/or on the person of the locate technician), a GPS-enabled locate and/or marking device operated by the technician during the locate operation, or another locate and/or marking device capable of determining its own location. The location stamp data may then be transmitted from the GPS-enabled device or locate and/or marking device to the user device alone or in association with other data (e.g. marking data or locate data). The transmission may occur, for example, in response to a request by the user device, a request by the user, or some triggering action. The location stamp data may be recorded to the data set automatically (e.g., without user intervention) or in response to user input.

It should be appreciated that both the timestamp field 710 and location stamp field 715 may optionally include a plurality of timestamps and location stamps. For example, each of a plurality of actions (e.g., markings on the electronic manifest, actuations of the locate and/or marking device) may be associated with a particular time stamp and/or location stamp recorded in fields 710 and 715 so that the time and location of various actions associated with the locate operation can subsequently be determined. The actions may cause the time stamp and/or location stamp to automatically be logged. Further, the timestamp field 710 and/or location stamp field 715 may optionally be "read only" fields. Prohibiting changes to these fields (e.g., by the locate technician) may preserve the integrity of the data therein so that it can be reliably used for verification of the locate operation.

Certification field 725 may comprise a certification of the data in data set 700, e.g., by the locate technician and/or another reviewer, such as a supervisor or other authorized representative of the locate company. Such a certification may comprise a signature, initials, an electronic stamp, or some other indication that the information in the data set 700 is "certified" (e.g., has been reviewed and/or is correct/approved).

In one implementation, the user device 210 may store multiple data sets corresponding to multiple underground facilities identified at a particular dig area. User device 210 may provide the data sets to server 220 in a batch—such as a batch corresponding to the group of underground facilities documented within the electronic manifest—or individually. The batch may be grouped together with other information generally relating to the locate operation, such as the name of the company responsible for performing the locate operation, the name of the locate technician, and the like. Additionally, or alternatively, the other information generally relating to the locate operation may be included in each data set.

Figure 8:
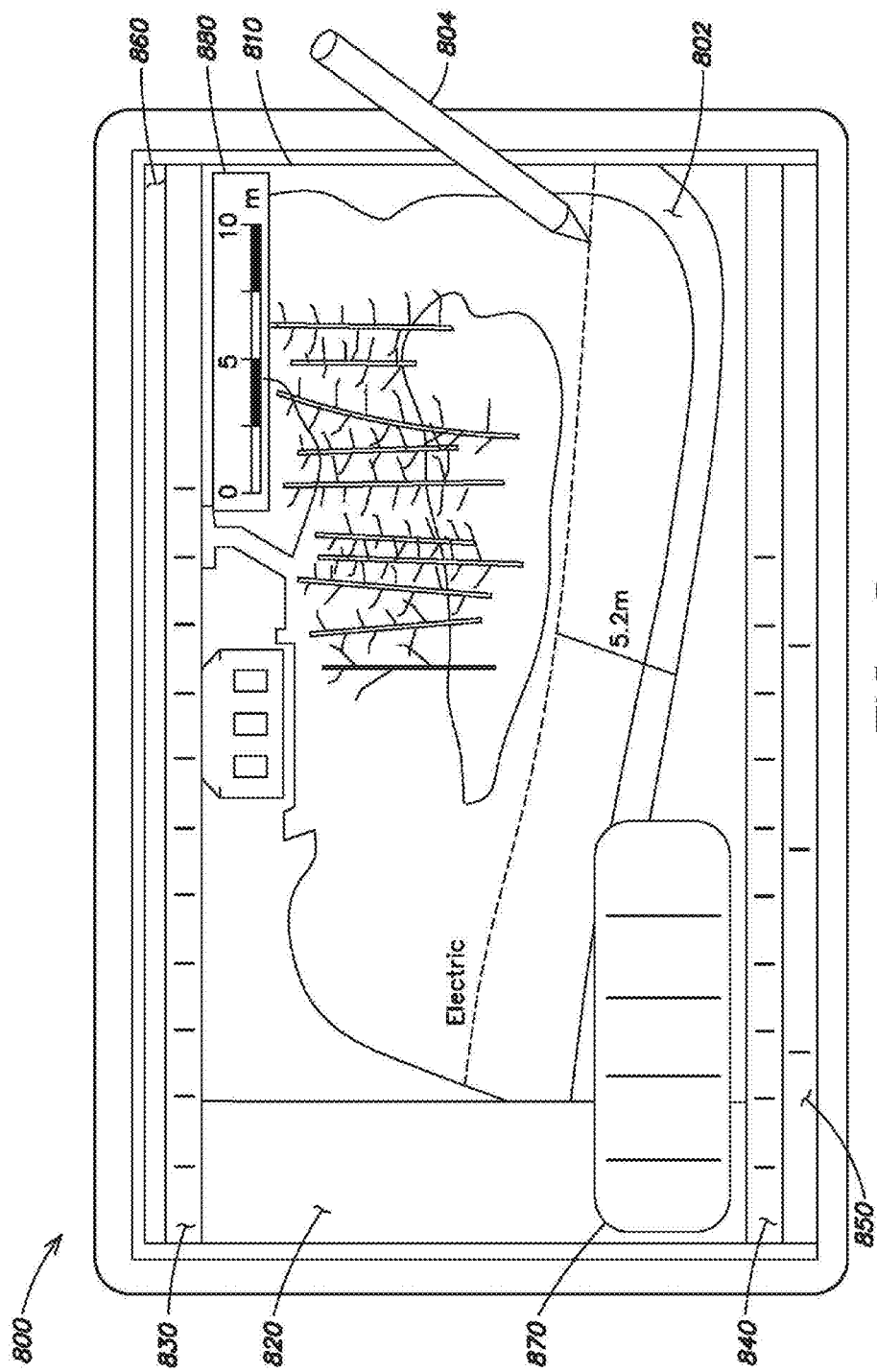
FIG. 8 is a diagram of an exemplary user interface that may be presented via the user device of FIG. 2, according to one embodiment of the present invention.

FIG. 8 an exemplary diagram of a user interface 800 that may be presented via the user device 210. The user interface may be presented on a screen 800 that may be the screen of the user device 210, as described herein with respect to FIG. 2. The screen 800 may display a variety of graphical elements, including but not limited to: a map control 810, an address search panel 820, a locator palette 830, a navigation palette 840, a status bar 850, a menu bar 860, a service grid 870, a scale bar 880, and the input image of the geographic area including the dig area. As discussed above, the displayed input image may include one or more dig area indicators or virtual white lines 890 to identify the dig area in the displayed image.

Map control 810 generally may be the surface, or canvas, where images—such as an exemplary image 802—are displayed. The user may draw or input shapes "on top of" this surface using for example, the input device 340 of FIG. 3 to identify underground facility locate mark locations. FIG. 8 shows a stylus 804 as an exemplary form of input device 340.

The address search panel 820 may be used to identify images corresponding to a desired address. Panel 820 may, for example, accept a partial or complete address and allow the user to search for matches. If an excessive number of addresses match the search, then the size of the result set may be constrained. Address search results may be displayed which match the address search. The listed matches may serve as a springboard for displaying the image desired by the user. For example, when the user taps with a stylus 804 on an address match, the user device 210 may load the image corresponding to the selected address. As described above, this image may be stored locally on user device 210 or retrieved from central server 220.

Palettes may be generally defined as a toolbar or toolbars containing soft buttons or other controls that are grouped in some logical order. The buttons on a palette may duplicate the commands available on the menu bar 860. The locator palette 830 may allow the user to select the type of underground facility locate marks (e.g., electric, gas, water, sewer, telecommunications, etc.) the user will draw on the image 802. The locator palette 830 may also include a choice of various shapes or shades, such as freestyle, line, circle, rectangle, or other polygon that the user may select to draw on the image 802. In one implementation, the locator palette 830 may present a list of potential environmental landmark identifiers. In this case, the user may select an environmental landmark identifier from the list to overlay at the appropriate place on the input image 802.

The locator palette 830 may also include an offset tool that allows the user to mark the distance between, for example, an environmental landmark identifier and a drawn underground facility locate mark. Once the user has chosen the type of shape they wish to draw (freestyle, line, polygon, shading etc.) the application may track the user's movements to define the layout and location of the shape. The shape may be completed when the user terminates the drawing (for example, by lifting the stylus 804 or releasing the mouse button). A text label or other indicator may be added to the shape automatically based on the type of underground facility locate mark or environmental landmark selected (e.g., "electric" or "curb") or may be manually added.

The navigation palette 840 may allow the user to zoom or pan the image 802. For example, the navigation palette 840 may include selections to zoom in, zoom out, or zoom to a selected section of the image. The navigation palette 840 may also include pan command buttons to pan left, pan right, pan up or pan down. Other selections that may be available on the navigation palette include buttons to alter the transparency of either the image 802 or the underground facility locate marks.

The status bar 850 may display information about the map control, such as the coordinates of the subject area, the coordinates of a cursor or stylus in relation to the image 802, and the image scale. The menu bar 860 may include an operating system element that allows a user to access commands, such as exiting the application, selecting what palettes or panels to display, or accessing online help.

The service grid 870 is shown as an exemplary "floating" window to show how the user interface for the screen 800 may operate in a typical operating system environment. The service grid 870 or any of the other graphical elements described in relation to screen 800 may be in a fixed or floating orientation. As underground facility locate marks are drawn on the map control 810, they may appear in a list in the service grid 870. Thus, the user may edit the properties of an underground facility shape using the service grid 870, as well as by selecting the shape in the map control 810. The service grid may include properties, such as the type, length, circumference, and material of the marked underground facility.

Figure 9:
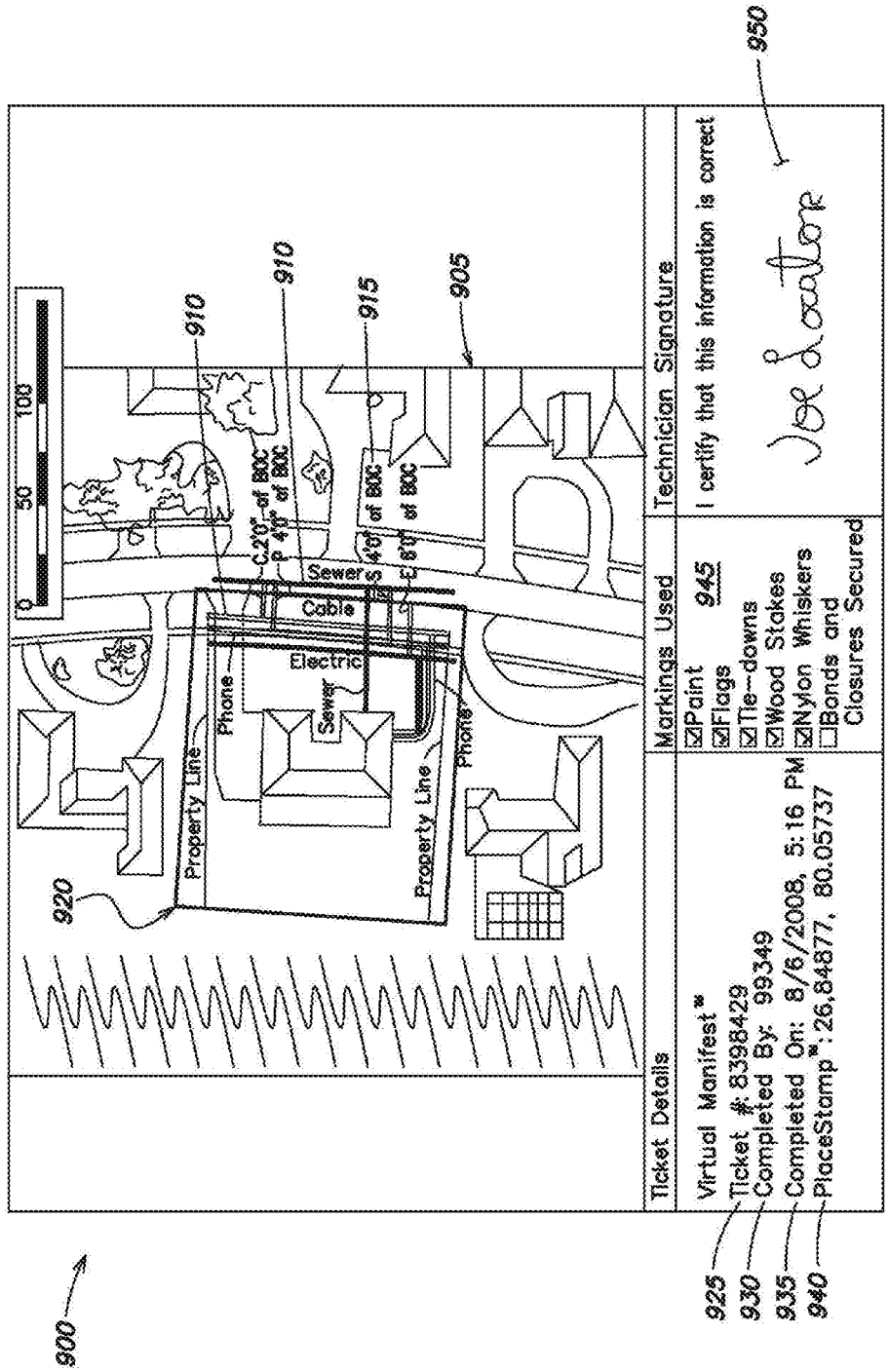
FIG. 9 is a diagram illustrating various elements of a searchable electronic record of a locate operation according to one embodiment of the present invention.

FIG. 9 shows an exemplary searchable electronic record or electronic manifest 900 that may be generated according to methods and apparatus described herein. The electronic manifest comprises image data or information including a marked-up image 905. In the example of FIG. 9, the marked-up image 905 includes digital representations 910 (locate mark indicators) of physical locate marks, offset indicia 915, and virtual white lines 920 (dig area indicators). In addition, the electronic manifest 900 comprises non-image information relating to the locate operation, derived from one or more of the fields of the exemplary data set 700 illustrated in FIG. 7. In the example of FIG. 9, the displayed elements of such a data set constituting non-image information include (but are not limited to) a ticket number 925 for the locate operation (from the ticket number field 790), an identifier 930 of the locate technician (e.g., from the field 765 or another similar field, which may indicate facility owner/operator, or locate company/technician), a time and date stamp 935 indicating when the electronic manifest was created (from the timestamp filed 710), a location stamp 940 indicating where the electronic manifest was created (from the location stamp field 715), a completed checklist 945 of markings used in the locate operation (from the marking method field 770), and a locate technician signature 950 certifying that the information of the electronic manifest is correct (from the certification field 725). The marked-up image and additional information relating to the locate operation may be stored as a single file (e.g., a combined image or image and text file), in associated files, or separately. It should be appreciated that the electronic manifest 900 shown FIG. 9 is merely exemplary, and that an electronic manifest as described herein may alternatively include other combinations of the information described herein and may be formatted in different manners.

An electronic manifest of underground facility locate marks may serve several purposes. For example, the electronic manifest may provide significant improvements in accuracy and save time for the locate technician. Manual sketching is time consuming and imprecise. For example, with manual sketching, the general geographic features of the dig area location, i.e. roads, sidewalks, landscaping, buildings, and other landmarks, must be reproduced by the locate technician. Creation of an electronic manifest that includes drafting on retrieved input images may improve accuracy and eliminate drafting of these general geographic features.

Additionally, or alternatively, an electronic manifest of underground facility locate marks may provide a variety of data formats from a single user event. For example, electronic drafting creates data about the electronic manifest which can be reviewed without viewing the image. The type of marked underground facilities can be determined based upon the existence of different colors, different line types (e.g., solid, dotted or dashed), or other coding schema. Length of marks for each underground facility can be approximated, and the existence and length of offsets detected. If available, the location of the marks can be cross-checked to the user's description or depiction of the area to be marked or excavated.

Additionally, or alternatively, an electronic manifest of underground facility locate marks may provide for easier dissemination and record-keeping. Electronic manifests can be associated with individual tickets and recalled electronically, avoiding the uncertainties and errors associated with manual filing systems. Furthermore, electronic manifests can be interrogated to ensure that the information recorded on the electronic manifest accurately comports with billing data or other information regarding the locate operation(s) performed.

Additionally, or alternatively, information from the electronic manifest regarding the distance between environmental landmarks and located underground facility locate marks may be used to verify subsequent locate operations or the accuracy of the electronic manifest. For example, if the information identifies an underground facility as running parallel to the curb at a distance of three meters, that information may be used to assess the accuracy or consistency of a subsequent locate operation at the same dig area or, upon inspection, the accuracy of the electronic manifest.

Additionally, or alternatively, information from the electronic manifest regarding the number and types of underground facilities may be used to estimate the scope of a subsequent locate operation to be performed at a dig area. For example, a large number of underground facilities may be indicative of an extensive (i.e., time-consuming) locate operation.

Additionally, or alternatively, information from the electronic manifest may be used by a quality control supervisor and/or damage inspector to verify the accuracy of the underground facility locate marks. For example, if the user who performed a locate operation indicated that an underground facility runs parallel to a driveway at a distance of two meters, then the quality control supervisor or damage inspector may use this information to verify whether the marks properly reflected the actual location of the underground facilities present within the dig area. Also information from the electronic manifest may be used to train a user and/or to perform quality control relating to a user's work. The electronic manifest can be modified, e.g., after retrieval from the memory of a central server or the user device itself, to include indication of that the manifest has been reviewed and/or approved (e.g., by quality control supervisor). Such an indication may comprise, for example, the signature of the reviewer.

Since it is possible for a locate technician to create a manifest without ever visiting the dig area, it may be desirable to verify that a locate operation was actually performed in the dig area, as discussed herein. According to one exemplary implementation, this may be accomplished by verifying that location information logged by a user device comports with a location where the locate operation was to be performed (e.g., the dig area) and/or that time information logged by a user device comports with a time frame for performing the locate operation (e.g., within 48 hours of the ticket being issued). The time and/or location information may be generated by the user device and automatically logged to the electronic manifest. Alternatively, the time and/or location information may be generated by the locate and/or marking device, transmitted to the user device, and automatically logged to the electronic manifest. The time information may comprise, for example, a time stamp generated by a clock internal to the user device or the locate and/or marking device. Such a time stamp may comprise a date and/or time indicative of when the locate operation was performed. The location information may comprise, for example, GPS coordinates or GPS-derived data such as a city, state, county, and/or address indicative of where the locate operation was performed. The time and/or location information may be stored and/or transmitted as part of the marked-up image or associated data (e.g., data set 700).

Data or non-image information associated with performing the locate operation and/or creating the electronic manifest, such as time spent performing certain actions or actuations of an input or marking device, can optionally be tracked and stored by the user device. Exemplary data that may be stored includes: a start time and/or date of the locate operation; a start time and/or date of the electronic manifest and/or associated sketch or drawing; an end time and/or date of the locate operation; an end time and/or date of the electronic manifest and/or associated sketch or drawing; a total time for marking each utility (e.g., electric, gas, cable, phone, water, recreational water, and sewer); an activity count (e.g., actuations of a marking device) associated with marking each utility; a total time or activity count for other actions (e.g., marking the property line, tie-down, sketching, drawing, selecting, dragging, resizing, or performing an undo, clear or zoom); time and data associated with menu clicks, line clicks, and point clicks; image request information and information identifying the requested image; data associated with drawing lines (e.g., utility type, begin location, end location, width, and characteristic (e.g., dashed or solid)); data associated with drawing points (e.g., utility type, location, width, characteristic (e.g., symbol type)); data associated with text boxes (e.g., location, characteristic (e.g., color), and text); drawing data (e.g., start and end time, ticket number, user name and/or identification, and IP address); and location data (e.g., image centroid, ticket location, start location, and end location).

The data described above that may be tracked and stored by the user device can be used, for example, to determine the cost of a locate operation, verify the performance of a locate operation, determine the location of physical locate marks, assess the efficiency or skill of a locate technician, and/or train the locate technician. Such assessments and determinations may be performed automatically using software associated with the user device or a computer that receives data from the user device. The software may have an interface that allows the parameters used in the assessment or determination to be customized. For example, an interface may be provided to allow a user to select which and how items of data will be used to assess the efficiency or skill of a locate technician. In this manner, a user may specify that a time lapse between the start and end times of creation of a sketch or drawing associated with an electronic manifest will be used to assess the efficiency or skill of a locate technician.

It should be appreciated that the user device described herein is merely exemplary and that other implementations of user device are possible. For example, the user device and/or certain components thereof may be integrated within a locate and/or marking device. In this case, the user device may share a display with that of the locate and/or marking device and process and store data within the locate and/or marking device.

Exemplary User Interface

One example of a user interface that may be presented via the user device 210 of FIG. 2 was described in connection with FIG. 8. Aspects of another exemplary user interface that may be presented via the user device 210 will be described in connection with FIGS. 17-47. The user interface, which comprises screen views rendered by a user interface application 337 running on the user device 210, may be used to facilitate creation of an electronic record of a locate operation as described herein. As noted above, in some embodiments a user (e.g., a locate technician) may use the user interface to electronically mark, on an input image or grid, digital representations of physical locate marks created during a locate operation and/or electronic detection indicators representing geographic locations of where one or more utilities were detected during the locate operation ("manual" electronic manifests). In other embodiments, geographic information regarding detection and/or marking of underground facilities may be uploaded to the user device 210 (e.g., from locate instruments and/or locate request tickets) to facilitate semi-automated or automated creation of an electronic manifest.

Information relating to the digital representations and/or the underlying input image or grid may be stored as part of an electronic record by the user interface application. Other information, such as a time and location at which the digital representations were created and a signature of the locate technician, may also be stored as part of the electronic record.

Figure 17:
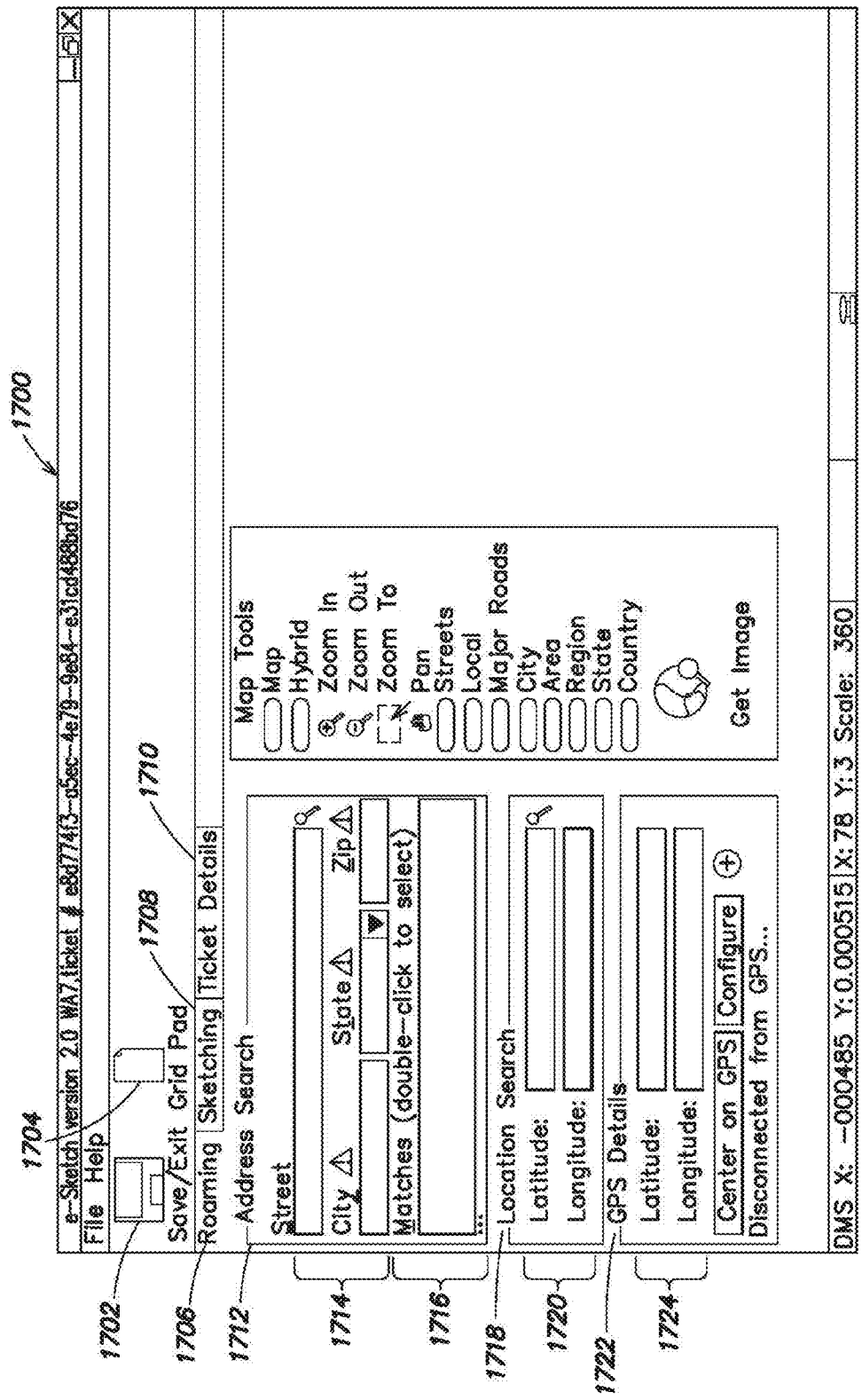
FIG. 17 shows an initial screen of an exemplary graphical user interface for facilitating creation of a searchable electronic record that may be presented via the user device described in connection with FIG. 2.

FIG. 17 shows an initial screen 1700 of the exemplary user interface. The initial screen 1700 includes a save/exit icon 1702 and a grid pad icon 1704. The save/exit icon 1702 may be selected to save an electronic record at any point during its creation and/or to exit the user interface application. Creation of the electronic record, which may involve rendering digital representations of a locate and/or marking operation on an underlying input image, will be described below in connection with other screens of the exemplary user interface. If the digital representations are created on an underlying input image, the input image may also be saved. As will be described in connection with other user interface screens, an underlying image is not required for the creation of digital representations. For example, the grid pad icon 1704 may be selected to generate a bare grid on which digital representations of physical locate marks may be created.

The initial screen 1700 also comprises a roaming tab 1706, a sketching tab 1708, and a ticket details tab 1710. Accessing the ticket details tab 1710 will display a window including information from the current ticket. According to one example, the information from the current ticket may comprise raw ticket information provided to or from a "one call center" or other utility notification center. Such ticket information may comprise details relating to a locate operation to be performed, such as the address and/or geographic coordinates of the dig area, a link to a map or other graphic of the dig area, the type of work being performed by excavators at the dig area (e.g., gas leak repair), the scheduled excavation date(s), and the extent of the dig area. These details may be used by a locate technician creating a marked-up digital image to, for example, identify an input image of the dig area or determine appropriate markings to be made thereon.

The roaming tab 1706 is associated with a window comprising fields that may be used to specify geographic location information corresponding to an input image to be acquired. The geographic location information may be manually input by a user, automatically derived from current ticket information and/or automatically acquired from a GPS device. For example, an address search area 1712 comprises input fields 1714 (e.g., street, city, state and zip code) in which a user may input address information and a match window 1716 in which the application may display matching addresses. A location search area 1718 comprises input fields 1720 that may be populated with latitude and longitude coordinates derived from the current ticket information, as provided under ticket details tab 1710. For example, the ticket manager routine 570 described in connection with FIG. 5 may parse the current ticket and pass an XML file including latitude and longitude coordinates of the dig area to the user interface application. The user interface application may populate the location search area 1718 using the received latitude and longitude coordinates. The location search area 1718 may also be modified by a user so that the user can change the pre-populated coordinates. A GPS details area 1722 comprises fields 1724 that may be populated with latitude and longitude coordinates acquired from a GPS device, such as a GPS device integrated within, connected to, or otherwise associated with a user input device. The GPS device may be a device having access to a global navigation satellite system (GNSS) receiver (e.g., a global positioning system (GPS) receiver). If a computer on which the user interface application is running has access to a GNSS receiver, the latitude and longitude coordinates of the computer may be automatically input into the fields 1724. The application may be configured to automatically detect connectivity to a GNSS server.

Figure 18:
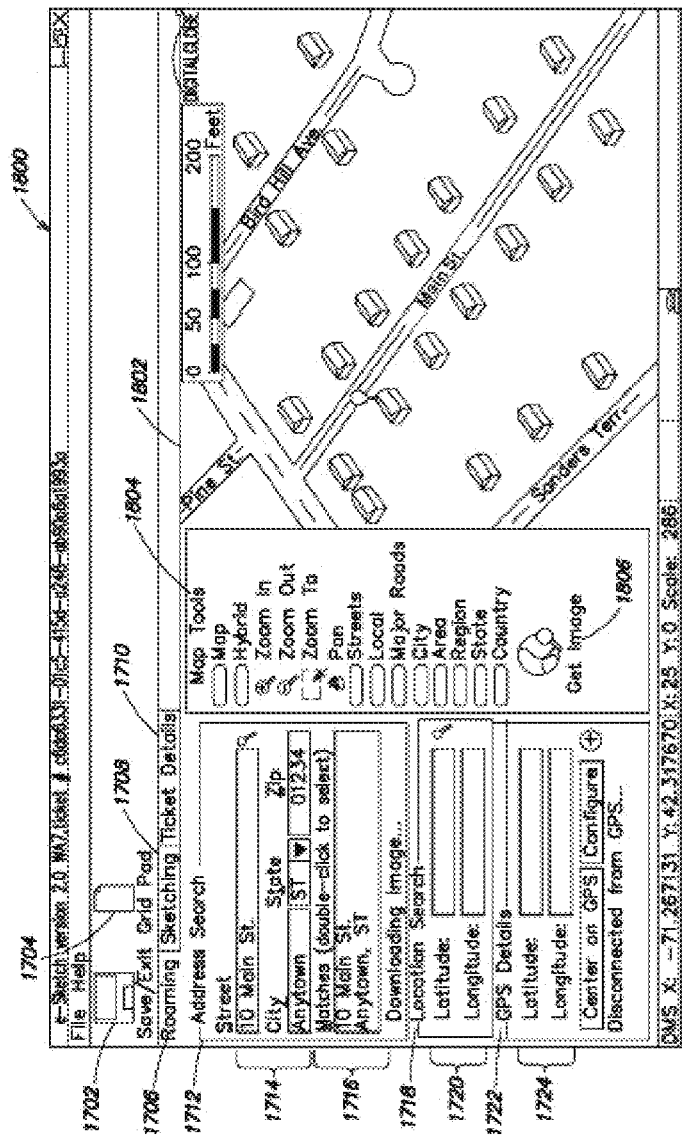
FIG. 18 shows a screen of the exemplary user interface that displays an image corresponding to an address.
Figure 19:
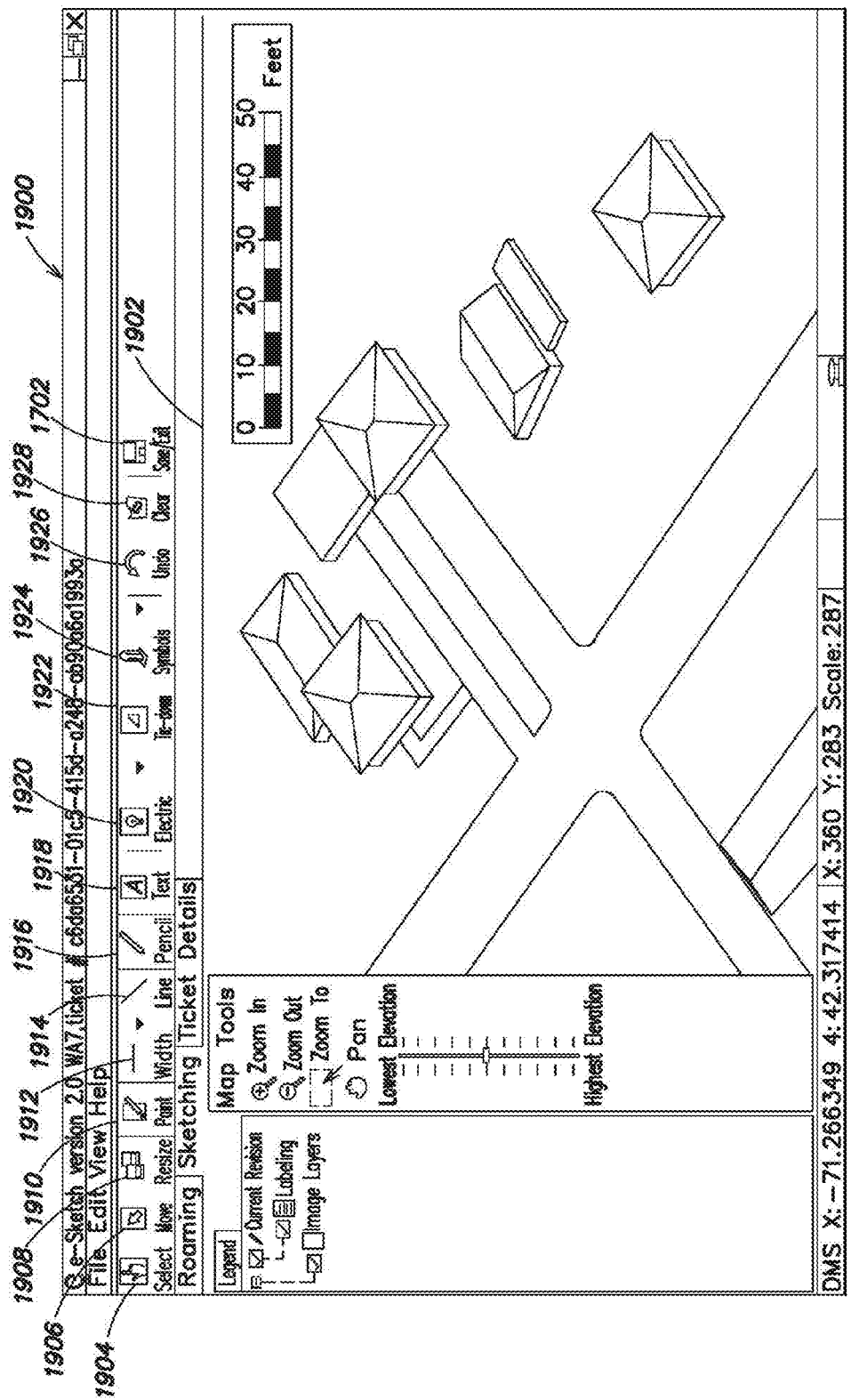
FIG. 19 shows a screen of the exemplary user interface wherein the sketching tab 1708 is active and an acquired input image is displayed.

The screen 1800 of FIG. 18 shows the result of selecting a matching address from match window 1716 based on address information entered into input fields 1714. In particular, the screen 1800 displays an image 1802 corresponding to the selected address. The map tools 1804 provided adjacent the image allow the image 1802 to be manipulated to create a desired input image. For example, the map tools 1804 comprise zoom and pan tools to allow the scope and center of an image to change. Once any desired manipulations have been performed, the user may select the "get image" icon, which causes the image to be displayed in a window associated with the sketching tab 1708, as shown in FIG. 19. The displayed image may be a high resolution image including the area of the selected address. If a high resolution image is not available, however, the user interface application may automatically retrieve a lower resolution image (e.g., a satellite image) or some other alternate default image.

Figure 20:
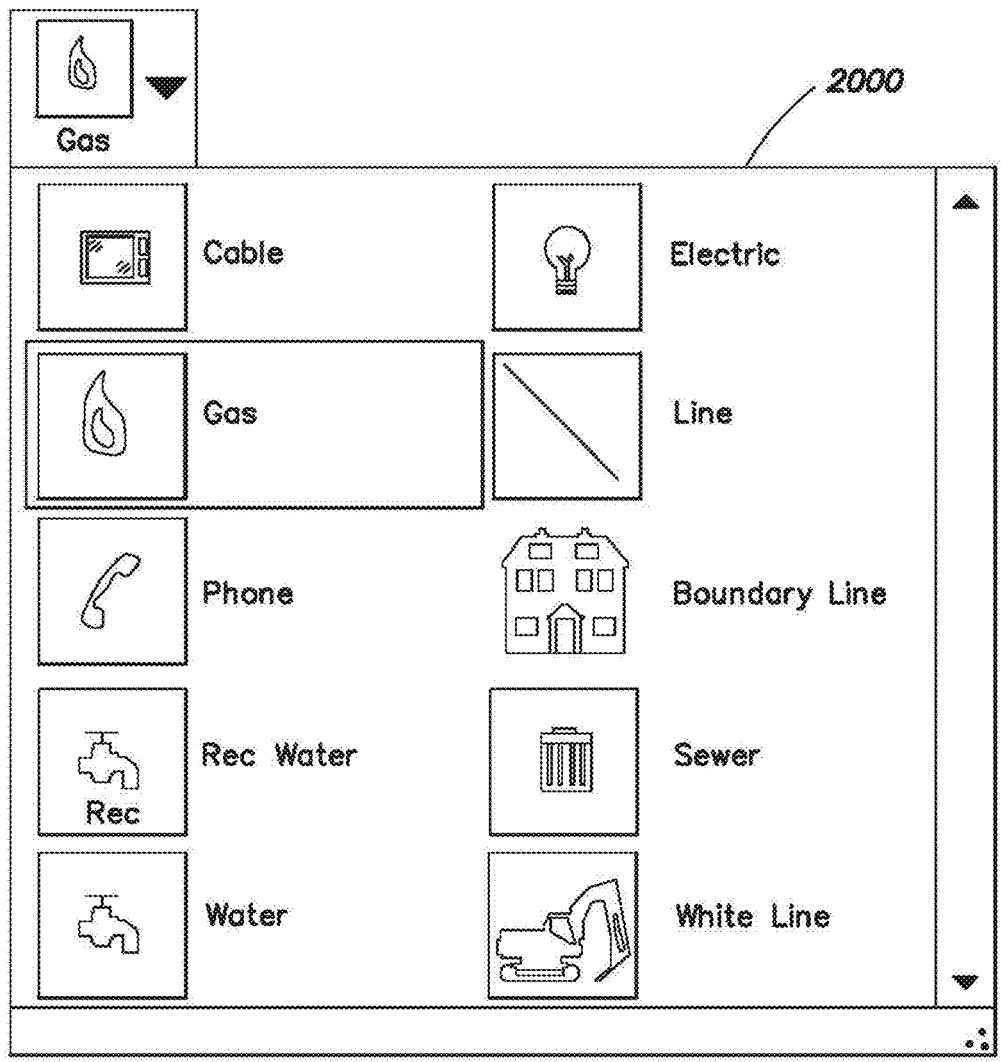
FIG. 20 shows a drop down menu of the exemplary user interface that allows a user to select a type of line to be drawn so as to represent a type of facility, boundary lines and/or white lines.
Figure 21:
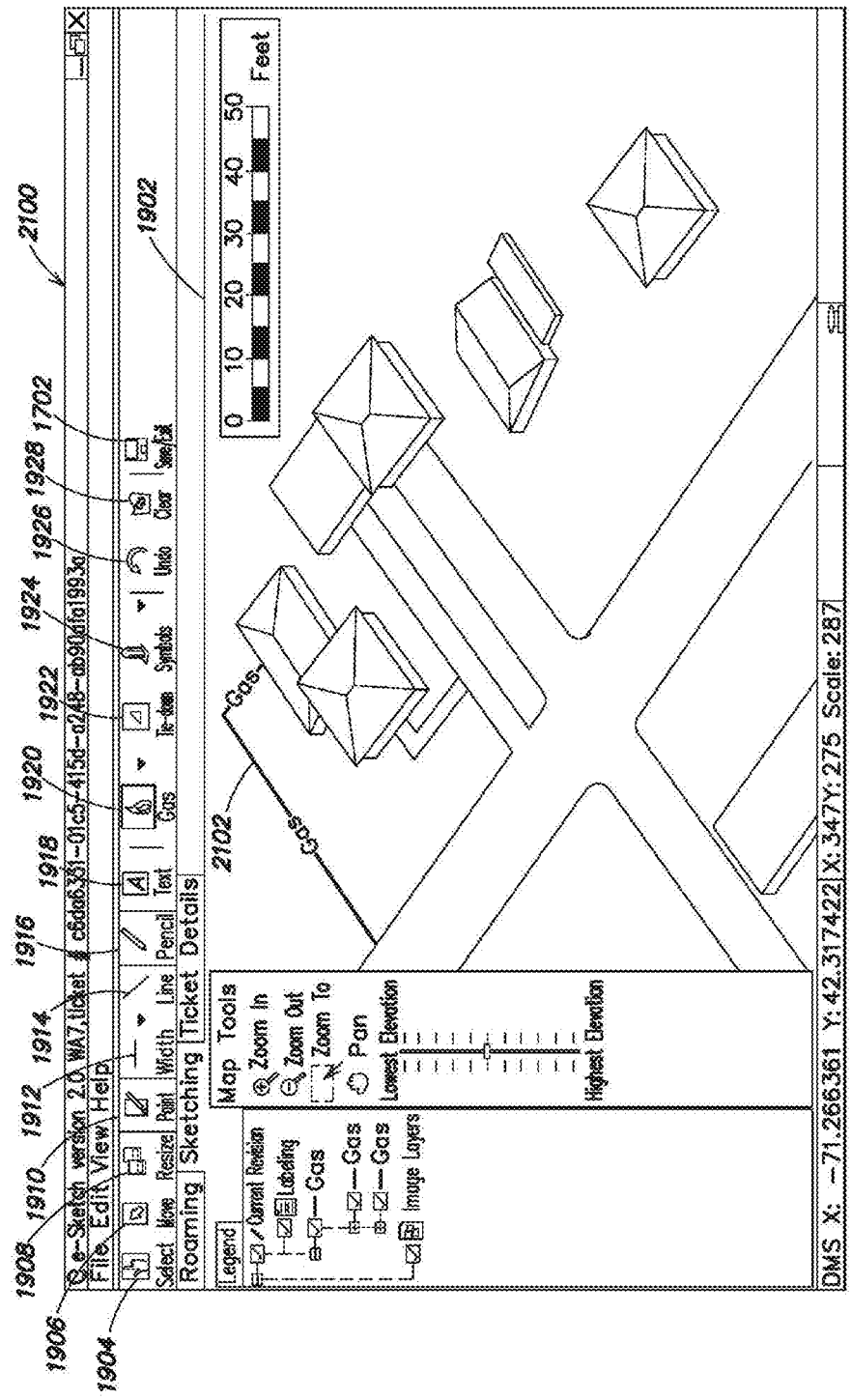
FIG. 21 shows a screen of the exemplary user interface showing a rendered line when the selected line type is "gas"

FIG. 19 shows a screen 1900 wherein the sketching tab 1708 is active and an acquired input image 1902 is displayed. Selection of the sketching tab 1708 causes icons 1904-1928, which relate to the creation of digital representations of physical locate marks and related information, to be displayed. To create a digital representation of a first facility type, the line type icon 1920 may be selected. The selection of the line type icon 1920 causes a drop down menu 2000 to be displayed, as shown in FIG. 20. The drop down menu 2000 allows a user to select a type of line corresponding to the first facility type. The drop down menu 2000 includes line types corresponding to cable, gas, phone, water, reclaimed water, electric, and sewer facility types. In addition, drop down menu 2000 includes line types corresponding to non-facilities. These line types include boundary lines and "white lines."

Each line type may correspond to a particular physical representation of a line (e.g., line color, width, and style). According to some exemplary implementations, the physical representation of a line may convey not only line type (e.g., gas line, white line), but also marking material type (e.g., paint, flags). For example, line color (e.g., yellow or red) may correspond to line type, while line style (e.g., dotted or dashed) may correspond to a marking material type. In other implementations, a physical representation of a line may convey other information concerning a dig area, such as the presence of multiple underground facilities at the same or approximately the same location (as is the case when multiple underground facilities share a common trench). For example, multiple differently-colored lines located in parallel in close proximity to each other (essentially co-located lines separated just enough so that respective different colors are discernible) may indicate that multiple underground facilities were marked at the location of the co-located lines, and the particular underground facilities marked at that location may be indicated by the different line colors. For example, a joint trench including electric and water facilities may be indicated by parallel contiguous red and blue lines. As may be appreciated from the foregoing, the physical representations of lines may convey information concerning facilities, marking material, and other aspects of a dig area, and the physical representation of each line may be selected or modified accordingly.

In the example of FIG. 20, gas has been selected as a line type corresponding to the first facility type. With gas selected as the line type using the line type icon 1920, the user may select the paint icon 1910 to activate a line tool. A user may render a straight line by selecting the line icon 1914 or a freeform line by selecting the pencil icon 1916. The line tool will render a line having the properties ascribed to the selected line type. As shown on the screen 2100 of FIG. 21, when the selected line type is "gas," the rendered line 2102 may be yellow and automatically identified with the label "gas." The rendered line 2102 may be selected using the select icon 1904, moved using the move icon 1906, and/or resized using the resize icon 1908. The width of a line to be rendered may be selected from a drop down menu activated by selection of the width icon 1912. To revert to an earlier version of a digital representation, the undo icon 1926 may be selected. To entirely clear the input image of digital representations, the clear icon 1928 may be selected.

In exemplary embodiments of a user interface to facilitate creation and manipulation of electronic manifests, various information relevant to the electronic manifest may be categorized based on a variety of criteria and displayed as separate "layers" of a visual rendering of the electronic manifest (e.g., display layers of the image-based portion of the manifest), such that a viewer of the visual rendering may turn on and turn off displayed information based on a categorization of the displayed information. Examples of information categories that may be associated with corresponding display layers include, but are not limited to, "marking information" (e.g., information relating to applied locate marks and/or locate mark indicators representing same), "locate information" (e.g., information relating to detected underground facilities, and/or detection indicators representing same), "landmark information" (e.g., information relating to one or more landmarks in or near the dig area and/or appearing in one or more images used in connection with an electronic manifest, and various symbols representing same), "image information" (e.g., information relating to one or more images used in connection with an electronic manifest), "labeling information" (e.g., information relating to labeling, annotations, notes, text boxes, etc. used in connection with an electronic manifest), "white line information" (e.g., information relating to one or more dig area indicators used in connection with an electronic manifest), and "revision information" (e.g., information relating to modifications to one or more elements constituting an electronic manifest).

In examples described below, information in different categories may be independently enabled or disabled for display as corresponding display layers. Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden (toggle on/off), thus facilitating comparative viewing of layers.

Furthermore, any of the above-mentioned exemplary categories for layers, as well as other categories not specifically mentioned above, may have sub-categories for sub-layers, such that each sub-layer may also be selectively enabled or disabled for viewing by a viewer. For example, under the general layer designation of "marking layer," different facility types that may have been detected during a marking operation (and indicated in the marking information by color, for example) may be categorized under different sub-layer designations ("marking layer—electric;" "marking layer—gas;" "marking layer—water;" etc.); in this manner, a viewer may be able to hide only the electric marking information while viewing the gas marking information, or vice versa, in addition to having the option to view or hide all marking information. Sub-layer designations similarly may be employed for the landmark information (e.g., "landmark layer—water/sewer;" "landmark layer—CATV;" "landmark layer—buildings"), and any other category of information.

Virtually any characteristic of the information available for display may serve to categorize the information for purposes of display layers or sub-layers. It should further be appreciated that, according to various embodiments, the attributes and/or type of visual information displayed as a result of selecting one or more layers or sub-layers is not limited. In particular, visual information corresponding to a selected layer or sub-layer may be electronically rendered in the form of one or more lines or shapes (of various colors, shadings and/or line types), text, graphics (e.g., symbols or icons), and/or images, for example. Likewise, the visual information corresponding to a selected layer or sub-layer may include multiple forms of visual information (one or more of lines, shapes, text, graphics and/or images). From the foregoing, it may be appreciated that a wide variety of information may be categorized in a nested hierarchy of layers, and information included in the layers may be visually rendered, when selected/enabled for display, in a variety of manners.

Figure 22:
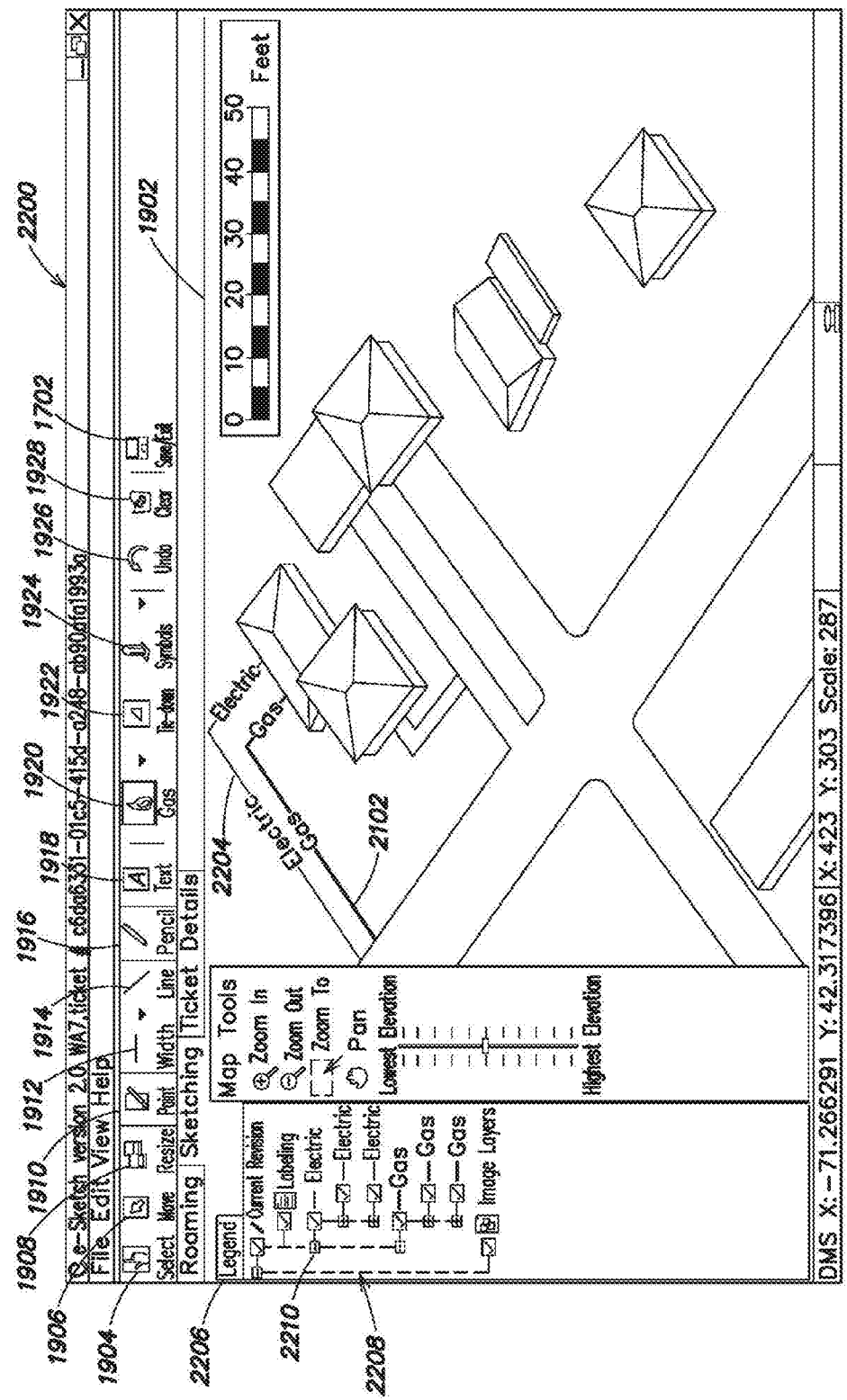
FIG. 22 shows a screen of the exemplary user interface including a layers legend 2208 displaying the facility types corresponding to the rendered lines.
Figure 23:
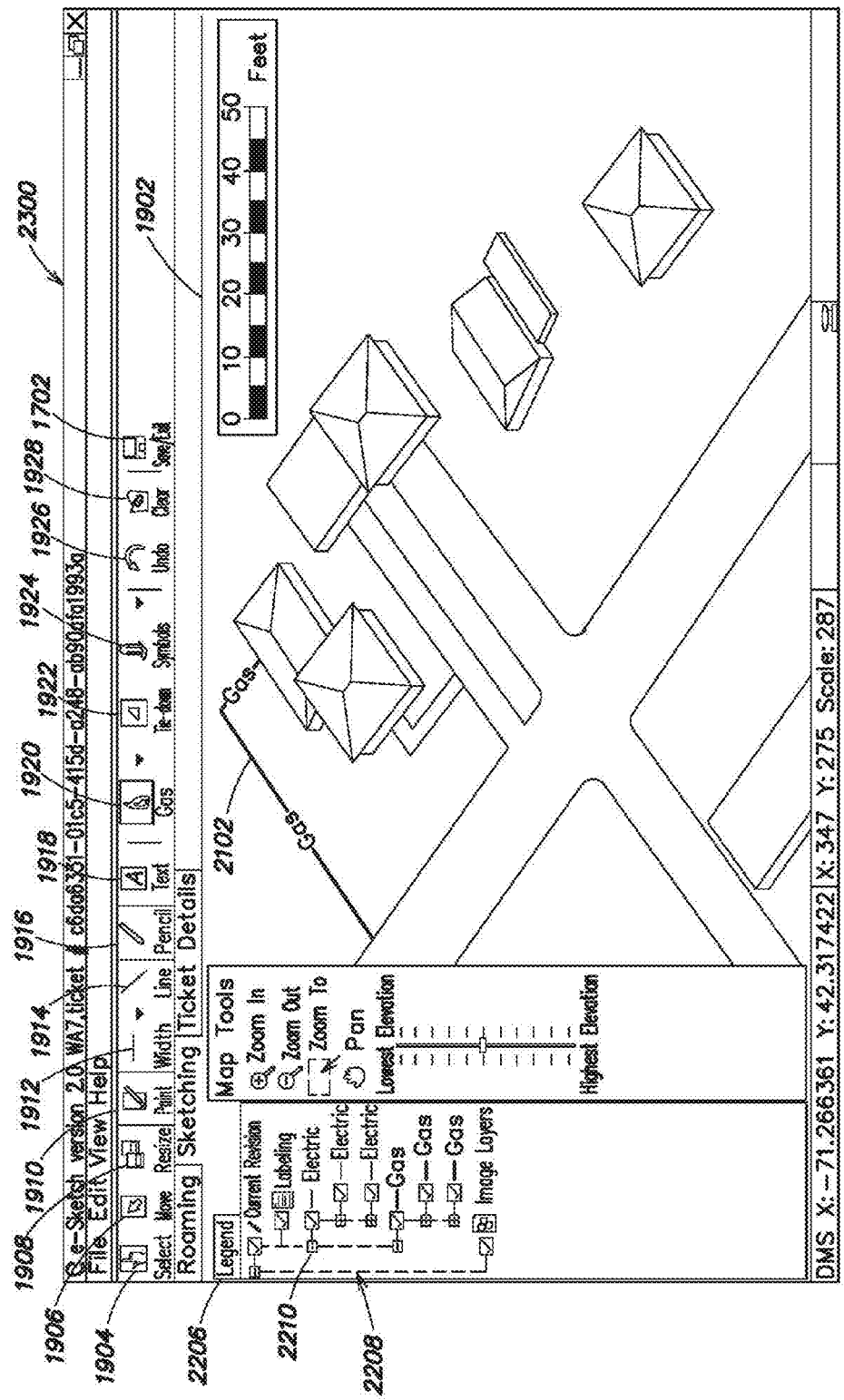
FIG. 23 shows a screen of the exemplary user interface including hidden layers.
Figure 24:
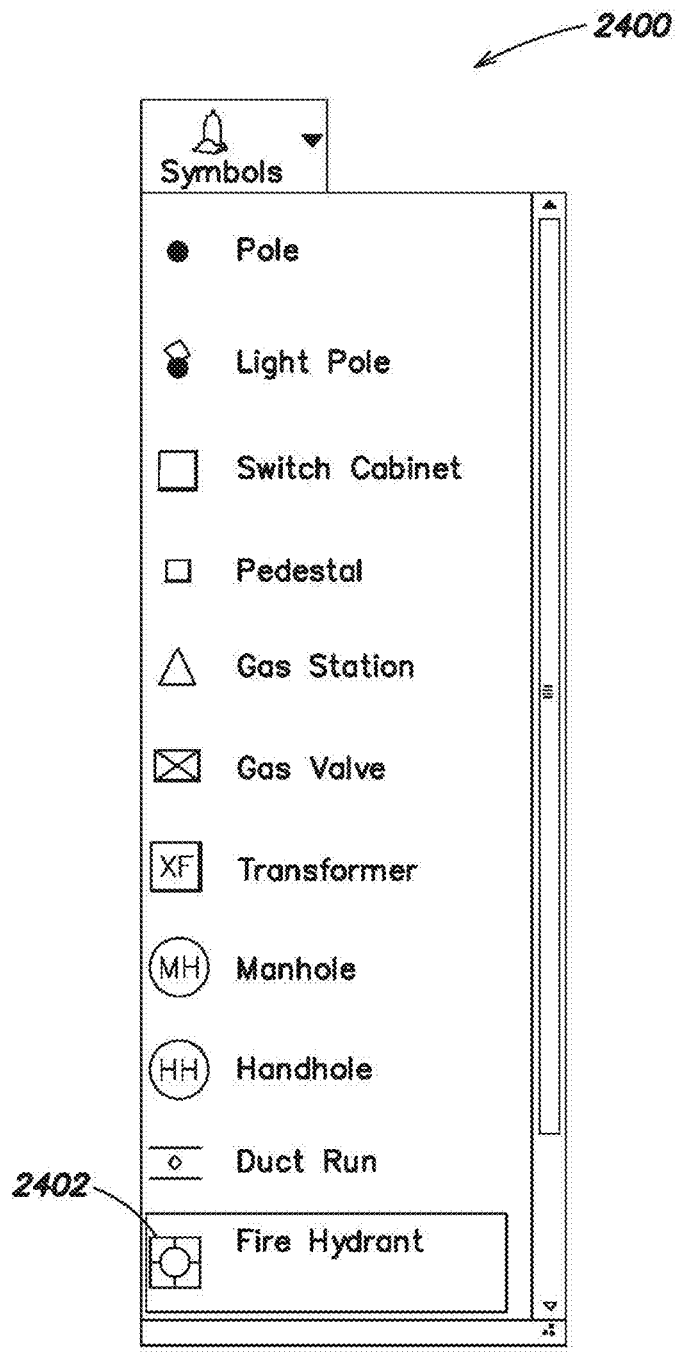
FIG. 24 shows a drop down menu of the exemplary user interface including selectable symbols that may be overlaid on an input image.
Figure 25:
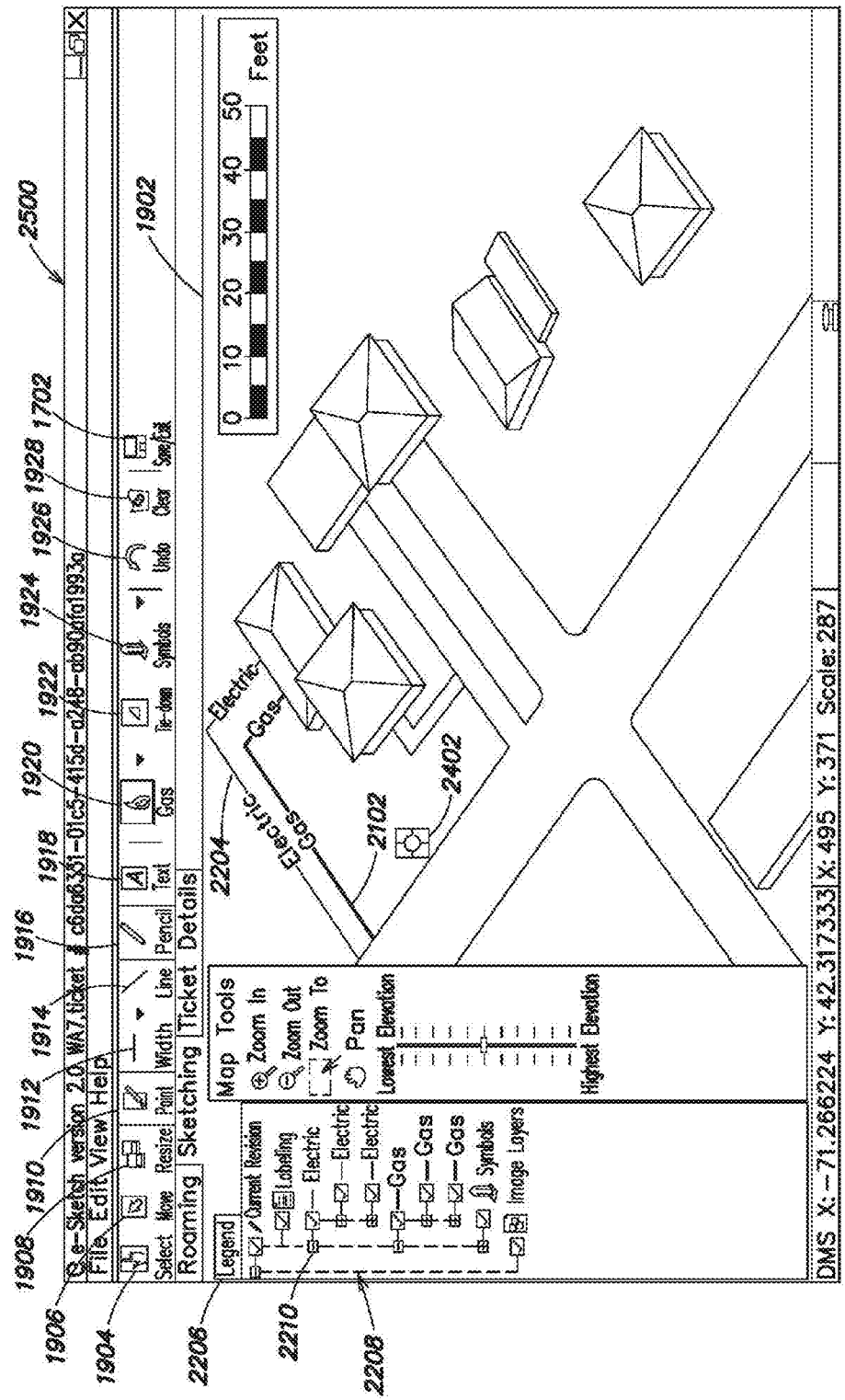
FIG. 25 shows a screen of the exemplary user interface including a fire hydrant symbol overlaid on an input image.
Figure 26:
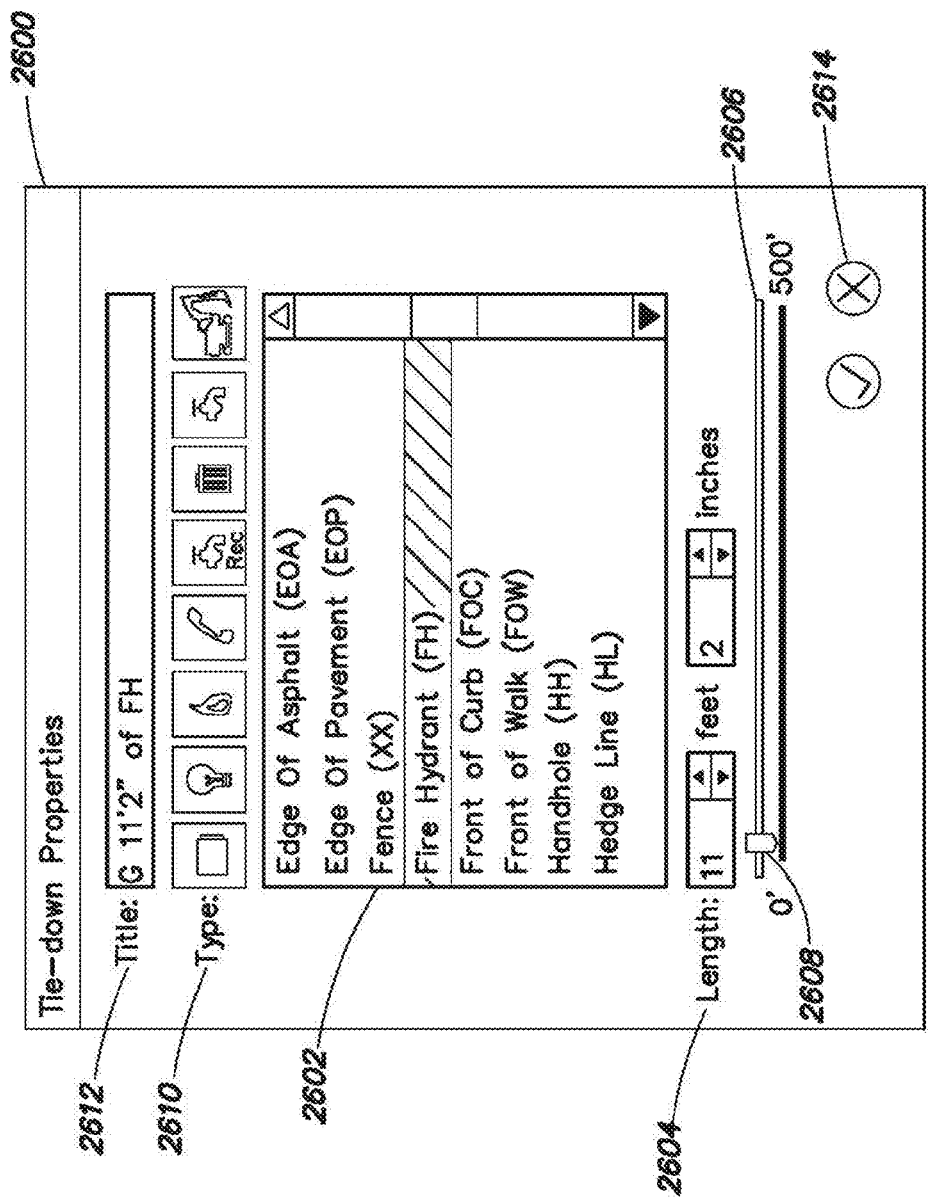
FIG. 26 shows a pop up window of the exemplary user interface that allows a user to select a type of reference location associated with a tie-down and select or specify a length of the tie-down.

FIG. 22 provides an illustrative example of the use of display layers, according to some embodiments of the present invention. In FIG. 22, electric line locate marks 2102 and gas line locate marks 2204 are digitally represented on the input image 1902 shown on screen 2200. The legend tab 2206 includes a layers legend 2208 displaying the facility types corresponding to the rendered lines. Each line segment is associated with a check box that controls whether the corresponding line segment is displayed. To hide a digital representation of a single line segment, the check box associated with that line segment may be unchecked. To hide all of the line segments corresponding to a particular underground facility, the check box associated with that underground facility may be unchecked. For example, to hide all of the electric line locate marks 2202 so that only the digital representations of gas line locate marks 2204 are shown, a user may simply uncheck the check box 2210 in the layers legend 2208. The resulting screen 2300 is shown in FIG. 23. Rechecking a check box, such as check box 2210, will cause the associated line(s) to again be displayed.

It should be appreciated that the layer feature described above may be used to selectively hide or display any of the digital representations described herein. For example, the layer feature may be used in connection with lines corresponding to underground facilities, lines corresponding to other features such as white lines or boundary lines, notes (e.g., text boxes), labels (e.g., utility types or dimensions), and/or symbols representing environmental landmarks, non-movable objects or other reference features. The layers legend described above may be used to control the various layers. As described in connection with the underground facility line segments, some layers may include sub-layers that allow portions of a digital representation to be hidden or displayed.

As yet another example, locate signal data, which relates to the locate signals detected by a locating device (on which locate marks generally are based), may be categorized as one or more layers. According to one exemplary implementation, a "locate signal" layer may include sub-layers of different facility types detected, in which respective facility types are rendered on the display as electronic detection marks and/or lines having different colors, line types and/or shading (respectively referred to as "detection indicators"). The depicted locate signals may be peak locate signals (e.g., locate signals exceeding some threshold). Alternatively, locate signals may be depicted more generally, but peak locate signals may be depicted in a different manner (e.g., using a different color or using a separate layer) so as to distinguish them from weaker locate signals. Sub-sub-layers of a facility type sub-layer may include different signal characteristics (e.g., frequency, amplitude, phase, gain), in which different signal values are rendered on the display as text (e.g., in proximity to the visual rendering of the detected facility line of the corresponding type).

Locate signal data represented by one or more detection indicators, and locate mark data represented by one or more locate mark indicators, may be displayed together for visual comparison. For example, an input image may have one or more locate signal layers (or "detection" layers) and one or more locate mark layers overlaid thereon, each of which may be selectively enabled for display. Such a display allows a user to check for potential discrepancies, such as locate marks at a location where there were no locate signals or, conversely, locate signals (e.g., peak locate signals) at a location where there were no locate marks. Various embodiments and exemplary implementations of selective display of one or more display layers including electronic locate marks, as well as one or more display layers including electronic detection marks, are discussed in detail in U.S. non-provisional application Ser. No. 12/649,535, filed on Dec. 30, 2009, entitled "Methods and Apparatus for Displaying an Electronic Rendering of a Locate and/or Marking Operation using Display Layers," published on May 13, 2010 as U.S. publication no. 2010-0117654-A1, which application and corresponding publication are hereby incorporated herein by reference.

In addition to the layers described above relating to locate information and marking information, according to some embodiments "revision layers" may be employed to provide for multiple electronic records relating to the same dig site or locate operation. Multiple revision layers may form part of a single electronic manifest, respective electronic manifests may be generated per revision, or an electronic manifest may include only particular/selected revisions. By way of example, the layers legend 2208 of FIG. 23 indicates that the layers shown in the figure correspond to a "current revision." Accordingly, it should be appreciated that like other layers, a given revision layer may include a number of sub-layers respectively corresponding to the various categories of information making up that revision layer (e.g., the "current revision" layer illustrated in FIG. 23 includes respective sub-layers for "labeling", "electric," and "gas.")

With respect to revision layers, in some implementations "original" information constituting an electronic manifest (e.g., one or more base images on which manifests are created, locate mark indicators as originally drawn and/or uploaded, detection indicators as originally drawn and/or uploaded, etc.) may be modified in some respect (to provide "modified" information) while at the same time maintaining the integrity of the original information. The original information may related to an original electronic manifest as prepared by a technician at a work site/dig area, or may correspond to a current revision layer that already includes some modifications to an original electronic manifest, for which additional modifications are desired. The original information itself may be identified as a particular revision layer (e.g., "Original") and may include multiple display layers as discussed above, and the modified information constituting a new revision layer may be identified as such (e.g., "Contractor Revisions") and also may include multiple display layers.

In one aspect relating to revision layers, there may be a one-to-one correspondence between the display layers constituting the original information and the display layers constituting the modified information, wherein one or more layers of the modified information include one or more revisions to the original information in that/those layers. In another aspect, one or more display layers constituting the original information may be purposefully excluded from the modified information, such that there are fewer display layers constituting the modified information. In this example, of the fewer display layers in the modified information, no remaining layer may have revisions (i.e., the only modification may be the exclusion of some original information), or one or more remaining layers may have one or more revisions to the original information. In yet another aspect, the modified information may contain one or more additional display layers not found in the original information. Accordingly, it should be appreciated that one or more revisions to the original information to provide modified information for a new revision layer may include some subset of the original information (omissions of original information without further modifications), edits/changes/alterations to at least some part of the original information, or additions to the original information (with or without edits/changes/alterations to the original information).

In some implementations relating to revision layers, it may be desirable to not only maintain/preserve original information on which modification may be based, but to also prevent modifications to, and/or viewing of, some or all of the original information. Furthermore, the same may be true of one or more revision layers based on modified information; i.e., it may be desirable to maintain/preserve modified information constituting a particular revision layer, and in some cases prevent further modification to, and/or viewing of, some or all of the modified information once it has been saved as a revision layer. Accordingly, in some embodiments, the current revision (comprised of original information or modified information) or certain layers thereof may be locked (e.g., write-protected) to prevent unauthorized modifications (e.g., deletion of layers or changes to digital representations). Similarly, one or more layers of a particular revision may be designated as hidden or copy-protected, such that they cannot be copied into a new revision layer.

Thus, a new revision layer may be created that may be wholly or partially modifiable, and may include at the outset all or only a portion of the information in a previous revision. According to one exemplary implementation, the new revision layer is created based on a prior revision such that, at least initially, the new revision layer includes all of the layers of the prior revision layer. However, since it may be desirable to prevent certain digital representations from being viewed, at least by certain parties, certain layers or sub-layers may be deleted or hidden from unauthorized viewing in the new revision layer. Alternatively, the new revision layer may be created at the outset with only a designated subset of the layers of the prior revision layer. Further, changes may be permitted in the new revision layer, such as the addition of new layers and/or new digital representations, and/or modifications to existing sub-layers of the new revision layer.

Revision layers may be used for various purposes. For example, revision layers may be used so a third party (e.g., a regulator or damage investigator) may create an annotated version of an electronic manifest based on original information (or in some case modified information). The third party (or other user) may create a new revision layer based on an "original" revision layer and include annotations in the new revision layer to indicate, for example, where damage occurred and where underground facilities are located vis a vis where they are indicated as being located in the original revision layer. Revision layers may also be used to create a new version of an electronic manifest, based on either original information or modified information, that includes a subset of the content in the previous revision, without necessarily further modifying any information in the new version. The purposeful exclusion of some information from revision to revision (e.g., based on facility type, facility owner, landmark type, content of one or more image layers, etc.) may be useful in maintaining the proprietary nature/confidentiality of some information; for example, information in a previous revision regarding a first utility company's infrastructure may be purposefully excluded from a new revision of a manifest that may be passed on to a different utility company. In this manner, locations of certain underground facilities may be hid from parties not associated with those underground facilities.

In yet another aspect relating to revision layers, different users or classes of users may have different privileges with respect to creation of revision layers. For example, once a user/technician has created an original electronic manifest, the user/technician themselves and/or other parties may have access to the original electronic manifest to create one or more revisions of same; however, all such parties may not necessarily have the same functionality available to them via the user device 210 to create such revisions. Stated differently, the "status" or identify of a given user or class of user may be associated with a degree to which they may modify information in an electronic manifest to create revisions (e.g., based on particular functionality that may or may not be enabled on the user device 210).

For example, different classes of users, such as "technician," "supervisor," "third party investigator," "facility owner," "regulator," and the like may be established and identified with corresponding editing privileges (e.g., via a log-in procedure). Based on the designated editing privileges, a given user may have limited or unlimited capability to create new revision layers. In one example, the technician who creates an original electronic manifest may have substantially limited or no privileges with respect to creating new revision layers, whereas the technician's supervisor may have unlimited editing privileges (e.g., to write-protect certain layers, copy-protect certain layers, modify certain layers, etc.). Similarly, third party investigators may have limited editing privileges to annotate and/or add symbols/markings to certain layers without modifying original content, and facility owners may have access to only certain layers pertaining to their own facilities. Generally speaking, various functionality of the user device 210 may be itself selectively enabled and disabled based on the corresponding editing privileges identified with a certain user or class or user, to provide for a wide variety of options in connection with the creation of revision layers.

Symbols representing environmental landmarks, non-movable objects or other reference features may be digitally represented on the input image 1902 to provide points of reference in the marked-up digital image. To add such a symbol, a user may select the symbols icon 1924, which will cause the drop down menu 2400 of FIG. 24 to appear. The drop down menu 2400 includes such symbols as pole, light pole, switch cabinet, pedestal, gas station, gas valve, transformer, manhole, handhole, duct run, fire hydrant, water meter and damage location. If the user selects the fire hydrant symbol 2402 from the menu, the symbol will appear on the input image 1902, as shown on screen 2500 of FIG. 25. The symbol 2402 may then be positioned by dragging the symbol, using a pointer, to a desired location.

While symbols and lines are referred to herein as different entities, it should be appreciated that lines or other markings may be considered as a type of symbol. For example, symbols may comprise both vector graphics-based symbols (e.g., lines) and icon-based symbols (e.g., bitmap or JPEG images). Thus, the lines described herein may have the same or similar attributes and/or functions as the symbols described herein.

Tie-downs may be used in connection with symbols or other features digitally represented on the input image 1902, or in connection with features of the input image 1902 itself, to indicate distances between such features and digitally represented underground facilities. To add a tie-down, a user may select the tie-down icon 1922, which will cause a tie-down pointer to appear. The tie-down icon 1922 may optionally be selectable only when a digital representation of an underground facility has been created. The user may position the tie-down cursor at a desired location along a digital representation of an underground facility, and actuate a mouse or other user input device at that location to indicate a start point of the tie-down. This actuation will cause a tie-down line having a fixed start point and a moveable end point to appear over the input image 1902. The user may then position the tie-down pointer at a desired end-point location, which is generally a reference location spaced from the start point. The user may actuate a mouse or other user input device at the location to indicate an end point of the tie-down, which will cause the pop-up window 2600 of FIG. 26 to appear. The pop-up window 2600 includes a reference location menu 2602 that allows the user to select the type of the reference location (e.g., "fire hydrant" and "fence"), and a length field 2604 that allows the user to select or specify a length of the tie-down. The length field 2604 may be linked to sliding length indicator 2606 such that sliding an arrow 2608 on the length indicator causes the length specified in the length field 2604 to correspondingly increase or decrease.

It should be appreciated that the user need not specify the length of the tie-down, as it may be automatically calculated using the user specified start point and end point of the tie down. For example, the distance between the start point and end point may be calculated using the latitude and longitude coordinates associated with each point, which may be derived from the geo-location data associated with the input image 1902 underlying the tie-down. Known algorithms exist for calculating a distance between latitude and longitude coordinates. For example, the haversine formula may be used to calculate the great-circle distance between two sets of latitude and longitude coordinates.

The underground facility type field 2610 may default to the type of underground facility associated with the start point of the tie-down, or the type may be selected by the user. The title field 2612 may be automatically populated with a default title based on the specified tie-down length and type of reference location, or a user-selected title may be provided. Once the desired parameters and title of the tie-down have been established, the user may approve or cancel the selections using approve/cancel icons 2614.

Figure 27:
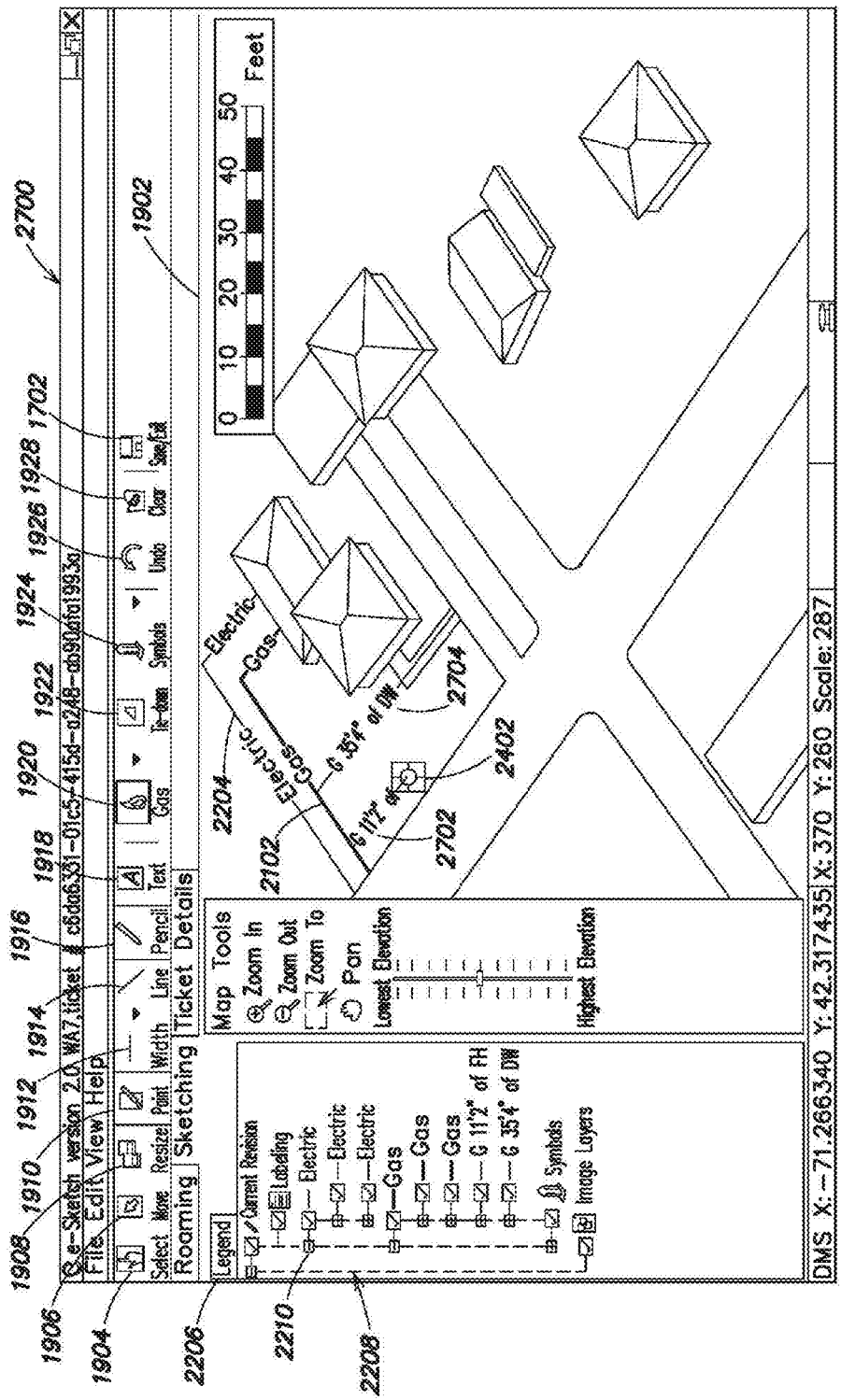
FIG. 27 shows a screen of the exemplary user interface including examples of tie-down lines that may be created using the interface.

Examples of tie-down lines that may be created using the above-described process are shown on screen 2700 of FIG. 27. A first tie-down line 2702 has a start point along gas line locate marks 2204 and an end point at fire hydrant symbol 2402. The tie-down line 2702 is labeled with a title, established using pop-up window 2600, that indicates the distance between the gas line and the fire hydrant. For example, the title may read "G 11' 2" of FH" which indicates that the gas line is offset 11 feet and 2 inches from the fire hydrant. A second tie-down line 2704 has a start point along gas line locate marks 2204 and an end point at an edge of a driveway. The tie-down line 2704 is labeled with a title, established using pop-up window 2600, that indicates the distance between the gas line and the driveway. For example, the title may read "G 35' 4" of DW" which indicates that the gas line is offset 35 feet and 4 inches from the driveway.

Figure 28:
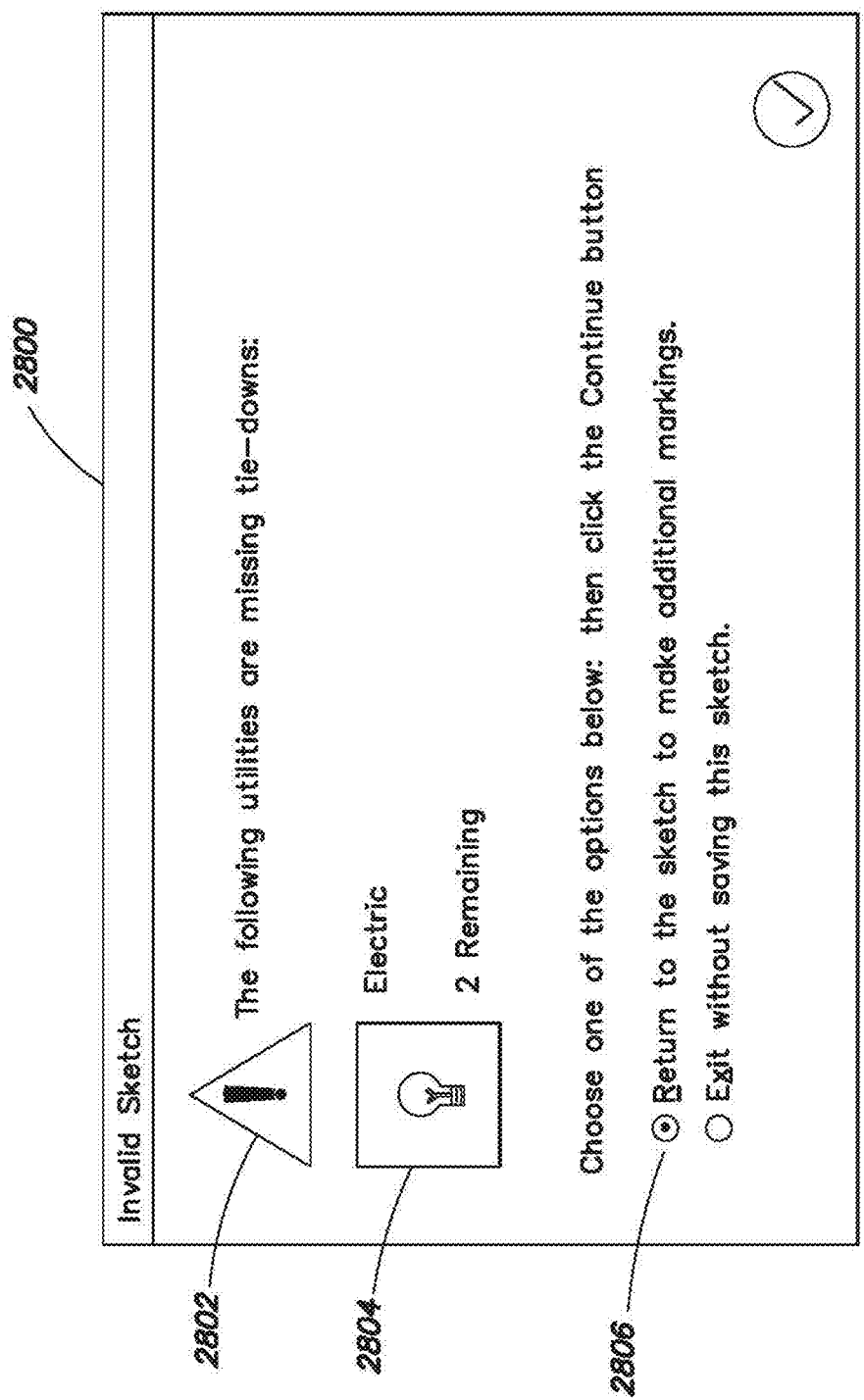
FIG. 28 shows a pop up window of the exemplary user interface including a message informing a user that at least one underground facility is missing at least one tie-down.
Figure 29:
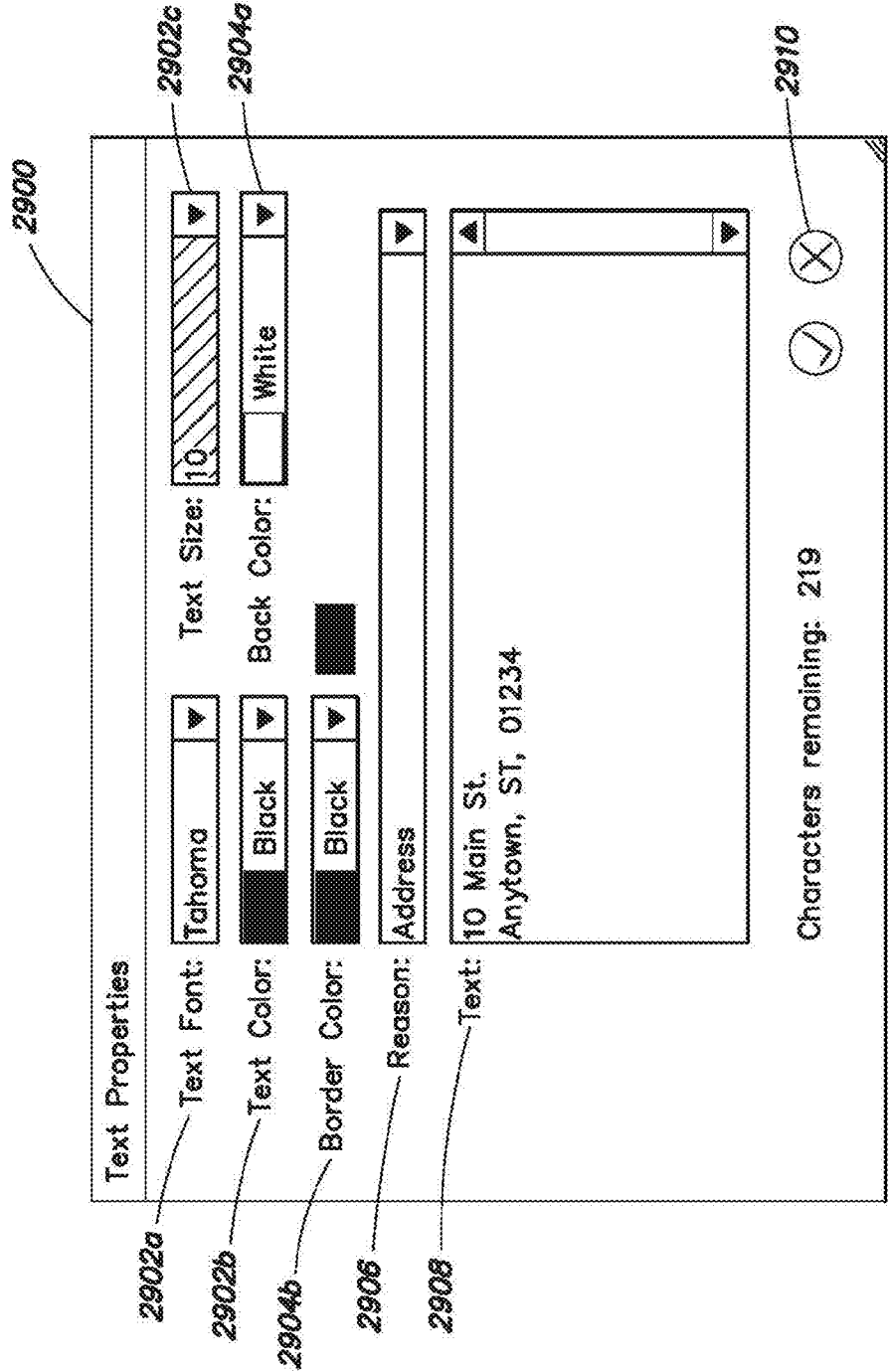
FIG. 29 shows a text pop up window of the exemplary user interface that allows a user to specify the parameters and content of a text box overlaying an input image.
Figure 30:
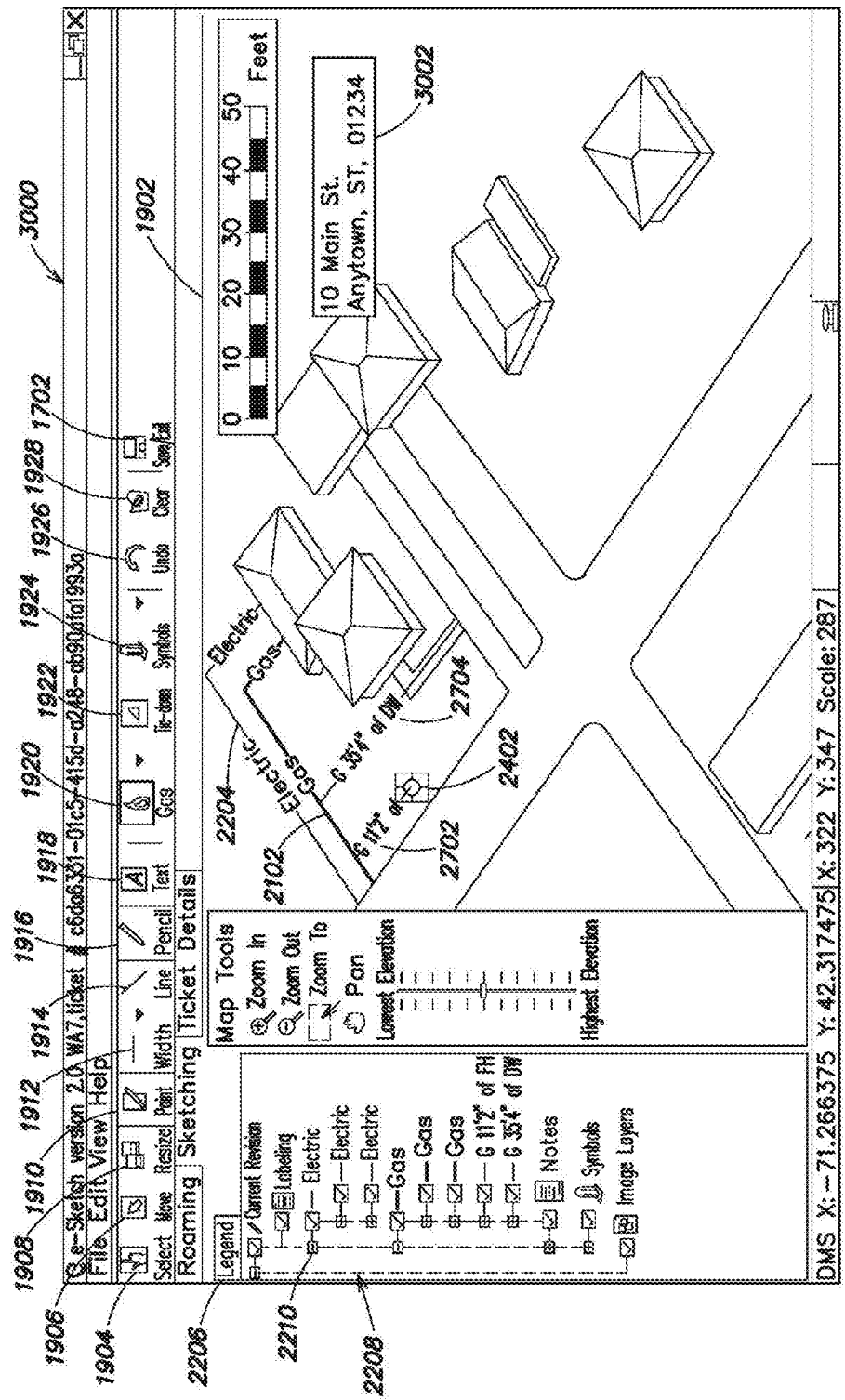
FIG. 30 shows a screen of the exemplary user interface including a text box overlaying an input image.

The application may be configured to require a minimum number of tie-downs (e.g., at least two) per underground facility. If a user attempts to save or close the marked-up image without creating the required minimum number of tie-downs, an alert such as that shown in the pop-up window 2800 of FIG. 28 may appear. Pop-up window 2800 includes message 2802 informing the user that at least one underground facility is missing at least one tie-down. The window 2800 also includes a message 2804 specifying which underground facilities are missing at least one tie-down, and how many are missing for each. Finally, the window 2800 includes an options menu 2806 allowing a user to select how to proceed. In the example of FIG. 28, the options menu 2806 allows a user to select between returning to the prior screen to create the additional tie-downs or exiting the application without saving the marked-up image.

Although the tie-down feature is described above as being used in connection with representations of underground facilities, it should be appreciated that tie-downs may also be used in connection with other lines or features. For example, tie-downs may be used to indicate distances between environmental features and white lines or boundary lines.

A text box may be added overlaying the input image 1902 by selecting text icon 1918 and selecting a location for the text box. This causes the text pop-up window 2900 of FIG. 29 to appear. The pop-up window 2900 includes text fields 2902a-c, which allow a user to specify the font, color and size of the text, and text box fields 2904a-b, which allow a user to specify the background and border color of the text box. A reason for the text box may be provided by selecting an appropriate option from drop down menu 2906. Possible reasons may include, e.g., providing an address, a note to supervisor, a note about the site, a note about the facilities, or a note about the plats. The reason may be logged as part of the electronic record including the marked-up digital image. Finally, the pop-up window 2900 includes a text field 2908 where the content of the text box may be typed. Once the desired parameters and content of the text box have been established, the user may approve or cancel the selections using approve/cancel icons 2910, which causes a text box 3002 to be rendered on input image 1902, as shown on screen 3000 of FIG. 30.

An underlying image is not required to create the digital representations (e.g., underground facilities, environmental landmarks, tie-downs, and text boxes) described herein. For example, as discussed in connection with FIG. 17, the grid pad icon 1704 shown in initial screen 1700 may be selected to generate a bare grid on which digital representations of physical locate marks may be created. When the grid pad icon 1704 of FIG. 17 is selected, the pop-up window 3100 of FIG. 31 appears. The window 3100 includes an instruction directing the user to select a reason for using the grid pad from a pull-down menu 3102. Exemplary reasons that may be selected in the pull-down menu 3102 include that the acquired image was incorrect for the location, too small, outdated, inverted, reversed, cut-off, of poor resolution, or included excessive tree cover. Another exemplary reason that may be selected in the pull-down menu 3102 is that an image could not be acquired, e.g., due to poor cellular coverage. If none of the reasons provided in pull-down menu 3102 are appropriate, the user may select "other," which will cause the user to be prompted to specify a reason in a pop-up text box. Specifying a reason for using the grid pad may optionally be required for the user to access the grid pad feature. Input fields 3104 for specifying latitude and longitude coordinates for the grid may also be specified. The latitude and longitude specified may used to establish a reference point on the grid, for example by assigning the latitude and longitude to a center point on the grid.

In some cases, an input image cannot be used because the user device on which the user interface application runs may have no connection to an image server, e.g., via the Internet, from which input images may be accessed. The user interface application may optionally be configured to automatically detect this lack of connectivity and automatically access the grid pad feature and/or prompt the user to confirm that the grid pad feature should be used.

Figure 32:
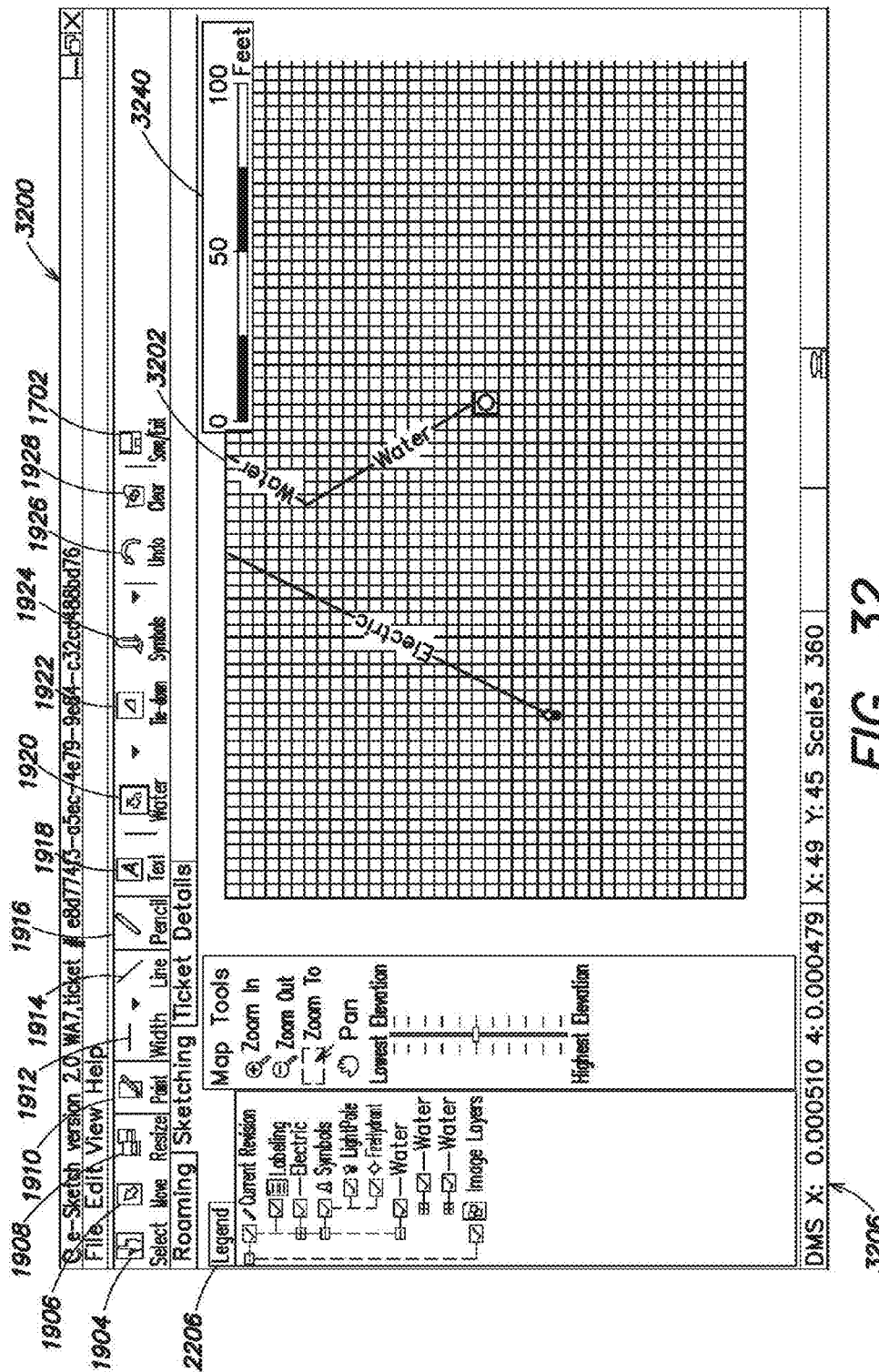
FIG. 32 shows a screen of the exemplary user interface including a bare grid.

FIG. 32 shows a screen 3200 including a bare grid 3202, wherein the user interface application is in a sketching mode. As when an underlying input image is used, digital representations of underground facilities, environmental landmarks, tie-downs, text boxes, etc. may be created overlying the grid. Further, as when an underlying image is used, a scale 3204 and geographic coordinates 3206 may be displayed. The scale 3204 corresponds to a scale of the grid, and the geographic coordinates 3206 correspond to a geographic location of a point on the grid (e.g., the centroid).

Figure 33:
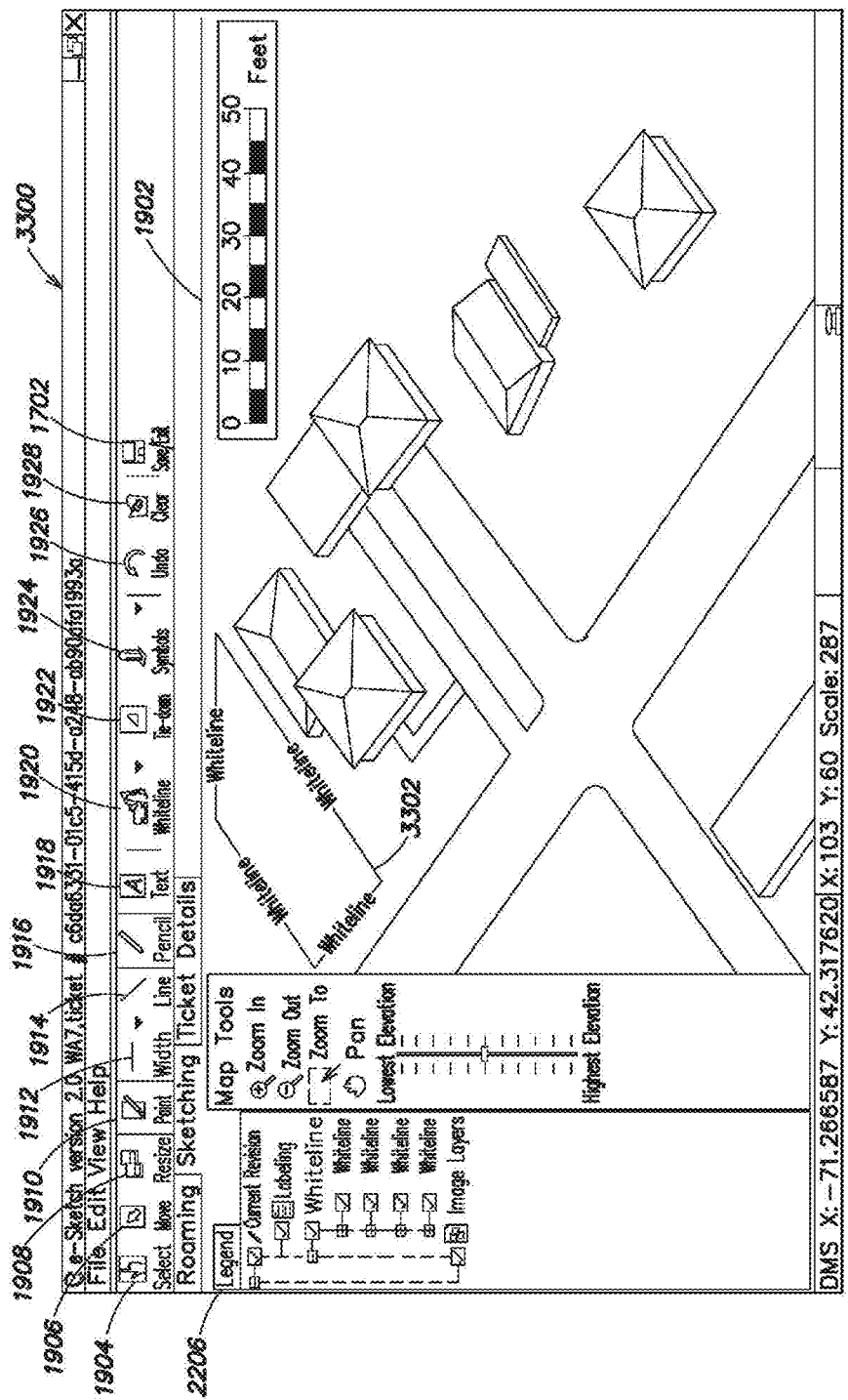
FIG. 33 shows a screen of the exemplary user interface including white lines overlaying an input image.

As discussed in connection with FIG. 19, one of the line types that may be selected when the application is in sketching mode is "white line." White lines may be created on either a displayed input image or on a bare grid by selecting the line type icon 1920 and "white line" from the drop down menu, and then rendering the white lines using the line or pencil tools associated with icons 1914 and 1916. FIG. 33 shows a screen 3300, wherein the input image 1902 includes white lines 3302 thereon. White lines formed using paint or other materials are conventionally used at dig sites to designate a dig area. A user may create white line representations as part of the electronic record to recreate physical white lines that are present at the dig site. As with other types of lines, tie-downs associated with the white line representations may be created and/or required.

The marked-up images and/or grids described herein may be saved as part of an electronic record. As described in connection with FIG. 17, the save/exit icon 1702 may be used to initiate a save operation. The marked-up images and/or grids may be saved in a number of formats. For example, the digital representations of the marked-up images and/or grids may be saved separately from the images or grids themselves (e.g., in an associated data file), or as metadata thereof.

It may be necessary to determine the extents of an image and/or grid to be saved. According to one exemplary method for determining the extents of an image, the centroid of the digital representations formed on the image and/or grid are first determined. Next, the extents of the digital representations are determined using the centroid as a reference point. For example, the extents of the digital representations may comprise a pair of coordinates (e.g., $-x,-y$ and $+x,+y$) that define the smallest rectangle fully encompassing the digital representations. This rectangle may be referred to as the "mark-up rectangle." Thereafter, the area of the mark-up rectangle may be compared to a predetermined minimum area, referred to as the "minimum image rectangle." If the area of the mark-up rectangle is smaller than the area of the minimum image rectangle, then the image or grid may be saved using the extents of the minimum image rectangle. Alternatively, if the area of the mark-up rectangle is greater than the area of the minimum image rectangle, then the image or grid may be saved using the extents of a "buffered mark-up rectangle" that comprises the mark-up rectangle with a buffer region therearound.

In some cases, a locate technician will not identify any underground facilities during a locate operation. This is generally referred to as a "clear." In this case, although there are no underground facilities to be identified on an input image or grid, the application may be configured to require at least one digital representation on the input image or grid (e.g., a text box including the designation "clear") to permit a save operation. Alternatively, the application may be configured to require some other indication that the dig area was cleared (e.g., a menu selection) to permit a save operation in cases where no underground facilities are identified on the input image or grid.

Figure 34:
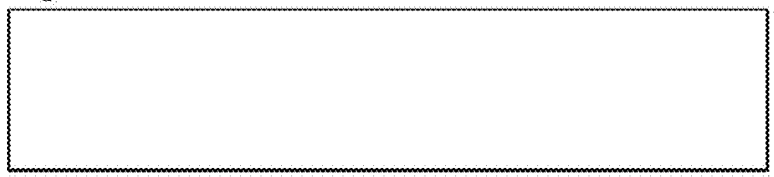
FIG. 34 shows an exemplary pop-up window of the exemplary user interface that appears when a save/exit icon is used to initiate a save operation.

FIG. 34 shows an exemplary pop-up window 3400 that appears when the save/exit icon 1702 described above is used to initiate a save operation. The window 3400 includes a ticket details area 3402 that may identify the ticket number, locate technician number, and date and time that the electronic record was saved. The window 3400 also includes a location information area 3404 that may identify the latitude and longitude coordinates where the locate operation was performed and/or where the electronic record was saved. In addition to being displayed for a user, the information in ticket details area 3402 and location information area 3404 may be saved as part of the electronic record. The user may specify the types of marking materials used in markings area 3406. If the locate technician did not identify any underground facilities, the "clear/aerial" checkbox may be marked. Signature area 3408 is provided so that the user may sign (e.g., using a mouse or other user interface device) to certify that the information provided in the electronic record is correct.

As further described in connection with FIG. 17, the application may be configured to automatically receive current GPS coordinates from a GNSS receiver. The received GPS coordinates may be used to verify that the electronic record of the locate operation is created at or near the work site.

According to one exemplary GPS verification algorithm for performing the verification above, when the location technician creates, saves or modifies the electronic record, first data representing the current geographic location (e.g., latitude and longitude coordinates received from the GNSS receiver) is input to the GPS verification algorithm. Second data representing a location of the work site is also input to the GPS verification algorithm. The second data may comprise (1) the centroid of the input image or grid on which digital representations are formed (e.g., latitude and longitude coordinates corresponding to the centroid) and/or (2) a location of the work site as indicated in the ticket information (e.g., latitude and longitude coordinates identifying the location of the work site in the ticket information). The first data representing a current geographic location and the second data representing a location of the work site may be recorded as part of the electronic record. Using the above-identified first and second data respectively representing first and second geographic locations, the GPS verification algorithm may automatically verify that the electronic record of the locate operation is created at or near the work site.

Figure 35:
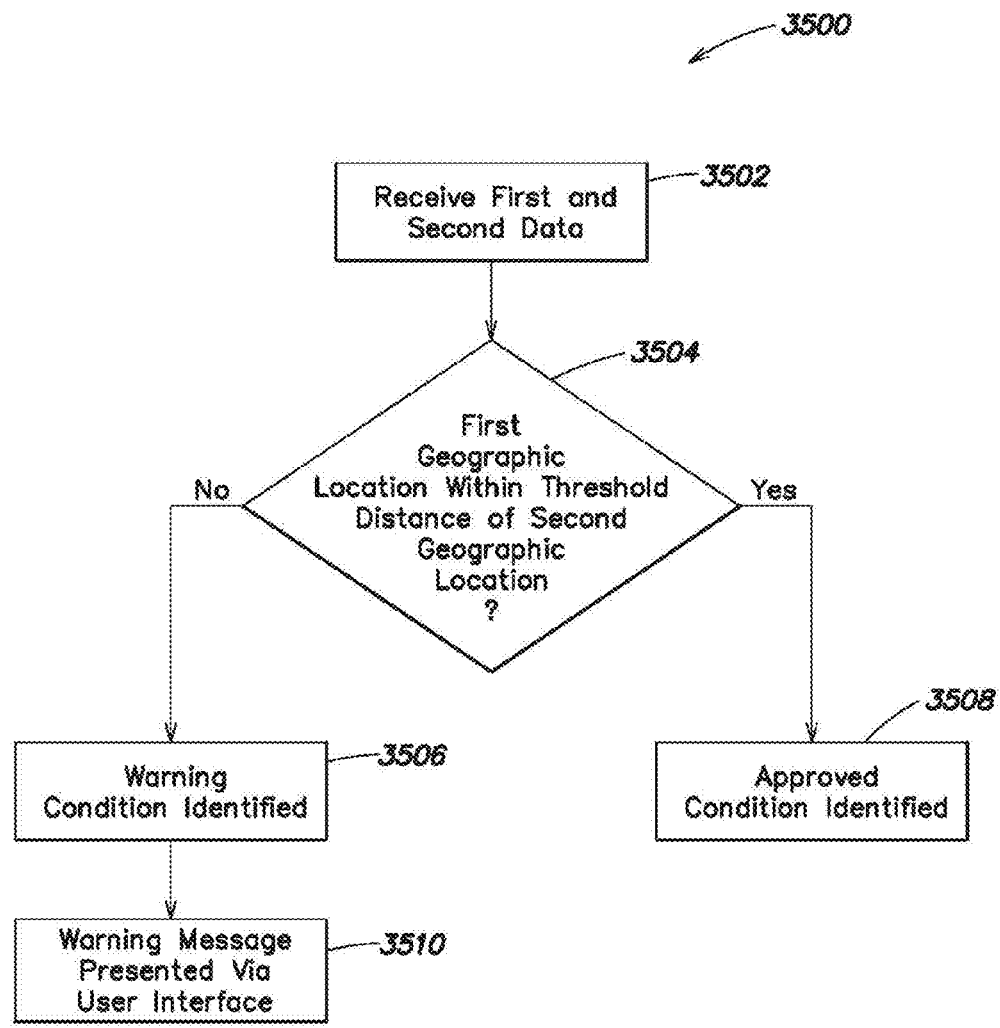
FIG. 35 shows an illustrative process that a GPS verification algorithm may perform to verify that an electronic record of a locate operation is created at or near a work site.

FIG. 35 shows an illustrative process 3500 that the GPS verification algorithm may perform. This process is similar to a process described in U.S. publication no. 2009-0327024-A1, incorporated herein by reference, which uses first, second, and third data representing three respective geographic locations to automatically assess the quality of a locate operation based on the proximity of the three locations. The process begins at act 3502, where the GPS verification algorithm receives the first and second data. The process next continues to act 3504, where the GPS verification algorithm compares the first data indicative of the geographic location at which the locate technician created, saved or modified the electronic record of the locate operation to the second data indicative of the location of the work site as derived from the ticket and/or geo-encoded input image or grid and determines whether these two geographic locations are within a threshold distance of each other. If, at act 3504, the GPS verification algorithm determines that these two geographic locations are not within the threshold distance of each other, the process continues to act 3506, where the GPS verification algorithm identifies a warning condition. If, at act 3504, the quality assessment application determines that these two geographic locations are within the threshold distance of each other, the process continues to act 3508, where the GPS verification algorithm identifies an approved condition. After act 3506, the process may continue to act 3510, where the application presents a warning alerting the user to the discrepancy between the first and second data. Such a warning may comprise a red bar with a warning message that appears at the bottom of a screen of the user interface. Additionally or alternatively, an indication of the discrepancy between the first and second data may be provided in the electronic record.

Another application for received GPS coordinates is indicating a path of a locate operation as part of the electronic record. For example, a locate technician may be provided with a GPS device, and the computer may receive from the GPS device coordinates indicating one or more locations of the locate technician during the locate operation. The user interface application may be configured to automatically represent the one or more locations of the locate technician on the input image or grid associated with the electronic record. The representations may, for example, comprise symbols or a particular line color or style indicative of a locate technician path. The representations of the locate technician path may be used by a supervisor or other entity to verify the accuracy of the electronic record.

Length-Based Analysis of Locate Marks

Other processes may be performed by the user interface application to analyze various data contained in the electronic record so as to provide information based at least in part on a length of one or more locate marks created during a marking operation and represented in a drawing associated with an electronic record. In exemplary implementations discussed below, such a length-based analysis of locate marks may be employed in a determination of costs associated with a locate and/or marking operation, and/or aspects of technician performance of the operation. For example, the data of the electronic record may be used to automatically determine a cost associated with the activities of a locate technician in a dig area. In some implementations, this type of analysis facilitates automatic billing for a locate operation based on an electronic record.

Figure 36:
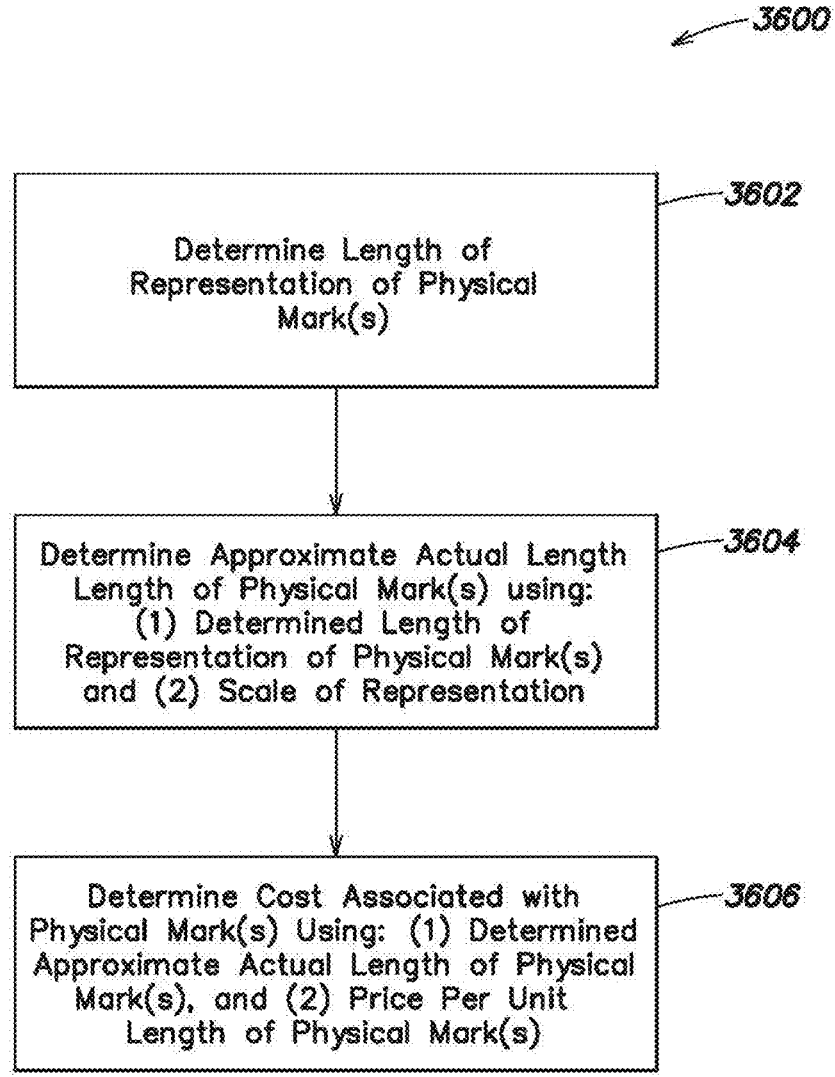
FIG. 36 shows an illustrative process for determining a cost associated with physical marks created by a locate technician in a dig area.

FIG. 36 shows an illustrative process 3600 for determining a cost associated with physical marks created by a locate technician in a dig area. The process begins at act 3602 with the user interface application determining the approximate length of the physical mark(s) represented in a drawing associated with an electronic record. According to one example, the user interface application may determine an approximate length of the physical locate marks by calculating a distance between the endpoints of each straight or substantially straight line segment (e.g., segments between vertices) of the representations of the physical locate marks and then summing the calculated distances for all of the segments. The distance between the endpoints of each line segment may be calculated using the latitude and longitude coordinates associated with each endpoint, which may be derived from the geo-location data associated with an input image and thus with the representations overlaid thereon. A known algorithm, such as the haversine formula discussed herein, may be used to calculate the distance between latitude and longitude coordinates.

Next, at act 3604, the user interface application determines the cost associated with the physical locate marks using the determined approximate length of the marks and a price per unit length of the marks. The user interface application may be preprogrammed with, or accept an input corresponding to, a price per unit length of the physical marks. Such a price may correspond to a desired charge, per unit length, for a locate technician to create physical locate marks in connection with a locate operation. The cost may be computed as a product of the approximate length of the physical locate marks, as previously determined, and the price per unit length of the physical marks.

In the example described in connection with FIG. 36, the computed cost is based on a length of physical locate marks created by a locate technician in a dig area. However, the process 3600 may be adapted to compute the cost based on additional or alternative factors. For example, the process may compute a cost associated with identifying the location of environmental features (e.g., a fire hydrant or other landmark) based on the identification of such features in a marked-up image and/or grid. As another example, the process may compute a cost associated with the creation of one or more tie-downs based on a number of such tie-downs in a marked-up image or grid. Further, different prices may be applied for different activities. For example, different prices may be associated with the marking of different types of facilities. It should also be appreciated that costs may be calculated for aspects and activities associated with the locate operation that do not involve marking. For example, the process may determine a cost for the locate operation based, at least in part, on the location of the dig area, as determined from the electronic record.

Figure 37:
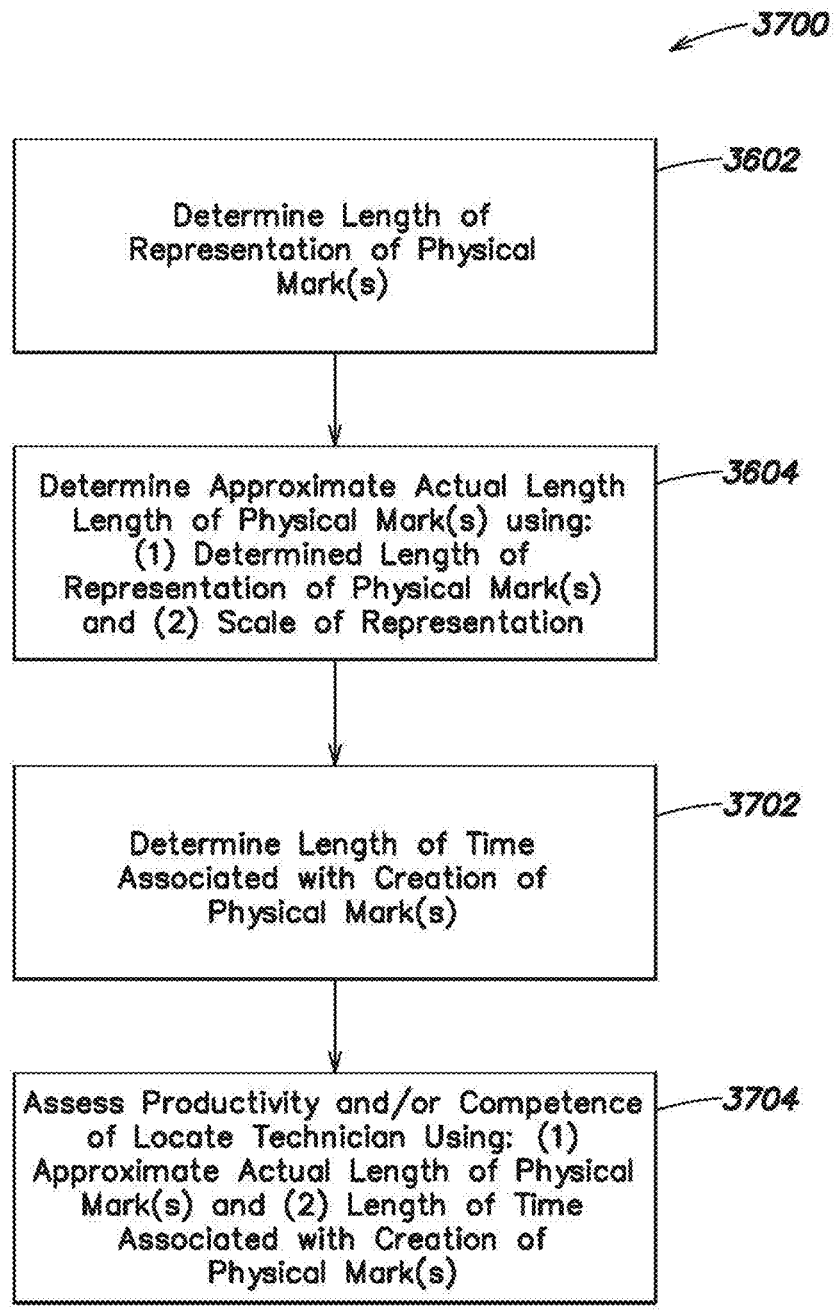
FIG. 37 shows an illustrative process for assessing the productivity and/or competence of a locate technician who performed a locate operation.

FIG. 37 shows an illustrative process 3700, according to another embodiment of the present invention, for assessing the productivity and/or competence of a locate technician who performed a locate operation, based at least in part on data relating to a drawing (e.g., a marked-up image or grid) of an electronic record. The process begins with acts 3602 and 3604, which were described above in connection with FIG. 36. In particular, the user interface application determines the length of the representation of the physical mark(s) at act 3602, and determines an approximate actual length of the physical locate marks using the determined length of the representations of the physical locate marks and the scale of the representation at act 3604.

At act 3702 of FIG. 37, the user interface application determines a length of time associated with the creation of physical mark(s). To do so, the user interface application may automatically acquire data from a data-enabled locating and/or marking device that indicates how long a locate technician spent performing a particular task or tasks. For example, the user interface application may automatically acquire data from the data-enabled locating and/or marking device that indicates an elapsed time between when a locate operation was initiated (e.g., when paint was first deposited by the device, when the device was turned on or undocked, or when the device first detected an underground facility) and when a locate operation was completed (e.g., when paint was last deposited by the device, when the device was turned off or docked, or when data from the device was uploaded to a computer).

At act 3704 in FIG. 37, the productivity and/or competence of the locate technician is assessed using the determined approximate actual length of the physical mark(s) and the determined length of time associated with the creation of the physical mark(s). First, the user interface application may divide the determined length of time associated with creation of the physical mark(s) by the determined approximate actual length of the physical mark(s) to obtain an average length of time spent by a locate technician per unit length marked. Then, the user interface application may automatically assess the productivity and/or competence of the locate technician by comparing the average length of time spent by the locate technician per unit length marked to an expected length or time or some other relative data point. Additionally or alternatively, a supervisor or other individual may assess the productivity and/or competence of the locate technician using their own knowledge or experience and/or by manually comparing reference data.

It should be appreciated that the processes described in connection with FIGS. 36 and 37 are merely exemplary and that many variations are possible. For example, the processes may be initiated by a user via the user interface application, or may be initiated automatically in response to some event (e.g., completion of the electronic record or a drawing associated therewith). In the latter case, the processes may be performed such that the user is unaware of their performance. Further, the data used to determine or estimate the length of the physical marks in the processes of FIGS. 36 and 37 may also have different possible origins. For example, the data may originate from a data-enabled locating and/or marking device rather than from user input. In addition, the processes of FIGS. 36 and 37 need not be performed in connection with a single electronic record or locate operation. Rather, data from a plurality of electronic records or a plurality of locate operations could be assessed in a similar manner to determine more general trends.

Image Processing

With respect to the exemplary digital images (e.g., digital photographs, aerial images, maps, engineering drawings, etc.) that may serve as a basis for creating an electronic manifest, according to other embodiments of the present invention a variety of image processing techniques may be employed (e.g., via the processing unit of the user device 210 executing the user interface application 337) to facilitate the creation of manifests. In exemplary aspects discussed in further detail below, such image processing techniques may be particularly helpful in situations in which the clarity and/or resolution of the image is such that features of significance relevant to documenting the locate operation via the electronic manifest are blurred or indeterminate. In such cases, image processing techniques may be used to facilitate improved feature recognition and/or detection in the image. In other examples, it may be desirable to remove objects in part or entirely from a digital image; for example, with respect to photographic images, objects such as cars, bicycles, trees, other landscape features, and the like may have been present in the scene at the time the image was acquired, but may no longer be present in the environs at the time the locate operation is conducted. In such cases, particularly if such objects interfere in some manner with the dig area and/or other elements of the electronic manifest important for appropriately documenting the locate operation, image processing techniques may be used to "erase," in whole or in part, one or more objects from the image.

With respect to image processing relating to electronic manifests, edge-detection and other image processing algorithms (e.g., smoothing, filtering, sharpening, thresholding, opacity/transparency, etc.) may be employed in connection with various types of base images to improve feature recognition and/or remove undesirable features. In some exemplary implementations, in a manner similar to that noted above in connection with image layers, multiple graphics layers (e.g., bitmap and/or vector graphics layers) may be composited over a given base image, wherein one or more graphics filters are employed for the respective graphics layers to improve one or more aspects of image quality and enable comparative viewing of original and processed image information.

With respect to lower resolution images, in some cases it may be difficult to discern the boundaries of certain environmental features of relevance to the locate operation. According to one exemplary implementation, this difficulty may be addressed by applying an edge detection algorithm to images to be displayed, and displaying the detected edges as a layer overlaying the lower resolution image. One exemplary edge detection algorithm that may be employed (e.g., as a routine of the user interface application) is the Canny edge detection algorithm, which is a known algorithm in image processing. The algorithm may generate lines along the borders of areas having strong intensity contrast. Thus, the algorithm may preserve important structural properties in the image, while filtering out less useful information.

Figure 38:
FIG. 38 shows an example of a lower resolution image that may serve as the basis for creating an electronic manifest.
Figure 39:
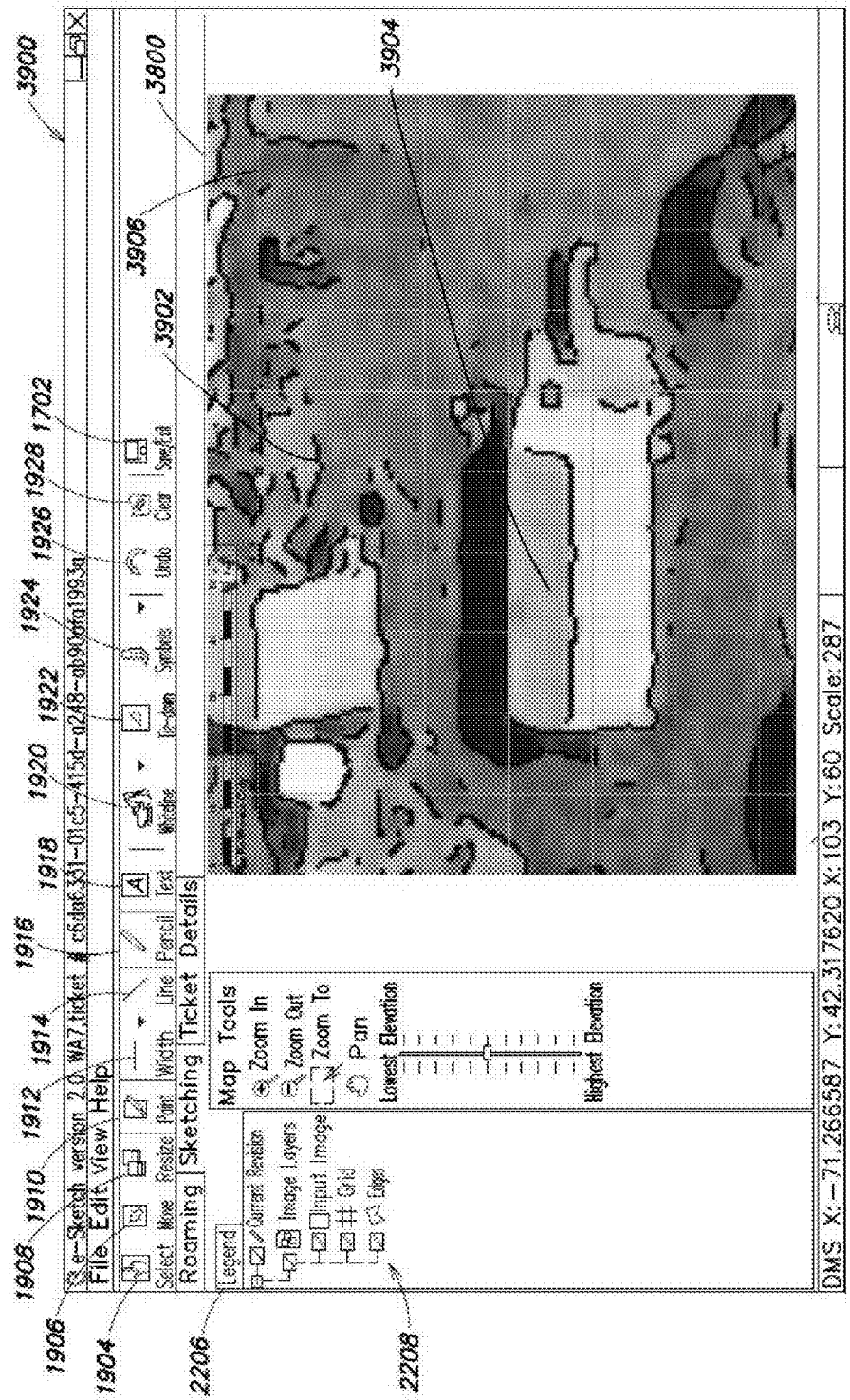
FIG. 39 shows a screen of the exemplary user interface displaying the lower resolution input image of FIG. 38 with an edges layer overlaid thereon.

FIG. 38 shows an example of a lower resolution image 3800 which may serve as a base image for an electronic manifest. FIG. 39 shows a screen 3900 displaying the lower resolution input image 3800 with an edges layer 3902 overlaid thereon, pursuant to execution of an edge detection algorithm as a routine of the user interface application. The edges shown in the edges layer assist a user in identifying boundaries, and therefore in determining the proper location of digital representations of different underground facility types (locate mark indicators, detection indicators), dig area indicators, boundary lines, symbols or other features, relative to those boundaries. The boundaries may correspond to the boundaries of structures, such as a house or garage, and/or environmental features, such as a sidewalk or body of water. In the example shown in FIG. 39, the boundaries of the dwelling 3904 are shown more clearly in the edges layer than in the underlying image, which may assist the user in marking up the image. A grid layer 3906 is also shown overlaid on the input image 3800. The edges layer 3902, the grid layer 3906 and an input image layer corresponding to input image 3800 are identified in the layers legend 2208 under the legend tab 2206. Using the check boxes associated therewith, each of the layers may be selectively hidden or displayed.

An exemplary process for creating an edges layer 3902 will now be described. In some implementations, Map Suite GIS Software (based on .NET components) available from ThinkGeo LLC of Frisco, Tex. (http://thinkgeo.com/) may be used in connection with processing and manipulation of base images for electronic manifests, and one or more libraries/applications available from AForge.NET (http://www.aforgenet.com/framework/) may be employed for various image processing functions for one or more base images.

With respect to edge detection, first, a same size, grayscale copy of the lower resolution image 3800 is created. Next, a Canny edge detection filter, such as the Canny edge detection filter available through the open source AForge.NET computer vision and artificial intelligence library (http://www.aforgenet.com/framework/features/edge_detectors_filters.html) is applied to the grayscale copy to compute edge outlines. Since the resulting filtered image will have whiter lines at the location of the edges, the gray palette of the filtered image is inverted so that the edge outlines are shown as darker lines. Additionally, an alpha component of the dark pixels may be set to implement opacity for the outline image lines. Next, a threshold filter may be applied to the filter gray-palette-inverted image to significantly reduce noise lines and pixels, and may reduce the width of the edge lines to approximately one to two pixels in width.

The threshold filtered image may then by converted to a bitmap image with a desired pixel aspect ratio and scale, and overlaid on the base image to comparatively illustrate the clarified edges (e.g., the image aspect ratio and scale of the bitmap image should match that of the original base image so that it overlays correctly at all zoom and pan settings). Factors to be considered in matching or sufficiently approximating image scales include the original scale of the base image and grayscale copy image against which the edge outlines were computed, and the ratio of the original map screen size to the current screen size.

In the example of FIG. 39, the input image 3800 is an aerial photograph; however, the input image layer may comprise any of the input images described herein. For example, the input image layer may comprise a facility map, such as the facility map 1200 of FIG. 12. As another example, the input image layer may comprise the map 1100 of FIG. 11 or another road map showing road names and/or house addresses. Further, edges layer 3902 is just one exemplary layer that may be overlaid on an input image to enhance the input image. Other image processing algorithms may be applied to an input image, and the result may be rendered in its own layer. For example, a sharpened input image or a threshold filtered input image may be rendered as a layer. The layer resulting from the image processing algorithm may be composited over the input image on which it was based or may be used in place of the original input image.

In addition, some or all of a layer (e.g., an image layer, a markings layer and/or a revision layer) may be transparent, so that when the layer is overlaid on another layer, the lower layer is still at least partially visible. The user interface application may accept parameters from a user to set the transparency of a layer.

Another issue that may arise in connection with a base image is that cars, trees or other environmental features may appear where a dig area indicator, locate mark indicator, and/or detection indicator is to be drawn or otherwise electronically rendered. In this case, it may be desirable to essentially erase the feature from the image so that the digital representation does not appear on top of the environmental feature. The user interface application may be configured to allow the input image to be manually or automatically modified so that these or other extraneous features appearing in an image may be altered. According to one example, the user interface application may include shape or object recognition software that allows such features to be identified and/or removed. One example of software capable of recognizing features in an image, such as an aerial image, is ENVI® image processing and analysis software available from ITT Corporation of White Plains, N.Y. Exemplary features that may be recognized include vehicles, buildings, roads, bridges, rivers, lakes, and fields. The user interface application may be configured such that a value indicating a level of confidence that an identified object corresponds to a particular feature may optionally be displayed. Automatically identified features may be automatically modified in the image in some manner. For example, the features may be blurred or colored (e.g., white, black or to resemble a color of one or more pixels adjacent the feature). Additionally, or alternatively, the user interface application may include drawing tools (e.g., an eraser tool or copy and paste tool), that allow such features to be removed, concealed, or otherwise modified after being visually recognized by a user or automatically recognized by the user interface application or associated software.

Figure 40:
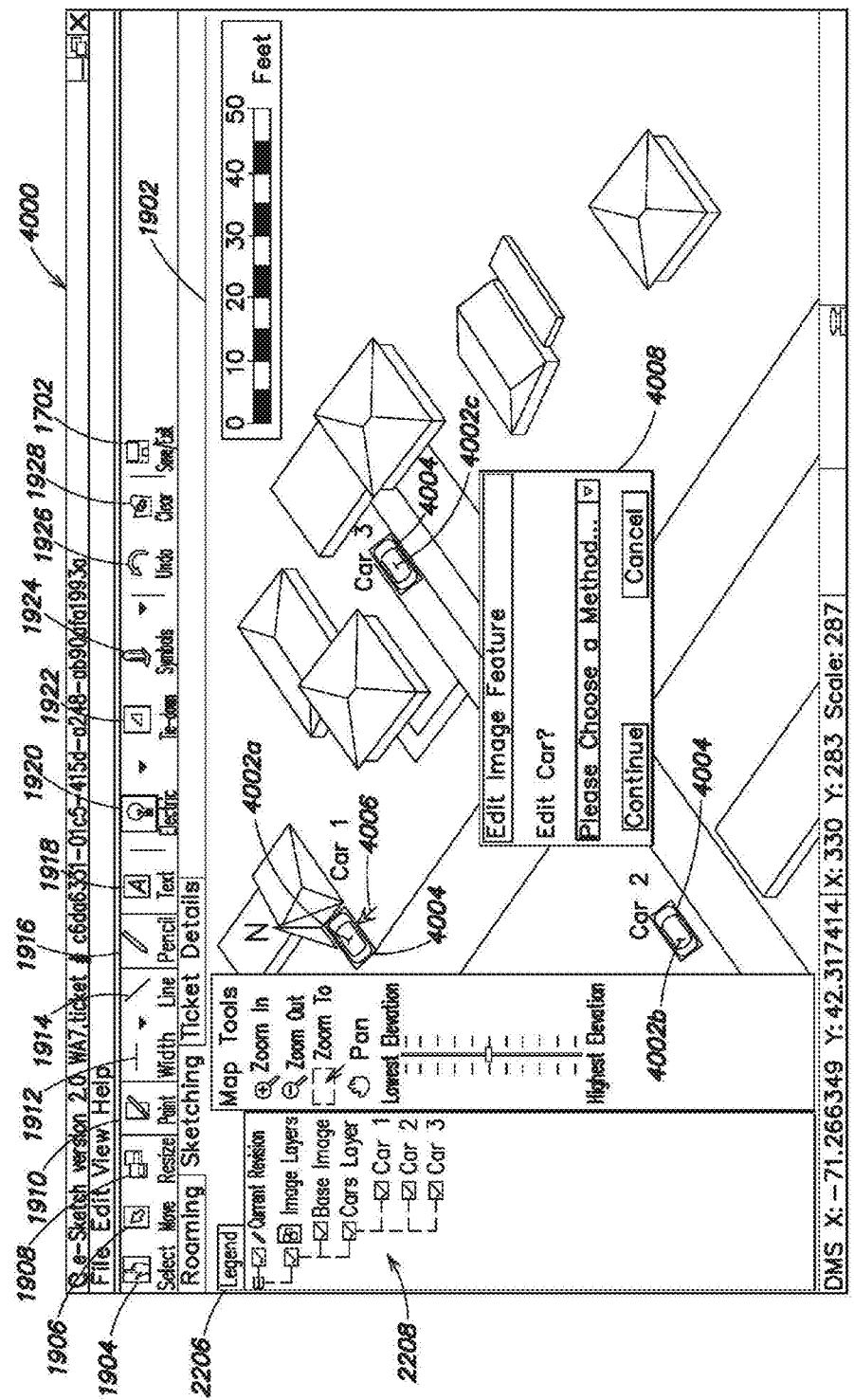
FIG. 40 shows a screen of the exemplary user interface displaying an input image including several cars identified for potential erasure.

FIG. 40 shows a screen 4000 displaying an input image 1902 including several cars 4002*a-c*. The cars 4002*a-c* are identified with lines 4004 around their perimeters. The cars may be automatically identified as discussed above or may be manually identified by a user, e.g., by using a drawing tool. In either case, the lines 4004 identifying the cars may be displayed when the "cars layer" or some subset thereof (e.g., car 1 and car 2) are activated in the layers legend 2208 under the legend tab 2206. When a user selects an identified car using a cursor 4006, a pop-up window 4008 may appear. The pop-up window 4008 allows a user to select a method of editing the selected image feature, which in the example shown is "car 1" 4002*a*. Exemplary editing methods include blurring the pixels of the image feature and coloring the pixels of the image feature (e.g., black, white, an average color of the pixels of the feature, or an average color of surrounding pixels). Upon selecting an editing method from the drop-down menu and selecting "continue," the editing effect may be automatically applied to the feature. In this manner, the car is erased or essentially erased from the input image 1902.

"Manual" Creation of Base Image

Figure 31:
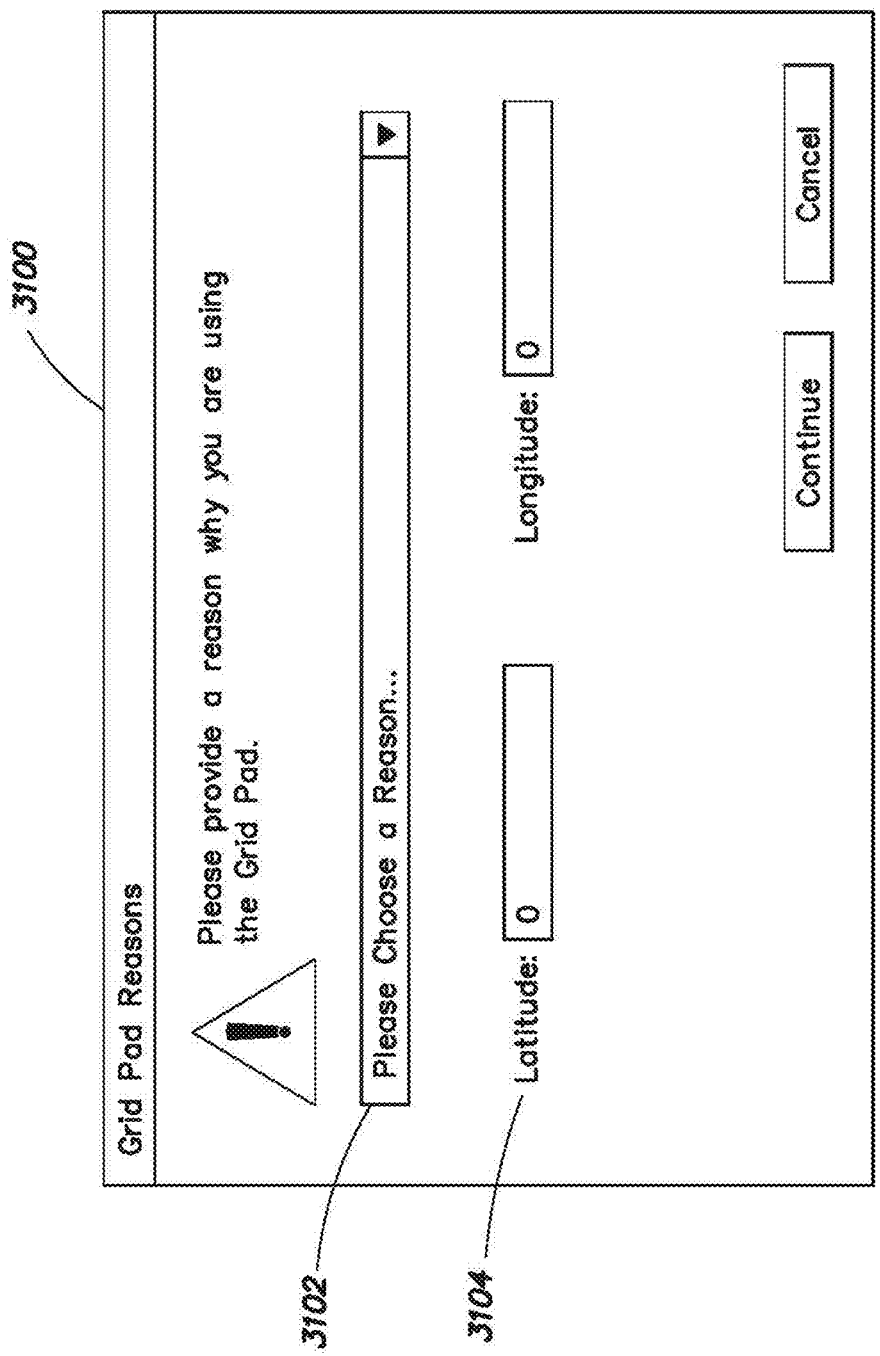
FIG. 31 shows a pop-up window of the exemplary user interface including an instruction directing a user to select a reason for using a grid pad.
Figure 41:
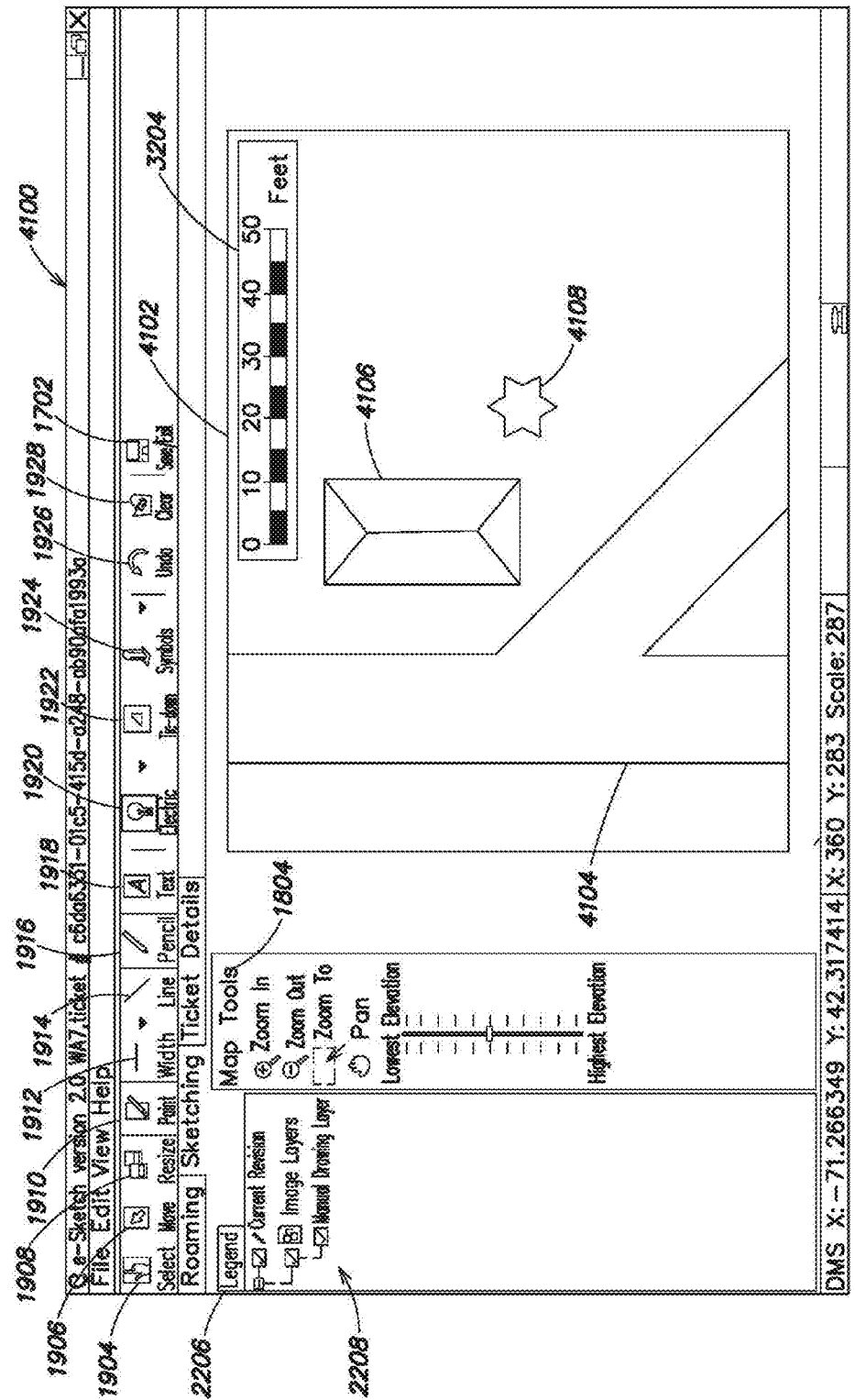
FIG. 41 shows a screen of the exemplary user interface that includes a manual drawing layer in place of an input image.

As discussed in connection with FIG. 31, an acquired input image is not required as a base on which to create an electronic manifest including various digital representations (e.g., underground facilities, environmental landmarks, tie-downs, and text boxes) as described herein. The bare grid 3202 shown in FIG. 32 is one alternative to an acquired input image. Another alternative, described in connection with FIG. 41, is that a user may create an underlying image using the drawing tools and/or symbols of the user interface application. FIG. 41 shows a screen 4100 that includes roadways 4104, a building 4106 and a tree 4108 rendered using the user interface application. For example, the roadways 4104 may be rendered using a line tool associated with icon 1914. The building 4106 and tree 4108 may be rendered using symbols selected from the drop down menu associated with the symbols icon 1924. The renderings of the roadways 4104, building 4106 and tree 4108 may be grouped as a layer referred to as a manual drawing layer 4102. This layer 4102 may be selectively enabled or disabled for display by selecting the associated check box in the layers legend 2208 under the legend tab 2206.

Figure 41A:
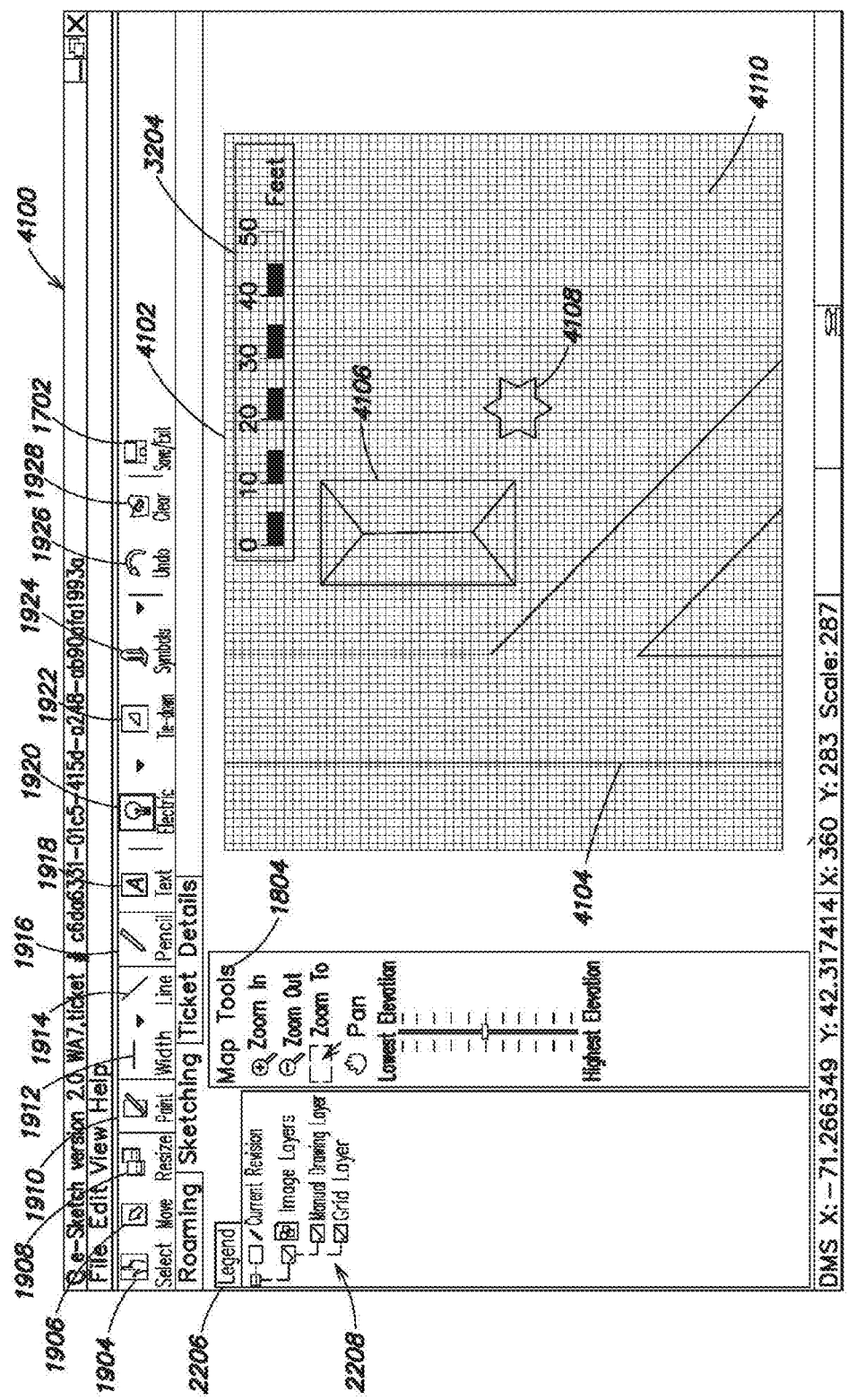
FIG. 41A shows the manual drawing layer of FIG. 41 with a grid overlaid thereon.

The user interface application may be configured such that the features of the manual drawing layer 4102 may be rendered to automatically conform to a particular scale, such as scale 3204. For example upon selection of a dwelling symbol from the drop down menu associated with the symbols icon 1924, the user may be prompted to input the dimensions or approximate size of the dwelling. Then, the user interface application may render the dwelling symbol according to the inputted dimensions or size and the scale 3204. Alternatively, the user may simply manually alter the size of the dwelling symbol with reference to the scale 3204. In either case, as the zoom tools under map tools 1804 are used to change the scale of the drawing, the dwelling symbol may automatically change in size in accordance with the change in scale. To assist a user in manually rendering the features of the manual drawing layer 4102 to conform to a particular scale, a grid layer 4110 may be displayed as shown on the screen 4112 of FIG. 41A. The grid layer 4110 may comprise a grid to which a user may refer in determining an appropriate size of the manual renderings. The scale of the grid may correspond to the scale 3204 shown on the screen 4112, such that the length of one square of the grid is equal to a length (e.g., 5 feet) shown on the scale 3204. Alternatively, the length of one square of the grid may correspond to one unit length (e.g., 1 foot) or some arbitrary length. The grid layer 4110 may be overlaid on the underlying manual drawing layer 4102. Alternatively, the manual drawing layer 4102 may alternatively be overlaid on the grid layer 4110. If the manual drawing layer 4102 is at least partially transparent, the grid will be visible even though it is below the manual drawing layer. The grid layer 4110 may be selectively enabled or disabled for display in the same manner as the manual drawing layer 4102, i.e., by selecting the associated check box in the layers legend 2208 under the legend tab 2206.

Accuracy Indicators

The representations of the physical locate marks applied to a dig area, and/or detection indicators representing geographic locations of detected facilities, are described herein in some implementations as being manually rendered by a user, e.g., using the line tools associated with icon 1914. Alternatively however, as noted earlier, the representations of detected and/or marked facilities may be rendered automatically (e.g., on a base image) to create an electronic manifest according to various embodiments of the present invention, based on data received from a data-enabled locating device and/or marking device. For example, U.S. publication no. 2010-0117654-A1, published May 13, 2010, which is incorporated herein by reference, describes how information regarding the approximate geographic location of detected and/or marked underground facilities (as well as a host of other information relating to a locate operation) may be received directly from a locating and/or marking device and rendered in a display field and, when a base image is available, overlaid on the base image. U.S. publication no. 2010-0090700-A1, published Apr. 15, 2010, which is also incorporated herein by reference, describes how information regarding the approximate geographic location of detected and/or marked underground facilities may categorized into a plurality of display layers for electronic rendering.

For GPS-enabled locating and/or marking devices, the inventors have appreciated that the accuracy of geographic information (e.g., GPS longitude and latitude coordinates) available from locate tracking systems integrated with such devices may vary from time to time, based at least in part on the availability of satellites, environmental interference (which in some instances may arise from features of the landscape in the vicinity of a locate operation), and/or positioning of the locating and/or marking device during use by a technician, for example. Accordingly, another embodiment of the present invention relates to including accuracy information in an electronic manifest that in some manner provides an indication of the accuracy of geographic information contained in the electronic manifest.

Figure 42:
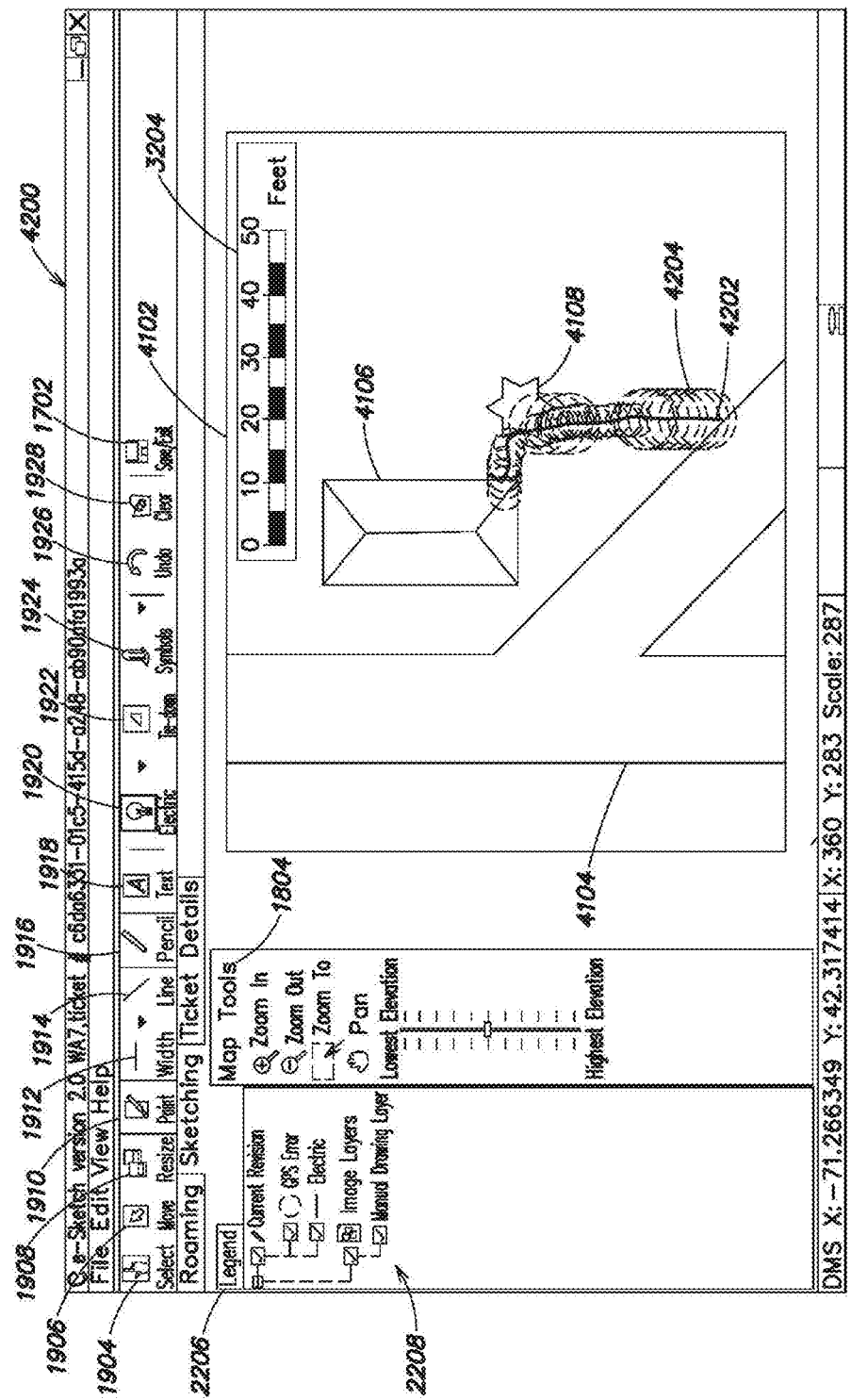
FIG. 42 shows the manual drawing layer of FIG. 41 with representations of physical locate marks based on GPS data from a locating and/or marking device and associated accuracy indications overlaid thereon.

With reference to FIG. 42, in one implementation pursuant to this embodiment, accuracy information is provided in the form of one or more accuracy indicators in a marked-up image that includes one or more locate mark indicators and/or one or more detection indicators. For purposes of illustration, the screen 4200 of FIG. 42 shows the manual drawing layer 4102 of FIG. 41 with representations of physical locate marks, rendered based on data from a GPS-enabled locating and/or marking device, and associated accuracy indicators overlaid thereon. In particular, FIG. 42 shows a series of closely-spaced locate mark indicators 4202 (e.g., representing a marked underground facility such as an electric line to the building 4106) and accuracy indicators 4204 associated with the locate mark indicators 4202. In this example, the accuracy indicators 4204 comprise dashed lines encircling respective locate mark indicators. The dashed lines represent a radius of possible error associated with the GPS-based location data for the corresponding locate mark indicator. As noted above, the accuracy indicators may be larger in instances in which environmental features (e.g., tree 4108) causes interference with a GPS signal, a number of available satellites from which geographic information may be calculated is reduced, and/or where a GPS-enabled locating and/or marking device has not yet settled, for example.

Figure 42A:
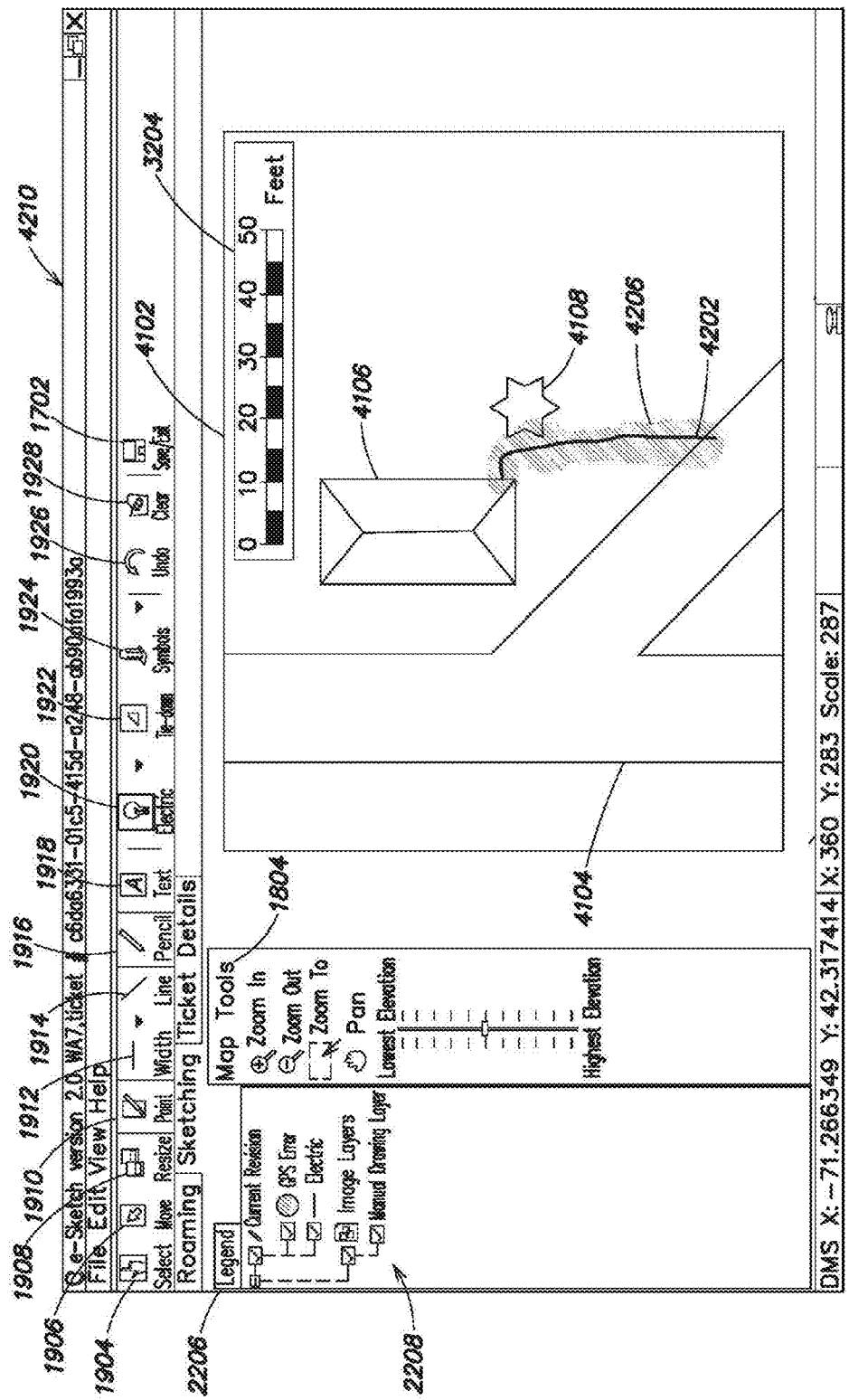
FIG. 42A shows the representations of physical locate marks shown in FIG. 42 with alternative accuracy indications overlaid thereon.

As discussed above in connection with other embodiments, according to one aspect of this embodiment the accuracy indicators 4204 may be rendered as a separate layer from the locate mark indicators 4202 to facilitate comparative viewing (i.e., the accuracy indicators and the locate mark indicators respectively may be selectively hidden or displayed by selecting the associated check boxes in the layers legend 2208 under the legend tab 2206). It should be appreciated that the dashed circular lines constituting the accuracy indicators 4204 in FIG. 42 are one illustrative example of rendering such indicators. Alternatively, for example, a range of potential error may be shown as one or more shaded regions surrounding a collection of locate mark indicators, using numeric values, or using a color code in which various colors correspond to different potential errors or ranges of potential errors. For example, FIG. 42A shows a screen 4210 in which an accuracy indicator 4206 is provided in the form of a shaded region having the same area encompassed by the circular accuracy indicators 4204 of FIG. 42. Thus, in this case, the shaded region represents a region of possible error associated with the GPS-based location data for the locate mark indicators 4202. If desired, the envelope of the shaded region may be automatically smoothed to eliminate sharp transitions.

Figure 42B:
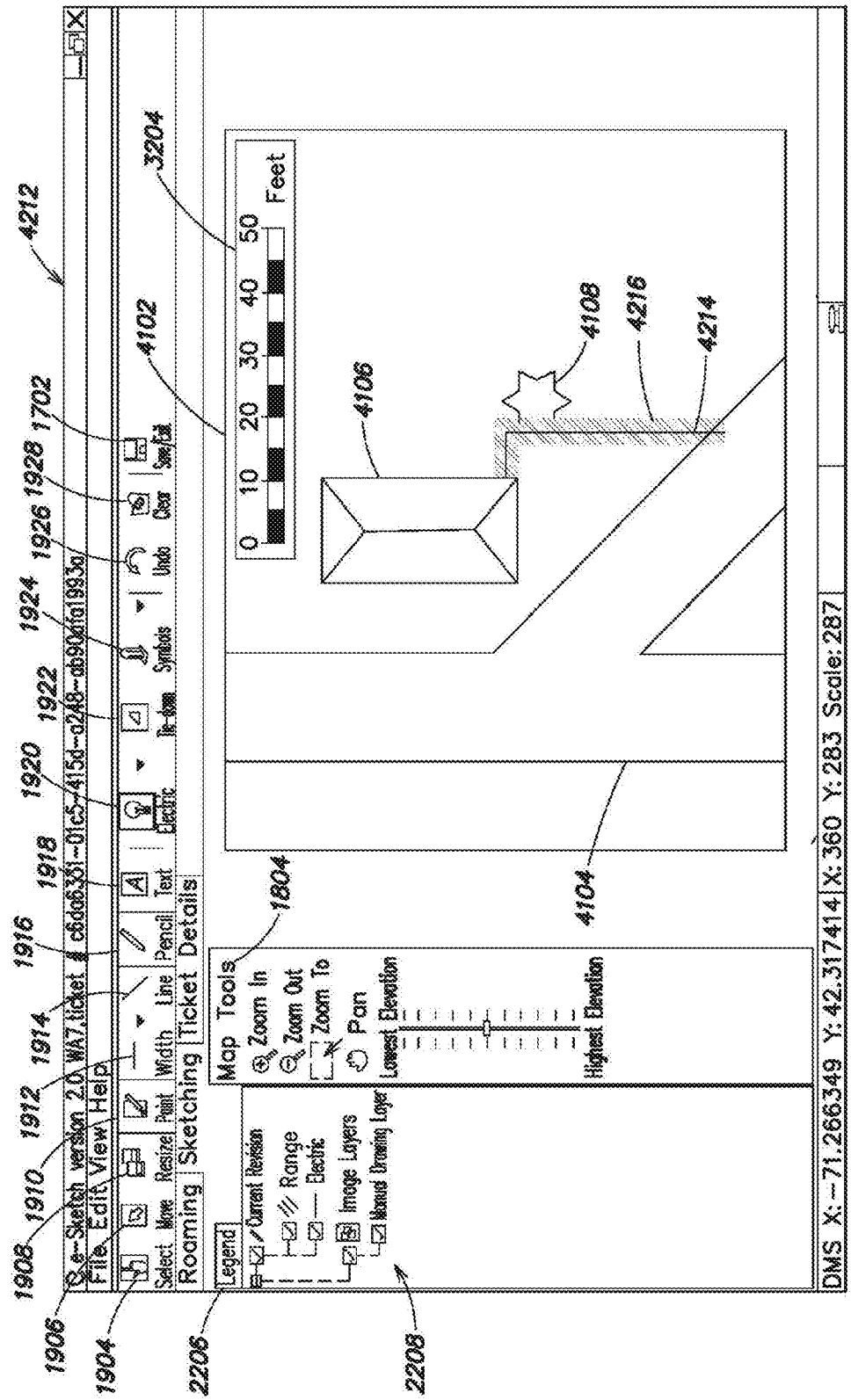
FIG. 42B shows the manual drawing layer of FIG. 41 with manually rendered representations of physical locate marks and associated accuracy indications overlaid thereon.

Accuracy indicators, such as those described above, are not limited to use in connection with automatically rendered representations of detected and/or marked facilities. Accuracy indicators may also be used in connection with manually rendered representations of detected and/or marked facilities to indicate a range of potential error associated with the representations. The screen 4212 of FIG. 42B shows the manual drawing layer 4102 of FIG. 41 with representations of physical locate marks, rendered manually by a user, and associated accuracy indicators overlaid thereon. In particular, FIG. 42B shows manually rendered locate mark indicators 4214 (e.g., representing a marked underground facility such as an electric line to the building 4106) and accuracy indicators 4216 associated with the locate mark indicators 4214. In this example, the accuracy indicators 4216 comprise dashed lines surrounding the locate mark indicators 4214 that represent a range of potential error associated with the locate mark indicators. The range of potential error may represent, for example, the area in which one may expect to find physical locate marks corresponding to the locate mark indicators. According to one example, the range of potential error is estimated by a user generating the manually rendered locate mark indicators 4214. The user may then generate the accuracy indicators 4216 in manner that represents the range of potential error. For example, the user may render the accuracy indicators 4216 as dashed lines and select an appropriate width for the dashed lines using the line tools associated with icon 1914.

Although the accuracy indicators described above are shown overlaid on manual drawing layer 4102, it should be appreciated that the accuracy indicators may be overlaid on any one or more of the base images described herein (e.g., a facilities map, an aerial photograph and/or a grid). The manual drawing layer is just one example of a base image that may be used.

Geographic Offset/Calibration Factors

Another source of possible error that may arise in connection with receiving geographic information from a locating and/or marking device and overlaying such information on a base image or grid relates to discrepancies that may exist between underlying GIS information relating to the base image or grid and the reference frame for geographic information received from the locating and/or marking device. To mitigate such discrepancies, another embodiment of the present invention relates to using one or more reference points in a dig area or more generally in the environs of a locate operation to determine a geographic offset that may be used as a calibration factor that is applied to one or both of the base image/grid or geographic information received from a locating and/or marking device.

In an exemplary scenario in which a geographic offset/calibration factor may facilitate more accurate creation of an electronic manifest, a locate technician may use a locating device and/or a marking device for a locate operation, and in so doing may recall that such a device was actuated (e.g., to acquire a signal relating to a detected magnetic field, or to dispense paint on the ground) at a particular geographic location at some point during the locate operation (e.g., at the end of a curb adjacent an edge/boundary of a driveway). However, when the technician thereafter views a displayed image on which geographic information from the device(s) is overlaid, the technician notes that there are no electronic indicators (e.g., detection indicators or locate mark indicators) on the displayed image at the end of the curb adjacent the edge/boundary of a driveway, but rather that one or more such indicators appear in the displayed image in the center of the driveway, where no detection or marking was done during the locate operation. In this situation, the technician has clear evidence that there is some discrepancy between the geographic information obtained from the locating and/or marking devices, and the geographic information on which the displayed image is based (e.g., GIS information/metadata accompanying the displayed image).

Figure 43:
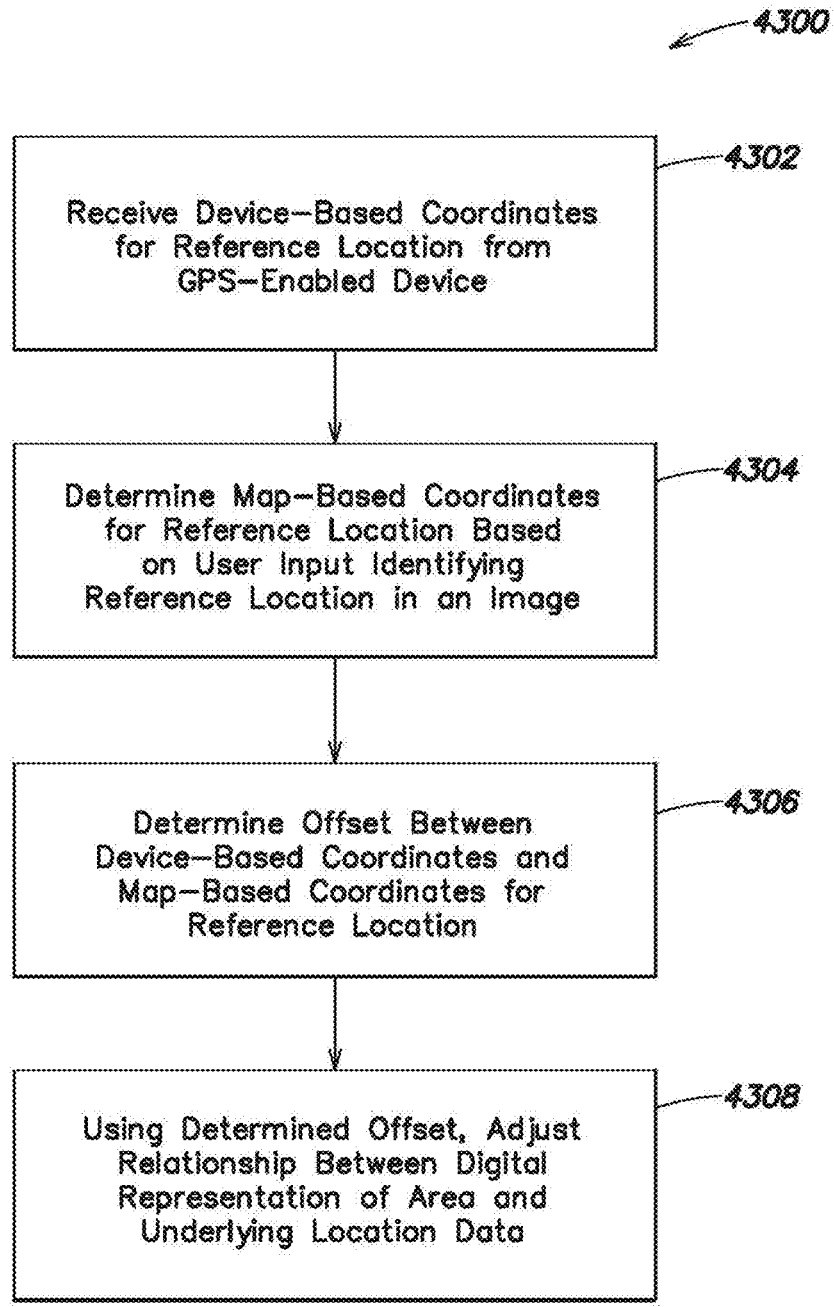
FIG. 43 shows an illustrative process for compensating for discrepancies between GPS data from a locating and/or marking device and GPS data associated with a base image for an electronic manifest.

FIG. 43 shows an illustrative process 4300 for compensating for such discrepancies. The process begins at act 4302, wherein the user interface application receives the device-based coordinates for a reference location from a GPS-enabled locating and/or marking device. For example, a GPS-enabled locating and/or marking device may be actuated at a reference location in or near the dig area or generally in the environs of the locate operation (e.g., at some point that would be expected to be displayed in a display field for an electronic manifest). A variety of features or objects may serve as reference locations for this purpose, examples of which include, but are not limited to, various natural or man-made features of the landscape, some of which may relate to utility infrastructure (e.g., curb edges at a corner, utility poles, fire hydrants, mailbox, pedestal, corner of a building, etc.). The device-based GPS coordinates at the reference location where the locating and/or marking device was actuated may be transmitted to a computer and subsequently received by the user interface application.

At act 4304, the user interface application determines the map-based coordinates for the reference location based on a user input identifying the reference location in an image. For example, the user interface may display a map, aerial image, or other image that shows the reference location and prompt a user to identify the reference location in the image (e.g., by clicking on the reference location in the image). The user interface application can then refer to underlying GPS data associated with the image to determine the map-based coordinates for the reference location. Next, the process proceeds to act 4306, in which the user interface application determines an offset between the device-based coordinates and the map-based coordinates for the reference location, which offset may serve as a calibration factor to be applied to one of the device-based coordinates and the map-based coordinates. At act 4308, the user interface application uses such a calibration factor by applying it to other geographic information obtained thereafter from the locating and/or marking device to adjust the relationship between this information and the geographic information associated with a base image on which locate mark indicators and/or detection indicators are to be overlaid.

While the example of FIG. 43 relates to determining an offset with respect to one set of GPS coordinates, it should be appreciated that a plurality of offsets may be determined in the same manner (e.g., by selecting multiple reference locations for comparison). Doing so may be helpful to establish consistency between the determined offsets. When a plurality of such offsets are determined, an average of the offsets may be calculated, and the user interface application may adjust the relationship between digital representation of area and the underlying location data based on the average offset.

The process 4300 of FIG. 43 may be initiated by a user of the user interface application. Alternatively, the user interface application may initiate the compensation process in response to some event (e.g., the receipt data from a GPS-enabled device). Once the compensation process has been performed in connection with a GPS-enabled device, data relating to the compensation parameters may be stored so that they may be applied in connection with future data received from that GPS-enabled device or, in some cases, other GPS-enabled devices.

Figure 43A:
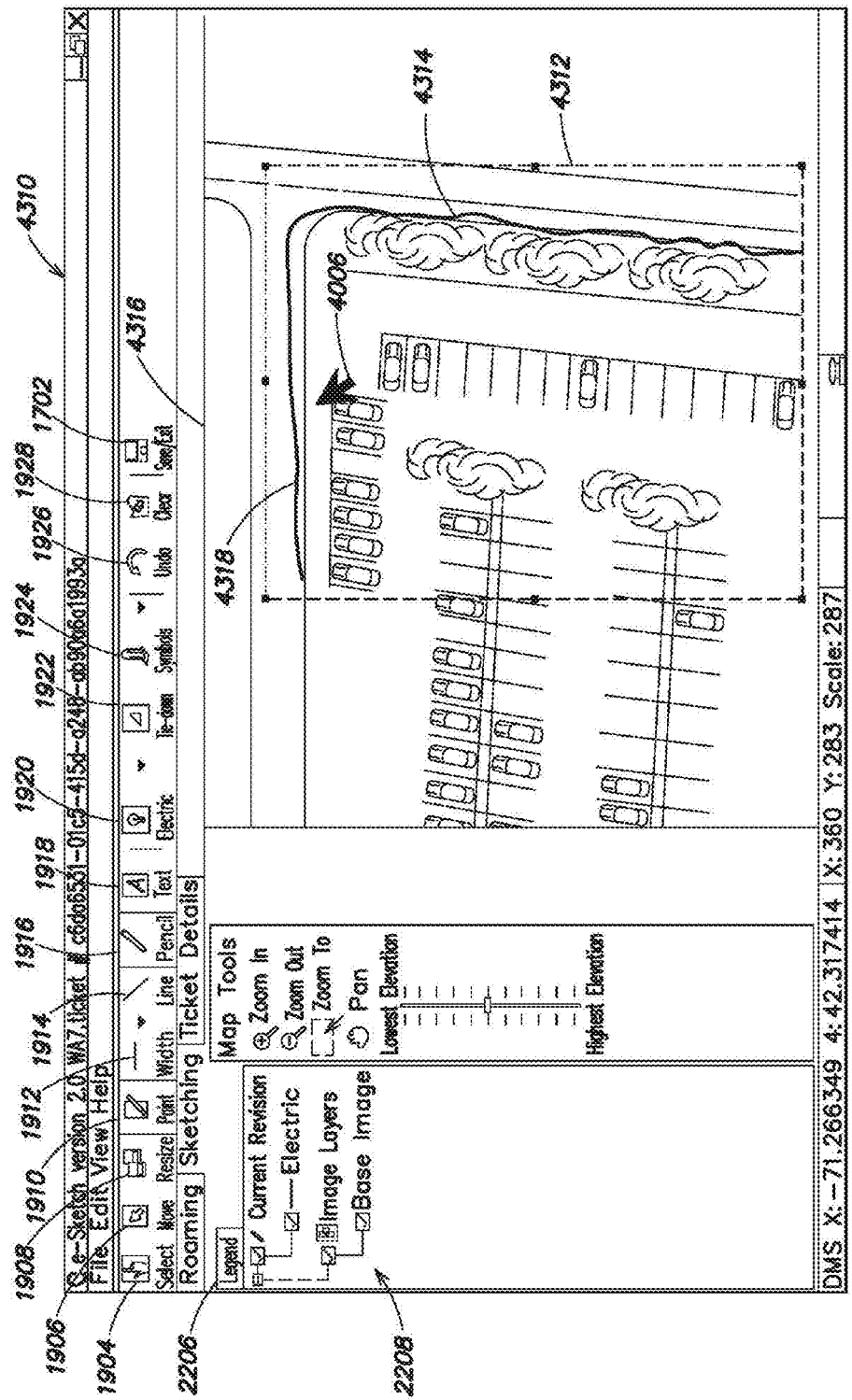
FIG. 43A shows another illustrative process for compensating for discrepancies between GPS data from a locating and/or marking device and GPS data associated with a base image for an electronic manifest in the context of a screen of the exemplary user interface.

The process described in connection with FIG. 43 is just one exemplary method for compensating for discrepancies between the geographic information obtained from locating and/or marking devices and the geographic information on which the displayed image is based. Another method for compensating for such discrepancies involves a user manually adjusting the location of locate mark indicators and/or detection indicators with respect to a base image using the tools of the user interface application. FIG. 43A provides an illustrative example. In FIG. 43A, a series of closely-spaced locate mark indicators 4314 (e.g., representing a marked underground facility such as an electric line) are shown overlaid on a base image 4316. The locate mark indicators 4314 comprise a layer distinct from the base image, as shown in the layers legend 2208 under the legend tab 2206. If a user (e.g., a technician) who created the physical locate marks recalls having made the marks along the curb 4318, but observes the locate mark indicators 4314 to be offset from the curb shown in the base image 4316, the user may manually alter the location of the locate mark indicators 4314 with respect to the base image 4316. In particular, the user may select the locate mark indicators 4314 using a lasso 4312 associated with the select icon 1904 and move the locate mark indicators to their known correct location using a cursor 4006 associated with the move icon 1906. For example, the user may drag the selected locate mark indicators 4314 downward with respect to the base image 4316 so that the locate mark indicators are closer to the curb 4318. Once this compensation process has been performed in connection with a GPS-enabled device, data relating to the relocation of the locate mark indicators 4314 (e.g., distance and direction moved) may be stored so that the same compensation may be automatically applied in connection with future data received from that GPS-enabled device or other GPS-enabled devices.

While the locate mark indicators 4314 in FIG. 43A form a continuous line, in other cases the locate mark indicators may be scattered, and it may not be clear which locate mark indicators relate to actions of the locate and/or marking operation occurring during a particular time frame. To ensure that only desired locate mark indicators are relocated, the displayed locate mark indicators may be filtered based on time prior to the select and move operation described in connection with FIG. 43A.

In yet other aspects, scattered locate mark indicators in connection with a given marking operation may be "smoothed" by running a regression through the collection of locate mark indicators and obtaining a best fit of a line through the collection of indicators. Alternatively, if via inspection of displayed information a user/technician can identify what appear to be one or more reliable locate indicators amidst scattered indicators (or obvious breaks in displayed data), the user may select a reliable first indicator and a reliable second indicator, draw a line through these points, and select one or more additional points on this line as substitute indicators. For example, in a marking operation involving the presence of trees, a technician may obtain a series of reliable GPS readings until passing under a tree, at which point scattered or no GPS readings are acquired. In a resulting image after processing, one or more reliable indicators on either side of the tree may be connected via line to replace the scattered/missing data in the vicinity of the tree.

Since the initial location of the locate mark indicators in the discussion above reflects the data as it was received from the GPS-enabled device, it may be desirable to only allow modification of a copy of the locate mark indicators such that the data reflecting the original location of the locate mark indicators may be preserved. One exemplary method for doing so in the examples above is to lock (e.g., write-protect) the displayed layer and create a revision layer, as discussed in connection with FIG. 23, that is freely modifiable by a user. Thus, the first layer may include the raw GPS data and the second "revision" layer may include a "cleaned up" (e.g., error corrected) version of the raw GPS data.

Overlaid Digital Media

A locate technician or other individual associated with a locate and/or marking operation may store photographs, movies, sound clips and/or other digital media that capture aspects of a locate and/or marking operation or the environment of the dig area. For example, the locate technician may use a camera to capture a digital photograph of a fire hydrant representing a landmark in the dig area. The locate technician may then store the digital photograph on the user device 210, for example by transferring the digital photograph thereto from a memory associated with the camera or by directly saving the digital photograph on the user device.

Figure 44:
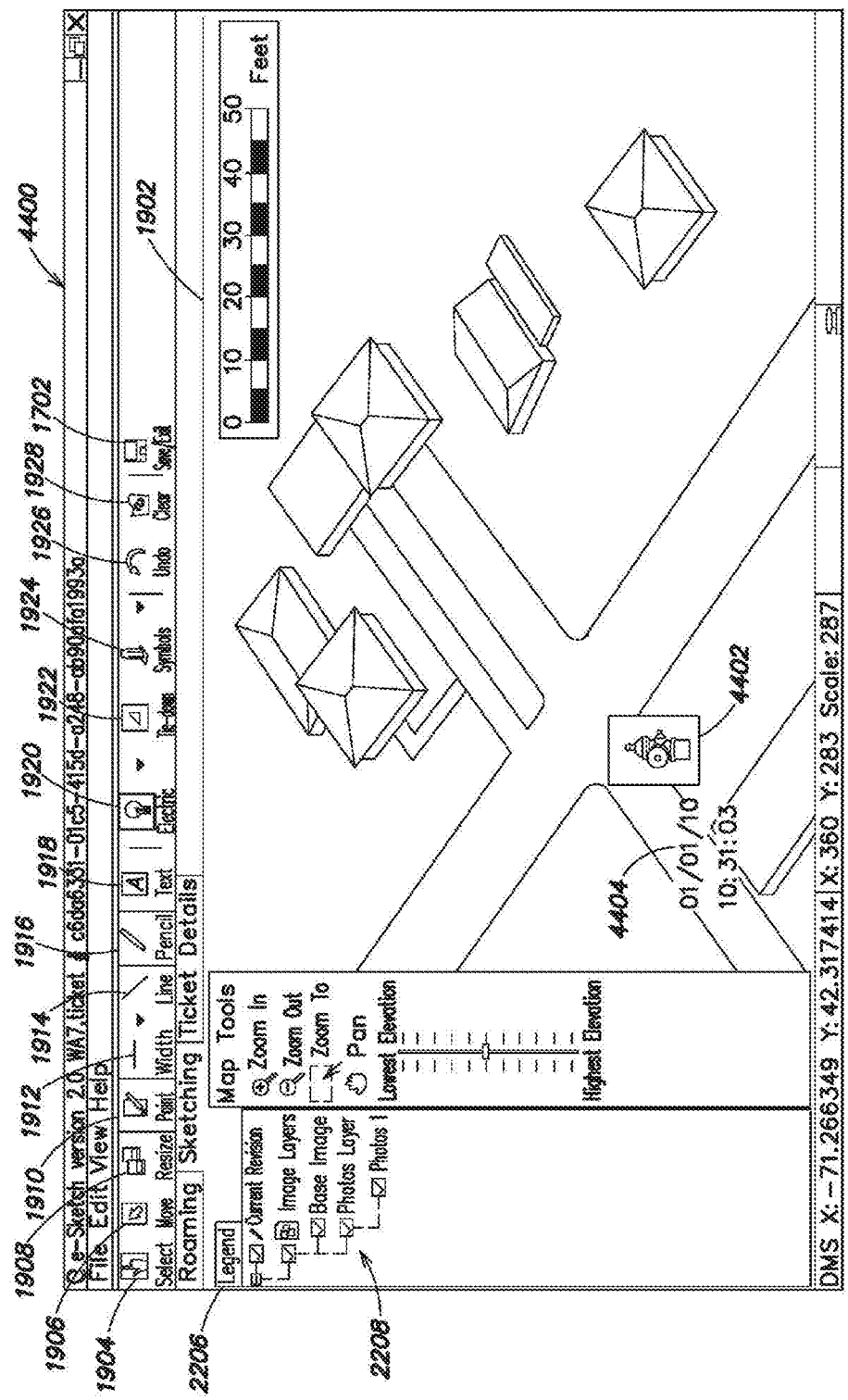
FIG. 44 shows a screen of the exemplary user interface displaying an input image with a photograph of an environmental feature overlaid thereon.

It may be desirable to display the digital media or a representation thereof in the context of a representation of the locate and/or marking operation. FIG. 44 shows a screen 4400 displaying an input image 1902 with a photograph 4402 of an environmental feature, in this case a fire hydrant, overlaid thereon. A label 4404 identifying a time and/or date at which the photograph was captured may be displayed in connection with the photograph 4402.

The photograph 4402 may be overlaid on the input image 1902 at the location where the photograph was captured.

According to one example, the user manually places the photograph on the input image 1902 at the approximate location where the photograph was captured. The user may retrieve the photograph from a storage location on the user device, estimate the location depicted in the photograph, and position the photograph such that it is overlaid on the input image 1902 at the estimated location. For example, the user may drag the digital file of the photograph from a window or folder on the user device 210 to the desired location on screen 4400. According to another example, geo-location data (e.g., metadata) associated with the photograph 4402 may be used to determine the location depicted in the photograph, and the photograph may be manually or automatically positioned at that location. For example, the user device 210 may detect when a camera storing the photograph is plugged into a universal serial bus (USB) port of the user device and automatically import the photograph into the user interface application. The user interface application may automatically position the photograph 4402 with respect to the input image 1902 by correlating geo-location metadata associated with the photograph with geo-location metadata associated with the input image. In addition to being manually or automatically positioned on the input image 1902, the photograph may be manually or automatically oriented on the input image (e.g., with a particular angle corresponding to a direction in which the photograph was taken).

Display of the photograph 4402 may be selectively enabled or disabled using layers legend 2208 under the legend tab 2206. Multiple photographs or other digital media may be collectively enabled or disabled for display as a layer by selecting or deselecting a checkbox associated therewith in the layers legend 2208. In a similar manner, sub-layers comprising one or more constituents thereof may be enabled or disabled for display by selecting or deselecting an associated check box. One exemplary hierarchical digital media layers structure comprises a layer for all overlaid digital media, sub-layers for photographs, movies, sound clips, and sub-sub-layers for individual photographs, individual movies, and individual sound clips.

Enabling or disabling the display of digital media layers may be useful, for example, when multiple digital media files correspond to and are thus represented at the same location. When all of the layers for such files are enabled, the representations may be stacked. To view a particular media file representation, the layers corresponding to overlaid media file layers may be hidden by selectively disabling the layers.

A user may provide an input to the user interface application to enlarge or otherwise modify the display of the photograph 4402. For example, when a user clicks on or mouses over the photograph 4402, a pop-up window with a larger version of the photograph may appear. The user may similarly interact with representations of overlaid movies or sound clips. For example, clicking on an overlaid representation of a movie or sound clip may cause a pop-up window with playback controls for the movie or sound clip to appear.

Figure 45:
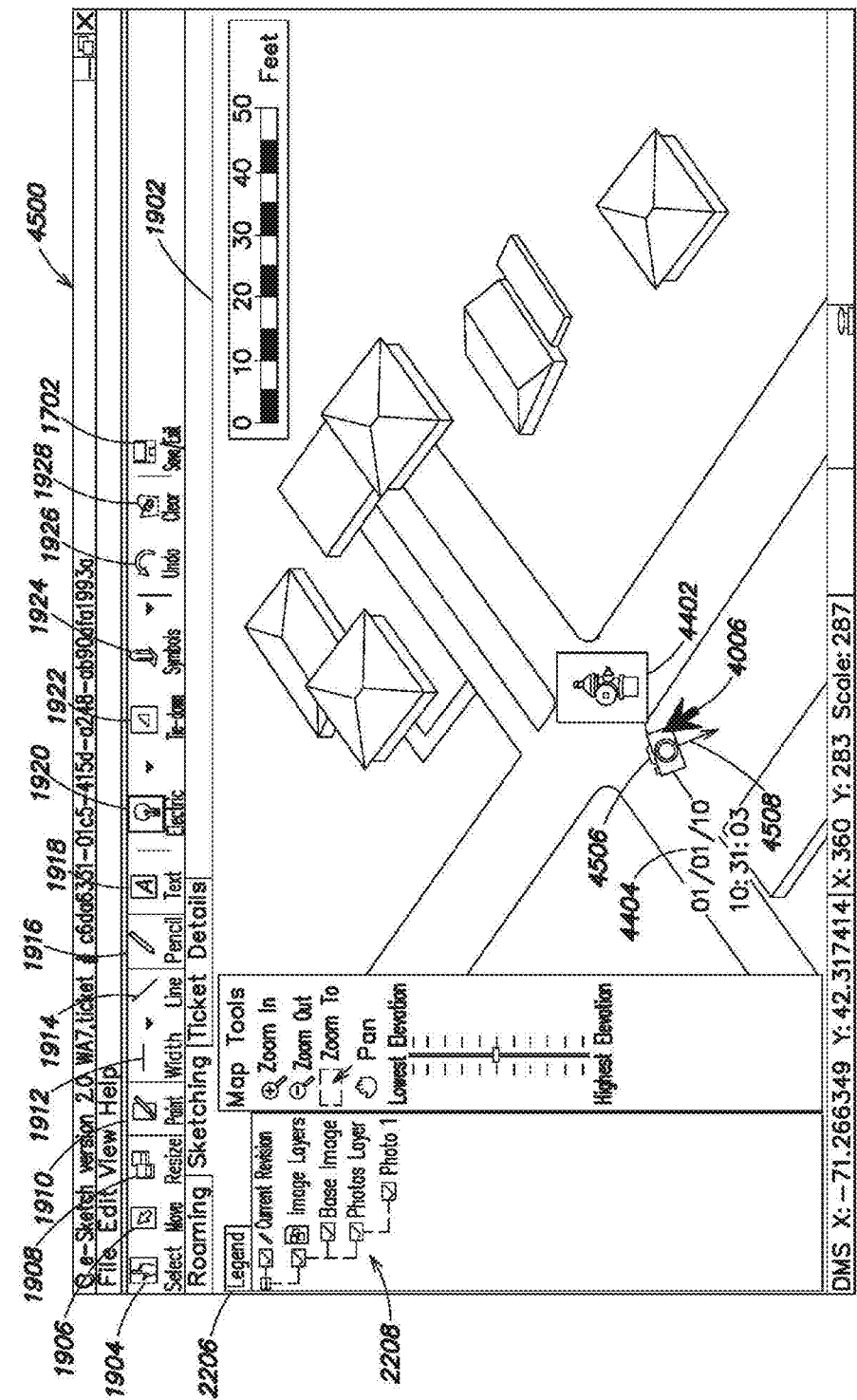
FIG. 45 shows a screen of the exemplary user interface having an interface for selectively displaying a digital media file.

Since overlaid photographs or other digital media may obscure aspects of the input image, it may be desirable to allow a user to selectively display digital media and/or associated information or controls. FIG. 45 shows a screen 4500 having an interface for selectively displaying a digital media file. In particular, FIG. 45 shows a screen 4500 displaying an input image 1902 with a camera icon 4506 overlaid thereon. The location of the camera icon 4506 with respect to the input image 1902 may indicate the location at which the photograph 4402 of FIG. 44 was captured. Using a cursor 4006, a user may mouse over or click the camera icon 4506 to cause the photograph 4402 and/or the label 4404 corresponding to the camera icon 4506 to be displayed. The rotational orientation of the camera icon 4506 may indicate the directional orientation of the camera capturing the image at the time the photograph 4402 was captured. For example, the rotational orientation of the camera icon 4506 shown in FIG. 45 indicates that the camera was facing in the direction of arrow 4508 when the image was captured.

Facilities May Layers

As discussed in connection with FIG. 39, the user interface may display multiple image layers, each of which may be selectively enabled or disabled for display. For example, in FIG. 39, an input image layer, a grid layer and/or an edges layer may be enabled for display. Another image layer that may be useful in the context of the renderings described herein is a facilities map layer.

A facilities map is any physical, electronic, or other representation of the geographic location, type, number, and/or other attributes of a facility or facilities. Facilities maps may be supplied by various facility owners and may indicate the geographic location of the facility lines (e.g., pipes, cables, and the like) owned and/or operated by the facility owner. For example, facilities maps may be supplied by the owner of the gas facilities, power facilities, telecommunications facilities, water and sewer facilities, and so on.

Facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region. One facilities map of such a set of maps is sometimes referred to in the relevant arts as a "plat."

Some types of facilities maps include a variety of electronic information, including geographic information and other detailed information, regarding the contents of various features included in the maps. In particular, facilities maps may be formatted as geographic information system (GIS) map data, in which map features (e.g., facility lines and other features) are represented as shapes and/or lines, and the metadata that describes the geographic locations and types of map features is associated with the map features. In some examples, a GIS map data may indicate a facility line using a straight line (or series of straight lines), and may include some symbol or other annotation (e.g., a diamond shape) at each endpoint of the line to indicate where the line begins and terminates. From the foregoing, it should be appreciated that in some instances in which the geo-locations of two termination or end-points of a given facility line may be provided by the map, the geo-location of any point on the facility line may be determined from these two end-points.

Examples of a wide variety of environmental landmarks and other features that may be represented in GIS facilities map data include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). GIS facilities map data may also include various shapes or symbols indicating different environmental landmarks relating to facilities, architectural elements, and/or traffic infrastructure elements.

Examples of information provided by metadata include, but are not limited to, information about the geo-location of various points along a given line, the termination points of a given line (e.g., the diamond shapes indicating the start and end of the line), the type of facility line (e.g., facility type and whether the line is a service line or main), geo-location of various shapes and/or symbols for other features represented in the map (environmental landmarks relating to facilities, architectural elements, and/or traffic infrastructure elements), and type information relating to shapes and/or symbols for such other features.

The GIS map data and metadata may be stored in any of a variety of ways. For example, in some embodiments, the GIS map data and metadata may be organized into files, where each file includes the map data and metadata for a particular geographic region. In other embodiments, the GIS map data and metadata may be stored in database and may be indexed in the database by the geographical region to which the map data and metadata corresponds.

For facilities maps in electronic form, a variety of digital formats of facilities maps may be used including, but not limited to, a vector image format that is the typical output format of computer-aided design (CAD) tools. In one example, some facilities maps may be in a DWG ("drawing") format, which is a format that used for storing two and three dimensional design data and metadata, and is a native used by several CAD packages including AutoCAD, Intellicad, and PowerCAD. However, those skilled in the art will recognize that facilities maps may be in any of several vector and/or raster image formats, such as, but not limited to, DWG, DWF, DGN, PDF, TIFF, MFI, PMF, and JPG.

As noted above, in some instances in which facilities maps are in a vector image format, a certain line on the facilities map may be represented by a starting point geo-location, an ending point geo-location, and metadata about the line (e.g., type of line, depth of line, width of line, distance of line from a reference point (i.e., tie-down), overhead, underground, line specifications, etc.). To facilitate display of facilities map information relating to multiple different types of facilities, each vector image may be assembled in layers, in which respective layers correspond, for example, to different types of facilities (e.g., gas, water, electric, telecommunications, etc.). In one aspect of such an embodiment, each layer is, for example, a set of vector images that are grouped together in order to render the representation of the certain type of facility.

Figure 46:
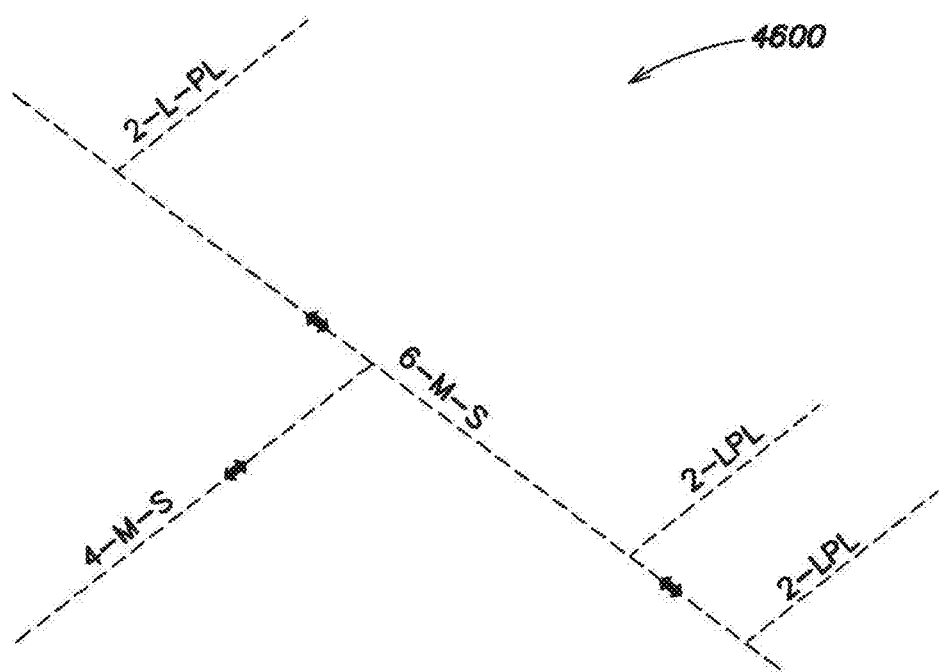
FIG. 46 shows an exemplary facility map that may be overlaid on an input image.

FIG. 12 shows an example of a visual representation of a portion of an electronic facilities map 1200. In this example, facilities map 1200 is a telecommunications facilities map that is supplied by a telecommunications company. Facilities map 1200 shows telecommunications facilities in relation to certain landmarks, such as streets and roads, using lines and shapes. As discussed above, the electronic facilities map may include metadata indicating what various lines, symbols and/or shapes represent, and indicating the geo-location of these lines, symbols and/or shapes. With respect to exemplary environmental landmarks and other features, facilities map 1200 may include both visual information (graphics and text) and metadata relating to utility poles, manholes, streets, and any of a variety of other landmarks and features that may fall within the geographic area covered by the facilities map 1200. Another somewhat more simple example of a facilities map is given by the facilities map 4600 shown in FIG. 46, representing a small portion of a water and sewer pipe infrastructure.

In some embodiments, processing unit 320 of the user device 210 (and/or the processing unit 420 of the server 220) may execute a map viewer application for displaying one or more facilities maps, which may be selectively enabled and disabled for viewing as an image layer, alone or together with other image layers. The map viewer application may be a custom application or any conventional viewer application that is capable of reading in electronic facilities maps data, and rendering all or a portion of the electronic facilities maps data/input images to an image that can be viewed in a display field of a display device. Examples of conventional map viewer applications suitable for purposes of some embodiments of the present invention include, but are not limited to, the Bentley® viewer application from Bentley Systems, Inc. (Exton, Pa.) and the ArcGIS viewer application from Environmental Systems Research Institute (Redlands, Calif.).

To appropriately display a facility map as an image layer that may be viewed concurrently with other image layers, the geo-spatial reference frame employed for geographic information underlying the respective image layers should preferably be the same. Accordingly, in some embodiments, geo-location data associated with one or both of a facility map and another image that may be viewed in relation to the facility map may be converted, if necessary to a common geo-spatial reference frame to facilitate accurate comparative viewing of the geographic information contained in the respective images.

As known in the relevant art, a geographic or "global" coordinate system (i.e., a coordinate system in which geographic locations on Earth are identified by a latitude and a longitude value, e.g., (LAT,LON)) may be used to identify geographic locations. In a "geocentric" global coordinate system (i.e., a coordinate system in which the Earth is modeled as a sphere), latitude is defined as the angle from a point on the surface of a sphere to the equatorial plane of the sphere, whereas longitude is defined as the angle east or west of a reference meridian between two geographical poles of the sphere to another meridian that passes through an arbitrary point on the surface of the sphere. Thus, in a geocentric coordinate system, the center of the Earth serves as a reference point that is the origin of the coordinate system. However, in actuality the Earth is not perfectly spherical, as it is compressed towards the center at the poles. Consequently, using a geocentric coordinate system can result in inaccuracies.

In view of the foregoing, the Earth is typically modeled as an ellipsoid for purposes of establishing a global coordinate system. The shape of the ellipsoid that is used to model the Earth and the way that the ellipsoid is fitted to the geoid of the Earth is called a "geodetic datum." In a "geodetic" global coordinate system, the latitude of a point on the surface of the ellipsoid is defined as the angle from the equatorial plane to a line normal to the reference ellipsoid passing through the point, whereas the longitude of a point is defined as the angle between a reference plane perpendicular to the equatorial plane and a plane perpendicular to the equatorial plane that passes through the point. Thus, geodetic latitude and longitude of a particular point depends on the geodetic datum used.

A number of different geodetic global coordinate systems exist that use different geodetic datums, examples of which include WGS84, NAD83, NAD27, OSGB36, and ED50. As such, a geographic point on the surface of Earth may have a different latitude and longitude values in different coordinate systems. For example, a stop sign at the corner Maple St. and Main St. may have a latitude and longitude of $(LAT_1, LON_1)$ in the WGS84 coordinate system, but may have a latitude and longitude of $(LAT_2, LON_2)$ in the NAD83 coordinate system (where $LAT_1 \neq LAT_2$ and/or $LON_1 \neq LON_2$). Thus, when comparing geographic information in respective different images, it is generally desirable to have both geographic points in the same global coordinate system.

Additionally, when determining a geographic location based on information derived from a map (e.g., a facilities map), the coordinate system provided by the map may not be a global coordinate system, but rather may be a "projected" coordinate system. As appreciated in the relevant art, representing the curved surface of the Earth on a flat surface or plane is known as a "map projection." Representing a curved surface in two dimensions causes distortion in shape, area, distance, and/or direction. Different map projections cause different types of distortions. For example, a projection could maintain the area of a feature but alter its shape. A map projection defines a relation between spherical coordinates on the globe (i.e., longitude and latitude in a global coordinate system) and flat planar x,y coordinates (i.e., a horizontal and vertical distance from a point of origin) in a projected coordinate system. A facilities map may provide geographic location information in one of several possible projected coordinate systems.

Thus, to facilitate comparative viewing of respective image layers, some of which may include one or more facilities map layers, it is desirable to have the respective image layers represented in the same geodetic global coordinate system or projected coordinate system (projected from the same geodetic geographical coordinate system). For example, in some embodiments, the geographic information underlying an input image serving as the basis for an electronic manifest may be provided as geo-location data in the WGS84 coordinate system (i.e., the coordinate system typically used by GPS equipment), whereas the facilities map information may be expressed in the NAD83 coordinate system. Thus, in one example, the geographic information underlying an input image may be converted to the NAD83 coordinate system so that the input image (as one image layer) and the facilities map (as another image layer) may be viewed comparatively. Of course, it should be appreciated that the example of coordinate system conversion from WGS84 to NAD83 is provided primarily for purposes of illustration, and any suitable conversion may be implemented to facilitate comparative viewing of multiple image layers.

Allowing a facilities map layer to be selectively displayed together with an input image serving as a basis for an electronic manifest, and/or a representation of a locate and/or marking operation (e.g., a manually, semi-automatically, or automatically created electronic manifest) provides a number of potential benefits. For example, displaying a facilities map together with a rendering of a locate and/or marking operation allows a user to visually verify whether representations of locate mark indicators, detection indicators, or other features appear in expected locations based on the locations of one or more facilities indicated in a facilities map.

Figure 47:
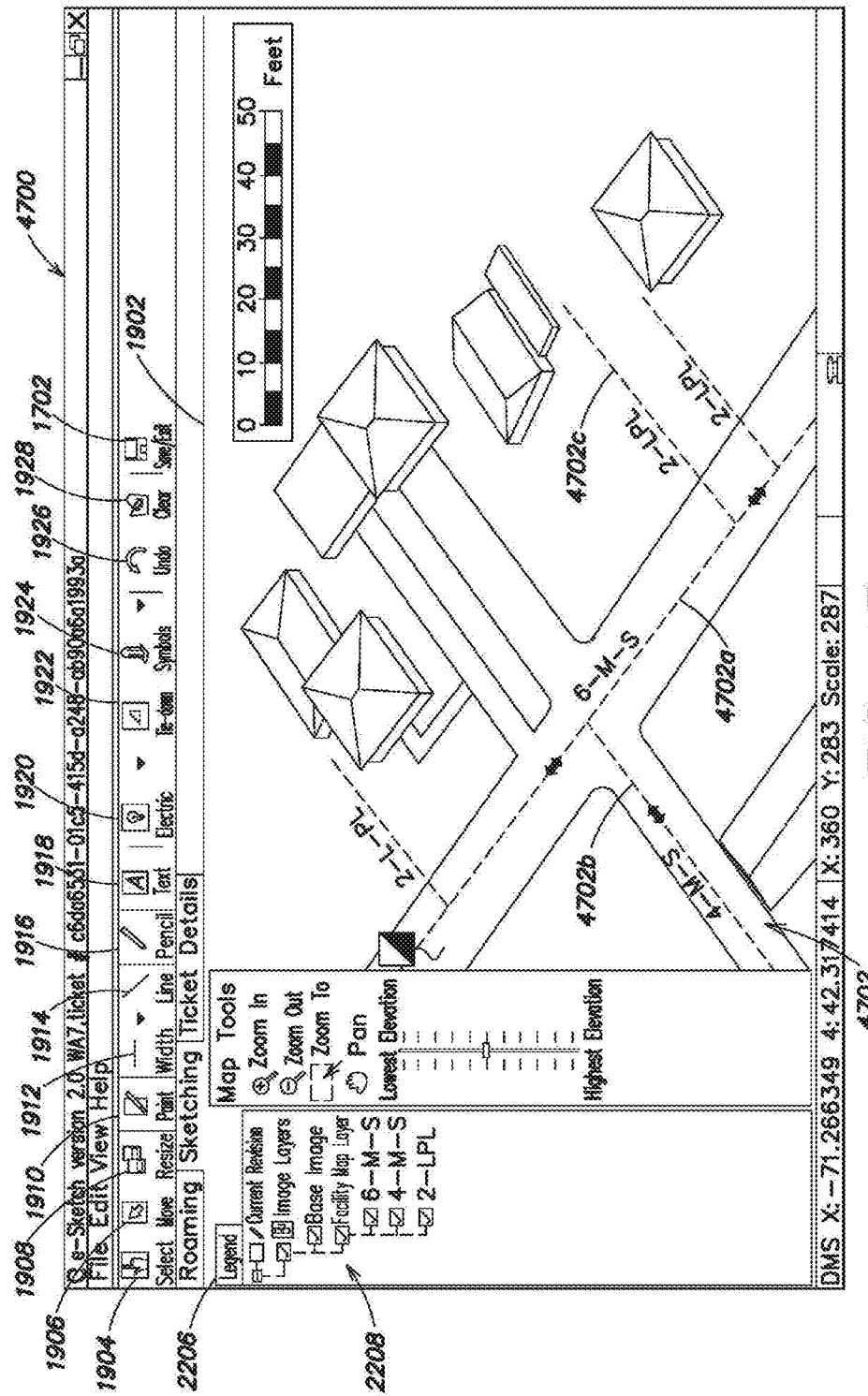
FIG. 47 shows a screen of the exemplary user interface displaying an input image with the facility map of FIG. 46 overlaid thereon.

FIG. 47 shows a screen 4700 of the exemplary user interface displaying an input image 1902 with a facilities map layer 4702, including the facilities map 46 of FIG. 46, overlaid thereon. The facilities map layer 4702 includes three sub-layers 4702*a*, 4702*b* and 4702*b*, which allow subsets of the facilities map layer to be selectively enabled or disabled for display. If the facilities map layer 4702 comprises a facilities map showing underground water pipes, for example, each sub-layer may correspond to a water pipe having a particular diameter. The sub-layers are identified in the layers legend 2208 under the legend tab 2206 and may be selectively enabled or disabled for display using the check boxes associated therewith.

As with the other layers described herein, the facilities map layer 4702 may be made partially transparent so that features that would otherwise be obscured by the facilities map layer 4702 may be viewed. The degree of transparency of the facilities map layer 4702 may be varied based on user input to the user interface application (e.g., an input specifying a desired degree of transparency). Facilities map layer 4702 may also be entirely hidden by disabling the layer in the layers legend 2208.

Limited Access Files for Electronic Manifests

In some instances, it may be desirable for a single entity or a limited number of entities to retain control over the status or other information relating to a locate operation. For example, it may be desirable for the entity that provides access to an electronic manifest (EM) creation application (e.g., the user interface application 337) and has initial control of one or more created EM images (e.g., marked-up image 905 of electronic manifest 900) and/or the entire electronic manifest itself to retain control of the images/manifest. One potential benefit of retaining control of the electronic manifests and/or image information contained therein is avoiding unauthorized edits to or unauthorized use of the image(s)/manifests.

According to one example, a "controlling" entity that provides access to an EM creation application (e.g., the user interface application 337) retains control of one or more created images and/or manifests, but allows other entities to access the images/manifest in some instances in a limited manner. For example, the controlling entity may provide a link (e.g., a hyperlink) to one or more EM images or the entire manifest(s) (e.g., via an e-mail) or otherwise provide an interface allowing the EM image(s)/manifests to be accessed (e.g., via a customized or proprietary image viewing application). Such a link may have a pre-established expiration date, such that clicking on the link will not access the EM image(s)/manifests after the specified expiration date. To maintain the integrity of the EM image(s)/manifests, the application providing access to the EM image(s)/manifest may prohibit copying of, saving of, or writing to the images/manifests. For example, the EM image/manifest may be viewable only using a corresponding image file viewer that allows limited access to the EM image/manifest. In particular, copy, save and/or write access to the EM image/manifest may be prohibited. In these and other respects discussed below, one or more EM image files, or one or more files for a complete manifest, may be stored and/or transmitted as "limited access files."

The EM image/manifest may, for example, be transmitted to a party associated with the at least one underground facility with the corresponding image file viewer so that the party may view the EM image/manifest. For example, an executable file comprising the EM image/manifest and image file viewer may be transmitted (e.g., a customized image viewer may be transmitted to one or more onsite computers). Alternatively, the image file viewer may be downloaded/installed separately, e.g., from a web site of the controlling entity, or the EM image/manifest may be viewed using an image file viewer stored and executed on a server of the controlling entity.

In one implementation, the controlling entity may allow access to the EM image(s)/manifest(s) only when a certain condition or conditions are met. For example, the controlling entity may require a password protected log-in procedure for access to the EM image(s)/manifest(s). In particular, the image file viewer may require a password to permit access. According to one implementation, the image file viewer may be programmed to require an indication of acceptance of terms and/or conditions prior to permitting access to the EM image(s)/manifest(s). According to yet another example, the controlling entity may charge a fee for permitting a third party to access one or more EM images/manifests, such as a per-transaction fee or a subscription fee.

To prevent access to the EM image/manifest unless or until a condition or conditions are met, the EM image/manifest may be encrypted and require decryption to be readable. A corresponding image file viewer may be required to decrypt the EM image/manifest. The EM image/manifest and/or the corresponding image file viewer may also or alternatively be proprietary, and may have a format specific to the controlling entity. The image file viewer may optionally be programmed to determine whether an updated version of the image file viewer is available. For example, the image file viewer may interrogate information associated with the EM image/manifest to determine a corresponding version of the image file viewer. If an updated version is found, the viewer may prompt the user to upgrade the application or otherwise facilitate an update.

The EM image/manifest may be transmitted in a variety of different formats. For example, the EM image/manifest may be transmitted as an image including locate mark indicators, detection indicators, and/or landmark indicators thereon. Alternatively, the EM image/manifest may be transmitted as a base image with associated metadata and/or a separate file (e.g., an XML file) including information that allows the locate mark indicators, detection indicators, and/or landmark indicators to be rendered on or in connection with the base image. Such information may comprise geographic coordinates specifying the respective indicators to be displayed on the base image. The information included in the metadata and/or separate file may also specify access permissions for the respective indicators. For example, in the case where the information that allows locate mark indicators to be rendered relates to a plurality of dig sites, locate mark information for one or more dig sites may have restricted access such that the corresponding locate mark indicators are not rendered unless certain access conditions are met.

While the status information described above as being stored and/or transmitted as a "limited access file" corresponds to one or more EM images/manifests, the same principles may be applied to other types of image-based or non-image files to limit the access to the status information. For example, access to the data set 700 described in connection with FIG. 7 may similarly be limited.

CONCLUSION

Aspects of the invention as described herein enable retrieving from a database the appropriate input image of a specific geographic location, or dig area, where locate operations are to be conducted for underground facilities. The user may draft, on the retrieved image, a variety of features, including but not limited to (1) the type of underground facilities marked and/or detected using an appropriate color or other coding schema, (2) the number of underground facilities marked and/or detected within the dig area, (3) the approximate geographic location of each set of underground facility locate mark indicators and/or detection indicators, and (4) the appropriate environmental landmark offsets for each set of underground facility locate marks. The combination of the retrieved image and additional information drafted by the user may be saved in a variety of formats as an electronic manifest. Other information regarding the specific geographic location of the locate mark indicators, detection indicators, and/or environmental landmark indicators may be incorporated into the electronic manifest using direct input from GPS-enabled positioning tools and the like. Various displayed information may be categorized as multiple display layers for selectively hiding and displaying certain types of information to facilitate comparative viewing. If no base image is available, a grid system and/or manual drawing tools may be used to generate a basis for creating an electronic manifest.

The foregoing description is not intended to be exhaustive or to limit the description to the precise form disclosed. Modifications and variations are possible in light of the above disclosure or may be acquired from practice of the invention.

For example, certain information was described as being presented visually on a screen of user device 210. In other implementations, this information may be audibly provided to the user. Also, particular information was described as being input via an input device 340, such as a screen of user device 210. In other implementations, this information may be provided in other ways, such as by receiving inputs via input keys and/or buttons, by recognizing speech of the user, or by monitoring a condition of the user. More particularly, the input device 340 may be capable of capturing signals that reflect a user's intent. For example, the input device 340 may include a microphone that can capture a user's intent by capturing the user's audible commands. Alternatively, the input device 340 may interact with a device that monitors a condition of the user, such as eye movement, brain activity, or heart rate.

As another example, certain components, such as user device 210 and central server 220 were described as using an image cache. In other implementations, user device 210 and/or central server 220 may communicate with an image server (such as imager server 230) in real-time, so that no image cache may be required. In still other implementations, the user device 210 may, for example, communicate in real time with the central server 220.

As another example, it should be noted that reference to a GPS-enabled device is not limited to GPS systems only, and that any global navigation satellite system or other system that provides geo-spatial positioning may be used in implementations of the invention.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for managing and displaying information relating to a marking operation to mark a presence or an affirmative absence of at least one underground facility, the method comprising:
    A) electronically storing first information relating to a first electronic rendering of the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag;
    B) accepting from at least one user interface at least one user input relating to a modification of the first electronic rendering;
    C) electronically storing second information relating to a second electronic rendering of the marking operation, wherein the second electronic rendering is based at least in part on the at least one user input relating to the modification of the first electronic rendering; and
    D) providing for independent enabling or disabling for display, via the at least one user interface, of (i) at least one first layer constituting at least part of the first electronic rendering, and/or (ii) at least one second layer constituting at least part of the second electronic rendering.

2. The method of claim 1, wherein each of the at least one first layer and the at least one second layer comprises a plurality of layers.

3. The method of claim 1, wherein:
    the first electronic rendering includes a plurality of first layers;
    the second electronic rendering includes a plurality of second layers respectively corresponding to the plurality of first layers; and
    the at least one second layer is a revised version of at least one corresponding first layer of the plurality of first layers.

4. The method of claim 1, wherein:
    the first electronic rendering includes a plurality of first layers; and
    the second electronic rendering includes a plurality of second layers respectively corresponding to only some of the plurality of first layers.

5. The method of claim 4, wherein the at least one second layer is a revised version of at least one corresponding first layer of the plurality of first layers.

6. The method of claim 4, wherein:
    the plurality of first layers includes at least one first facility layer corresponding to a first facility type; and
    the plurality of second layers does not include any layer corresponding to the first facility type.

7. The method of claim 4, wherein:
    the plurality of first layers includes at least one first facility layer corresponding to a first facility owner; and
    the plurality of second layers does not include any layer corresponding to the first facility owner.

8. The method of claim 4, wherein:
    the plurality of first layers includes at least one first facility layer corresponding to a first landmark type; and
    the plurality of second layers does not include any layer corresponding to the first landmark type.

9. The method of claim 1, wherein:
    the first electronic rendering includes a plurality of first layers;
    the second electronic rendering includes a plurality of second layers; and
    the at least one second layer does not correspond to any first layer of the plurality of first layers.

10. The method of claim 9, wherein:
    all of the plurality of first layers are included in the plurality of second layers; and
    the plurality of second layers includes at least one additional layer not found in the plurality of first layers.

11. The method of claim 1, wherein at least a portion of the first information is write-protected to prevent unauthorized modifications thereto.

12. The method of claim 1, wherein at least a portion of the first information is copy-protected information to prevent unauthorized copying, and wherein the second information does not include the copy-protected information.

13. The method of claim 1, wherein D) comprises:
    providing for independent enabling or disabling for display of only the at least one second layer such that the at least one first layer is unavailable for selective display.

14. The method of claim 1, wherein D) comprises:
    providing for independent enabling or disabling for display of both the at least one first layer and the at least one second layer to facilitate comparative viewing of the at least one first layer and the at least one second layer.

15. The method of claim 1, wherein the method further comprises:
    E) rendering for display on a display device only enabled layers of the at least one first layer and/or the at least one second layer.

16. The method of claim 1, further comprising:
    E) rendering for display on a display device a layer legend indicating the at least one first layer and the at least one second layer;

wherein D) comprises selecting for enabling or disabling for display at least one layer of the at least one first layer and/or the at least one second layer indicated in the layer legend.

17. The method of claim 1, wherein B) comprises:
limiting the scope and/or type of at least one user input relating to the modification of the first electronic rendering based at least in part on an identity or a class of a user and editing privileges associated with the identity or the class or the user.

18. An apparatus for managing and displaying information relating to a marking operation to mark a presence or an affirmative absence of at least one underground facility, the apparatus comprising:
   a memory to store processor-executable instructions;
   at least one user interface; and
   a processor coupled to the memory and the at least one user interface, wherein upon execution of the processor-executable instructions, the processor:
      A) controls the memory to electronically store first information relating to a first electronic rendering of the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag;
      B) accepts from the at least one user interface at least one user input relating to a modification of the first electronic rendering;
      C) controls the memory to electronically store second information relating to a second electronic rendering of the marking operation, wherein the second electronic rendering is based at least in part based on the at least one user input; and
      D) provides for independent enabling or disabling for display, via the at least one user interface, of (i) at least one first layer constituting at least part of the first electronic rendering, and/or (ii) at least one second layer constituting at least part of the second electronic rendering.

19. The apparatus of claim 18, wherein each of the at least one first layer and the at least one second layer comprises a plurality of layers.

20. The apparatus of claim 18, wherein:
the first electronic rendering includes a plurality of first layers;
the second electronic rendering includes a plurality of second layers respectively corresponding to the plurality of first layers; and
the at least one second layer is a revised version of at least one corresponding first layer of the plurality of first layers.

21. The apparatus of claim 18, wherein:
the first electronic rendering includes a plurality of first layers; and
the second electronic rendering includes a plurality of second layers respectively corresponding to only some of the plurality of first layers.

22. The apparatus of claim 21, wherein the at least one second layer is a revised version of at least one corresponding first layer of the plurality of first layers.

23. The apparatus of claim 21, wherein:
the plurality of first layers includes at least one first facility layer corresponding to a first facility type; and
the plurality of second layers does not include any layers corresponding to the first facility type.

24. The apparatus of claim 21, wherein:
the plurality of first layers includes at least one first facility layer corresponding to a first facility owner; and
the plurality of second layers does not include any layer corresponding to the first facility owner.

25. The apparatus of claim 18, wherein:
the first electronic rendering includes a plurality of first layers;
the second electronic rendering includes a plurality of second layers; and
the at least one second layer does not correspond to any first layer of the plurality of first layers.

26. The apparatus of claim 25, wherein:
all of the plurality of first layers are included in the plurality of second layers; and
the plurality of second layers includes at least one additional layer not found in the plurality of first layers.

27. The apparatus of claim 18, wherein at least a portion of the first information is write-protected to prevent unauthorized modifications thereto.

28. The apparatus of claim 18, wherein at least a portion of the first information is copy-protected information to prevent unauthorized copying, and wherein the second information does not include the copy-protected information.

29. The apparatus of claim 18, wherein in D), the processor:
provides for independent enabling or disabling for display of only the at least one second layer such that the at least one first layer is unavailable for selective display.

30. The apparatus of claim 18, wherein in D), the processor:
provides for independent enabling or disabling for display of both the at least one first layer and the at least one second layer to facilitate comparative viewing of first and second electronic renderings.

31. The apparatus of claim 18, wherein the processor:
renders for display on a display device only enabled layers of the at least one first layer and the at least one second layer.

32. The apparatus of claim 18, wherein the processor:
renders for display on a display device a layer legend indicating the at least one first layer and the at least one second layer; and
selects for enabling or disabling for display at least one layer of the at least one first layer and/or the at least one second layer indicated in the layer legend.

33. The apparatus of claim 18, wherein the processor:
limits the scope and/or type of at least one user input relating to the modification of the first electronic rendering based at least in part on an identity or a class of a user and editing privileges associated with the identity or the class or the user.

34. At least one non-transitory computer-readable storage medium encoded with at least one program including processor-executable instructions that, when executed by a processor, perform a method for managing and displaying information relating to a marking operation to mark a presence or an affirmative absence of at least one underground facility, the method comprising:

A) electronically storing first information relating to a first electronic rendering of the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag;

B) accepting at least one user input relating to a modification of the first electronic rendering;

C) electronically storing second information relating to a second electronic rendering of the marking operation, wherein the second electronic rendering is based at least in part on the at least one user input relating to the modification of the first electronic rendering; and D) providing for independent enabling or disabling for display of (i) at least one first layer comprising the first electronic rendering, and/or (ii) at least one second layer comprising the second electronic rendering.

35. A method for providing on a display device an electronic rendering of a marking operation to mark a presence or an affirmative absence of at least one underground facility, the method comprising:

A) electronically categorizing information relating to the marking operation into a plurality of display layers of the electronic rendering, the plurality of display layers including:

at least one first display layer comprising original information relating to the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag; and at least one second display layer comprising modified information relating to the marking operation, wherein the modified information is based at least in part on one or more revisions to the original information;

B) providing for independent enabling or disabling for display, via at least one user interface, of the at least one first display layer and the at least one second display layer; and C) displaying in a display field of the display device only enabled display layers of the plurality of display layers so as to provide the electronic rendering of the marking operation.

36. The method of claim 35, wherein:
the at least one first display layer includes a plurality of first display layers;
the at least one second display layer includes a plurality of second display layers respectively corresponding to the plurality of first display layers; and
the at least one second display layer is a revised version of a corresponding first display layer of the plurality of first display layers.

37. The method of claim 35, wherein:
the one or more revisions to the original information comprise excluding some of the original information, such that the modified information is less than the original information;
the at least one first display layer includes a plurality of first display layers; and
the at least one second display layer includes a plurality of second display layers respectively corresponding to only some of the plurality of first display layers.

38. The method of claim 37, wherein the at least one second display layer is a revised version of a corresponding first display layer of the plurality of first display layers.

39. The method of claim 37, wherein:
the plurality of first display layers includes at least one first facility layer corresponding to a first facility type; and
the plurality of second display layers does not include any layer corresponding to the first facility type.

40. The method of claim 37, wherein:
the plurality of first display layers includes at least one first facility layer corresponding to a first facility owner; and
the plurality of second display layers does not include any layer corresponding to the first facility owner.

41. The method of claim 37, wherein:
the plurality of first display layers includes at least one first facility layer corresponding to a first landmark type; and
the plurality of second display layers does not include any layer corresponding to the first landmark type.

42. The method of claim 35, wherein:
the at least one first display layer includes a plurality of first display layers;
the at least one second display layer includes a plurality of second display layers; and
the at least one second display layer does not correspond to any first display layer of the plurality of first display layers.

43. The method of claim 42, wherein:
all of the plurality of first display layers are included in the plurality of second display layers; and
the plurality of second display layers includes at least one additional layer not found in the plurality of first display layers.

44. The method of claim 35, wherein at least a portion of the original information is write-protected to prevent unauthorized modifications thereto.

45. The method of claim 35, wherein at least a portion of the original information is copy-protected information to prevent unauthorized copying, and wherein the modified information does not include the copy-protected information.

46. An apparatus for providing on a display device an electronic rendering of a marking operation to mark a presence or an affirmative absence of at least one underground facility, the apparatus comprising:
a memory to store processor-executable instructions;
at least one user interface;
a display device; and
a processor coupled to the memory, the at least one user interface, and the display device, wherein upon execution of the processor-executable instructions, the processor:

A) electronically categorizes information relating to the marking operation into a plurality of display layers of the electronic rendering, the plurality of display layers including:

at least one first display layer comprising original information relating to the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag; and at least one second display layer comprising modified information relating to the marking operation, wherein the modified information is based at least in part on one or more revisions to the original information;

B) provides for independent enabling or disabling for display, via at least one user interface, of the at least one first display layer and the at least one second display layer; and C) controls the display device so as to display only enabled display layers of the plurality of display layers so as to provide the electronic rendering of the marking operation.

47. The apparatus of claim 46, wherein:
the at least one first display layer includes a plurality of first display layers;
the at least one second display layer includes a plurality of second display layers respectively corresponding to the plurality of first display layers; and
the at least one second display layer is a revised version of a corresponding first display layer of the plurality of first display layers.

48. The apparatus of claim 46, wherein:
the one or more revisions to the original information comprise excluding some of the original information, such that the modified information is less than the original information;
the at least one first display layer includes a plurality of first display layers; and
the at least one second display layer includes a plurality of second display layers respectively corresponding to only some of the plurality of first display layers.

49. The apparatus of claim 48, wherein the at least one second display layer is a revised version of a corresponding first display layer of the plurality of first display layers.

50. The apparatus of claim 48, wherein:
the plurality of first display layers includes at least one first facility layer corresponding to a first facility type; and
the plurality of second display layers does not include any layer corresponding to the first facility type.

51. The apparatus of claim 48, wherein:
the plurality of first display layers includes at least one first facility layer corresponding to a first facility owner; and
the plurality of second display layers does not include any layer corresponding to the first facility owner.

52. The apparatus of claim 48, wherein:
the plurality of first display layers includes at least one first facility layer corresponding to a first landmark type; and
the plurality of second display layers does not include any layer corresponding to the first landmark type.

53. The apparatus of claim 46, wherein:
the at least one first display layer includes a plurality of first display layers;
the at least one second display layer includes a plurality of second display layers; and
the at least one second display layer does not correspond to any first display layer of the plurality of first display layers.

54. The apparatus of claim 53, wherein:
all of the plurality of first display layers are included in the plurality of second display layers; and
the plurality of second display layers includes at least one additional layer not found in the plurality of first display layers.

55. The apparatus of claim 46, wherein at least a portion of the original information is write-protected to prevent unauthorized modifications thereto.

56. The apparatus of claim 46, wherein at least a portion of the original information is copy-protected information to prevent unauthorized copying, and wherein the modified information does not include the copy-protected information.

57. At least one non-transitory computer-readable storage medium encoded with at least one program including processor-executable instructions that, when executed by a processor, perform a method for providing on a display device an electronic rendering of a marking operation to mark a presence or an affirmative absence of at least one underground facility, the method comprising:

A) electronically categorizing information relating to the marking operation into a plurality of display layers of the electronic rendering, the plurality of display layers including:
at least one first display layer comprising original information relating to the marking operation, the marking operation being performed after generation of and pursuant to a locate request ticket relating to a dig area, wherein at least a portion of the dig area is planned to be excavated or disturbed during prospective excavation activities, the marking operation comprising, in response to the locate request ticket, providing at least one visible warning to an excavator performing the prospective excavation activities of the presence or the affirmative absence of the at least one underground facility at the dig area using at least one physical locate mark that includes at least one of non-white paint and a non-white flag; and
at least one second display layer comprising modified information relating to the marking operation, wherein the modified information is based at least in part on one or more revisions to the original information;

B) providing for independent enabling or disabling for display of the at least one first display layer and the at least one second display layer; and C) displaying in a display field only enabled display layers of the plurality of display layers so as to provide the electronic rendering of the marking operation.

* * * * *